US012503603B2

(12) United States Patent
Samejima et al.

(10) Patent No.: US 12,503,603 B2
(45) Date of Patent: Dec. 23, 2025

(54) COMPOSITION, FILM, OPTICAL FILTER, SOLID-STATE IMAGING ELEMENT, IMAGE DISPLAY DEVICE, INFRARED SENSOR, CAMERA MODULE, COMPOUND, AND INFRARED ABSORBER

(71) Applicant: FUJIFILM Corporation, Tokyo (JP)

(72) Inventors: Suguru Samejima, Shizuoka (JP); Tokihiko Matsumura, Shizuoka (JP); Yumi Kato, Shizuoka (JP); Ryoji Orita, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 203 days.

(21) Appl. No.: 18/187,426

(22) Filed: Mar. 21, 2023

(65) Prior Publication Data

US 2023/0220210 A1 Jul. 13, 2023

Related U.S. Application Data

(63) Continuation of application No. PCT/JP2021/034249, filed on Sep. 17, 2021.

(30) Foreign Application Priority Data

Sep. 23, 2020 (JP) ................................ 2020-158832
Mar. 12, 2021 (JP) ................................ 2021-039767
Aug. 30, 2021 (JP) ................................ 2021-139650

(51) Int. Cl.
*C09B 47/04* (2006.01)
*C09B 57/00* (2006.01)
(Continued)

(52) U.S. Cl.
CPC .............. *C09B 57/00* (2013.01); *C09B 47/04* (2013.01); *G02B 1/04* (2013.01); *G02B 5/208* (2013.01)

(58) Field of Classification Search
CPC ........... C09B 47/04; C09B 57/00; G02B 1/04; G02B 5/208
See application file for complete search history.

(56) References Cited

U.S. PATENT DOCUMENTS

2011/0012075 A1 1/2011 Nii et al.
2011/0070407 A1* 3/2011 Kato .................... C09B 57/004 428/172
(Continued)

FOREIGN PATENT DOCUMENTS

JP 2009-263614 A 11/2009
JP 2010-90313 A 4/2010
(Continued)

OTHER PUBLICATIONS

Cammidge et al., "Phthalocyanine Analogues: Unexpectedly Facile Access to Non-Peripherally Substituted Octaalkyl Tetrabenzotriazaporphyrins, Tetrabenzodiazaporphyrins, Tetrabenzomonoazaporphyrins and Tetrabenzoporphyrins," Chemistry: A European Journal, vol. 17, 2011, pp. 3136-3146.
(Continued)

*Primary Examiner* — Bijan Ahvazi
(74) *Attorney, Agent, or Firm* — Birch, Stewart, Kolasch & Birch, LLP

(57) ABSTRACT

Provided is a composition which has excellent temporal stability and excellent spectral characteristics, and with which a film with suppressed defects can be formed. The composition includes a coloring agent represented by Formula (1) and a curable compound, in which $R^1$ to $R^4$ each independently represent a substituent, $R^5$ represents an aliphatic hydrocarbon group, $R^{11}$ to $R^{15}$ each independently represent a hydrogen atom or a substituent, and $Y^1$ and $Y^2$ each independently represent a hydrogen atom or a substitu-
(Continued)

ent. However, at least one of $R^{11}$, $R^{12}$, $R^{13}$, or $R^{14}$ is a substituent or each of $R^{11}$ to $R^{15}$ is a hydrogen atom.

(1)

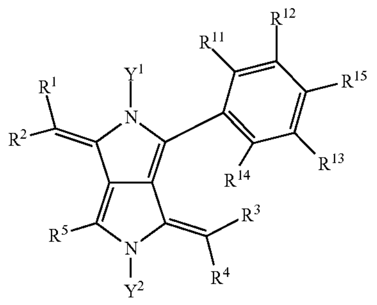

13 Claims, 1 Drawing Sheet

(51) Int. Cl.
*G02B 1/04* (2006.01)
*G02B 5/20* (2006.01)

(56) References Cited

U.S. PATENT DOCUMENTS

2011/0195235 A1 8/2011 Kato et al.
2017/0038507 A1 2/2017 Norizuki et al.

FOREIGN PATENT DOCUMENTS

JP 2010-111750 A 5/2010
JP 2011-68731 A 4/2011
JP 2014-184688 A 10/2014
JP 2014-240371 A 12/2014
JP 2018154672 A * 10/2018 ............ C09B 67/22
JP WO-2017126528 A1 * 11/2018 ............... G02B 5/22
WO WO 2015/166873 A1 11/2015

OTHER PUBLICATIONS

International Preliminary Report on Patentability and Written Opinion of the International Searching Authority (Forms PCT/IB/326, PCT/IB/373, and PCT/ISA/237) for International Application No. PCT/2021/034249, dated Apr. 6, 2023, with an English translation.
International Search Report (Form PCT/ISA/210) for International Application No. PCT/JP2021/034249, dated Nov. 30, 2021, with an English translation.
Mack et al., "Synthesis, Characterization, MCD Spectroscopy, and TD-DFT Calculations of Copper-Metalated Nonperipherally Substituted Octaoctyl Derivatives of Tetrabenzotriazaporphyrin, cis- and trans-Tetrabenzodiazaporphyrin, Tetrabenzomonoazaporphyrin, and Tetrabenzoporphyrin," Inorganic Chemistry, vol. 51, 2012, pp. 12820-12833.
Van As et al., "Tetrabenzoporphyrin and -mono-, -cis-di- and Tetrabenzotriazaporphyrin Derivatives: Electrochemical and Spectroscopic Implications of meso CH Group Replacement with Nitrogen," Inorganic Chemistry, vol. 54, 2015, pp. 5329-5341.
Japanese Office Action for corresponding Japanese Application No. 2022-551943, dated Mar. 5, 2024, with English translation.
Chinese Office Action and Search Report for corresponding Chinese Application No. 202180064983.3, dated Aug. 7, 2024, with English translation.
Korean Office Action for corresponding Korean Application No. 10-2023-7009822, dated May 14, 2025, with English translation.
Taiwanese Office Action and Search Report for corresponding Taiwanese Application No. 110135175, dated Mar. 12, 2025, with partial English translation.

* cited by examiner

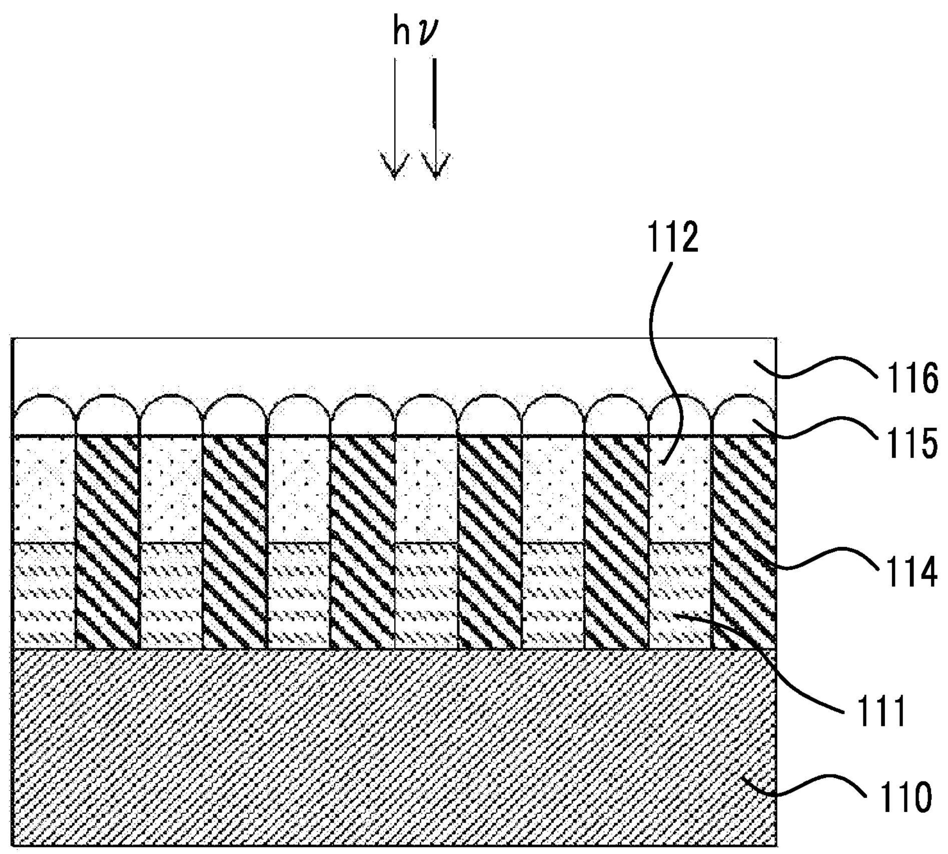
hν
112
116
115
114
111
110

COMPOSITION, FILM, OPTICAL FILTER, SOLID-STATE IMAGING ELEMENT, IMAGE DISPLAY DEVICE, INFRARED SENSOR, CAMERA MODULE, COMPOUND, AND INFRARED ABSORBER

CROSS-REFERENCE TO RELATED APPLICATIONS

This application is a continuation application of International Application No. PCT/JP2021/034249, filed Sep. 17, 2021, the disclosure of which is incorporated herein by reference in its entirety. Further, this application claims priority from Japanese Patent Application No. 2020-158832, filed Sep. 23, 2020, Japanese Patent Application No. 2021-039767, filed Mar. 12, 2021, and Japanese Patent Application No. 2021-139650, filed Aug. 30, 2021, the disclosures of which are incorporated herein by reference in their entirety.

BACKGROUND OF THE INVENTION

1. Field of the Invention

The present invention relates to a composition including a coloring agent and a curable compound. The present invention also relates to a film formed of the above-described composition, an optical filter, a solid-state imaging element, an image display device, an infrared sensor, a camera module, a compound, and an infrared absorber.

2. Description of the Related Art

A charge coupled device (CCD) or a complementary metal-oxide semiconductor (CMOS), which are solid-state imaging elements of color images, has been used in video cameras, digital still cameras, mobile phones with camera function, and the like. Silicon photodiodes having sensitivity to infrared rays are used in a light receiving section of these solid-state imaging elements. Therefore, an infrared cut filter may be provided to correct visual sensitivity.

The infrared cut filter is manufactured by using a composition including an infrared-absorbing coloring agent. As the infrared-absorbing coloring agent, a pyrrolopyrrole compound or the like has been known (see JP2014-184688A).

SUMMARY OF THE INVENTION

In recent years, there has been a demand for further improvement in spectral characteristics of a film formed of the composition including an infrared-absorbing coloring agent. For example, there has been a demand for excellent visible transparency.

In addition, the composition including an infrared-absorbing coloring agent is also required to have excellent temporal stability and to have few defects in the film to be obtained.

Therefore, an object of the present invention is to provide a composition which has excellent temporal stability and excellent spectral characteristics, and with which a film with suppressed defects can be formed. Another object of the present invention is to provide a film formed of the composition, an optical filter, a solid-state imaging element, an image display device, an infrared sensor, and a camera module. Still another object of the present invention is to provide a compound and an infrared absorber.

The present invention provides the following.

<1> A composition comprising:

a coloring agent represented by Formula (1); and a curable compound, (1)

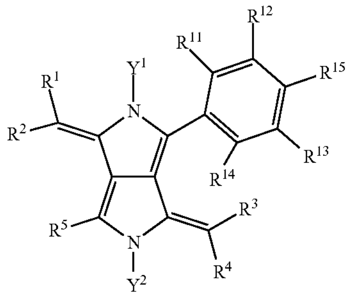

in Formula (1), $R^1$ to $R^4$ each independently represent a substituent, $R^5$ represents an aliphatic hydrocarbon group, $R^{11}$ to $R^{15}$ each independently represent a hydrogen atom or a substituent, and $Y^1$ and $Y^2$ each independently represent a hydrogen atom or a substituent, where at least one of $R^{11}$, $R^{12}$, $R^{13}$, or $R^{14}$ is a substituent or each of $R^{11}$ to $R^{15}$ is a hydrogen atom.

<2> The composition according to <1>, in which one of $R^1$ and $R^2$ in Formula (1) is a cyano group and the other is an aryl group or a heteroaryl group, and one of $R^3$ and $R^4$ in Formula (1) is a cyano group and the other is an aryl group or a heteroaryl group.

<3> The composition according to <1> or <2>, in which $R^5$ in Formula (1) is an alkyl group, and at least one of $R^{11}$ or $R^{14}$ is a substituent.

<4> The composition according to any one of <1> to <3>, in which $Y^1$ and $Y^2$ in Formula (1) each independently represent —$BR^{Y1}R^{Y2}$, where $R^{Y1}$ and $R^{Y2}$ each independently represent a hydrogen atom, a halogen atom, an alkyl group, an alkenyl group, an aryl group, a heteroaryl group, an alkoxy group, an aryloxy group, or a heteroaryloxy group, and $R^{Y1}$ and $R^{Y2}$ may be bonded to each other to form a ring.

<5> The composition according to any one of <1> to <4>, in which the coloring agent represented by Formula (1) has a maximal absorption wavelength at a wavelength of 650 nm or more.

<6> The composition according to any one of <1> to <5>, further comprising:

a compound represented by Formula (Pc), (Pc)

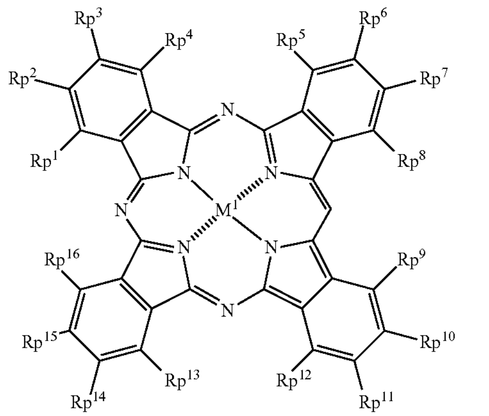

in Formula (Pc), $Rp^1$ to $Rp^{16}$ each independently represent a hydrogen atom or a substituent, at least one of $Rp^1$ or $Rp^4$ represents an alkyl group, at least one of $Rp^5$ or $Rp^8$ represents an alkyl group, at least one of $Rp^9$ or $Rp^{12}$ represents an alkyl group, at least one of $Rp^{13}$ or $Rp^{16}$ represents an alkyl group, and $M^1$ represents two hydrogen atoms, a divalent metal atom, or a divalent substituted metal atom including a trivalent or tetravalent metal atom.

<7> A film formed of the composition according to any one of <1> to <6>.

<8> An optical filter comprising:

the film according to <7>.

<9> A solid-state imaging element comprising:

the film according to <7>.

<10> An image display device comprising:

the film according to <7>.

<11> An infrared sensor comprising:

the film according to <7>.

<12> A camera module comprising:

the film according to <7>.

<13> A compound represented by Formula (1), (1)

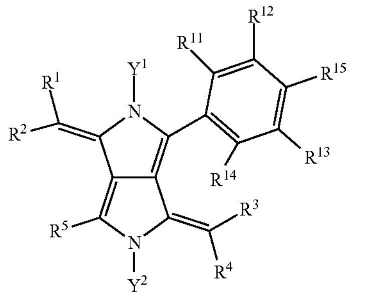

in Formula (1), $R^1$ to $R^4$ each independently represent a substituent, $R^5$ represents an aliphatic hydrocarbon group, $R^{11}$ to $R^{15}$ each independently represent a hydrogen atom or a substituent, and $Y^1$ and $Y^2$ each independently represent a hydrogen atom or a substituent, where at least one of $R^{11}$, $R^{12}$, $R^{13}$, or $R^{14}$ is a substituent or each of $R^{11}$ to $R^{15}$ is a hydrogen atom.

<14> An infrared absorber comprising:

the compound according to <13>.

According to the present invention, it is possible to provide a composition which has excellent temporal stability and excellent spectral characteristics, and with which a film with suppressed defects can be formed. In addition, according to the present invention, it is possible to provide a film, an optical filter, a solid-state imaging element, an image display device, an infrared sensor, a camera module, a compound, and an infrared absorber.

BRIEF DESCRIPTION OF THE DRAWINGS

FIG. 1 is a schematic diagram indicating an embodiment of an infrared sensor.

DESCRIPTION OF THE PREFERRED EMBODIMENTS

Hereinafter, the details of the present invention will be described.

In the present specification, numerical ranges represented by "to" include numerical values before and after "to" as lower limit values and upper limit values.

In the present specification, unless specified as a substituted group or as an unsubstituted group, a group (atomic group) denotes not only a group (atomic group) having no substituent but also a group (atomic group) having a substituent. For example, "alkyl group" denotes not only an alkyl group having no substituent (unsubstituted alkyl group) but also an alkyl group having a substituent (substituted alkyl group).

In the present specification, unless specified otherwise, "exposure" denotes not only exposure using light but also drawing using a corpuscular beam such as an electron beam or an ion beam. Examples of the light used for exposure include an actinic ray or radiation, for example, a bright light spectrum of a mercury lamp, a far ultraviolet ray represented by excimer laser, an extreme ultraviolet ray (EUV light), an X-ray, or an electron beam.

In the present specification, "(meth)acrylate" denotes either or both of acrylate and methacrylate, "(meth)acryl" denotes either or both of acryl and methacryl, and "(meth) acryloyl" denotes either or both of acryloyl and methacryloyl.

In the present specification, a weight-average molecular weight and a number-average molecular weight are defined as values in terms of polystyrene measured by gel permeation chromatography (GPC).

In the present specification, in a chemical formula, Me represents a methyl group, Et represents an ethyl group, Bu represents a butyl group, and Ph represents a phenyl group.

In the present specification, infrared rays denote light (electromagnetic wave) having a wavelength in a range of 700 to 2500 nm.

In the present specification, a total solid content denotes the total mass of all the components of the composition excluding a solvent.

In the present specification, a pigment means a coloring material which is hardly dissolved in a solvent.

In the present specification, the term "step" denotes not only an individual step but also a step which is not clearly distinguishable from another step as long as an effect expected from the step can be achieved.

<Composition>

The composition according to the embodiment of the present invention includes a coloring agent represented by Formula (1) and a curable compound.

The coloring agent represented by Formula (1) has excellent infrared shielding properties. In addition, since $R^5$ is an aliphatic hydrocarbon group, and at least one of $R^{11}$, $R^{12}$, $R^{13}$, or $R^{14}$ is a substituent or each of $R^{11}$ to $R^{15}$ is a hydrogen atom, transition of the coloring agent in a visible range can be reduced, and visible transparency can be improved. Moreover, in a case where at least one of $R^{11}$, $R^{12}$, $R^{13}$, or $R^{14}$ is a substituent, a twist angle of a pyrrolopyrrole ring which is a coloring agent mother nucleus is increased, and the visible transparency can be further improved. In particular, in a case where $R^5$ is an alkyl group and at least one of $R^{11}$ or $R^{14}$ is a substituent, the twist angle of the pyrrolopyrrole ring which is a coloring agent mother nucleus is further increased, and the visible transparency can be further improved. Therefore, by using the composition according to the embodiment of the present invention, a film having excellent spectral characteristics can be formed.

In addition, the coloring agent represented by Formula (1) has a structure in which (1) $R^5$ which is an aliphatic hydrocarbon group and (2) a benzene ring group in which at least one of $R^{11}$, $R^{12}$, $R^{13}$, or $R^{14}$ is a substituent or each of $R^{11}$ to $R^{15}$ is a hydrogen atom (that is, a benzene ring group having at least a substituent in the ortho or meta position or an unsubstituted benzene ring group (phenyl group)) are each bonded to the pyrrolopyrrole ring which is a coloring agent mother nucleus at a symmetrical position. As described above, since the coloring agent represented by Formula (1) is a compound having an asymmetric structure, it is presumed that ease of overlapping between molecules, or the like is lowered, crystallinity is reduced, and aggregation of the coloring agents in the composition can be suppressed. Therefore, the composition according to the embodiment of the present invention has excellent temporal stability.

In addition, since the coloring agent represented by Formula (1) has low crystallinity, the aggregation of the coloring agents in the film can also be suppressed. Therefore, by using the composition according to the embodiment of the present invention, it is possible to form a film in which occurrence of defects is suppressed.

The composition according to the embodiment of the present invention can be used as a composition for an optical filter. Examples of the type of the optical filter include an infrared cut filter and an infrared transmitting filter. Since the coloring agent represented by Formula (1) has excellent visible transparency, an infrared cut filter having excellent visible transparency can be formed by using the composition according to the embodiment of the present invention. In addition, in the infrared transmitting filter, the coloring agent represented by Formula (1) has a role of limiting transmitted light (infrared rays) to be a longer wavelength side. Since the coloring agent represented by Formula (1) has excellent visible transparency, it is easy to control a spectrum to be shielded in the visible range or a spectrum to be transmitted in an infrared range to be in an appropriate range.

Hereinafter, each of the components used in the composition according to the embodiment of the present invention will be described.

<<Coloring Agent Represented by Formula (1) (Specific Coloring Agent)>>

The composition according to the embodiment of the present invention includes a coloring agent represented by Formula (1) (hereinafter, also referred to as a specific coloring agent).

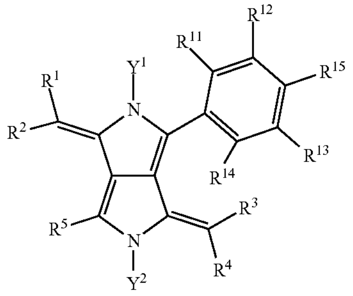

(1)

In Formula (1), $R^1$ to $R^4$ each independently represent a substituent, $R^5$ represents an aliphatic hydrocarbon group, $R^{11}$ to $R^{15}$ each independently represent a hydrogen atom or a substituent, and $Y^1$ and $Y^2$ each independently represent a hydrogen atom or a substituent, where at least one of $R^{11}$, $R^{12}$, $R^{13}$, or $R^{14}$ is a substituent or each of $R^{11}$ to $R^{15}$ is a hydrogen atom.

Examples of the substituent represented by $R^1$ to $R^4$ in Formula (1) include groups in the description of the substituent T later.

It is preferable that one of $R^1$ and $R^2$ in Formula (1) is an electron withdrawing group and the other is an aryl group or a heteroaryl group. In addition, it is preferable that one of $R^3$ and $R^4$ is an electron withdrawing group and the other is an aryl group or a heteroaryl group.

A substituent having a positive Hammett's σp value (sigma para value) acts as an electron withdrawing group. In the present specification, a substituent having a Hammett's σp value of 0.2 or more can be exemplified as the electron withdrawing group. The σp value is preferably 0.25 or more, more preferably 0.3 or more, and particularly preferably 0.35 or more. The upper limit is not particularly limited, but is preferably 0.80. Specific examples of the electron withdrawing group include a cyano group (0.66), a carboxyl group (—COOH: 0.45), an alkoxycarbonyl group (for example, —$COOCH_3$: 0.45), an aryloxycarbonyl group (for example, —COOPh: 0.44), a carbamoyl group (for example, —$CONH_2$: 0.36), an alkylcarbonyl group (for example, —$COCH_3$: 0.50), an arylcarbonyl group (for example, —COPh: 0.43), an alkylsulfonyl group (for example, —$SO_2CH_3$: 0.72), and an arylsulfonyl group (for example, —$SO_2Ph$: 0.68). A cyano group, an alkylcarbonyl group, an alkylsulfonyl group, or an arylsulfonyl group is preferable, and a cyano group is more preferable. That is, it is preferable that one of $R^1$ and $R^2$ and one of $R^3$ and $R^4$ in Formula (1) are each a cyano group. Here, Ph represents a phenyl group. With regard to the Hammett's 6p value, reference can be made to the description in paragraphs 0024 and 0025 of JP2009-263614A, the contents of which are incorporated herein by reference.

One of $R^1$ and $R^2$ and one of $R^3$ and $R^4$ are each independently preferably an aryl group or a heteroaryl group, and more preferably a heteroaryl group.

The number of carbon atoms in the aryl group is preferably 6 to 20 and more preferably 6 to 13. The aryl group may have a substituent or may be unsubstituted. Examples of the substituent include groups in the description of the substituent T later and a group represented by Formula (R-100) described later, and a halogen atom, an alkyl group, an aryl group, a heteroaryl group, an alkoxy group, an aryloxy group, or a hydroxy group is preferable.

The heteroaryl group may be a monocyclic ring, but is preferably a fused ring. The number of heteroatoms constituting a heteroaryl ring of the heteroaryl group is preferably 1 to 3. As the heteroatom constituting the heteroaryl ring, a nitrogen atom, an oxygen atom, or a sulfur atom is preferable. The number of carbon atoms constituting the heteroaryl ring is preferably 3 to 30, more preferably 3 to 18, and still more preferably 3 to 12. It is preferable that the heteroaryl ring is a 5-membered or 6-membered ring. The heteroaryl group may have a substituent or may be unsubstituted. Examples of the substituent include groups in the description of the substituent T later and a group represented by Formula (R-100) described later, and a halogen atom, an alkyl group, an aryl group, a heteroaryl group, an alkoxy group, an aryloxy group, or a hydroxy group is preferable.

Examples of the heteroaryl group include groups represented by Formulae (Har-1) to (Har-10) shown below. Among these, from the reason that light resistance is excellent, a group represented by Formula (Har-1), a group represented by Formula (Har-2), a group represented by Formula (Har-3), a group represented by Formula (Har-4), a group represented by Formula (Har-8), a group represented by Formula (Har-9), or a group represented by Formula (Har-10) is preferable. In addition, from the reason that more excellent visible transparency is obtained, a group represented by Formula (Har-1), a group represented by Formula (Har-2), a group represented by Formula (Har-3), or a group represented by Formula (Har-4) is preferable, a group represented by Formula (Har-1), a group represented by Formula (Har-2), or a group represented by Formula (Har-4) is more preferable, a group represented by Formula (Har-1) or a group represented by Formula (Har-2) is still more preferable, and a group represented by Formula (Har-1) is particularly preferable.

(Har-1)

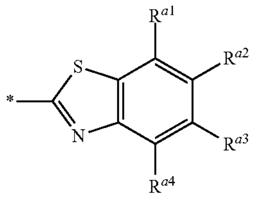

(Har-2)

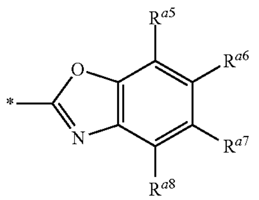

(Har-3)

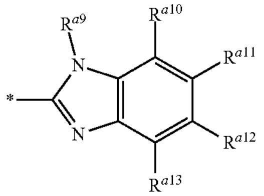

-continued (Har-4)

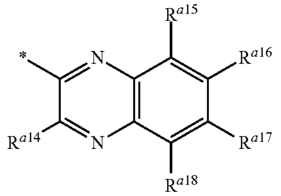

(Har-5)

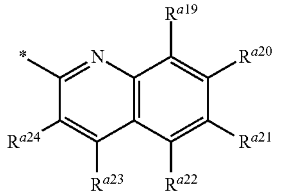

(Har-6)

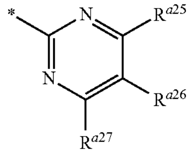

(Har-7)

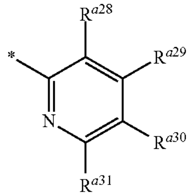

(Har-8)

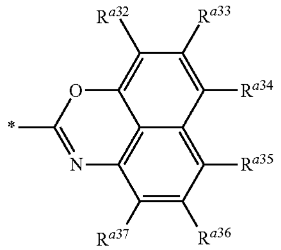

(Har-9)

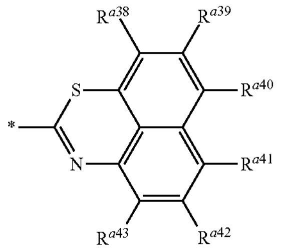

(Har-10)

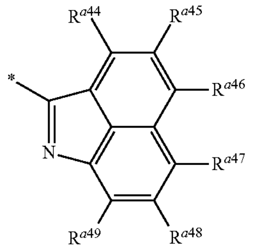

In the formulae, $R^{a1}$ to $R^{a49}$ each independently represent a hydrogen atom or a substituent, and * represents a bonding site. Examples of the substituent represented by $R^{a1}$ to $R^{a49}$ include groups in the description of the substituent T later and a group represented by Formula (R-100) described later. $R^{a1}$ to $R^{a49}$ are each independently preferably a hydrogen atom, a halogen atom, an alkyl group, an aryl group, a heteroaryl group, an alkoxy group, an aryloxy group, or a hydroxy group.

In Formula (Har-1), $R^{a1}$ and $R^{a2}$, $R^{a2}$ and $R^{a3}$, or $R^{a3}$ and $R^{a4}$ may be bonded to each other to form a ring.

In Formula (Har-2), $R^{a5}$ and $R^{a6}$, $R^{a6}$ and $R^{a7}$, or $R^{a7}$ and $R^{a8}$ may be bonded to each other to form a ring.

In Formula (Har-3), $R^{a9}$ and $R^{a10}$, $R^{a10}$ and $R^{a11}$, $R^{a11}$ and $R^{a12}$, or $R^{a12}$ and $R^{a13}$ may be bonded to each other to form a ring.

In Formula (Har-4), $R^{a15}$ and $R^{a16}$, $R^{a16}$ and $R^{a17}$, or $R^{a17}$ and Rais may be bonded to each other to form a ring.

In Formula (Har-5), $R^{a19}$ and $R^{a20}$, $R^{a20}$ and $R^{a21}$, $R^{a21}$ and $R^{a22}$, $R^{a22}$ and $R^{a23}$, or $R^{a23}$ and $R^{a24}$ may be bonded to each other to form a ring.

In Formula (Har-6), $R^{a25}$ and $R^{a26}$ or $R^{a26}$ and $R^{a27}$ may be bonded to each other to form a ring.

In Formula (Har-7), $R^{a28}$ and $R^{a29}$, $R^{a29}$ and $R^{a30}$, or $R^{a30}$ and $R^{a31}$ may be bonded to each other to form a ring.

In Formula (Har-8), $R^{a32}$ and $R^{a33}$, $R^{a33}$ and $R^{a34}$, $R^{a34}$ and $R^{a35}$, $R^{a15}$ and $R^{a36}$, or $R^{a36}$ and $R^{a37}$ may be bonded to each other to form a ring.

In Formula (Har-9), $R^{a38}$ and $R^{a39}$, $R^{a39}$ and $R^{a40}$, $R^{a40}$ and $R^{a41}$, $R^{a41}$ and $R^{a42}$, or $R^{a42}$ and $R^{a43}$ may be bonded to each other to form a ring.

In Formula (Har-10), $R^{a44}$ and $R^{a45}$, $R^{a45}$ and $R^{a46}$, $R^{a46}$ and $R^{a47}$, $R^{a47}$ and $R^{a48}$, or $R^{a48}$ and $R^{a49}$ may be bonded to each other to form a ring.

In Formulae (Har-1) to (Har-10), the ring formed by bonding the above-described groups to each other is preferably a 5-membered ring or a 6-membered ring.

$R^5$ in Formula (1) represents an aliphatic hydrocarbon group. The aliphatic hydrocarbon group represented by $R^5$ may be a saturated aliphatic hydrocarbon group or an unsaturated aliphatic hydrocarbon group. The aliphatic hydrocarbon group represented by $R^5$ may be linear, branched, or cyclic, but is preferably a branched or cyclic aliphatic hydrocarbon group. In addition, the cyclic aliphatic hydrocarbon group may be any of a monocyclic aliphatic hydrocarbon group, a fused aliphatic hydrocarbon group, or a crosslinked aliphatic hydrocarbon group, but is preferably a monocyclic aliphatic hydrocarbon group. The aliphatic hydrocarbon group represented by $R^5$ may have a substituent. Examples of the substituent include groups in the description of the substituent T later and a group represented by Formula (R-100) described later, and a halogen atom, an alkoxy group, an alkylthio group, a ureido group, an acyl group, an alkoxycarbonyl group, an acyloxy group, a hydroxy group, a sulfamoyl group, an aryloxy group, a carbonyl group, a carboxylic acid amide group, a sulfonamide group, an imide group, a sulfo group, or a group represented by Formula (R-100) is preferable.

Specific examples of the aliphatic hydrocarbon group represented by $R^5$ in Formula (1) include an alkyl group, an alkenyl group, and an alkynyl group.

The number of carbon atoms in the alkyl group is preferably 1 to 30. The lower limit is preferably 3 or more. In a case where the specific coloring agent is a pigment, the upper limit of the number of carbon atoms in the alkyl group is preferably 15 or less, more preferably 10 or less, and still more preferably 7 or less. In a case where the specific coloring agent is a dye, the upper limit of the number of carbon atoms in the alkyl group is preferably 25 or less and more preferably 19 or less. The alkyl group may be linear, branched, or cyclic, but is preferably a branched or cyclic alkyl group.

The number of carbon atoms in the alkenyl group is preferably 2 to 30. The lower limit is preferably 3 or more. In a case where the specific coloring agent is a pigment, the upper limit of the number of carbon atoms in the alkenyl group is preferably 15 or less, more preferably 10 or less, and still more preferably 7 or less. In a case where the specific coloring agent is a dye, the upper limit of the number of carbon atoms in the alkenyl group is preferably 25 or less and more preferably 19 or less. The alkenyl group may be linear, branched, or cyclic, but is preferably a branched or cyclic alkenyl group.

The number of carbon atoms in the alkynyl group is preferably 2 to 30. The lower limit is preferably 3 or more. In a case where the specific coloring agent is a pigment, the upper limit of the number of carbon atoms in the alkynyl group is preferably 15 or less, more preferably 10 or less, and still more preferably 7 or less. In a case where the specific coloring agent is a dye, the upper limit of the number of carbon atoms in the alkynyl group is preferably 25 or less and more preferably 19 or less. The alkynyl group may be linear, branched, or cyclic forms, and is preferably a branched or cyclic alkynyl group and more preferably a branched alkynyl group.

The alkyl group, the alkenyl group, and the alkynyl group may have a substituent or may be unsubstituted. Examples of the substituent include groups in the description of the substituent T later and a group represented by Formula (R-100) described later, and a halogen atom, an alkoxy group, an alkylthio group, a ureido group, an acyl group, an alkoxycarbonyl group, an acyloxy group, a hydroxy group, a sulfamoyl group, an aryloxy group, a carbonyl group, a carboxylic acid amide group, a sulfonamide group, an imide group, a sulfo group, or a group represented by Formula (R-100) is preferable.

The aliphatic hydrocarbon group represented by $R^5$ in Formula (1) is preferably an alkyl group, and more preferably a secondary alkyl group. Here, the secondary alkyl group is a group represented by $-C(R^{5a})(R^{5b})$. $R^{5a}$ and $R^{5b}$ each independently represent an alkyl group, and $R^{5a}$ and $R^{5b}$ may be bonded to each other to form an aliphatic hydrocarbon ring. The number of carbon atoms in the alkyl group represented by $R^{5a}$ and $R^{5b}$ is preferably 1 to 10 and more preferably 1 to 7. The alkyl group represented by $R^{5a}$ and $R^{5b}$ is preferably a linear or branched alkyl group. The alkyl group represented by $R^{5a}$ and $R^{5b}$ may have a substituent or may be unsubstituted.

Examples of the substituent include groups in the description of the substituent T later and a group represented by Formula (R-100) described later, and a halogen atom, an alkoxy group, an alkylthio group, a ureido group, an acyl group, an alkoxycarbonyl group, an acyloxy group, a hydroxy group, a sulfamoyl group, an aryloxy group, a carbonyl group, a carboxylic acid amide group, a sulfonamide group, an imide group, a sulfo group, or a group represented by Formula (R-100) is preferable.

The aliphatic hydrocarbon group represented by $R^5$ in Formula (1) is also preferably a group represented by Formula (R-1). According to this aspect, the coloring agent represented by Formula (1) easily forms an association during film formation, and heat resistance and light resistance of the film to be obtained can be further improved.

$$*-\!\!\left(CR^{101}R^{102}\right)_n\!\!-Ar^{101} \qquad \text{(R-1)}$$

In Formula (R-1), * represents a bonding site, $R^{101}$ and $R^{102}$ each independently represent a hydrogen atom or a substituent, $Ar^{101}$ represents an aryl group or a heteroaryl group, and n represents an integer of 1 or more.

Examples of the substituent represented by $R^{101}$ and $R^{102}$ include an alkyl group, an aryl group, and a heteroaryl group, and an alkyl group is preferable. $R^{101}$ and $R^{102}$ are each independently preferably a hydrogen atom.

$Ar^{101}$ represents an aryl group or a heteroaryl group, and is preferably an aryl group.

n in Formula (1) represents an integer of 1 or more, and is preferably an integer of 1 or 10, more preferably an integer of 1 to 5 and still more preferably 1 or 2.

The number of carbon atoms in the alkyl group represented by $R^{101}$ and $R^{102}$ is preferably 1 to 30, more preferably 1 to 20, still more preferably 1 to 10, even more preferably 1 to 5, and particularly preferably 1 to 3. The alkyl group may be linear, branched, or cyclic forms, and is preferably linear or branched and more preferably linear. The alkyl group may have a substituent or may be unsubstituted. Examples of the substituent include groups in the description of the substituent T later.

The number of carbon atoms in the aryl group represented by $R^{101}$, $R^{102}$, and $Ar^{101}$ is preferably 6 to 30, more preferably 6 to 20, and still more preferably 6 to 12. The aryl group may have a substituent or may be unsubstituted. Examples of the substituent include groups in the description of the substituent T later.

The number of carbon atoms in the heteroaryl group represented by $R^{101}$, $R^{102}$, and $Ar^{101}$ is preferably 1 to 30 and more preferably 1 to 12. Examples of the type of heteroatom constituting the heteroaryl group include a nitrogen atom, an oxygen atom, and a sulfur atom. The number of heteroatoms constituting the heteroaryl group is preferably 1 to 3 and more preferably 1 or 2. The heteroaryl group is preferably a monocyclic ring or a fused ring, more preferably a monocyclic ring or a fused ring composed of 2 to 8 rings, and still more preferably a monocyclic ring or a fused ring composed of 2 to 4 rings. The heteroaryl group may have a substituent or may be unsubstituted. Examples of the substituent include groups in the description of the substituent T later.

$R^{101}$ and $Ar^{101}$ may be bonded to each other to form a ring. The ring formed is preferably a 5-membered ring or a 6-membered ring.

$R^{11}$ to $R^{15}$ in Formula (1) each independently represent a hydrogen atom or a substituent. However, at least one of $R^{11}$, $R^{12}$, $R^{13}$, or $R^{14}$ is a substituent or each of $R^{11}$ to $R^{15}$ is a hydrogen atom. In a case where at least one of $R^{11}$, $R^{12}$, $R^{13}$, or $R^{14}$ in Formula (1) is a substituent, $R^{15}$ is preferably a hydrogen atom.

It is preferable that at least one of $R^{11}$ or $R^{14}$ in Formula (1) is a substituent. In addition, in this case, it is preferable that each of $R^{12}$, $R^{13}$, and $R^{15}$ in Formula (1) is a hydrogen atom.

Examples of the substituent represented by $R^{11}$ to $R^{15}$ in Formula (1) include groups in the description of the substituent T later and the group represented by Formula (R-100) described later, and a hydroxy group, a halogen atom, an alkyl group, an alkoxy group, an acyl group, an acyloxy group, an alkoxycarbonyl group, a sulfamoyl group, an alkylthio group, a ureido group, an aryloxy group, a carboxyl group, a carbonyl group, a carboxylic acid amide group, a sulfonamide group, an imide group, a sulfo group, or a group represented by Formula (R-100) is preferable.

$$*\text{-}L^{R1}\text{-}(X^{R1})_n \qquad \text{(R-100)}$$

In Formula (R-100), $L^{R1}$ represents an aliphatic hydrocarbon group, an aromatic hydrocarbon group, a heterocyclic group, —O—, —S—, —$NR^{L1}$—, —CO—, —COO—, —OCO—, —$SO_2$—, or an (n+1)-valent linking group consisting of a combination of these groups, $R^{L1}$ represents a hydrogen atom, an alkyl group, or an aryl group, $X^{R1}$ represents an acid group or a basic group, and n represents an integer of 1 or more. In a case where n is 1, $L^{R1}$ may be a single bond.

The number of carbon atoms in the aliphatic hydrocarbon group is preferably 1 to 20, more preferably 2 to 20, still more preferably 2 to 10, and particularly preferably 2 to 5. The aliphatic hydrocarbon group may be linear, branched, or cyclic. The aliphatic hydrocarbon group may have a substituent. Examples of the substituent include groups in the description of the substituent T later.

The number of carbon atoms in the aromatic hydrocarbon group is preferably 6 to 18, more preferably 6 to 14, and still more preferably 6 to 10. The aromatic hydrocarbon group may have a substituent. Examples of the substituent include groups in the description of the substituent T later.

The heterocyclic group is preferably a monocyclic ring or a fused ring having 2 to 4 fused rings. The number of heteroatoms constituting a ring of the heterocyclic group is preferably 1 to 3. The heteroatom constituting the ring of the heterocyclic group is preferably a nitrogen atom, an oxygen atom, or a sulfur atom. The number of carbon atoms constituting the ring of the heterocyclic group is preferably 3 to 30, more preferably 3 to 18, and more preferably 3 to 12. Specific examples of the heterocyclic group include a piperazine ring group, a pyrrolidine ring group, a pyrrole ring group, a piperidine ring group, a pyridine ring group, an imidazole ring group, a pyrazole ring group, an oxazole ring group, a thiazole ring group, a pyrazine ring group, a morpholine ring group, a thiazine ring group, an indole ring group, an isoindole ring group, a benzimidazole ring group, a purine ring group, a quinoline ring group, an isoquinoline ring group, a quinoxaline ring group, a cinnoline ring group, a carbazole ring group, and groups represented by Formulae (L-1) to (L-7).

(L-1)

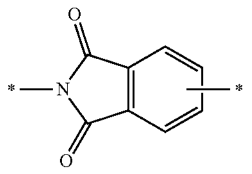

(L-2)

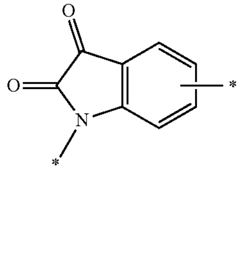

-continued (L-3)

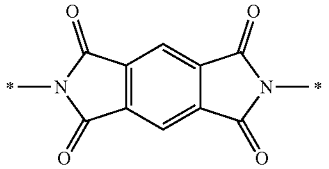

(L-4)

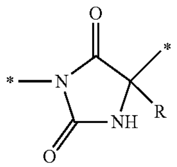

(L-5)

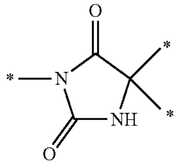

(L-6)

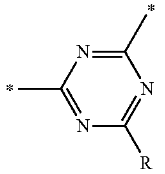

(L-7)

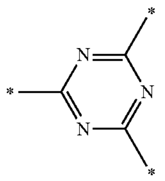

* in the formulae represents a bonding site. R represents a hydrogen atom or a substituent. Examples of the substituent include groups in the description of the substituent T later.

The aliphatic hydrocarbon group, the aromatic hydrocarbon group, and the heterocyclic group may have a substituent. Examples of the substituent include groups in the description of the substituent T later, and a halogen atom is preferable and a fluorine atom is more preferable.

The number of carbon atoms in the alkyl group represented by RY is preferably 1 to 20, more preferably 1 to 15, and still more preferably 1 to 8. The alkyl group may be linear, branched, or cyclic, and is preferably linear or branched and more preferably linear. The alkyl group represented by $R^{L1}$ may further have a substituent. Examples of the substituent include groups in the description of the substituent T later.

The number of carbon atoms in the aryl group represented by $R^{L1}$ is preferably 6 to 30, more preferably 6 to 20, and still more preferably 6 to 12. The aryl group represented by $R^{L1}$ may further have a substituent. Examples of the substituent include groups in the description of the substituent T later.

Examples of the acid group represented by $X^{R1}$ in Formula (R-100) include a carboxyl group, a sulfo group, a phosphoric acid group, a boronic acid group, a carboxylic acid amide group, a sulfonamide group, an imidic acid group, and salts of these group. Examples of an atom or atomic group constituting the salts include alkali metal ions ($Li^+$, $Na^+$, $K^+$, $Rb^+$, $Cs^+$, and the like), alkaline earth metal ions ($Ca^{2+}$, $Mg^{2+}$, and the like), an ammonium ion, an imidazolium ion, a pyridinium ion, and a phosphonium ion. As the carboxylic acid amide group, a group represented by $—NHCOR^{X1}$ is preferable. As the sulfonamide group, a group represented by $—NHSO_2R^{X2}$ is preferable. As the imidic acid group, a group represented by $—SO_2NHSO_2R^{X3}$, $—CONHSO_2R^{X4}$, $—CONHCOR^{X5}$, or $—SO_2NHCOR^{X6}$ is preferable, and a $—CONHSO_2R^{X4}$ or $—SO_2NHSO_2R^{X3}$ is more preferable. $R^{X1}$ to $R^{X6}$ each independently represent an alkyl group or an aryl group. The alkyl group and the aryl group represented by $R^{X1}$ to $R^{X6}$ may have a substituent. As the substituent, a halogen atom is preferable and a fluorine atom is more preferable.

Examples of the basic group represented by $X^{R1}$ in Formula (R-100) include an amino group, a pyridinyl group, or a salt thereof, a salt of an ammonium group, and a phthalimidomethyl group. Examples of an atom or atomic group constituting the salts include a hydroxide ion, a halogen ion, a carboxylate ion, a sulfonate ion, and a phenoxide ion.

Examples of the amino group include a group represented by $—NRx^1Rx^2$ and a cyclic amino group. In the group represented by $—NRx^1Rx^2$, $Rx^1$ and $Rx^2$ each independently represent a hydrogen atom, an alkyl group, or an aryl group, and an alkyl group is preferable. The number of carbon atoms in the alkyl group is preferably 1 to 10, more preferably 1 to 5, and still more preferably 1 to 3. The alkyl group may be any of linear, branched, and cyclic forms, but is preferably linear or branched and more preferably linear. The alkyl group may have a substituent. Examples of the substituent include groups in the description of the substituent T later. The number of carbon atoms in the aryl group is preferably 6 to 30, more preferably 6 to 20, and still more preferably 6 to 12. The aryl group may have a substituent. Examples of the substituent include groups in the description of the substituent T later. In addition, $Rx^1$ and $RX^2$ may be bonded to each other to form a ring. Examples of the cyclic amino group include a pyrrolidine group, a piperidine group, a piperazine group, and a morpholine group. These groups may further have a substituent. Examples of the substituent include groups in the description of the substituent T later. Specific examples of the substituent include an alkyl group and an aryl group.

n in Formula (R-100) represents an integer of 1 or more, and is preferably an integer of 1 or 3, more preferably 1 or 2, and still more preferably 1.

$Y^1$ and $Y^2$ in Formula (1) each independently represent a hydrogen atom or a substituent, and a substituent is preferable. Examples of the substituent represented by $Y^1$ and $Y^2$ in Formula (1) include an alkyl group, an aryl group, a heteroaryl group, and $—BR^{Y1}R^{Y2}$, and $—BR^{Y1}R^{Y2}$ is preferable.

The number of carbon atoms in the alkyl group represented by $Y^1$ and $Y^2$ is preferably 1 to 30, more preferably 1 to 20, still more preferably 1 to 10, even more preferably 1 to 5, and particularly preferably 1 to 3. The alkyl group may be linear, branched, or cyclic forms, and is preferably linear or branched and more preferably linear. The alkyl group may have a substituent or may be unsubstituted. Examples of the substituent include groups in the description of the substituent T later.

The number of carbon atoms in the aryl group represented by $Y^1$ and $Y^2$ is preferably 6 to 30, more preferably 6 to 20, and still more preferably 6 to 12. The aryl group may have a substituent or may be unsubstituted. Examples of the substituent include groups in the description of the substituent T later.

The number of carbon atoms in the heteroaryl group represented by $Y^1$ and $Y^2$ is preferably 1 to 30 and more preferably 1 to 12. Examples of the type of heteroatom constituting the heteroaryl group include a nitrogen atom, an oxygen atom, and a sulfur atom. The number of heteroatoms constituting the heteroaryl group is preferably 1 to 3 and more preferably 1 or 2. The heteroaryl group is preferably a monocyclic ring or a fused ring, more preferably a monocyclic ring or a fused ring composed of 2 to 8 rings, and still more preferably a monocyclic ring or a fused ring composed of 2 to 4 rings. The heteroaryl group may have a substituent or may be unsubstituted. Examples of the substituent include groups in the description of the substituent T later.

$R^{Y1}$ and $R^{Y2}$ in the group represented by $—BR^{Y1}R^{Y2}$ each independently represent a hydrogen atom, a halogen atom, an alkyl group, an alkenyl group, an aryl group, a heteroaryl group, an alkoxy group, an aryloxy group, or a heteroaryloxy group, and a halogen atom, an alkyl group, an aryl group, or a heteroaryl group is preferable, a halogen atom, an alkyl group, or an aryl group is more preferable, and an aryl group is still more preferable.

Examples of the halogen atom represented by $R^{Y1}$ and $R^{Y2}$ include a fluorine atom, a chlorine atom, a bromine atom, and an iodine atom, and a fluorine atom is preferable.

The number of carbon atoms in the alkyl group and the alkoxy group represented by $R^{Y1}$ and $R^{Y2}$ is preferably 1 to 40, more preferably 1 to 30, and still more preferably 1 to 20. The alkyl group and the alkoxy group may be linear, branched, or cyclic, and are preferably linear or branched. The alkyl group and the alkoxy group may have a substituent or may be unsubstituted. Examples of the substituent include an aryl group, a heteroaryl group, and a halogen atom.

The number of carbon atoms in the alkenyl group represented by $R^{Y1}$ and $R^{Y2}$ is preferably 2 to 40, more preferably 2 to 30, and still more preferably 2 to 20. The alkenyl group may have a substituent or may be unsubstituted. Examples of the substituent include an alkyl group, an alkoxy group, an aryl group, a heteroaryl group, and a halogen atom.

The number of carbon atoms in the aryl group and the aryloxy group represented by $R^{Y1}$ and $R^{Y2}$ is preferably 6 to 20 and more preferably 6 to 12. The aryl group and the aryloxy group may have a substituent or may be unsubstituted. Examples of the substituent include an alkyl group, an alkoxy group, and a halogen atom.

The heteroaryl group and the heteroaryloxy group represented by $R^{Y1}$ and $R^{Y2}$ may be a monocyclic ring or a fused ring. The number of heteroatoms constituting a heteroaryl ring of the heteroaryl group and the heteroaryloxy group is preferably 1 to 3. As the heteroatom constituting the heteroaryl ring, a nitrogen atom, an oxygen atom, or a sulfur atom is preferable. The number of carbon atoms constituting the heteroaryl ring is preferably 3 to 30, more preferably 3 to 18, and still more preferably 3 to 12. It is preferable that the heteroaryl ring is a 5-membered or 6-membered ring. The heteroaryl group and the heteroaryloxy group may have a substituent or may be unsubstituted. Examples of the substituent include an alkyl group, an alkoxy group, and a halogen atom.

$R^{Y1}$ and $R^{Y2}$ in the group represented by $—BR^{Y1}R^{Y2}$ may be bonded to each other to form a ring. Examples of the ring to be formed include structures shown in Formulae (B-1) to (B-4) below. In the following, Rb represents a substituent, $Rb^1$ to $Rb^4$ each independently represent a hydrogen atom or a substituent, b1 to b3 each independently represent an integer of 0 to 4, and * represents a bonding site. Examples of the substituent represented by Rb and $Rb^1$ to $Rb^4$ include groups in the description of the substituent T later, and a halogen atom, an alkyl group, or an alkoxy group is preferable.

(B-1)

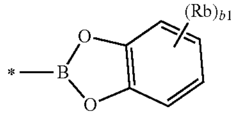

(B-2)

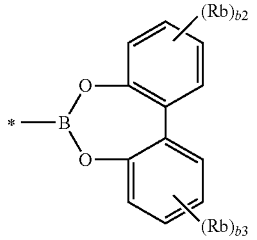

(B-3)

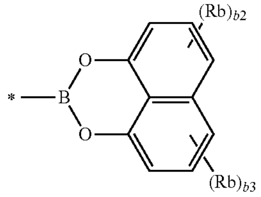

(B-4)

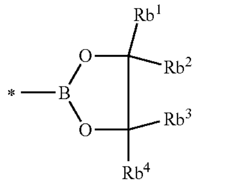

(Substituent T)

Examples of the substituent T include the following groups: a halogen atom (for example, a fluorine atom, a chlorine atom, a bromine atom, and an iodine atom), an alkyl group (preferably an alkyl group having 1 to 30 carbon atoms), an alkenyl group (preferably an alkenyl group having 2 to 30 carbon atoms), an alkynyl group (preferably an alkynyl group having 2 to 30 carbon atoms), an aryl group (preferably an aryl group having 6 to 30 carbon atoms), a heteroaryl group (preferably a heteroaryl group having 1 to 30 carbon atoms), an amino group (preferably an amino group having 0 to 30 carbon atoms), an alkoxy group (preferably an alkoxy group having 1 to 30 carbon atoms), an aryloxy group (preferably an aryloxy group having 6 to 30 carbon atoms), a heteroaryloxy group (preferably a heteroaryloxy group having 1 to 30 carbon atoms), an acyl group (preferably an acyl group having 2 to 30 carbon atoms), an alkoxycarbonyl group (preferably an alkoxycarbonyl group having 2 to 30 carbon atoms), an aryloxycarbonyl group (preferably an aryloxycarbonyl group having 7 to 30 carbon atoms), a heteroaryloxycarbonyl group (preferably a heteroaryloxycarbonyl group having 2 to 30 carbon atoms), an acyloxy group (preferably an acyloxy group having 2 to 30 carbon atoms), an acylamino group (preferably an acylamino group having 2 to 30 carbon atoms), an aminocarbonylamino group (preferably an aminocarbonylamino group having 2 to 30 carbon atoms), an alkoxycarbonylamino group (preferably an alkoxycarbonylamino group having 2 to 30 carbon atoms), an aryloxycarbonylamino group (preferably an aryloxycarbonylamino group having 7 to 30 carbon atoms), a sulfamoyl group (preferably a sulfamoyl group having 0 to 30 carbon atoms), a sulfamoylamino group (preferably a sulfamoylamino group having 0 to 30 carbon atoms), a carbamoyl group (preferably a carbamoyl group having 1 to 30 carbon atoms), an alkylthio group (preferably an alkylthio group having 1 to 30 carbon atoms), an arylthio group (preferably an arylthio group having 6 to 30 carbon atoms), a heteroarylthio group (preferably a heteroarylthio group having 1 to 30 carbon atoms), an alkylsulfonyl group (preferably an alkylsulfonyl group having 1 to 30 carbon atoms), an alkylsulfonylamino group (preferably an alkylsulfonylamino group having 1 to 30 carbon atoms), an arylsulfonyl group (preferably an arylsulfonyl group having 6 to 30 carbon atoms), an arylsulfonylamino group (preferably an arylsulfonylamino group having 6 to 30 carbon atoms), a heteroarylsulfonyl group (preferably a heteroarylsulfonyl group having 1 to 30 carbon atoms), a heteroarylsulfonylamino group (preferably a heteroarylsulfonylamino group having 1 to 30 carbon atoms), an alkylsulfinyl group (preferably an alkylsulfinyl group having 1 to 30 carbon atoms), an arylsulfinyl group (preferably an arylsulfinyl group having 6 to 30 carbon atoms), a heteroarylsulfinyl group (preferably a heteroarylsulfinyl group having 1 to 30 carbon atoms), a ureide group (preferably a ureide group having 1 to 30 carbon atoms), a hydroxy group, a nitro group, a carboxyl group, a sulfo group, a phosphoric acid group, a carboxylic acid amide group, a sulfonic acid amide group, an imide group, a phosphino group, a mercapto group, a cyano group, an alkylsulfino group, an arylsulphino group, an arylazo group, a heteroarylazo group, a phosphinyl group, a phosphinyloxy group, a phosphinylamino group, a silyl group, a hydradino group, and an imino group. In a case where the above-described groups can be further substituted, the groups may further have a substituent. Examples of the substituent include the groups described regarding the substituent T.

The specific coloring agent has a maximal absorption wavelength preferably at a wavelength of 650 nm or more, more preferably in a wavelength range of 650 to 1500 nm, still more preferably in a wavelength range of 660 to 1200 nm, and particularly preferably in a wavelength range of 660 to 1000 nm.

In addition, with regard to the specific coloring agent, in a wavelength range of 400 nm to 1200 nm, in a case where an absorbance value in a wavelength (λmax) which exhibits the largest absorbance value is set to 1, an average absorbance value in a wavelength range of 420 to 550 nm is preferably less than 0.010 and more preferably less than 0.007.

The values of the absorbance and the maximal absorption wavelength of the specific coloring agent can be obtained by dissolving the specific coloring agent in a solvent to prepare a coloring agent solution and measuring an absorbance of the coloring agent solution. Examples of the solvent used for preparing the coloring agent solution include chloroform, dimethyl sulfoxide (DMSO), and tetrahydrofuran (THF). In a case of a compound in which the specific coloring agent is soluble in chloroform, chloroform is used as the solvent. In a case of a compound in which the specific coloring agent is not soluble in chloroform but is soluble in dimethyl sulfoxide (DMSO) or tetrahydrofuran (THF), dimethyl sulfoxide (DMSO) or tetrahydrofuran (THF) is used as the solvent.

The specific coloring agent may be a pigment or a dye.

In addition, the specific coloring agent may be a coloring agent derivative. The coloring agent derivative is used, for example, as a dispersion aid. The dispersion aid is a material for increasing dispersibility of the pigment in the composition. In a case where the composition further includes a resin such as a dispersant, a network is formed between the pigment, the dispersion aid, and the resin, and the dispersibility of the pigment can be further improved. A compound having a structure in which at least one of $R^{11}$, $R^{12}$, $R^{13}$, or $R^{14}$ in Formula (1) is the group represented by Formula (R-100) can be preferably used as the dispersion aid. The compound having a structure in which at least one of $R^{11}$, $R^{12}$, $R^{13}$, or $R^{4}$ in Formula (1) is the group represented by Formula (R-100) can also be used as a pigment or a dye.

In the present specification, a resonance structure is also included in Formula (1). That is, a compound having a resonance structure of Formula (1) is also included in the specific coloring agent according to the specific coloring agent.

Specific examples of the specific coloring agent include compounds (PPB-A-1 to PPB-A-81, PPB-B-24, PPB-B-26, PPB-B-28, PPB-B-30, PPB-B-32, PPB-B-36, PPB-B-37, PPB-B-38, PPB-B-40, PPB-B-44, PPB-B-45, PPB-B-46, PPB-B-50, PPB-B-52, PPB-B-54, PPB-B-56, PPB-B-58, PPB-B-62, PPB-B-63, PPB-B-64, PPB-B-65, PPB-B-66, PPB-B-67, PPB-B-68, PPB-B-69, PPB-B-70, PPB-B-71, PPB-B-72, PPB-B-73, PPB-B-74, and PPB-C-1 to PPB-C-12) having structures described in Examples later, and salts of these compounds.

A content of the specific coloring agent in the total solid content of the composition is preferably 0.5% by mass or more, more preferably 3% by mass or more, and still more preferably 5% by mass or more. In addition, the upper limit of the content of the specific coloring agent is preferably 50% by mass or less, more preferably 40% by mass or less, and still more preferably 30% by mass or less. The composition may include only one kind of specific coloring agent, or may include two or more kinds thereof. In a case of including two or more kinds thereof, the total amount thereof is preferably within the above-described range.

The composition according to the embodiment of the present invention may include a decomposition product of the specific coloring agent.

<<Curable Compound>>

The composition according to the embodiment of the present invention contains a curable compound. Examples of the curable compound include a polymerizable compound and a resin. The resin may be a non-polymerizable resin (resin not having a polymerizable group), or may be a polymerizable resin (resin having a polymerizable group). Examples of the polymerizable group include an ethylenically unsaturated bond-containing group, a cyclic ether group, a methylol group, and an alkoxymethyl group. Examples of the ethylenically unsaturated bond-containing group include a vinyl group, a vinylphenyl group, a (meth)allyl group, a (meth)acryloyl group, a (meth)acryloyloxy group, and a (meth)acryloylamide group. Among these, a (meth)allyl group, a (meth)acryloyl group, or a (meth)acryloyloxy group is preferable, and a (meth)acryloyloxy group is more preferable. Examples of the cyclic ether group include an epoxy group and an oxetanyl group, and an epoxy group is preferable. The polymerizable compound is preferably a polymerizable monomer.

It is preferable that the curable compound includes at least a resin. In addition, in a case where the composition according to the embodiment of the present invention is used as a composition for photolithography, it is preferable to use a resin as a curable compound and a polymerizable monomer (monomer-type polymerizable compound), and it is more preferable to use a resin and a polymerizable monomer (monomer-type polymerizable compound) having an ethylenically unsaturated bond-containing group.

(Polymerizable Compound)

Examples of the polymerizable compound include a compound having an ethylenically unsaturated bond-containing group, a compound having a cyclic ether group, a compound having a methylol group, and a compound having an alkoxymethyl group. The compound having an ethylenically unsaturated bond-containing group can be preferably used as a radically polymerizable compound. In addition, the compound having a cyclic ether group can be preferably used as a cationically polymerizable compound.

Examples of a resin-type polymerizable compound include a resin which includes a repeating unit having a polymerizable group.

A molecular weight of the monomer-type polymerizable compound (polymerizable monomer) is preferably less than 2,000 and more preferably 1,500 or less. The lower limit of the molecular weight of the polymerizable monomer is preferably 100 or more and more preferably 200 or more. A weight-average molecular weight (Mw) of the resin-type polymerizable compound is preferably 2,000 to 2,000,000. The upper limit of the weight-average molecular weight is preferably 1,000,000 or less and more preferably 500,000 or less. The lower limit of the weight-average molecular weight is preferably 3,000 or more and more preferably 5,000 or more.

The compound having an ethylenically unsaturated bond-containing group as the polymerizable monomer is preferably a trifunctional to pentadecafunctional (meth)acrylate compound and more preferably a trifunctional to hexafunctional (meth)acrylate compound. Specific examples thereof include compounds described in paragraph Nos. 0095 to 0108 of JP2009-288705A, paragraph No. 0227 of JP2013-029760A, paragraph Nos. 0254 to 0257 of JP2008-292970A, paragraph Nos. 0034 to 0038 of JP2013-253224A, paragraph No. 0477 of JP2012-208494A, JP2017-048367A, JP6057891B, JP6031807B, and JP2017-194662A, the contents of which are incorporated herein by reference.

Examples of the compound having an ethylenically unsaturated bond-containing group include dipentaerythritol triacrylate (as a commercially available product, KAYARAD D-330 manufactured by Nippon Kayaku Co., Ltd.), dipentaerythritol tetraacrylate (as a commercially available product, KAYARAD D-320 manufactured by Nippon Kayaku Co., Ltd.), dipentaerythritol penta(meth)acrylate (as a commercially available product, KAYARAD D-310 manufactured by Nippon Kayaku Co., Ltd.), dipentaerythritol hexa(meth)acrylate (as a commercially available product, KAYARAD DPHA manufactured by Nippon Kayaku Co., Ltd., NK ESTER A-DPH-12E manufactured by Shin-Nakamura Chemical Co., Ltd.), and a compound having a structure in which a (meth)acryloyl group of these compounds is bonded through an ethylene glycol and/or a propylene glycol residue (for example, SR454 and SR499 which are commercially available products from Sartomer Company Inc.). In addition, as the compound having an ethylenically unsaturated bond-containing group, diglycerin ethylene oxide (EO)-modified (meth)acrylate (as a commercially available product, M-460 manufactured by TOAGOSEI CO., LTD.), pentaerythritol tetraacrylate (NK ESTER A-TMMT manufactured by Shin-Nakamura Chemical Co., Ltd.), 1,6-hexanediol diacrylate (KAYARAD HDDA manufactured by Nippon Kayaku Co., Ltd.), RP-1040 (manufactured by Nippon Kayaku Co., Ltd.), ARONIX TO-2349 (manufactured by TOAGOSEI CO., LTD.), NK OLIGO UA-7200 (manufactured by Shin-Nakamura Chemical Co., Ltd.), 8UH-1006 and 8UH-1012 (manufactured by Taisei Fine Chemical Co., Ltd.), Light Acrylate POB-A0 (manufactured by KYOEISHA CHEMICAL Co., Ltd.), and the like can also be used.

In addition, as the compound having an ethylenically unsaturated bond-containing group, it is also preferable to use a trifunctional (meth)acrylate compound such as trimethylolpropane tri(meth)acrylate, trimethylolpropane propyleneoxide-modified tri(meth)acrylate, trimethylolpropane ethyleneoxide-modified tri(meth)acrylate, isocyanuric acid ethyleneoxide-modified tri(meth)acrylate, and pentaerythritol tri(meth)acrylate. Examples of a commercially available product of the trifunctional (meth)acrylate compound include ARONIX M-309, M-310, M-321, M-350, M-360, M-313, M-315, M-306, M-305, M-303, M-452, and M-450 (manufactured by TOAGOSEI CO., LTD.), NK ESTER A9300, A-GLY-9E, A-GLY-20E, A-TMM-3, A-TMM-3L, A-TMM-3LM-N, A-TMPT, and TMPT (manufactured by Shin-Nakamura Chemical Co., Ltd.), and KAYARAD GPO-303, TMPTA, THE-330, TPA-330, and PET-30 (manufactured by Nippon Kayaku Co., Ltd.).

The compound having an ethylenically unsaturated bond-containing group may further have an acid group such as a carboxyl group, a sulfo group, and a phosphoric acid group. Examples of a commercially available product of such a compound include ARONIX M-305, M-510, M-520, and ARONIX TO-2349 (manufactured by TOAGOSEI CO., LTD.).

As the compound having an ethylenically unsaturated bond-containing group, a compound having a caprolactone structure can also be used. With regard to the compound having a caprolactone structure, reference can be made to the description in paragraph Nos. 0042 to 0045 of JP2013-253224A, the content of which is incorporated herein by reference. Examples of the compound having a caprolactone structure include DPCA-20, DPCA-30, DPCA-60, and DPCA-120, each of which is commercially available as series from Nippon Kayaku Co., Ltd.

As the compound having an ethylenically unsaturated bond-containing group, a compound having an ethylenically unsaturated bond-containing group and an alkyleneoxy group can also be used. Such a compound is preferably a compound having an ethylenically unsaturated bond-containing group and an ethyleneoxy group and/or a propyleneoxy group, more preferably a compound having an ethylenically unsaturated bond-containing group and an ethyleneoxy group, and still more preferably a 3- to 6-functional (meth)acrylate compound having 4 to 20 ethyleneoxy groups. Examples of a commercially available product thereof include SR-494 manufactured by Sartomer Company Inc., which is a tetrafunctional (meth)acrylate having 4 ethyleneoxy groups, and KAYARAD TPA-330 manufactured by Nippon Kayaku Co., Ltd., which is a trifunctional (meth)acrylate having 3 isobutyleneoxy groups.

As the compound having an ethylenically unsaturated bond-containing group, a polymerizable compound having a fluorene skeleton can also be used. Examples of a commercially available product thereof include OGSOL EA-0200 and EA-0300 (manufactured by Osaka Gas Chemicals Co., Ltd., (meth)acrylate monomer having a fluorene skeleton).

As the compound having an ethylenically unsaturated bond-containing group, it is also preferable to use a compound which does not substantially include environmentally regulated substances such as toluene. Examples of a commercially available product of such a compound include KAYARAD DPHA LT and KAYARAD DPEA-12 LT (manufactured by Nippon Kayaku Co., Ltd.).

As the compound having an ethylenically unsaturated bond-containing group, it is also preferable to use UA-7200 (manufactured by Shin-Nakamura Chemical Co., Ltd.), DPHA-40H (manufactured by Nippon Kayaku Co., Ltd.), UA-306H, UA-306T, UA-306I, AH-600, T-600, AI-600, and LINC-202UA (manufactured by KYOEISHA CHEMICAL Co., Ltd.), 8UH-1006 and 8UH-1012 (all of which are manufactured by Taisei Fine Chemical Co., Ltd.), Light Acrylate POB-A0 (manufactured by KYOEISHA CHEMICAL Co., Ltd.), and the like.

Examples of the compound having a cyclic ether group include a compound having an epoxy group and a compound having an oxetanyl group, and a compound having an epoxy group is preferable. Examples of the compound having an epoxy group include a compound having 1 to 100 epoxy groups in one molecule. The upper limit of the number of epoxy groups may be, for example, 10 or less or 5 or less. The lower limit of the number of epoxy groups is preferably 2 or more. As the epoxy compound having an epoxy group, compounds described in paragraph Nos. 0034 to 0036 of JP2013-011869A, paragraph Nos. 0147 to 0156 of JP2014-043556A, and paragraph Nos. 0085 to 0092 of JP2014-089408A, and compounds described in JP2017-179172A can also be used, the contents of which are incorporated herein by reference.

The compound having a cyclic ether group may be a low-molecular-weight compound (for example, having a molecular weight of less than 1,000) or a high-molecular-weight compound (macromolecule) (for example, having a molecular weight of 1,000 or more, and in a case of a polymer, having a weight-average molecular weight of 1,000 or more). The weight-average molecular weight of the compound having a cyclic ether group is preferably 200 to 100,000 and more preferably 500 to 50,000. The upper limit of the weight-average molecular weight is preferably 10,000 or less, more preferably 5,000 or less, and still more preferably 3,000 or less.

As the compound having a cyclic ether group, the compounds described in paragraph Nos. 0034 to 0036 of JP2013-011869A, the compounds described in paragraph Nos. 0147 to 0156 of JP2014-043556A, the compounds paragraph Nos. 0085 to 0092 of JP2014-089408A, and the compounds described in JP2017-179172A can also be used.

Examples of a commercially available product of the compound having a cyclic ether group include DENACOL EX-212L, EX-212, EX-214L, EX-214, EX-216L, EX-216, EX-321L, EX-321, EX-850L, and EX-850 (all of which are manufactured by Nagase ChemteX Corporation); ADEKA RESIN EP-40005, EP-40035, EP-40105, and EP-4011S (all of which are manufactured by ADEKA Corporation); NC-2000, NC-3000, NC-7300, XD-1000, EPPN-501, and EPPN-502 (all of which are manufactured by ADEKA Corporation); CELLOXIDE 2021P, CELLOXIDE 2081, CELLOXIDE 2083, CELLOXIDE 2085, EHPE3150, EPOLEAD PB 3600, and PB 4700 (all of which are manufactured by Daicel Corporation); CYCLOMER P ACA 200M, ACA 230AA, ACA Z250, ACA Z251, ACA Z300, and ACA Z320 (all of which are manufactured by Daicel Corporation); jER 1031S, jER 157S65, jER 152, jER 154, and jER 157570 (all of which are manufactured by Mitsubishi Chemical Corporation); ARON OXETANE OXT-121, OXT-221, OX-SQ, and PNOX (all of which are manufactured by TOAGOSEI CO., LTD.); ADEKA GLYCILOL ED-505 (manufactured by ADEKA Corporation, epoxy group-containing monomer); MARPROOF G-0150M, G-0105SA, G-0130SP, G-0250SP, G-1005S, G-1005SA, G-1010S, G-2050M, G-01100, and G-01758 (manufactured by NOF Corporation, epoxy group-containing polymer); OXT-101, OXT-121, OXT-212, and OXT-221 (all of which are manufactured by TOAGOSEI CO., LTD., oxetanyl group-containing monomer); and OXE-10 and OXE-30 (both of which are manufactured by OSAKA ORGANIC CHEMICAL INDUSTRY LTD., oxetanyl group-containing monomer).

Examples of the compound having a methylol group (hereinafter, also referred to as a methylol compound) include a compound in which a methylol group is bonded to a nitrogen atom or a carbon atom which forms an aromatic ring.

In addition, examples of the compound having an alkoxymethyl group (hereinafter, also referred to as an alkoxymethyl compound) include a compound in which an alkoxymethyl group is bonded to a nitrogen atom or a carbon atom which forms an aromatic ring. As the compound in which an alkoxymethyl group or a methylol group is bonded to a nitrogen atom, for example, alkoxy methylated melamine, methylolated melamine, alkoxy methylated benzoguanamine, methylolated benzoguanamine, alkoxy methylated glycoluril, methylolated glycoluril, alkoxy methylated urea, or methylolated urea is preferable. In addition, compounds described in paragraphs 0134 to 0147 of JP2004-295116A and paragraphs 0095 to 0126 of JP2014-089408A can also be used.

(Resin)

A resin can be used as the curable compound in the composition according to the embodiment of the present invention. It is preferable that the curable compound includes at least a resin. The resin is blended in, for example, an application for dispersing a pigment or the like in the composition or an application as a binder. Mainly, a resin which is used for dispersing a pigment or the like in the composition is also referred to as a dispersant. However, such applications of the resin are merely exemplary, and the resin can also be used for other purposes in addition to such applications. A resin having a polymerizable group also corresponds to the polymerizable compound.

A weight-average molecular weight of the resin is preferably 3,000 to 2,000,000. The upper limit is preferably 1000000 or less and more preferably 500000 or less. The lower limit is preferably 4000 or more and more preferably 5000 or more.

Examples of the resin include a (meth)acrylic resin, an epoxy resin, an ene-thiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamide resin, a polyamideimide resin, a polyolefin resin, a cyclic olefin resin, a polyester resin, a styrene resin, a vinyl acetate resin, a polyvinyl alcohol resin, a polyvinyl acetal resin, a polyurethane resin, and a polyurea resin. These resins may be used singly or as a mixture of two or more kinds thereof. From the viewpoint of improving heat resistance, as the cyclic olefin resin, a norbornene resin is preferable.

Examples of a commercially available product of the norbornene resin include ARTON series (for example, ARTON F4520) manufactured by JSR Corporation. In addition, as the resin, resins described in Examples of WO2016/088645A, resins described in JP2017-057265A, resins described in JP2017-032685A, resins described in JP2017-075248A, resins described in JP2017-066240A, resins described in JP2017-167513A, resins described in paragraph Nos. 0041 to 0060 of JP2017-206689A, and resins described in paragraph Nos. 0022 to 0071 of JP2018-010856A can also be used. In addition, as the resin, a resin having a fluorene skeleton can also be preferably used. With regard to the resin having a fluorene skeleton, reference can be made to the description in US2017/0102610A, the content of which is incorporated herein by reference.

As the resin, it is preferable to use a resin having an acid group. Examples of the acid group include a carboxyl group, a phosphoric acid group, a sulfo group, and a phenolic hydroxy group. Among these acid groups, one kind may be used singly, or two or more kinds may be used in combination. The resin having an acid group can also be used as a dispersant. An acid value of the resin having an acid group is preferably 30 to 500 mgKOH/g. The lower limit is preferably 50 mgKOH/g or more and more preferably 70 mgKOH/g or more. The upper limit is preferably 400 mgKOH/g or less, more preferably 200 mgKOH/g or less, still more preferably 150 mgKOH/g or less, and most preferably 120 mgKOH/g or less.

As the resin, it is also preferable to include a resin including a repeating unit derived from a compound represented by Formula (ED1) and/or a compound represented by Formula (ED2) (hereinafter, these compounds will also be referred to as an "ether dimer").

(ED1)

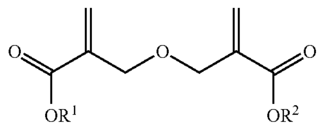

In Formula (ED1), $R^1$ and $R^2$ each independently represent a hydrogen atom or a hydrocarbon group having 1 to 25 carbon atoms, which may have a substituent.

(ED2)

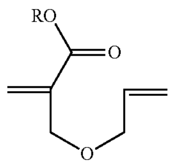

In Formula (ED2), R represents a hydrogen atom or an organic group having 1 to 30 carbon atoms. Specific examples of Formula (ED2) can be found in the description of JP2010-168539A.

Specific examples of the ether dimer can be found in paragraph No. 0317 of JP2013-029760A, the contents of which are incorporated herein by reference.

As the resin, it is also preferable to use a resin having a polymerizable group. As the polymerizable group, an ethylenically unsaturated bond-containing group or a cyclic ether group is preferable, and an ethylenically unsaturated bond-containing group is more preferable.

As the resin, it is also preferable to use a resin including a repeating unit derived from a compound represented by Formula (X).

(X)

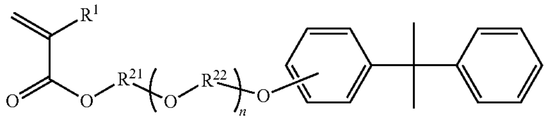

In the formula, $R^1$ represents a hydrogen atom or a methyl group, $R^{21}$ and $R^{22}$ each independently represent an alkylene group, and n represents an integer of 0 to 15. The number of carbon atoms in the alkylene group represented by $R^{21}$ and $R^{22}$ is preferably 1 to 10, more preferably 1 to 5, still more preferably 1 to 3, and particularly preferably 2 or 3. n represents an integer of 0 to 15, and is preferably an integer of 0 or 5, more preferably an integer of 0 to 4, and still more preferably an integer of 0 to 3.

Examples of the compound represented by Formula (X) include ethylene oxide- or propylene oxide-modified (meth) acrylate of para-cumylphenol. Examples of a commercially available product thereof include ARONIX M-110 (manufactured by TOAGOSEI CO., LTD.).

The resin preferably includes a resin as a dispersant. Examples of the dispersant include an acidic dispersant (acidic resin) and a basic dispersant (basic resin). Here, the acidic dispersant (acidic resin) represents a resin in which the amount of the acid group is larger than the amount of the basic group. The acidic dispersant (acidic resin) is preferably a resin in which the amount of the acid group is 70 mol % or more in a case where the total amount of the acid group and the basic group is 100 mol %. The acid group included in the acidic dispersant (acidic resin) is preferably a carboxyl group. An acid value of the acidic dispersant (acidic resin) is preferably 10 to 105 mgKOH/g. In addition, the basic dispersant (basic resin) represents a resin in which the amount of the basic group is larger than the amount of the acid group. The basic dispersant (basic resin) is preferably a resin in which the amount of the basic group is more than 50 mol % in a case where the total amount of the acid group and the basic group is 100 mol %. The basic group included in the basic dispersant is preferably an amino group.

It is also preferable that the resin used as a dispersant is a graft resin. With regard to details of the graft resin, reference can be made to the description in paragraph Nos. 0025 to 0094 of JP2012-255128A, the contents of which are incorporated herein by reference.

It is also preferable that the resin used as a dispersant is a polyimine-based dispersant including a nitrogen atom in at least one of the main chain or the side chain. As the polyimine-based dispersant, a resin having a main chain which has a partial structure having a functional group of pKa 14 or less, and a side chain which has 40 to 10000 atoms, in which at least one of the main chain or the side chain has a basic nitrogen atom, is preferable. The basic nitrogen atom is not particularly limited as long as it is a nitrogen atom exhibiting basicity. With regard to the polyimine-based dispersant, reference can be made to the description in paragraph Nos. 0102 to 0166 of JP2012-255128A, the contents of which are incorporated herein by reference.

It is also preferable that the resin used as a dispersant is a resin having a structure in which a plurality of polymer chains are bonded to a core portion. Examples of such a resin include dendrimers (including star polymers). In addition, specific examples of the dendrimer include polymer compounds C-1 to C-31 described in paragraph Nos. 0196 to 0209 of JP2013-043962A.

It is also preferable that the resin used as a dispersant are a resin including a repeating unit having an ethylenically unsaturated bond-containing group in the side chain. A content of the repeating unit having an ethylenically unsaturated bond-containing group in the side chain is preferably 10 mol % or more, more preferably 10 to 80 mol %, and still more preferably 20 to 70 mol % with respect to the total repeating units of the resin.

In addition, as the dispersant, a resin described in JP2018-087939A, block copolymers (EB-1) to (EB-9) described in paragraph Nos. 0219 to 0221 of JP6432077B, polyethyleneimine having a polyester side chain, described in WO2016/104803A, a block copolymer described in WO2019/125940A, a block polymer having an acrylamide structural unit, described in JP2020-066687A, a block polymer having an acrylamide structural unit, described in JP2020-066688A, or the like can also be used.

A commercially available product is also available as the dispersant, and specific examples thereof include DISPERBYK series manufactured by BYK Chemie Japan, Solsperse series manufactured by Lubrizol Japan Ltd., Efka series manufactured by BASF SE, and AJISPER series manufactured by Ajinomoto Fine-Techno Co., Inc. In addition, products described in paragraph No. 0129 of JP2012-137564A and products described in paragraph No. 0235 of JP2017-194662A can also be used as the dispersant.

A content of the curable compound in the total solid content of the composition is preferably 1% to 95% by mass. The lower limit is preferably 2% by mass or more, more preferably 5% by mass or more, still more preferably 7% by mass or more, and particularly preferably 10% by mass or more. The upper limit is preferably 94% by mass or less, more preferably 90% by mass or less, still more preferably 85% by mass or less, and particularly preferably 80% by mass or less.

In a case where the composition according to the embodiment of the present invention includes a polymerizable compound as the curable compound, a content of the polymerizable compound in the total solid content of the composition is preferably 1% to 85% by mass. The lower limit is preferably 2% by mass or more, more preferably 3% by mass or more, and still more preferably 5% by mass or more. The upper limit is preferably 80% by mass or less and more preferably 70% by mass or less.

In a case where the composition according to the embodiment of the present invention includes a polymerizable monomer as the curable compound, a content of the polymerizable monomer in the total solid content of the composition is preferably 1% to 50% by mass. The lower limit is preferably 2% by mass or more, more preferably 3% by mass or more, and still more preferably 5% by mass or more. The upper limit is preferably 30% by mass or less and more preferably 20% by mass or less.

In a case where the composition according to the embodiment of the present invention includes a compound having an ethylenically unsaturated bond-containing group as the curable compound, a content of the compound having an ethylenically unsaturated bond-containing group in the total solid content of the composition is preferably 1% to 70% by mass. The lower limit is preferably 2% by mass or more, more preferably 3% by mass or more, and still more preferably 5% by mass or more. The upper limit is preferably 65% by mass or less and more preferably 60% by mass or less.

In a case where the composition according to the embodiment of the present invention includes a resin as the curable compound, a content of the resin in the total solid content of the composition is preferably 1% to 85% by mass. The lower limit is preferably 2% by mass or more, more preferably 5% by mass or more, still more preferably 7% by mass or more, and particularly preferably 10% by mass or more. The upper limit is preferably 80% by mass or less, more preferably 75% by mass or less, still more preferably 70% by mass or less, and particularly preferably 40% by mass or less.

In a case where the composition according to the embodiment of the present invention contains a resin as a dispersant, a content of the resin as a dispersant in the total solid content of the composition is preferably 0.1% to 40% by mass. The upper limit is more preferably 25% by mass or less and still more preferably 20% by mass or less. The lower limit is preferably 0.5% by mass or more and more preferably 1% by mass or more. In addition, the content of the resin as a dispersant is preferably 1 to 100 parts by mass with respect to 100 parts by mass of the above-described specific coloring agent. The upper limit is preferably 80 parts by mass or less and more preferably 75 parts by mass or less. The lower limit is preferably 2.5 parts by mass or more and more preferably 5 parts by mass or more.

The composition according to the embodiment of the present invention may include one curable compound or two or more kinds of curable compounds. In a case of including two or more kinds of curable compounds, it is preferable that the total content thereof is within the above-described range.

<<Other Infrared Absorbers>>

The composition according to the embodiment of the present invention can contain an infrared absorber other than the above-described specific coloring agent (other infrared absorbers). By further containing other infrared absorbers, it is possible to form a film capable of shielding infrared rays in a wider wavelength range. The other infrared absorbers may be a dye or a pigment (particle). Examples of the other infrared absorbers include a pyrrolopyrrole compound, a cyanine compound, a squarylium compound, a phthalocyanine compound, a naphthalocyanine compound, a quaterrylene compound, a merocyanine compound, a croconium compound, an oxonol compound, an iminium compound, a dithiol compound, a triarylmethane compound, a pyrromethene compound, an azomethine compound, an anthraquinone compound, a dibenzofuranone compound, a dithiolene metal complex, a metal oxide, and a metal boride. Examples of the pyrrolopyrrole compound include compounds described in paragraph Nos. 0016 to 0058 of JP2009-263614A, compounds described in paragraph Nos. 0037 to 0052 of JP2011-068731A, and compounds described in paragraph Nos. 0010 to 0033 of WO2015/166873A. Examples of the squarylium compound include compounds described in paragraph Nos. 0044 to 0049 of JP2011-208101A, compounds described in paragraph Nos. 0060 and 0061 of JP6065169B, compounds described in paragraph No. 0040 of WO2016/181987A, compounds described in JP2015-176046A, compounds described in paragraph No. 0072 of WO2016/190162A, compounds described in paragraph Nos. 0196 to 0228 of JP2016-074649A, compounds described in paragraph No. 0124 of JP2017-067963A, compounds described in WO2017/135359A, compounds described in JP2017-114956A, compounds described in JP6197940B, and compounds described in WO2016/120166A. Examples of the cyanine compound include compounds described in paragraph Nos. 0044 and 0045 of JP2009-108267A, compounds described in paragraph Nos. 0026 to 0030 of JP2002-194040A, compounds described in JP2015-172004A, compounds described in JP2015-172102A, compounds described in JP2008-088426A, compounds described in paragraph No. 0090 of WO2016/190162A, and compounds described in JP2017-031394A. Examples of the croconium compound include compounds described in JP2017-082029A. Examples of the iminium compound include compounds described in JP2008-528706A, compounds described in JP2012-012399A, compounds described in JP2007-092060A, and compounds described in paragraph Nos. 0048 to 0063 of WO2018/043564A. Examples of the phthalocyanine compound include compounds described in paragraph No. 0093 of JP2012-077153A, oxytitanium phthalocyanine described in JP2006-343631A, compounds described in paragraph Nos. 0013 to 0029 of JP2013-195480A, vanadium phthalocyanine compounds described in JP6081771B, compounds described in WO2020/071470A, and compounds described in paragraph Nos. 0020 to 0024 of WO2018/186489A and paragraph Nos. 0029 to 0076 of WO2020/071470A. Examples of the naphthalocyanine compound include compounds described in paragraph No. 0093 of JP2012-077153A. Examples of the dithiolene metal complex include compounds described in JP5733804B. Examples of the metal oxide include indium tin oxide, antimony tin oxide, zinc oxide, Al-doped zinc oxide, fluorine-doped tin dioxide, niobium-doped titanium dioxide, and tungsten oxide. The details of tungsten oxide can be found in paragraph Nos. 0080 of JP2016-006476A, the content of which is incorporated herein by reference. Examples of the metal boride include lanthanum boride. Examples of a commercially available product of the lanthanum boride include $LaB_6$-F (manufactured by Japan New Metals Co., Ltd.). In addition, compounds described in WO2017/119394A can also be used as the metal boride. Examples of a commercially available product of indium tin oxide include F-ITO (manufactured by DOWA HIGHTECH CO., LTD.).

In addition, as the phthalocyanine compound, a compound represented by Formula (Pc) can also be used.

(Pc)

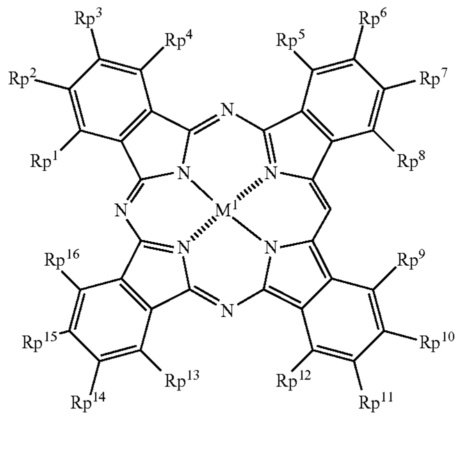

In Formula (Pc), $Rp^1$ to $Rp^{16}$ each independently represent a hydrogen atom or a substituent, at least one of $Rp^1$ or $Rp^4$ represents an alkyl group, at least one of $Rp^5$ or $Rp^8$ represents an alkyl group, at least one of $Rp^9$ or $Rp^{12}$ represents an alkyl group, at least one of $Rp^{13}$ or $Rp^{16}$ represents an alkyl group, and $M^1$ represents two hydrogen atoms, a divalent metal atom, or a divalent substituted metal atom including a trivalent or tetravalent metal atom.

Examples of the substituent represented by $Rp^1$ to $Rp^{16}$ in Formula (Pc) include the groups in the description of the substituent T above. The number of carbon atoms in the alkyl group represented by $Rp^1$, $Rp^4$, $Rp^5$, $Rp^8$, $Rp^9$, $Rp^{12}$, $Rp^{13}$, and $Rp^{16}$ in Formula (Pc) is preferably 1 to 30, more preferably 1 to 20, and still more preferably 1 to 10. The alkyl group is preferably linear or branched, and more preferably linear. The alkyl group may have a substituent, or may be an unsubstituted alkyl group. Examples of the substituent included in the alkyl group include an alkoxy group, an aryloxy group, an alkylthio group, and an arylthio group, and an alkoxy group or an aryloxy group is preferable. These groups may further have a substituent. Examples of the further substituent include an alkyl group, an aryl group, an alkoxy group, an aryloxy group, an alkylthio group, and an arylthio group, and an alkoxy group or an aryloxy group is preferable and an alkoxy group is more preferable.

In Formula (Pc), it is preferable that $Rp^1$, $Rp^4$, $Rp^5$, $Rp^8$, $Rp^9$, $Rp^{12}$, $Rp^{13}$, and $Rp^{16}$ are each independently an alkyl group.

In addition, it is preferable that $Rp^2$, $Rp^3$, $Rp^6$, $Rp^7$, $Rp^{10}$, $Rp^{11}$, $Rp^{14}$, and $Rp^{15}$ are hydrogen atoms.

Examples of a preferred aspect of $Rp^1$ to $Rp^{16}$ include an aspect in which $Rp^1$, $Rp^4$, $Rp^5$, $Rp^8$, $Rp^9$, $Rp^{12}$, $Rp^{13}$, and $Rp^{16}$ are each independently an alkyl group and $Rp^2$, $Rp^3$, $Rp^6$, $Rp^7$, $Rp^{10}$, $Rp^{11}$, $Rp^{14}$, and $Rp^{15}$ are hydrogen atoms.

Examples of another preferred aspect of $Rp^1$ to $Rp^{16}$ include an aspect in which one of $Rp^1$ and $Rp^4$ is an alkyl group and the other is a hydrogen atom, one of $Rp^5$ and $Rp^8$ is an alkyl group and the other is a hydrogen atom, one of $Rp^9$ and $Rp^{12}$ is an alkyl group and the other is a hydrogen atom, one of $Rp^{13}$ and $Rp^{16}$ is an alkyl group and the other is a hydrogen atom, and $Rp^2$, $Rp^3$, $Rp^6$, $Rp^7$, $Rp^{10}$, $Rp^{11}$, $Rp^{14}$, and $Rp^{15}$ are hydrogen atoms.

$M^1$ in Formula (Pc) is preferably Pd, Cu, Zn, Pt, Ni, TiO, Co, Fe, Mn, Sn, $SnCl_2$, AlCl, Al(OH), $Si(OH)_2$, VO, or InCl, and more preferably Cu or VO.

Specific examples of the compound represented by Formula (Pc) include the following compounds.

Pc-1
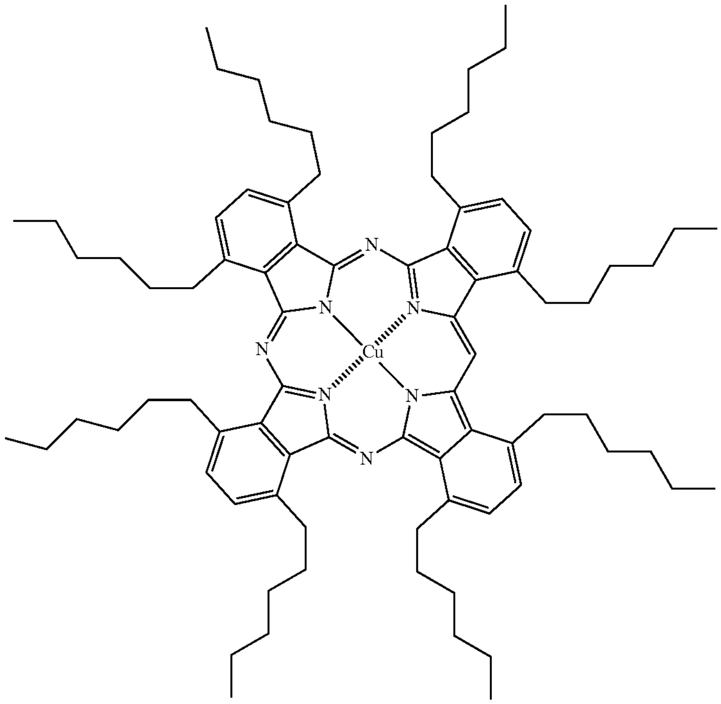
Pc-2
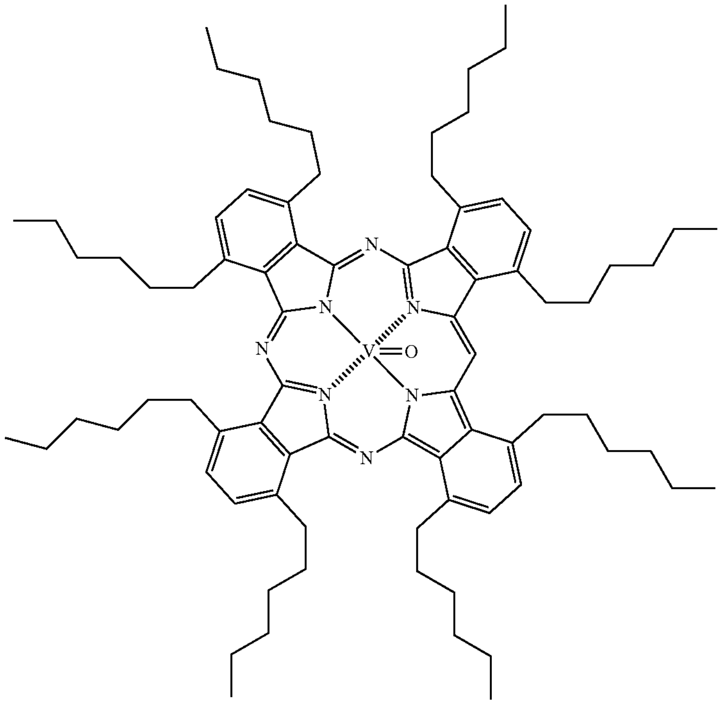

-continued
Pc-3
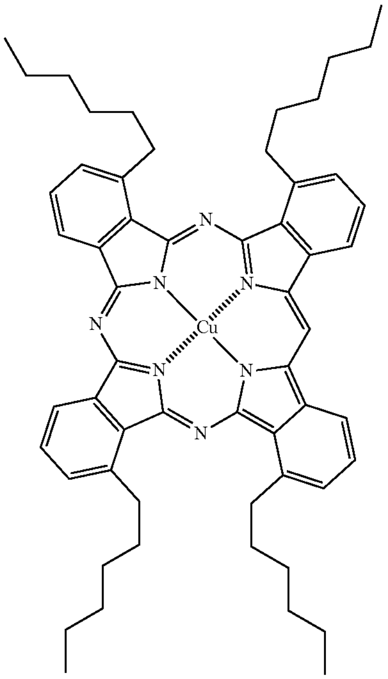
Pc-4
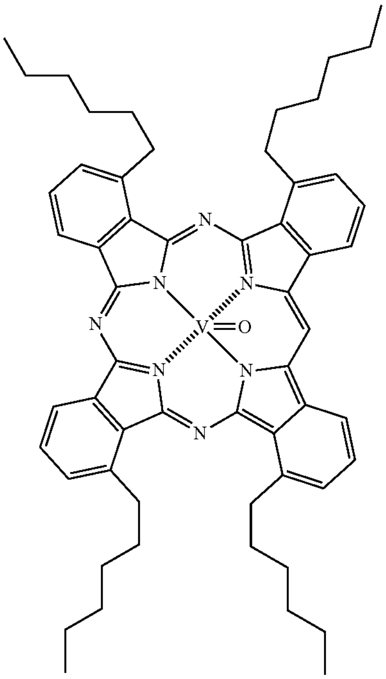
Pc-5
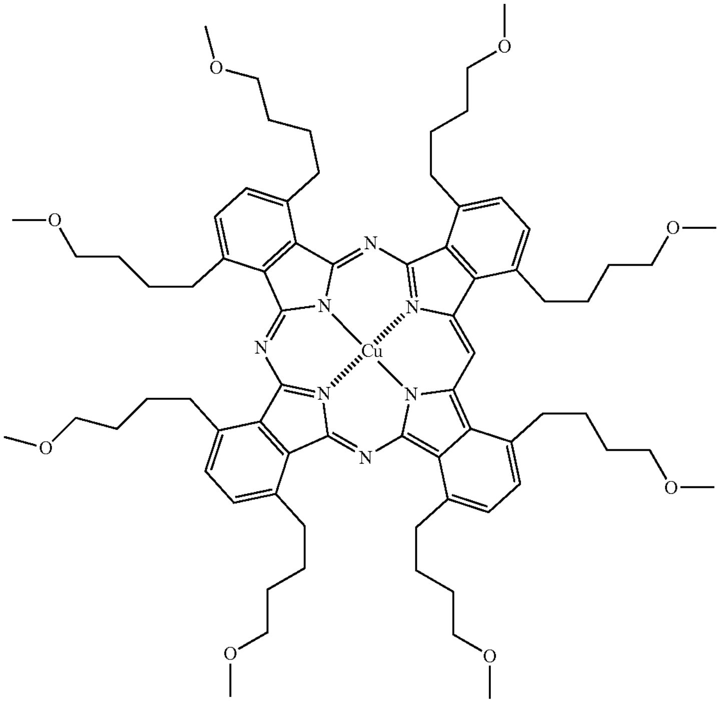

-continued
Pc-6
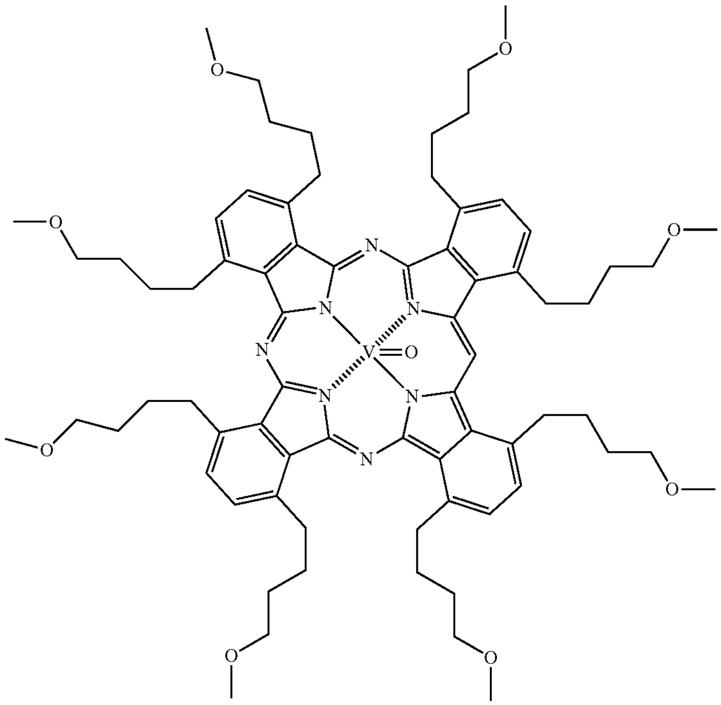
Pc-7
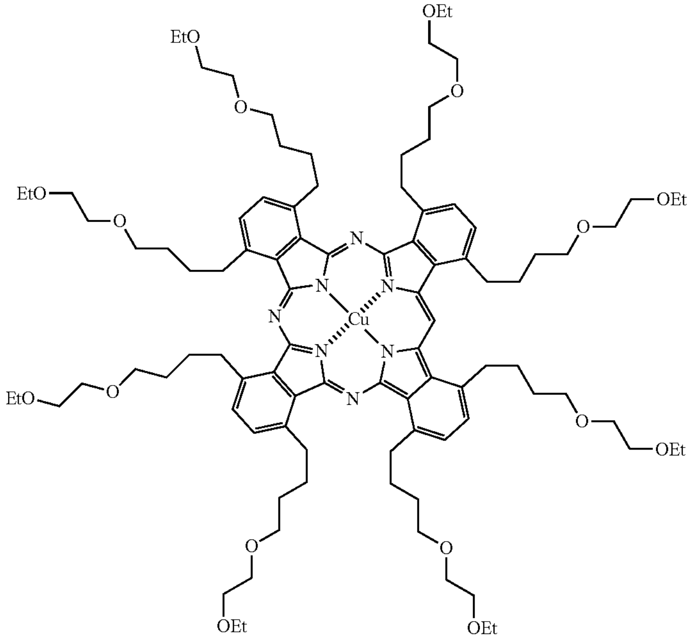

-continued
Pc-8
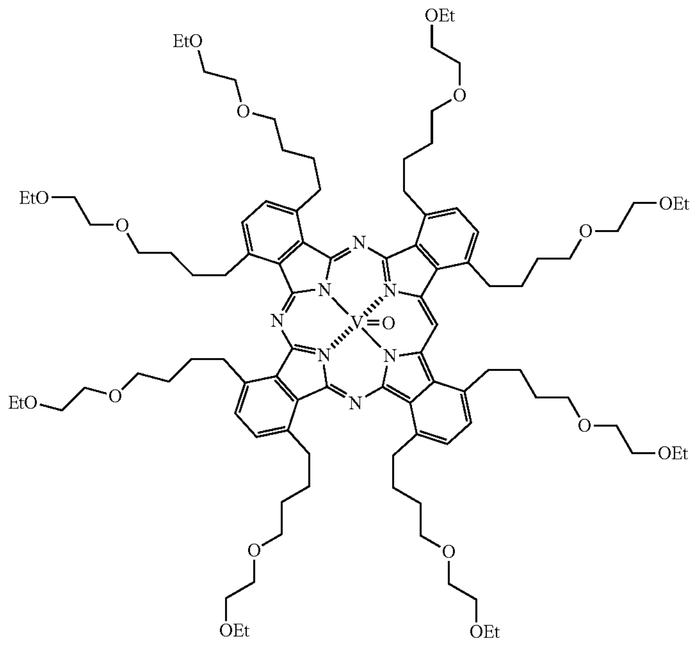
Pc-9
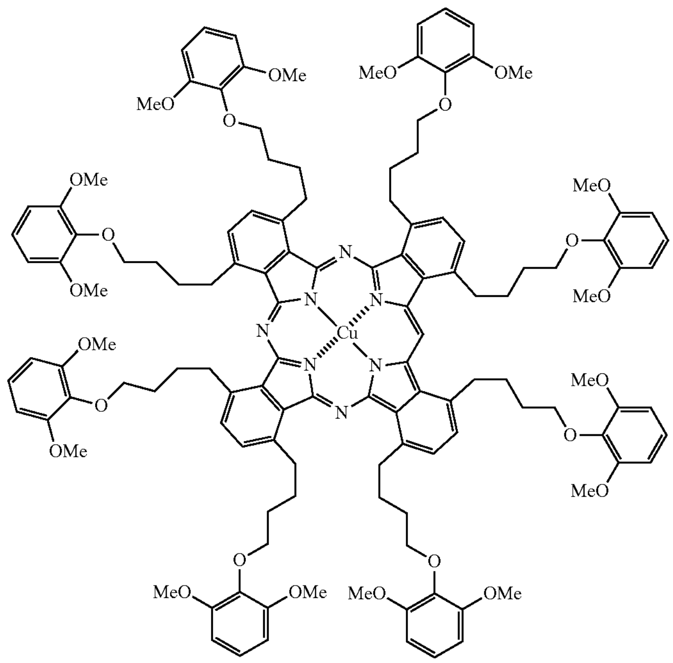

-continued

Pc-10

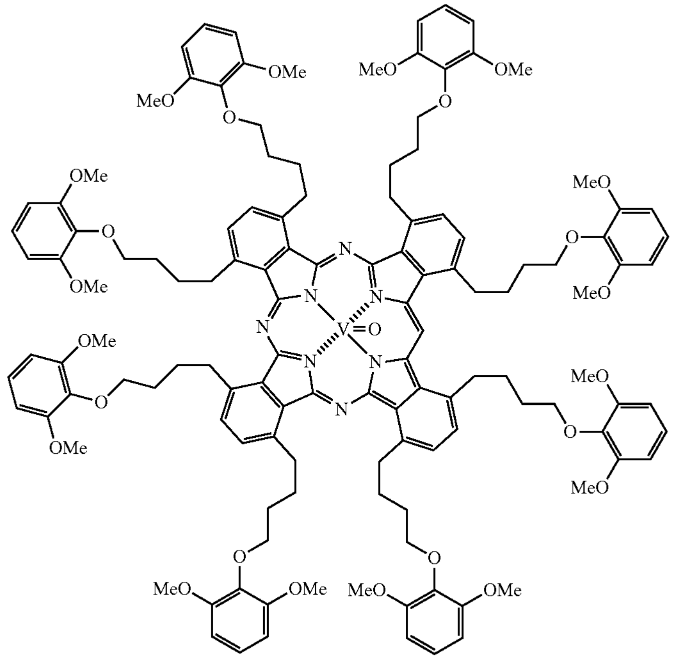

In addition, as the infrared absorber, squarylium compounds described in JP2017-197437A, squarylium compounds described in JP2017-025311A, squarylium compounds described in WO2016/154782A, squarylium compounds described in JP5884953B, squarylium compounds described in JP6036689B, squarylium compounds described in JP5810604B, squarylium compounds described in paragraph Nos. 0090 to 0107 of WO2017/213047A, pyrrole ring-containing compounds described in paragraph Nos. 0019 to 0075 of JP2018-054760A, pyrrole ring-containing compounds described in paragraph Nos. 0078 to 0082 of JP2018-040955A, pyrrole ring-containing compounds described in paragraph Nos. 0043 to 0069 of JP2018-002773A, squarylium compounds having an aromatic ring at the α-amide position described in paragraph Nos. 0024 to 0086 of JP2018-041047A, amide-linked squarylium compounds described in JP2017-179131A, compounds having a pyrrole bis-type squarylium skeleton or a croconium skeleton described in JP2017-141215A, dihydrocarbazole bis-type squarylium compounds described in JP2017-082029, asymmetric compounds described in paragraph Nos. 0027 to 0114 of JP2017-068120A, pyrrole ring-containing compounds (carbazole type) described in JP2017-067963A, phthalocyanine compounds described in JP6251530B, and the like can also be used.

A content of the other infrared absorbers is preferably 1 to 100 parts by mass, more preferably 3 to 60 parts by mass, and still more preferably 5 to 40 parts by mass with respect to 100 parts by mass of the above-described specific coloring agent. In addition, the total solid content of the above-described specific coloring agent and the other infrared absorbers in the total solid content of the composition is preferably 1% by mass or more, more preferably 3% by mass or more, and still more preferably 5% by mass or more. The upper limit of the above-described total content is preferably 50% by mass or less, more preferably 40% by mass or less, and still more preferably 30% by mass or less. Two or more kinds of other infrared absorbers can be used in combination. In a case where two or more kinds of other infrared absorbers are used in combination, the total content of the above-described specific coloring agent and the other infrared absorbers may be within the above-described range.

<<Coloring Agent Derivative>>

The composition according to the embodiment of the present invention can further contain a coloring agent derivative in addition to the above-described specific coloring agent. The coloring agent derivative is used as a dispersion aid. Examples of the coloring agent derivative include a compound having a structure in which an acid group or a basic group is bonded to a coloring agent skeleton.

Examples of the coloring agent skeleton constituting the coloring agent derivative include a squarylium coloring agent skeleton, a pyrrolopyrrole coloring agent skeleton, a diketo pyrrolopyrrole coloring agent skeleton, a quinacridone coloring agent skeleton, an anthraquinone coloring agent skeleton, a dianthraquinone coloring agent skeleton, a benzoisoindole coloring agent skeleton, a thiazine indigo coloring agent skeleton, an azo coloring agent skeleton, a quinophthalone coloring agent skeleton, a phthalocyanine coloring agent skeleton, a naphthalocyanine coloring agent skeleton, a dioxazine coloring agent skeleton, a perylene coloring agent skeleton, a perinone coloring agent skeleton, a benzimidazolone coloring agent skeleton, a benzothiazole coloring agent skeleton, a benzimidazole coloring agent skeleton, and a benzoxazole coloring agent skeleton. Among these, a squarylium coloring agent skeleton, a pyrrolopyrrole coloring agent skeleton, a diketo pyrrolopyrrole coloring agent skeleton, a phthalocyanine coloring agent skeleton, a quinacridone coloring agent skeleton, or benzimidazolone coloring agent skeleton is preferable, and a squarylium coloring agent skeleton or a pyrrolopyrrole coloring agent skeleton is more preferable.

Examples of the acid group include a carboxyl group, a sulfo group, a phosphoric acid group, a boronic acid group, a carboxylic acid amide group, a sulfonamide group, an imidic acid group, and salts of these group. Examples of an atom or atomic group constituting the salts include alkali metal ions ($Li^+$, $Na^+$, $K^+$, $Rb^+$, $Cs^+$, and the like), alkaline earth metal ions ($Ca^{2+}$, $Mg^{2+}$, and the like), an ammonium ion, an imidazolium ion, a pyridinium ion, and a phosphonium ion. As the carboxylic acid amide group, a group represented by $—NHCOR^{X1}$ is preferable. As the sulfonamide group, a group represented by $—NHSO_2R^{X2}$ is preferable. As the imidic acid group, a group represented by $—SO_2NHSO_2R^{X3}$, $—CONHSO_2R^{X4}$, $—CONHCOR^{X5}$, or $—SO_2NHCOR^{X6}$ is preferable, and $—SO_2NHSO_2RX^3$ is more preferable. $R^{X1}$ to $R^{X6}$ each independently represent an alkyl group or an aryl group. The alkyl group and the aryl group represented by $R^{X1}$ to $R^{X6}$ may have a substituent. As the substituent, a halogen atom is preferable and a fluorine atom is more preferable.

Examples of the basic group included in the pigment derivative include an amino group, a pyridinyl group, or a salt thereof, a salt of an ammonium group, and a phthalimidomethyl group. Examples of an atom or atomic group constituting the salts include a hydroxide ion, a halogen ion, a carboxylate ion, a sulfonate ion, and a phenoxide ion.

Specific examples of the coloring agent derivative include compounds described in Examples later. In addition, examples thereof include compounds described in JP1981-118462A (JP-S56-118462A), JP1988-264674A (JP-S63-264674A), JP1989-217077A (JP-H01-217077A), JP1991-009961A (JP-H03-009961A), JP1991-026767A (JP-H03-026767A), JP1991-153780A (JP-H03-153780A), JP1991-045662A (JP-H03-045662A), JP1992-285669A (JP-H04-285669A), JP1994-145546A (JP-H06-145546A), JP1994-212088A (JP-H06-212088A), JP1994-240158A (JP-H06-240158A), JP1998-030063A (JP-H10-030063A), JP1998-195326A (JP-H10-195326A), paragraph Nos. 0086 to 0098 of WO2011/024896A, and paragraph Nos. 0063 to 0094 of WO2012/102399A, the contents of which are incorporated herein by reference.

A content of the coloring agent derivative is preferably 1 to 50 parts by mass with respect to 100 parts by mass of the above-described specific coloring agent. The lower limit value is preferably 3 parts by mass or more and more preferably 5 parts by mass or more. The upper limit value is preferably 40 parts by mass or less and more preferably 30 parts by mass or less. As the coloring agent derivative, one kind may be used alone, or two or more kinds may be used in combination. In a case of using two or more kinds thereof, the total amount thereof is preferably within the above-described range.

<<Solvent>>

The composition according to the embodiment of the present invention preferably contains a solvent. Examples of the solvent include water and an organic solvent, and an organic solvent is preferable. Examples of the organic solvent include an ester-based solvent, a ketone-based solvent, an alcohol-based solvent, an amide-based solvent, an ether-based solvent, and a hydrocarbon-based solvent. The details of the organic solvent can be found in paragraph No. 0223 of WO2015/166779A, the content of which is incorporated herein by reference. In addition, an ester-based solvent in which a cyclic alkyl group is substituted or a ketone-based solvent in which a cyclic alkyl group is substituted can also be preferably used. Specific examples of the organic solvent include polyethylene glycol monomethyl ether, dichloromethane, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, 3-pentanone, 4-heptanone, cyclohexanone, 2-methylcyclohexanone, 3-methylcyclohexanone, 4-methylcyclohexanone, cycloheptanone, cyclooctanone, cyclohexyl acetate, cyclopentanone, ethylcarbitol acetate, butylcarbitol acetate, propylene glycol monomethyl ether, propylene glycol monomethyl ether acetate, 3-methoxy-N,N-dimethylpropanamide, 3-butoxy-N,N-dimethylpropanamide, γ-butyrolactone, N-methyl-2-pyrrolidone, propylene glycol diacetate, sulfolane, anisole, 1,4-diacetoxybutane, diethylene glycol monoethyl ether acetate, butane diacetate-1,3-diyl, dipropylene glycol methyl ether acetate, diacetone alcohol (also known as diacetone alcohol or 4-hydroxy-4-methyl-2-pentanone), 2-methoxypropyl acetate, 2-methoxy-1-propanol, and isopropyl alcohol. In this case, it may be preferable that the content of aromatic hydrocarbons (such as benzene, toluene, xylene, and ethylbenzene) as the organic solvent is low (for example, 50 parts per million (ppm) by mass or less, 10 ppm by mass or less, or 1 ppm by mass or less with respect to the total amount of the organic solvent) in consideration of environmental aspects and the like.

In the present invention, an organic solvent having a low metal content is preferably used. For example, the metal content in the organic solvent is preferably 10 mass parts per billion (ppb) or less. Optionally, an organic solvent having a metal content at a mass parts per trillion (ppt) level may be used. For example, such an organic solvent is available from Toyo Gosei Co., Ltd. (The Chemical Daily, Nov. 13, 2015).

Examples of a method for removing impurities such as a metal from the organic solvent include distillation (such as molecular distillation and thin-film distillation) and filtration using a filter. The filter pore size of the filter used for the filtration is preferably 10 μm or less, more preferably 5 μm or less, and still more preferably 3 μm or less. As a material of the filter, polytetrafluoroethylene, polyethylene, or nylon is preferable.

The organic solvent may include an isomer (a compound having the same number of atoms and a different structure). In addition, only one kind of isomers may be included, or a plurality of isomers may be included.

The organic solvent preferably has the content of peroxides of 0.8 mmol/L or less, and more preferably, the organic solvent does not substantially include peroxides.

A content of the solvent in the composition is preferably 10% to 97% by mass. The lower limit is preferably 30% by mass or more, more preferably 40% by mass or more, still more preferably 50% by mass or more, even still more preferably 60% by mass or more, and particularly preferably 70% by mass or more. The upper limit is preferably 96% by mass or less and more preferably 95% by mass or less. The composition may include only one kind of solvent, or may include two or more kinds thereof. In a case of including two or more kinds thereof, the total amount thereof is preferably within the above-described range.

<<Photopolymerization Initiator>>

In a case where the composition according to the embodiment of the present invention includes the polymerizable compound, it is preferable that the composition according to the embodiment of the present invention further contains a photopolymerization initiator. The photopolymerization initiator is not particularly limited, and can be appropriately selected from known photopolymerization initiators. For example, a compound having photosensitivity to light in a range from an ultraviolet range to a visible range is preferable. The photopolymerization initiator is preferably a photoradical polymerization initiator.

Examples of the photopolymerization initiator include a halogenated hydrocarbon derivative (for example, a compound having a triazine skeleton or a compound having an oxadiazole skeleton), an acylphosphine compound, a hexaarylbiimidazole, an oxime compound, an organic peroxide, a thio compound, a ketone compound, an aromatic onium salt, an α-hydroxyketone compound, and an α-aminoketone compound. From the viewpoint of exposure sensitivity, as the photopolymerization initiator, a trihalomethyltriazine compound, a benzyldimethylketal compound, an α-hydroxyketone compound, an α-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyl oxadiazole compound, or a 3-aryl-substituted coumarin compound is preferable, a compound selected from an oxime compound, an α-hydroxyketone compound, an α-aminoketone compound, and an acylphosphine compound is more preferable, and an oxime compound is still more preferable. In addition, as the photopolymerization initiator, compounds described in paragraphs 0065 to 0111 of JP2014-130173A, compounds described in JP6301489B, peroxide-based photopolymerization initiators described in MATERIAL STAGE, p. 37 to 60, vol. 19, No. 3, 2019, photopolymerization initiators described in WO2018/221177A, photopolymerization initiators described in WO2018/110179A, photopolymerization initiators described in JP2019-043864A, photopolymerization initiators described in JP2019-044030A, peroxide initiators described in JP2019-167313A, aminoacetophenone-based initiators described in JP2020-055992A, and oxime-based photopolymerization initiators described in JP2013-190459A, the contents of which are incorporated herein by reference.

Examples of a commercially available product of the α-hydroxyketone compound include Omnirad 184, Omnirad 1173, Omnirad 2959, and Omnirad 127 (all of which are manufactured by IGM Resins B.V.), Irgacure 184, Irgacure 1173, Irgacure 2959, and Irgacure 127 (all of which are manufactured by BASF SE). Examples of a commercially available product of the α-aminoketone compound include Omnirad 907, Omnirad 369, Omnirad 369E, and Omnirad 379EG (all of which are manufactured by IGM Resins B.V.), Irgacure 907, Irgacure 369, Irgacure 369E, and Irgacure 379EG (all of which are manufactured by BASF SE). Examples of a commercially available product of the acylphosphine compound include Omnirad 819 and Omnirad TPO (both of which are manufactured by IGM Resins B.V), Irgacure 819 and Irgacure TPO (both of which are manufactured by BASF SE).

Examples of the oxime compound include the compounds described in JP2001-233842A, the compounds described in JP2000-080068A, the compounds described in JP2006-342166A, the compounds described in J. C. S. Perkin II (1979, pp. 1653 to 1660), the compounds described in J. C. S. Perkin II (1979, pp. 156 to 162), the compounds described in Journal of Photopolymer Science and Technology (1995, pp. 202 to 232), the compounds described in JP2000-066385A, the compounds described in JP2004-534797A, the compounds described in JP2017-019766A, the compounds described in JP6065596B, the compounds described in WO2015/152153A, the compounds described in WO2017/051680A, the compounds described in JP2017-198865A, the compounds described in paragraph Nos. 0025 to 0038 of WO2017/164127A, and compounds described in WO2013/167515A. Specific examples of the oxime compound include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-(4-toluene sulfonyloxy)iminobutane-2-one, and 2-ethoxycarbonyloxyimino-1-phenylpropane-1-one. Examples of a commercially available product thereof include Irgacure OXE01, Irgacure OXE02, Irgacure OXE03, and Irgacure OXE04 (all of which are manufactured by BASF SE), TR-PBG-304 (manufactured by TRONLY), and ADEKA OPTOMER N-1919 (manufactured by ADEKA Corporation; photopolymerization initiator 2 described in JP2012-014052A). In addition, as the oxime compound, it is also preferable to use a compound having no colorability or a compound having high transparency and being resistant to discoloration. Examples of a commercially available product thereof include ADEKA ARKLS NCI-730, NCI-831, and NCI-930 (all of which are manufactured by ADEKA Corporation).

An oxime compound having a fluorene ring can also be used as the photopolymerization initiator. Specific examples of the oxime compound having a fluorene ring include compounds described in JP2014-137466A, compounds described in JP6636081A, and compounds described in KR10-2016-0109444A.

As the photopolymerization initiator, an oxime compound having a skeleton in which at least one benzene ring of a carbazole ring is a naphthalene ring can also be used. Specific examples of such an oxime compound include the compounds described in WO2013/083505A.

An oxime compound having a fluorine atom can also be used as the photopolymerization initiator. Specific examples of the oxime compound having a fluorine atom include compounds described in JP2010-262028A, Compounds 24 and 36 to 40 described in JP2014-500852A, and Compound (C-3) described in JP2013-164471A.

An oxime compound having a nitro group can be used as the photopolymerization initiator. The oxime compound having a nitro group is also preferably used in the form of a dimer. Specific examples of the oxime compound having a nitro group include a compound described in paragraph Nos. 0031 to 0047 of JP2013-114249A and paragraph Nos. 0008 to 0012 and 0070 to 0079 of JP2014-137466A, a compound described in paragraph Nos. 0007 to 0025 of JP4223071B, and ADEKAARKLS NCI-831 (manufactured by ADEKA Corporation).

An oxime compound having a benzofuran skeleton can also be used as the photopolymerization initiator. Specific examples thereof include OE-01 to OE-75 described in WO2015/036910A.

In the present invention, as the photopolymerization initiator, an oxime compound in which a substituent having a hydroxy group is bonded to a carbazole skeleton can also be used. Examples of such a photopolymerization initiator include compounds described in WO2019/088055A.

Specific examples of the oxime compound which are preferably used in the present invention are shown below, but the present invention is not limited thereto.

(C-1)

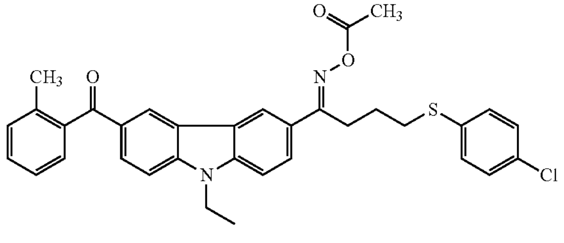

-continued
(C-2)
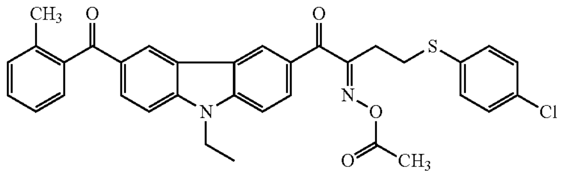
(C-3)
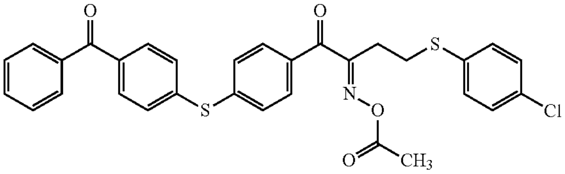
(C-4)
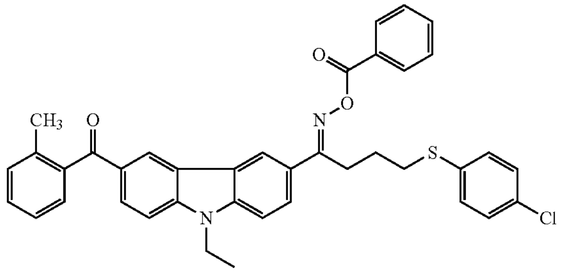
(C-5)
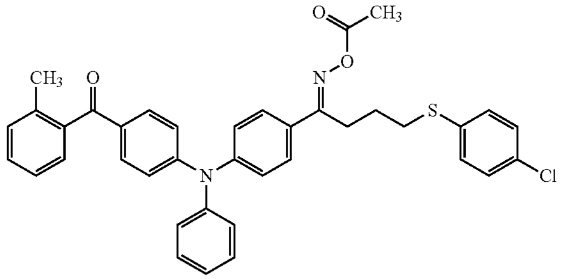
(C-6)
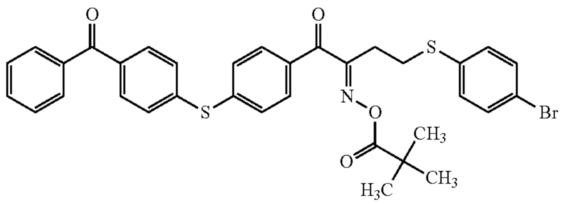
(C-7)
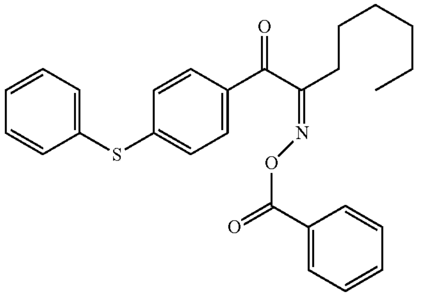
-continued
(C-8)
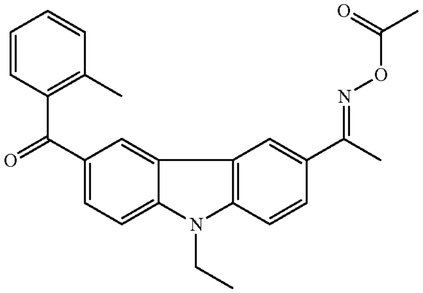
(C-9)
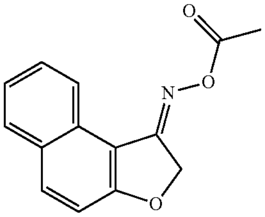
(C-10)
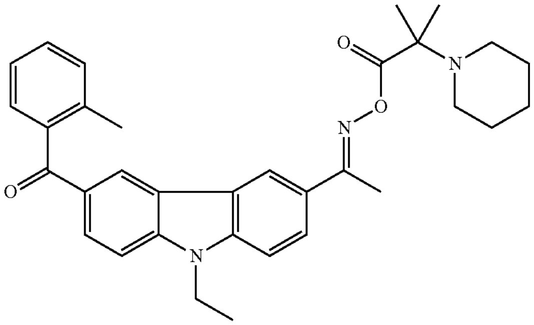
(C-11)
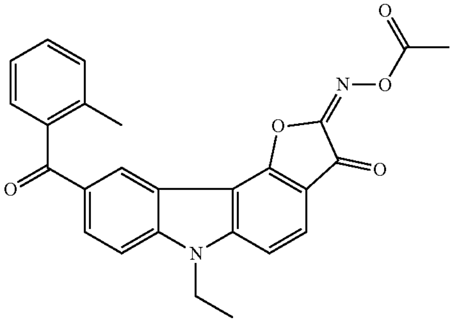
(C-12)
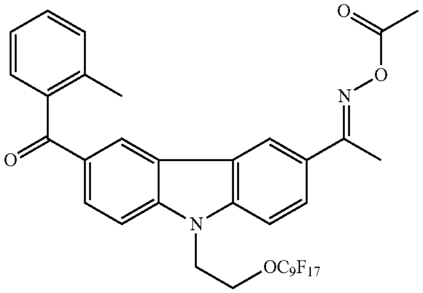

-continued (C-13)

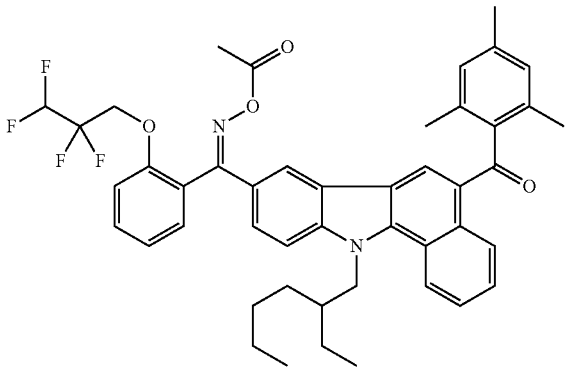

(C-14)

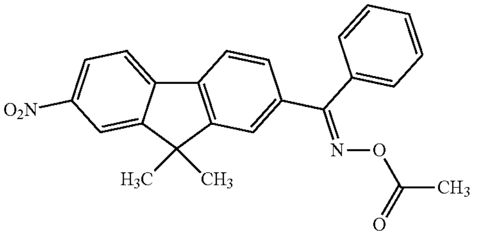

(C-15)

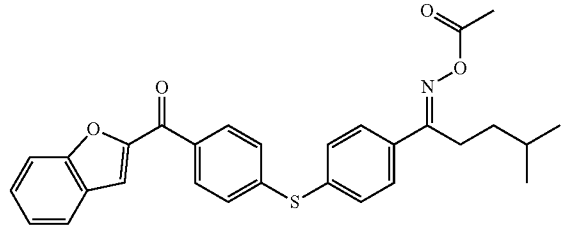

(C-16)

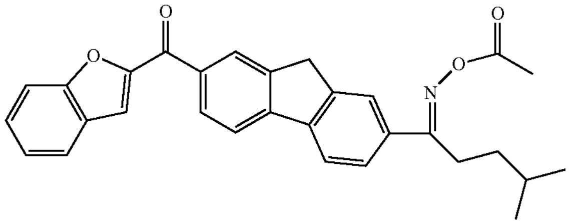

(C-17)

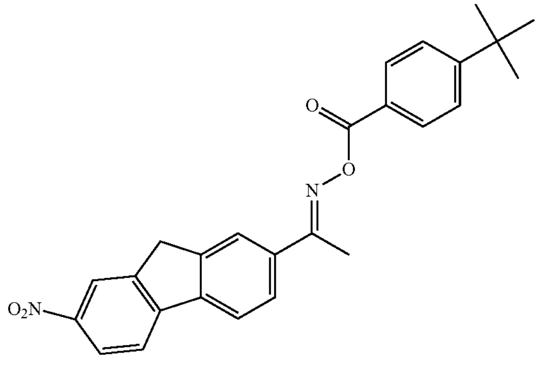

The oxime compound is preferably a compound having a maximal absorption wavelength in a wavelength range of 350 to 500 nm and more preferably a compound having a maximal absorption wavelength in a wavelength range of 360 to 480 nm. In addition, from the viewpoint of sensitivity, a molar absorption coefficient of the oxime compound at a wavelength of 365 nm or 405 nm is preferably high, more preferably 1000 to 300000, still more preferably 2000 to 300000, and particularly preferably 5000 to 200000. The molar absorption coefficient of a compound can be measured using a known method. For example, it is preferable that the molar absorption coefficient can be measured using a spectrophotometer (Cary-5 spectrophotometer, manufactured by Varian Medical Systems, Inc.) and ethyl acetate as a solvent at a concentration of 0.01 g/L.

As the photopolymerization initiator, a bifunctional or tri- or higher functional photoradical polymerization initiator may be used. By using such a photoradical polymerization initiator, two or more radicals are generated from one molecule of the photoradical polymerization initiator, and as a result, good sensitivity is obtained. In addition, in a case of using a compound having an asymmetric structure, crystallinity is reduced so that solubility in a solvent or the like is improved, precipitation is to be difficult over time, and temporal stability of the composition can be improved. Specific examples of the bifunctional or tri- or higher functional photoradical polymerization initiator include dimers of the oxime compounds described in JP2010-527339A, JP2011-524436A, WO2015/004565A, paragraph Nos. 0407 to 0412 of JP2016-532675A, and paragraph Nos. 0039 to 0055 of WO2017/033680A; the compound (E) and compound (G) described in JP2013-522445A; Cmpd 1 to 7 described in WO2016/034963A; the oxime ester photoinitiators described in paragraph No. 0007 of JP2017-523465A; the photoinitiators described in paragraph Nos. 0020 to 0033 of JP2017-167399A; the photopolymerization initiator (A) described in paragraph Nos. 0017 to 0026 of JP2017-151342A; and the oxime ester photoinitiators described in JP6469669B.

A content of the photopolymerization initiator in the total solid content of the composition is preferably 0.1% to 40% by mass, more preferably 0.5% to 35% by mass, and still more preferably 1% to 30% by mass. The composition may include only one kind of the photopolymerization initiator or two or more kinds thereof. In a case of including two or more kinds thereof, the total amount thereof is preferably within the above-described range.

<<Curing Agent>>

In a case where the composition according to the embodiment of the present invention includes the compound having a cyclic ether group, the composition according to the embodiment of the present invention preferably further includes a curing agent. Examples of the curing agent include an amine-based compound, an acid anhydride-based compound, an amide-based compound, a phenol-based compound, polyvalent carboxylic acid, and a thiol compound. Specific examples of the curing agent include succinic acid, trimellitic acid, pyromellitic acid, N,N-dimethyl-4-aminopyridine, and pentaerythritol tetrakis(3-mercaptopropionate). As the curing agent, compounds described in paragraph Nos. 0072 to 0078 of JP2016-075720A or compounds described in JP2017-036379A can also be used.

A content of the curing agent is preferably 0.01 to 20 parts by mass, more preferably 0.01 to 10 parts by mass, and still more preferably 0.1 to 6.0 parts by mass with respect to 100 parts by mass of the compound having a cyclic ether group.

<<Chromatic Colorant>>

The composition according to the embodiment of the present invention can contain a chromatic colorant. In the present invention, "chromatic colorant" denotes a colorant other than a white colorant and a black colorant. It is preferable that the chromatic colorant is a colorant having a maximal absorption wavelength in a wavelength range of 400 nm or more and less than 650 nm.

Examples of the chromatic colorant include red colorants, green colorants, blue colorants, yellow colorants, violet colorants, and orange colorants. The chromatic colorant may be a pigment or a dye. The coloring material may be used in combination of the pigment and the dye. In addition, the pigment may be either an inorganic pigment or an organic pigment. In addition, as the pigment, a material in which a part of an inorganic pigment or an organic-inorganic pigment is substituted with an organic chromophore can also be used. By substituting an inorganic pigment or an organic-inorganic pigment with an organic chromophore, hue design can be easily performed.

An average primary particle diameter of the pigment is preferably 1 to 200 nm. The lower limit is preferably 5 nm or more and more preferably 10 nm or more. The upper limit is preferably 180 nm or less, more preferably 150 nm or less, and still more preferably 100 nm or less. In a case where the average primary particle diameter of the pigment is within the above-described range, dispersion stability of the pigment in the composition is good. In the present invention, the primary particle diameter of the pigment can be determined from a captured image obtained by observing primary particles of the pigment using a transmission electron microscope. Specifically, a projected area of the primary particles of the pigment is determined, and the corresponding equivalent circle diameter is calculated as the primary particle diameter of the pigment. In addition, the average primary particle diameter in the present invention is an arithmetic average of the primary particle diameters with respect to 400 primary particles of the pigment. In addition, the primary particle of the pigment refers to a particle which is independent without aggregation.

It is preferable that the chromatic colorant includes a pigment. A content of the pigment in the chromatic colorant is preferably 50% by mass or more, more preferably 70% by mass or more, still more preferably 80% by mass or more, and particularly preferably 90% by mass or more. Examples of the pigment include the following pigments:

Color Index (C. I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, 215, 228, 231, 232 (methine-based), 233 (quinoline-based), 234 (aminoketone-based), 235 (aminoketone-based), 236 (aminoketone-based), and the like (all of which are yellow pigments);

C. I. Pigment Orange 2, 5, 13, 16, 17:1, 31, 34, 36, 38, 43, 46, 48, 49, 51, 52, 55, 59, 60, 61, 62, 64, 71, and 73 (all of which are orange pigments);

C. I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 269, 270, 272, 279, 291, 294 (xanthene-based, Organo Ultramarine, Bluish Red), 295 (monoazo-based), 296 (diazo-based), 297 (aminoketone-based), and the like (all of which are red pigments);

C. I. Pigment Green 7, 10, 36, 37, 58, 59, 62, 63, 64 (phthalocyanine-based), 65 (phthalocyanine-based), 66 (phthalocyanine-based), and the like (all of which are green pigments);

C. I. Pigment Violet 1, 19, 23, 27, 32, 37, 42, 60 (triarylmethane-based), 61 (xanthene-based), and the like (all of which are violet pigments); and C. I. Pigment Blue 1, 2, 15, 15:1, 15:2, 15:3, 15:4, 15:6, 16, 22, 29, 60, 64, 66, 79, 80, 87 (monoazo-based), 88 (methine-based), and the like (all of which are blue pigments).

In addition, as the green pigment, a halogenated zinc phthalocyanine pigment having an average number of halogen atoms in one molecule of 10 to 14, an average number of bromine atoms in one molecule of 8 to 12, and an average number of chlorine atoms in one molecule of 2 to 5 can also be used. Specific examples thereof include the compounds described in WO2015/118720A. In addition, as the green pigment, a compound described in CN2010-6909027A, a phthalocyanine compound described in WO2012/102395A, which has phosphoric acid ester as a ligand, a phthalocyanine compound described in JP2019-008014A, a phthalocyanine compound described in JP2018-180023A, a compound described in JP2019-038958A, a core-shell type coloring agent described in JP2020-076995A, and the like can also be used.

In addition, as the blue pigment, an aluminum phthalocyanine compound having a phosphorus atom can also be used. Specific examples thereof include the compounds described in paragraph Nos. 0022 to 0030 of JP2012-247591A and paragraph No. 0047 of JP2011-157478A.

In addition, as the yellow pigment, compounds described in JP2017-201003A, compounds described in JP2017-197719A, compounds described in paragraph Nos. 0011 to 0062 and 0137 to 0276 of JP2017-171912A, compounds described in paragraph Nos. 0010 to 0062 and 0138 to 0295 of JP2017-171913A, compounds described in paragraph Nos. 0011 to 0062 and 0139 to 0190 of JP2017-171914A, compounds described in paragraph Nos. 0010 to 0065 and 0142 to 0222 of JP2017-171915A, quinophthalone compounds described in paragraph Nos. 0011 to 0034 of JP2013-054339A, quinophthalone compounds described in paragraph Nos. 0013 to 0058 of JP2014-026228A, isoindoline compounds described JP2018-062644A, quinophthalone compounds described in JP2018-203798A, quinophthalone compounds described in JP2018-062578A, quinophthalone compounds described in JP6432076B, quinophthalone compounds described in JP2018-155881A, quinophthalone compounds described in JP2018-111757A, quinophthalone compounds described in JP2018-040835A, quinophthalone compounds described in JP2017-197640A, quinophthalone compounds described in JP2016-145282A, quinophthalone compounds described in JP2014-085565A, quinophthalone compounds described in JP2014-021139A, quinophthalone compounds described in JP2013-209614A, quinophthalone compounds described in JP2013-209435A, quinophthalone compounds described in JP2013-181015A, quinophthalone compounds described in JP2013-061622A, quinophthalone compounds described in JP2013-032486A, quinophthalone compounds described in JP2012-226110A, quinophthalone compounds described in JP2008-074987A, quinophthalone compounds described in JP2008-081565A, quinophthalone compounds described in JP2008-074986A, quinophthalone compounds described in JP2008-074985A, quinophthalone compounds described in JP2008-050420A, quinophthalone compounds described in JP2008-031281A, quinophthalone compounds described in JP1973-032765A (JP-S48-032765A), quinophthalone compounds described in JP2019-008014A, quinophthalone compounds described in JP6607427B, compounds described in KR10-2014-0034963A, compounds described in JP2017-095706A, compounds described in TW2019-20495A, compounds described in JP6607427B, compounds described in JP2020-033525A, compounds described in JP2020-033524A, compounds described in JP2020-033523A, compounds described in JP2020-033522A, compounds described in JP2020-033521A, compounds described in WO2020/045200A, compounds described in WO2020/045199A, and compounds described in WO2020/045197A can also be used. In addition, from the viewpoint of improving a color value, a multimerized compound of these compounds is also preferably used.

As the red pigment, diketopyrrolopyrrole compounds described in JP2017-201384A, in which the structure has at least one substituted bromine atom, diketopyrrolopyrrole compounds described in paragraph Nos. 0016 to 0022 of JP6248838B, diketopyrrolopyrrole compounds described in WO2012/102399A, diketopyrrolopyrrole compounds described in WO2012/117965A, naphtholazo compounds described in JP2012-229344A, red pigments described in JP6516119B, red pigments described in JP6525101B, brominated diketopyrrolopyrrole compounds described in paragraph No. 0229 of JP2020-090632A, anthraquinone compounds described in KR10-2019-0140741A, anthraquinone compounds described in KR10-2019-0140744A, perylene compounds described in JP2020-079396A, and the like can also be used. In addition, as the red pigment, a compound having a structure that an aromatic ring group in which a group bonded with an oxygen atom, a sulfur atom, or a nitrogen atom is introduced to an aromatic ring is bonded to a diketopyrrolopyrrole skeleton can be used.

Regarding diffraction angles preferably possessed by various pigments, descriptions of JP6561862B, JP6413872B, JP6281345B, and JP2020-026503A can be referred to, the contents of which are incorporated herein by reference. In addition, in the pyrrolopyrrole-based pigment, it is also preferable to use a pyrrolopyrrole-based pigment in which a crystallite size in a plane direction corresponding to the maximum peak in the X-ray diffraction pattern among eight planes (±1 ±1 ±1) of the crystal lattice planes is 140 Å or less. In addition, it is also preferable that physical properties of the pyrrolopyrrole-based pigment are set as described in paragraph Nos. 0028 to 0073 of JP2020-097744A.

In the present invention, a dye can also be used as the chromatic colorant. As the dye, a known dye can be used without any particular limitation. Examples thereof include a pyrazoleazo-based dye, an anilinoazo-based dye, a triarylmethane-based dye, an anthraquinone-based dye, an anthrapyridone-based dye, a benzylidene-based dye, an oxonol-based dye, a pyrazolotriazoleazo-based dye, a pyridoneazo-based dye, a cyanine-based dye, a phenothiazine-based dye, a pyrrolopyrazoleazomethine-based dye, a xanthene-based dye, a phthalocyanine-based dye, a benzopyran-based dye, an indigo-based dye, and a pyrromethane-based dye. In addition, as the dye, thiazole compounds described in JP2012-158649A, azo compounds described in JP2011-184493A, or azo compounds described in JP2011-145540A can also be preferably used.

In a case where the composition according to the embodiment of the present invention contains a chromatic colorant, a content of the chromatic colorant in the total solid content of the composition according to the embodiment of the present invention according to the embodiment of the present invention is preferably 1% to 50% by mass. In a case where the composition according to the embodiment of the present invention includes two or more kinds of chromatic colorants, it is preferable that the total content of the two or more kinds of chromatic colorants is within the above-described range.

<<Coloring Material which Allows Transmission of Infrared Rays and Shields Visible Light>>

The composition according to the embodiment of the present invention can also contain a coloring material which allows transmission of infrared rays and shields visible light (hereinafter, also referred to as a "coloring material which shields visible light"). A composition including the coloring material which shields visible light is preferably used as a composition for forming an infrared transmitting filter.

It is preferable that the coloring material which shields visible light is a coloring material which absorbs light in a wavelength range of violet to red. In addition, it is preferable that the coloring material which shields visible light is a coloring material which shields light in a wavelength range of 450 to 650 nm. In addition, it is preferable that the coloring material which shields visible light is a coloring material which allows transmission of light in a wavelength range of 900 to 1500 nm. It is preferable that the coloring material which shields visible light satisfies at least one of the following requirement (A) or (B).

(A): coloring material which shields visible light includes two or more kinds of chromatic colorants, and a combination of the two or more chromatic colorants forms black.

(B): coloring material which shields visible light includes an organic black colorant.

Examples of the chromatic colorant include the above-described chromatic colorants. Examples of the organic black colorant include a bisbenzofuranone compound, an azomethine compound, a perylene compound, and an azo compound. Among these, a bisbenzofuranone compound or a perylene compound is preferable. Examples of the bisbenzofuranone compound include the compounds described in JP2010-534726A, JP2012-515233A, JP2012-515234A, and the like, and the bisbenzofuranone compound is available, for example, as "Irgaphor Black" manufactured by BASF SE. Examples of the perylene compound include compounds described in paragraph Nos. 0016 to 0020 of JP2017-226821A, and C. I. Pigment Black 31 and 32. Examples of the azomethine compound include compounds described in JP1989-170601A (JP-H01-170601A) and JP1990-034664A (JP-H02-034664A). For example, "CHROMOFINE BLACK A1103" (manufactured by Dainichiseika Color & Chemicals Mfg. Co., Ltd.) is available.

In a case where a combination of the two or more chromatic colorants forms black, examples of the combination of the chromatic colorants include the following aspects (1) to (8).

(1) aspect in which the coloring material which shields visible light contains a yellow colorant, a blue colorant, a violet colorant, and a red colorant.

(2) aspect in which the coloring material which shields visible light contains a yellow colorant, a blue colorant, and a red colorant.

(3) aspect in which the coloring material which shields visible light contains a yellow colorant, a violet colorant, and a red colorant.

(4) aspect in which the coloring material which shields visible light contains a yellow colorant and a violet colorant.

(5) aspect in which the coloring material which shields visible light contains a green colorant, a blue colorant, a violet colorant, and a red colorant.

(6) aspect in which the coloring material which shields visible light contains a violet colorant and an orange colorant.

(7) aspect in which the coloring material which shields visible light contains a green colorant, a violet colorant, and a red colorant.

(8) aspect in which the coloring material which shields visible light contains a green colorant and a red colorant.

In a case where the composition according to the embodiment of the present invention contains a coloring material which shields visible light, a content of the coloring material which shields visible light in the total solid content of the composition is preferably 1% to 50% by mass. The lower limit is preferably 5% by mass or more, more preferably 10% by mass or more, still more preferably 20% by mass or more, and particularly preferably 30% by mass or more.

<<Surfactant>>

The composition according to the embodiment of the present invention preferably contains a surfactant. As the surfactant, various surfactants such as a fluorine-based surfactant, a nonionic surfactant, a cationic surfactant, an anionic surfactant, and a silicone-based surfactant can be used. Examples of the surfactant include surfactants described in paragraph Nos. 0238 to 0245 of WO2015/166779A, the contents of which are incorporated herein by reference.

Examples of the fluorine-based surfactant include surfactants described in paragraph Nos. 0060 to 0064 of JP2014-041318A (paragraph Nos. 0060 to 0064 of the corresponding WO2014/017669A) and the like, surfactants described in paragraph Nos. 0117 to 0132 of JP2011-132503A, and surfactants described in JP2020-008634A, the contents of which are incorporated herein by reference. Examples of a commercially available product of the fluorine-based surfactant include: MEGAFACE F-171, F-172, F-173, F-176, F-177, F-141, F-142, F-143, F-144, F-437, F-475, F-477, F-479, F-482, F-554, F-555-A, F-556, F-557, F-558, F-559, F-560, F-561, F-563, F-565, F-568, F-575, F-780, EXP, MFS-330, R-01, R-40, R-40-LM, R-41, R-41-LM, RS-43, TF-1956, RS-90, R-94, RS-72-K, and DS-21 (all of which are manufactured by DIC Corporation); FLUORAD FC430, FC431, and FC171 (all of which are manufactured by Sumitomo 3M Ltd.); SURFLON S-382, SC-101, SC-103, SC-104, SC-105, SC-1068, SC-381, SC-383, S-393, and KH-40 (all of which are manufactured by Asahi Glass Co., Ltd.); POLYFOX PF636, PF656, PF6320, PF6520, and PF7002 (all of which are manufactured by OMNOVA Solutions Inc.); and FTERGENT 208G, 215M, 245F, 601AD, 601ADH2, 602A, 610FM, 710FL, 710FM, 710FS, and FTX-218 (all of which are manufactured by NEOS COMPANY LIMITED).

In addition, as the fluorine-based surfactant, an acrylic compound, which has a molecular structure having a functional group containing a fluorine atom and in which, by applying heat to the molecular structure, the functional group containing a fluorine atom is broken to volatilize a fluorine atom, can also be suitably used. Examples of such a fluorine-based surfactant include MEGAFACE DS series manufactured by DIC Corporation (The Chemical Daily, Feb. 22, 2016; Nikkei Business Daily, Feb. 23, 2016) such as MEGAFACE DS-21.

In addition, it is also preferable that a polymer of a fluorine atom-containing vinyl ether compound having a fluorinated alkyl group or a fluorinated alkylene ether group, and a hydrophilic vinyl ether compound is used as the fluorine-based surfactant. Examples of such a fluorine-based surfactant include fluorine-based surfactants described in JP2016-216602A, the contents of which are incorporated herein by reference.

A block polymer can also be used as the fluorine-based surfactant. As the fluorine-based surfactant, a fluorine-containing polymer compound including a repeating unit derived from a (meth)acrylate compound having a fluorine atom and a repeating unit derived from a (meth)acrylate compound having 2 or more (preferably 5 or more) alkyleneoxy groups (preferably ethyleneoxy groups or propyleneoxy groups) can also be preferably used. In addition, fluorine-containing surfactants described in paragraph Nos. 0016 to 0037 of JP2010-032698A, or the following compounds are also exemplified as the fluorine-based surfactant used in the present invention.

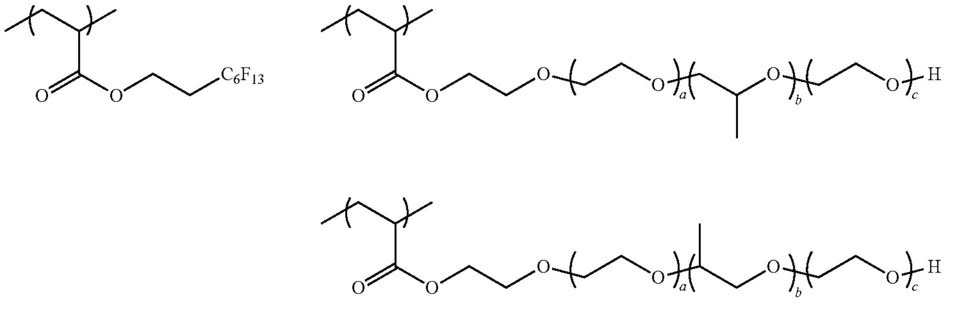

a + c = 14
b = 17

62% 38%

A weight-average molecular weight of the compound is preferably 3000 to 50000 and, for example, 14000. In the compound, "%" representing the proportion of a repeating unit is mol %.

In addition, as the fluorine-based surfactant, a fluorine-containing polymer having an ethylenically unsaturated bond-containing group in the side chain can be used. Specific examples thereof include compounds described in paragraph Nos. 0050 to 0090 and paragraph Nos. 0289 to 0295 of JP2010-164965A, and MEGAFACE RS-101, RS-102, RS-718K, and RS-72-K manufactured by DIC Corporation. In addition, as the fluorine-based surfactant, compounds described in paragraph Nos. 0015 to 0158 of JP2015-117327A can also be used.

In addition, from the viewpoint of environmental regulation, it is also preferable to use a surfactant described in WO2020/084854A as a substitute for the surfactant having a perfluoroalkyl group having 6 or more carbon atoms.

In addition, it is also preferable to use a fluorine-containing imide salt compound represented by Formula (fi-1) as the surfactant.

(fi-1)

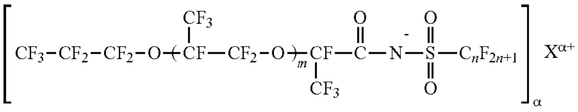

In Formula (fi-1), m represents 1 or 2, n represents an integer of 1 to 4, α represents 1 or 2, and $X^{\alpha+}$ represents an α-valent metal ion, a primary ammonium ion, a secondary ammonium ion, a tertiary ammonium ion, a quaternary ammonium ion, or $NH_4^+$.

Examples of the nonionic surfactant include glycerol, trimethylolpropane, trimethylolethane, an ethoxylate and propoxylate thereof (for example, glycerol propoxylate or glycerol ethoxylate), polyoxyethylene lauryl ether, polyoxyethylene stearyl ether, polyoxyethylene oleyl ether, polyoxyethylene octylphenyl ether, polyoxyethylene nonylphenyl ether, polyethylene glycol dilaurate, polyethylene glycol distearate, sorbitan fatty acid esters, PLURONIC L10, L31, L61, L62, 10R5, 17R2, and 25R2 (manufactured by BASF SE), TETRONIC 304, 701, 704, 901, 904, and 150R1 (manufactured by BASF SE), SOLSPERSE 20000 (manufactured by Lubrizol Japan Ltd.), NCW-101, NCW-1001, and NCW-1002 (all of which are manufactured by Wako Pure Chemical Corporation), PIONIN D-6112, D-6112-W, and D-6315 (all of which are manufactured by Takemoto Oil&Fat Co., Ltd.), and OLFINE E1010 and SURFYNOL 104, 400, and 440 (all of which are manufactured by Nissin Chemical Co., Ltd.).

Examples of the cationic surfactant include a tetraalkylammonium salt, an alkylamine salt, a benzalkonium salt, an alkylpyridium salt, and an imidazolium salt. Specific examples thereof include dihydroxyethylstearylamine, 2-heptadecenyl-hydroxyethylimidazoline, lauryldimethylbenzylammonium chloride, cetylpyridinium chloride, and stealamidemethylpyridium chloride.

Examples of the anionic surfactant include dodecylbenzene sulfonic acid, sodium dodecylbenzene sulfonate, sodium lauryl sulfate, sodium alkyldiphenyl ether disulfonate, sodium alkylnaphthalene sulfonate, sodium dialkyl sulfosuccinate, sodium stearate, potassium oleate, sodium dioctyl sulfosuccinate, sodium polyoxyethylene alkyl ether sulfate, sodium polyoxyethylene alkylphenyl ether sulfate, sodium dialkyl sulfosuccinate, sodium oleate, and sodium t-octylphenoxyethoxypolyethoxyethyl sulfate.

Examples of the silicone-based surfactant include TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all of which are manufactured by Dow Corning Toray Co., Ltd.), TSF-4440, TSF-4300, TSF-4445, TSF-4460, and TSF-4452 (all of which are manufactured by Momentive Performance Materials Co., Ltd.), KP-341, KF-6001, and KF-6002 (all of which are manufactured by Shin-Etsu Chemical Co., Ltd.), BYK-307, BYK-322, BYK-323, BYK-330, BYK-3760, and BYK-UV3510 (all of which are manufactured by BYK Chemie), and FZ-2122 (manufactured by Dow TORAY).

In addition, as the silicone-based surfactant, a compound having the following structure can also be used.

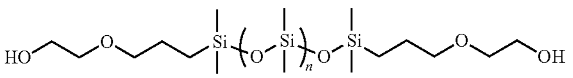

A content of the surfactant in the total solid content of the composition is preferably 0.001% to 1% by mass, more preferably 0.001% to 0.5% by mass, and still more preferably 0.001% to 0.2% by mass. The composition may include only one kind of surfactant, or may include two or more kinds thereof. In a case of including two or more kinds thereof, the total amount thereof is preferably within the above-described range.

<<Polymerization Inhibitor>>

The composition according to the embodiment of the present invention can contain a polymerization inhibitor. Examples of the polymerization inhibitor include hydroquinone, p-methoxyphenol, di-tert-butyl-p-cresol, pyrogallol, tert-butyl catechol, benzoquinone, 4,4'-thiobis(3-methyl-6-tert-butylphenol), 2,2'-methylenebis(4-methyl-6-t-butylphenol), and an N-nitrosophenylhydroxylamine salt (an ammonium salt, a cerous salt, or the like), and p-methoxyphenol is preferable. A content of the polymerization inhibitor in the total solid content of the composition is preferably 0.0001% to 5% by mass. The composition may include only one kind of polymerization inhibitor, or may include two or more kinds thereof. In a case of including two or more kinds thereof, the total amount thereof is preferably within the above-described range.

<<Silane Coupling Agent>>

The composition according to the embodiment of the present invention can contain a silane coupling agent. In the present specification, the silane coupling agent means a silane compound having a hydrolyzable group and other functional groups. In addition, the hydrolyzable group refers to a substituent directly linked to a silicon atom and capable of forming a siloxane bond due to at least one of a hydrolysis reaction or a condensation reaction. Examples of the hydrolyzable group include a halogen atom, an alkoxy group, and an acyloxy group, and an alkoxy group is preferable. That is, it is preferable that the silane coupling agent is a compound having an alkoxysilyl group. Examples of the functional group other than the hydrolyzable group include a vinyl group, a styryl group, a (meth)acryloyl group, a mercapto group, an epoxy group, an oxetanyl group, an amino group, a ureido group, a sulfide group, an isocyanate group, and a phenyl group, and a (meth)acryloyl group or an epoxy group is preferable. Examples of the silane coupling agent include a compound described in paragraph Nos. 0018 to 0036 of JP2009-288703A and a compound described in paragraph Nos. 0056 to 0066 of JP2009-242604A, the content of which is incorporated herein by reference. A content of the silane coupling agent in the total solid content of the composition is preferably 0.01% to 15.0% by mass and more preferably 0.05% to 10.0% by mass. The composition may include only one kind of silane coupling agent, or may include two or more kinds thereof. In a case of including two or more kinds thereof, the total amount thereof is preferably within the above-described range.

<<Ultraviolet Absorber>>

The composition according to the embodiment of the present invention can include an ultraviolet absorber. Examples of the ultraviolet absorber include a conjugated diene compound, an aminodiene compound, a salicylate compound, a benzophenone compound, a benzotriazole compound, an acrylonitrile compound, a hydroxyphenyltriazine compound, an indole compound, a triazine compound, and a merocyanine coloring agent. Specific examples of such a compound include compounds described in paragraph Nos. 0038 to 0052 of JP2009-217221A, paragraph Nos. 0052 to 0072 of JP2012-208374A, paragraph Nos. 0317 to 0334 of JP2013-068814A, and paragraph Nos. 0061 to 0080 of JP2016-162946A, the contents of which are incorporated herein by reference. Examples of a commercially available product of the ultraviolet absorber include Tinuvin series and Uvinul series manufactured by BASF SE. In addition, examples of the benzotriazole compound include MYUA series manufactured by Miyoshi Oil & Fat Co., Ltd. (The Chemical Daily, Feb. 1, 2016). In addition, as the ultraviolet absorber, compounds described in paragraph Nos. 0049 to 0059 of JP6268967B and paragraph Nos. 0059 to 0076 of WO2016/181987A can also be used. A content of the ultraviolet absorber in the total solid content of the composition is preferably 0.01% to 30% by mass and more preferably 0.05% to 25% by mass. The composition may include only one kind of ultraviolet absorber, or may include two or more kinds thereof. In a case of including two or more kinds thereof, the total amount thereof is preferably within the above-described range.

<<Antioxidant>>

The composition according to the embodiment of the present invention can include an antioxidant. Examples of the antioxidant include a phenol compound, a phosphite ester compound, and a thioether compound. As the phenol compound, any phenol compound which is known as a phenol-based antioxidant can be used. Preferred examples of the phenol compound include a hindered phenol compound. A compound having a substituent at a site (ortho position) adjacent to a phenolic hydroxy group is preferable. As the substituent, a substituted or unsubstituted alkyl group having 1 to 22 carbon atoms is preferable. In addition, as the antioxidant, a compound having a phenol group and a phosphite ester group in the same molecule is also preferable. In addition, as the antioxidant, a phosphorus antioxidant can also be suitably used. Examples of the phosphorus antioxidant include tris[2-[[2,4,8,10-tetrakis(1,1-dimethylethyl)dibenzo[d,f][1,3,2]dioxaphosphepin-6-yl]oxy]ethyl]amine, tris[2-[(4,6,9,11-tetra-tert-butyldibenzo[d,f][1,3,2]dioxaphosphepin-2-yl)oxy]ethyl]amine, and ethyl bis(2,4-di-tert-butyl-6-methylphenyl)phosphite. Examples of a commercially available product of the antioxidant include ADK STAB AO-20, ADK STAB AO-30, ADK STAB AO-40, ADK STAB AO-50, ADK STAB AO-50F, ADK STAB AO-60, ADK STAB AO-60G, ADK STAB AO-80, and ADK STAB AO-330 (all of which are manufactured by ADEKA Corporation). In addition, as the antioxidant, compounds described in paragraph Nos. 0023 to 0048 of JP6268967B, compounds described in WO2017/006600A, or compounds described in WO2017/164024A can also be used. A content of the antioxidant in the total solid content of the composition is preferably 0.01% to 20% by mass and more preferably 0.3% to 15% by mass. The composition may include only one kind of antioxidant, or may include two or more kinds thereof. In a case of including two or more kinds thereof, the total amount thereof is preferably within the above-described range.

<<Other Components>>

Optionally, the composition according to the embodiment of the present invention may further contain a sensitizer, a curing accelerator, a filler, a thermal curing accelerator, a plasticizer, and other auxiliary agents (for example, conductive particles, an antifoaming agent, a flame retardant, a leveling agent, a peeling accelerator, an aromatic chemical, a surface tension adjuster, or a chain transfer agent). By appropriately containing these components, properties such as film properties can be adjusted. The details of the components can be found in, for example, paragraph No. 0183 of JP2012-003225A (corresponding to paragraph No. 0237 of US2013/0034812A) and paragraph Nos. 0101 to 0104 and 0107 to 0109 of JP2008-250074A, the contents of which are incorporated herein by reference. In addition, optionally, the composition according to the embodiment of the present invention may contain a potential antioxidant. Examples of the potential antioxidant include a compound in which a portion that functions as the antioxidant is protected by a protective group and the protective group is desorbed by heating the compound at 100° C. to 250° C. or by heating the compound at 80° C. to 200° C. in the presence of an acid/a base catalyst. Examples of the potential antioxidant include compounds described in WO2014/021023A, WO2017/030005A, and JP2017-008219A. Examples of a commercially available product of the potential antioxidant include ADEKA ARKLS GPA-5001 (manufactured by ADEKA Corporation).

<Storage Container>

A storage container of the composition according to the embodiment of the present invention is not particularly limited, and a well-known storage container can be used. In addition, as the storage container, it is also preferable to use a multilayer bottle having an interior wall constituted with six layers from six kinds of resins or a bottle having a 7-layer structure from 6 kinds of resins for the purpose of suppressing infiltration of impurities into raw materials or compositions. Examples of such a container include the containers described in JP2015-123351A. In addition, for the purpose of preventing metal elution from the container interior wall, improving temporal stability of the composition, and suppressing the alteration of components, it is also preferable that the container interior wall is formed of glass, stainless steel, or the like.

<Method of Preparing Composition>

The composition according to the embodiment of the present invention can be prepared by mixing the above-described components with each other. During the preparation of the composition, all the components may be dissolved or dispersed in a solvent at the same time to prepare the composition. Optionally, two or more solutions or dispersion liquids in which the respective components are appropriately blended may be prepared, and the solutions or dispersion liquids may be mixed with each other during use (during application) to prepare the composition.

In the preparation of the composition, a process of dispersing the pigment may be included. In the process for dispersing the pigment, examples of a mechanical force which is used for dispersing the pigment include compression, pressing, impact, shear, and cavitation. Specific examples of these processes include a beads mill, a sand mill, a roll mill, a ball mill, a paint shaker, a microfluidizer, a high-speed impeller, a sand grinder, a flow jet mixer, high-pressure wet atomization, and ultrasonic dispersion. In addition, in the pulverization of the pigment in a sand mill (beads mill), it is preferable to perform a treatment under the condition for increasing a pulverization efficiency by using beads having small diameters; increasing the filling rate of the beads; or the like. Incidentally, it is preferable to remove coarse particles by filtration, centrifugation, or the like after the pulverization treatment. In addition, as the process and the dispersing machine for dispersing the pigment, the process and the dispersing machine described in "Dispersion Technology Comprehension, published by Johokiko Co., Ltd., Jul. 15, 2005", "Actual comprehensive data collection on dispersion technology and industrial application centered on suspension (solid/liquid dispersion system), published by Publication Department, Management Development Center, Oct. 10, 1978", and paragraph No. 0022 of JP2015-157893A can be suitably used. In addition, in the process for dispersing the pigment, a refining treatment of pigments in a salt milling step may be performed. A material, a device, process conditions, and the like used in the salt milling step can be found in, for example, JP2015-194521A and JP2012-046629A.

During the preparation of the composition, it is preferable that the composition is filtered through a filter, for example, in order to remove foreign matter or to reduce defects. As the filter, any filter which is used in the related art for filtering or the like can be used without any particular limitation. Examples of a material of the filter include: a fluororesin such as polytetrafluoroethylene (PTFE); a polyamide resin such as nylon (for example, nylon-6 or nylon-6,6); and a polyolefin resin (including a polyolefin resin having a high density and an ultrahigh molecular weight) such as polyethylene or polypropylene (PP). Among these materials, polypropylene (including high-density polypropylene) or nylon is preferable.

The pore size of the filter is preferably 0.01 to 7.0 μm, more preferably 0.01 to 3.0 μm, and still more preferably 0.05 to 0.5 μm. In a case where the pore size of the filter is within the above-described range, fine foreign matters can be reliably removed. With regard to the pore size value of the filter, reference can be made to a nominal value of filter manufacturers. As the filter, various filters provided by Nihon Pall Corporation (DFA4201NIEY, DFA4201NAEY, DFA4201J006P, and the like), Toyo Roshi Kaisha., Ltd., Nihon Entegris K.K. (formerly Nippon Microlith Co., Ltd.), Kitz Micro Filter Corporation, and the like can be used.

In addition, it is preferable that a fibrous filter material is used as the filter. Examples of the fibrous filter material include polypropylene fiber, nylon fiber, and glass fiber. Examples of a commercially available product include SBP type series (SBP008 and the like), TPR type series (TPR002, TPR005, and the like), or SHPX type series (SHPX003 and the like), all manufactured by Roki Techno Co., Ltd.

In a case where a filter is used, a combination of different filters (for example, a first filter and a second filter) may be used. In this case, the filtering using each of the filters may be performed once, or twice or more. In addition, a combination of filters having different pore sizes in the above-described range may be used. In addition, the filtering using the first filter may be performed only on the dispersion liquid, and the filtering using the second filter may be performed on a mixture of the dispersion liquid and other components.

<Film>

Next, a film according to an embodiment of the present invention will be described. The film according to the embodiment of the present invention is obtained from the above-described composition according to the embodiment of the present invention. The film according to the embodiment of the present invention can be preferably used as an optical filter. An application of the optical filter is not particularly limited, and examples thereof include an infrared cut filter and an infrared transmitting filter. Examples of the infrared cut filter include an infrared cut filter on a light-receiving side of a solid-state imaging element (for example, an infrared cut filter for a wafer level lens), an infrared cut filter on a back surface side (opposite to the light-receiving side) of the solid-state imaging element, and an infrared cut filter for an ambient light sensor (for example, an illuminance sensor that detects illuminance or tone of an environment in which an information terminal device is placed and adjusts tone of a display, or a color correction sensor that adjusts tone). In particular, the film according to the embodiment of the present invention can be preferably used as an infrared cut filter of a solid-state imaging element on a light-receiving side. Examples of the infrared transmitting filter include a filter which shields visible light and can selectively transmit infrared rays having a specific wavelength or higher.

The film according to the embodiment of the present invention may be a film having a pattern or a film (flat film) not having a pattern. In addition, the film according to the embodiment of the present invention may be used in a state where it is laminated on a support, or the film according to the embodiment of the present invention may be peeled off from a support. Examples of the support include a semiconductor base material such as a silicon substrate, and a transparent base material.

A charge coupled device (CCD), a complementary metal-oxide semiconductor (CMOS), a transparent conductive film, or the like may be formed on the semiconductor base material used as the support. In addition, a black matrix which separates pixels from each other may be formed on the semiconductor base material. In addition, optionally, an undercoat layer may be provided on the semiconductor base material to improve adhesiveness with a layer above the semiconductor base material, to prevent diffusion of substances, or to make the surface of the base material flat.

The transparent base material used as the support is not particularly limited as long as it is formed of a material which can allow transmission of at least visible light. Examples thereof include a base material formed of a material such as glass and resin. Examples of the resin include polyester resins such as polyethylene terephthalate and polybutylene terephthalate, polyolefin resins such as polyethylene, polypropylene, and ethylene vinyl acetate copolymer, norbornene resin, acrylic resins such as polyacrylate and polymethylmethacrylate, urethane resin, vinyl chloride resin, fluororesin, polycarbonate resin, polyvinyl butyral resin, and polyvinyl alcohol resin. Examples of the glass include soda lime glass, borosilicate glass, non-alkali glass, quartz glass, and copper-containing glass. Examples of the copper-containing glass include a phosphate glass containing copper and a fluorophosphate glass containing copper. As the copper-containing glass, a commercially available product may also be used. Examples of a commercially available product of the copper-containing glass include NF-50 (manufactured by AGC Techno Glass Co., Ltd.).

A thickness of the film according to the embodiment of the present invention can be a adjusted according to the purpose. The thickness of the film is preferably 20 μm or less, more preferably 10 μm or less, and still more preferably 5 μm or less. The lower limit of the thickness of the film is preferably 0.1 μm or more and more preferably 0.2 μm or more.

In a case where the film according to the embodiment of the present invention is used as an infrared cut filter, it is preferable that the film according to the embodiment of the present invention has a maximal absorption wavelength in a range of 650 to 1500 nm (preferably 660 to 1200 nm and more preferably 660 to 1000 nm). In addition, an average light transmittance in a wavelength range of 420 to 550 nm is preferably 50% or more, more preferably 70% or more, still more preferably 80% or more, and particularly preferably 85% or more. In addition, the light transmittance in the entire wavelength range of 420 to 550 nm is preferably 50% or more, more preferably 70% or more, and still more preferably 80% or more. In addition, in the film according to the embodiment of the present invention, a transmittance at at least one point in a wavelength range of 650 to 1500 nm (preferably 660 to 1200 nm and more preferably 660 to 1000 nm) is preferably 15% or less, more preferably 10% or less, and still more preferably 5% or less. In addition, in the film according to the embodiment of the present invention, in a case where an absorbance at the maximal absorption wavelength is set to 1, an average absorbance in the wavelength range of 420 to 550 nm is preferably less than 0.030 and more preferably less than 0.025.

In a case where the film according to the embodiment of the present invention is used as an infrared transmitting filter, it is preferable that the film according to the embodiment of the present invention has, for example, any one of the following spectral characteristics (i1) to (i3).

(i1): filter in which the maximum value of a transmittance in a wavelength range of 400 to 850 nm is 20% or less (preferably 15% or less and more preferably 10% or less) and the minimum value of a transmittance in a wavelength range of 1000 to 1500 nm is 70% or more (preferably 75% or more and more preferably 80% or more). A film having such spectral characteristics can shield light having a wavelength range of 400 to 850 nm, and can transmit light having a wavelength exceeding 950 nm.

(i2): filter in which the maximum value of a transmittance in a wavelength range of 400 to 950 nm is 20% or less (preferably 15% or less and more preferably 10% or less) and the minimum value of a transmittance in a wavelength range of 1100 to 1500 nm is 70% or more (preferably 75% or more and more preferably 80% or more). A film having such spectral characteristics can shield light having a wavelength range of 400 to 950 nm, and can transmit light having a wavelength exceeding 1050 nm.

(i3): filter in which the maximum value of a transmittance in a wavelength range of 400 to 1050 nm is 20% or less (preferably 15% or less and more preferably 10% or less) and the minimum value of a transmittance in a wavelength range of 1200 to 1500 nm is 70% or more (preferably 75% or more and more preferably 80% or more). A film having such spectral characteristics can shield light having a wavelength range of 400 to 1050 nm, and can transmit light having a wavelength exceeding 1150 nm.

The film according to the embodiment of the present invention can be used in combination with a color filter which includes a chromatic colorant. The color filter can be produced using a coloring composition including a chromatic colorant. In a case where the film according to the embodiment of the present invention is used as an infrared cut filter and used in combination with a color filter, it is preferable that the color filter is disposed on an optical path of the film according to the embodiment of the present invention. For example, it is preferable that the film according to the embodiment of the present invention and the color filter are laminated and used as a laminate. In the laminate, the film according to the embodiment of the present invention and the color filter may be or may not be adjacent to each other in a thickness direction. In a case where the film according to the embodiment of the present invention is not adjacent to the color filter in the thickness direction, the film according to the embodiment of the present invention may be formed on another support other than a support on which the color filter is formed, or another member (for example, a microlens or a planarizing layer) constituting a solid-state imaging element may be interposed between the film according to the embodiment of the present invention and the color filter.

The film according to the embodiment of the present invention can be used in various devices including a solid-state imaging element such as a charge coupled device (CCD) or a complementary metal-oxide semiconductor (CMOS), an infrared sensor, or an image display device.

<Method for Producing Film>

The film according to the embodiment of the present invention can be formed through a step of applying the composition according to the embodiment of the present invention.

Examples of the support are as described above. As a method of applying the composition, a known method can be used. Examples thereof include a dropping method (drop casting); a slit coating method; a spray method; a roll coating method; a spin coating method (spin coating); a cast coating method; a slit and spin method; a pre-wet method (for example, a method described in JP2009-145395A), various printing methods such as an ink jet (for example, on-demand type, piezo type, thermal type), a discharge printing such as nozzle jet, a flexo printing, a screen printing, a gravure printing, a reverse offset printing, and a metal mask printing method; a transfer method using molds and the like; and a nanoimprinting method. The application method using an ink jet method is not particularly limited, and examples thereof include a method (in particular, pp. 115 to 133) described in "Extension of Use of Ink Jet-Infinite Possibilities in Patent-" (published in February, 2005, S.B. Research Co., Ltd.) and methods described in JP2003-262716A, JP2003-185831A, JP2003-261827A, JP2012-126830A, and JP2006-169325A.

A composition layer formed by applying the composition may be dried (pre-baked). In a case of performing the pre-baking, the pre-baking temperature is preferably 150° C. or lower, more preferably 120° C. or lower, and still more preferably 110° C. or lower. The lower limit may be set to, for example, 50° C. or higher, or to 80° C. or higher. The pre-baking time is preferably 10 seconds to 3000 seconds, more preferably 40 seconds to 2500 seconds, and still more preferably 80 seconds to 220 seconds. Drying can be performed using a hot plate, an oven, or the like.

The method of producing the film according to the embodiment of the present invention may further include a step of forming a pattern. Examples of the pattern forming method include a pattern forming method using a photolithography method and a pattern forming method using a dry etching method. Among these, the pattern forming method using a photolithography method is preferable. In a case where the film according to the embodiment of the present invention is used as a flat film, the step of forming a pattern is not necessarily performed. Hereinafter, the step of forming a pattern will be described in detail.

(Case where Pattern is Formed Using Photolithography Method)

It is preferable that the pattern forming method using a photolithography method includes: a step (exposing step) of exposing the composition layer, which is formed by applying the composition according to the embodiment of the present invention, in a patterned manner; and a step (developing step) of forming a pattern by removing a non-exposed portion of the composition layer by development. Optionally, the pattern forming method may further include a step (post-baking step) of baking the developed pattern. Hereinafter, the respective steps will be described.

In the exposing step, the composition layer is exposed in a patterned manner. For example, the composition layer can be exposed in a patterned manner using a stepper exposure device or a scanner exposure device through a mask having a predetermined mask pattern. Thus, the exposed portion can be cured.

Examples of the radiation (light) which can be used during the exposure include g-rays and i-rays. In addition, light (preferably light having a wavelength of 180 to 300 nm) having a wavelength of 300 nm or less can also be used. Examples of the light having a wavelength of 300 nm or less include KrF-rays (wavelength: 248 nm) and ArF-rays (wavelength: 193 nm), and KrF-rays (wavelength: 248 nm) are preferable. In addition, a long-wave light source of 300 nm or more can be used.

In addition, in a case of exposure, the composition layer may be irradiated with light continuously to expose the composition layer, or the composition layer may be irradiated with light in a pulse to expose the composition layer (pulse exposure). The pulse exposure refers to an exposing method in which light irradiation and resting are repeatedly performed in a short cycle (for example, millisecond-level or less).

The irradiation amount (exposure amount) is, for example, preferably 0.03 to 2.5 $J/cm^2$ and more preferably 0.05 to 1.0 $J/cm^2$. The oxygen concentration during the exposure can be appropriately selected, and the exposure may also be performed, for example, in a low-oxygen atmosphere having an oxygen concentration of 19% by volume or less (for example, 15% by volume, 5% by volume, and substantially oxygen-free) or in a high-oxygen atmosphere having an oxygen concentration of more than 21% by volume (for example, 22% by volume, 30% by volume, and 50% by volume), in addition to an atmospheric air. In addition, the exposure illuminance can be appropriately set, and can be usually selected from a range of 1000 $W/m^2$ to 100000 $W/m^2$ (for example, 5000 $W/m^2$, 15000 $W/m^2$, or 35000 $W/m^2$). Appropriate conditions of each of the oxygen concentration and the exposure illuminance may be combined, and for example, a combination of the oxygen concentration of 10% by volume and the illuminance of 10000 $W/m^2$, a combination of the oxygen concentration of 35% by volume and the illuminance of 20000 $W/m^2$, or the like is available.

Next, a pattern is formed by removing a non-exposed portion of the exposed composition layer by development. The non-exposed portion of the composition layer can be removed by development using a developer. As a result, a non-exposed portion of the composition layer in the exposing step is eluted into the developer, and only the photocured portion remains on the support. The temperature of the developer is preferably, for example, 20° C. to 30° C. The development time is preferably 20 to 180 seconds. In addition, in order to improve residue removing properties, a step of removing the developer by shaking off per 60 seconds and supplying a fresh developer may be repeated multiple times.

Examples of the developer include an organic solvent and an alkali developer, and an alkali developer is preferably used. As the alkali developer, an alkaline aqueous solution (alkali developer) in which an alkaline agent is diluted with pure water is preferable. Examples of the alkaline agent include organic alkaline compounds such as ammonia, ethylamine, diethylamine, dimethylethanolamine, diglycol amine, diethanolamine, hydroxyamine, ethylenediamine, tetramethylammonium hydroxide, tetraethylammonium hydroxide, tetrapropylammonium hydroxide, tetrabutylammonium hydroxide, ethyltrimethylammonium hydroxide, benzyltrimethylammonium hydroxide, dimethylbis(2-hydroxyethyl)ammonium hydroxide, choline, pyrrole, piperidine, and 1,8-diazabicyclo[5.4.0]-7-undecene, and inorganic alkaline compounds such as sodium hydroxide, potassium hydroxide, sodium carbonate, sodium hydrogen carbonate, sodium silicate, and sodium metasilicate. In consideration of environmental aspects and safety aspects, the alkaline agent is preferably a compound having a high molecular weight. The concentration of the alkaline agent in the alkaline aqueous solution is preferably 0.001% to 10% by mass and more preferably 0.01% to 1% by mass. In addition, the developer may further contain a surfactant. As the surfactant, a nonionic surfactant is preferable. From the viewpoint of transportation, storage, and the like, the developer may be first produced as a concentrated solution and then diluted to a concentration required upon the use. The dilution factor is not particularly limited and, for example, can be set to be in a range of 1.5 to 100 times. In addition, it is also preferable to wash (rinse) with pure water after development. In addition, it is preferable that the rinsing is performed by supplying a rinsing liquid to the composition layer after development while rotating the support on which the composition layer after development is formed. In addition, it is preferable that the rinsing is performed by moving a nozzle discharging the rinsing liquid from a center of the support to a peripheral edge of the support. In this case, in the movement of the nozzle from the center of the support to the peripheral edge of the support, the nozzle may be moved while gradually decreasing the moving speed of the nozzle. By performing rinsing in this manner, in-plane variation of rinsing can be suppressed. In addition, the same effect can be obtained by gradually decreasing the rotating speed of the support while moving the nozzle from the center of the support to the peripheral edge of the support.

After the development, it is preferable to carry out an additional exposure treatment or a heating treatment (post-baking) after carrying out drying. The additional exposure treatment or the post-baking is a curing treatment after development in order to complete curing. The heating temperature in the post-baking is, for example, preferably 100° C. to 240° C. and more preferably 200° C. to 240° C. The film after development is post-baked continuously or batch-wise using a heating unit such as a hot plate, a convection oven (hot air circulation dryer), and a high-frequency heater under the above-described conditions. In a case of performing the additional exposure treatment, light used for the exposure is preferably light having a wavelength of 400 nm or less. In addition, the additional exposure treatment may be carried out by the method described in KR10-2017-0122130A.

(Case where Pattern is Formed Using Dry Etching Method)

The formation of a pattern using a dry etching method can be performed using a method including: applying the above-described composition to a support or the like to form a composition layer; curing the formed composition layer to form a cured composition layer; forming a patterned photoresist layer on the cured composition layer; and dry-etching the cured composition layer with etching gas by using the patterned photoresist layer as a mask. It is preferable that pre-baking treatment is performed in order to form the photoresist layer. The details of the pattern formation by the dry etching method can be found in paragraph Nos. 0010 to 0067 of JP2013-064993A, the content of which is incorporated herein by reference.

<Optical Filter>

An optical filter according to an embodiment of the present invention has the above-described film according to the embodiment of the present invention. Examples of the type of the optical filter include an infrared cut filter and an infrared transmitting filter.

The optical filter according to the embodiment of the present invention may have a layer containing copper, a dielectric multi-layer film, or an ultraviolet absorbing layer in addition to the film according to the embodiment of the present invention. Examples of the ultraviolet absorbing layer include absorbing layers described in paragraph Nos. 0040 to 0070 and 0119 to 0145 of WO2015/099060A. Examples of the dielectric multi-layer film include dielectric multi-layer films described in paragraph Nos. 0255 to 0259 of JP2014-041318A. As the layer containing copper, a glass substrate (copper-containing glass substrate) formed of glass containing copper, or a layer (copper complex-containing layer) containing a copper complex may also be used. Examples of the copper-containing glass substrate include a phosphate glass including copper and a fluorophosphate glass including copper. Examples of a commercially available product of the copper-containing glass include NF-50 (manufactured by AGC Techno Glass Co., Ltd.), BG-60 and BG-61 (both of which are manufactured by Schott AG), and CD5000 (manufactured by Hoya Corporation).

<Solid-State Imaging Element>

The solid-state imaging element according to an embodiment of the present invention includes the film according to the embodiment of the present invention. The configuration of the solid-state imaging element is not particularly limited as long as it includes the film according to the embodiment of the present invention and functions as a solid-state imaging element. For example, the following configuration can be adopted.

The solid-state imaging element includes a plurality of photodiodes and transfer electrodes on the support, the photodiodes consisting of a light receiving area of the solid-state imaging element, and the transfer electrode consisting of polysilicon or the like. In the solid-state imaging element, a light-shielding film consisting of tungsten or the like which has openings through only light receiving sections of the photodiodes is provided on the photodiodes and the transfer electrodes, a device protective film consisting of silicon nitride or the like is formed on the light-shielding film so as to cover the entire surface of the light-shielding film and the light receiving sections of the photodiodes, and the film according to the embodiment of the present invention is formed on the device protective film. Furthermore, a configuration in which a light collecting unit (for example, a microlens; hereinafter, the same shall be applied) is provided above the device protective film and below the film according to the embodiment of the present invention (on a side thereof close the support), or a configuration in which a light collecting unit is provided on the film according to the embodiment of the present invention may be adopted. In addition, the color filter may have a structure in which a film which forms each pixel is embedded in a space which is partitioned in, for example, a lattice form by a partition wall. In this case, it is preferable that the partition wall has a lower refractive index than each pixel. Examples of an imaging device having such a structure include devices described in JP2012-227478A and JP2014-179577A.

<Image Display Device>

An image display device according to the embodiment of the present invention includes the film according to the embodiment of the present invention. Examples of the image display device include a liquid crystal display device or an organic electroluminescence (organic EL) display device. The definitions or details of image display devices are described in, for example, "Electronic Display Device (Akio Sasaki, Kogyo Chosakai Publishing Co., Ltd., published in 1990)", "Display Device (Sumiaki Ibuki, Sangyo Tosho Co., Ltd.)", and the like. In addition, the liquid crystal display device is described in, for example, "Liquid Crystal Display Technology for Next Generation (edited by Tatsuo Uchida, Kogyo Chosakai Publishing Co., Ltd., published in 1994)". The liquid crystal display device to which the present invention can be applied is not particularly limited, and can be applied to, for example, liquid crystal display devices employing various systems described in the "Liquid Crystal Display Technology for Next Generation". The image display device may be an image display device having a white organic EL element. It is preferable that the white organic EL element has a tandem structure. The tandem structure of the organic EL element is described in, for example, JP2003-045676A, or pp. 326 to 328 of "Forefront of Organic EL Technology Development-Know-How Collection of High Brightness, High Precision, and Long Life" (Technical Information Institute, 2008). It is preferable that a spectrum of white light emitted from the organic EL element has high maximal emission peaks in a blue range (430 to 485 nm), a green range (530 to 580 nm), and a yellow range (580 to 620 nm). It is more preferable that the spectrum has a maximal emission peak in a red range (650 to 700 nm) in addition to the above-described emission peaks.

<Infrared Sensor>

An infrared sensor according to the embodiment of the present invention includes the film according to the embodiment of the present invention. The configuration of the infrared sensor is not particularly limited as long as it functions as an infrared sensor. Hereinafter, an embodiment of the infrared sensor according to the present invention will be described using the drawing.

In FIG. 1, reference numeral 110 represents a solid-state imaging element. Infrared cut filters 111 and infrared transmitting filters 114 are arranged in an imaging region of the solid-state imaging element 110. In addition, color filters 112 are arranged on the infrared cut filters 111. Microlenses 115 are disposed on an incidence ray hv side of the color filters 112 and the infrared transmitting filters 114. A planarizing layer 116 is formed so as to cover the microlenses 115.

The infrared cut filter 111 can be formed using the composition according to the embodiment of the present invention. The color filters 112 is not particularly limited as long as pixels which allow transmission of light having a specific wavelength in a visible range and absorbs the light are formed therein, and a known color filter in the related art for forming a pixel can be used. For example, pixels of red (R), green (G), and blue (B) are formed in the color filters. For example, the details of the color filters can be found in paragraph Nos. 0214 to 0263 of JP2014-043556A, the content of which is incorporated herein by reference. Characteristics of the infrared transmitting filter 114 can be selected according to the emission wavelength of the infrared LED to be used. The infrared transmitting filter 114 can be formed using the composition according to the embodiment of the present invention.

In the infrared sensor shown in FIG. 1, an infrared cut filter (other infrared cut filters) other than the infrared cut filter 111 may be further disposed on the planarizing layer 116. As the other infrared cut filters, for example, a layer containing copper and/or a dielectric multi-layer film may be provided. The details of the examples are as described above. In addition, as the other infrared cut filters, a dual band pass filter may be used.

<Camera Module>

The camera module according to the embodiment of the present invention includes a solid-state imaging element and the above-described film according to the embodiment of the present invention. It is preferable that the camera module further includes a lens and a circuit for processing an image obtained from the solid-state imaging element. The solid-state imaging element used in the camera module may be the above-described solid-state imaging element according to the embodiment of the present disclosure, or a known solid-state imaging element. In addition, as the lens and the circuit for processing an image obtained from the above-described solid-state imaging element used in the camera module, known ones can be used. Examples of the camera module include camera modules described in JP2016-006476A and JP2014-197190A, the contents of which are incorporated herein by reference.

<Compound>

The compound according to the embodiment of the present invention is a compound represented by Formula (1).

(1)

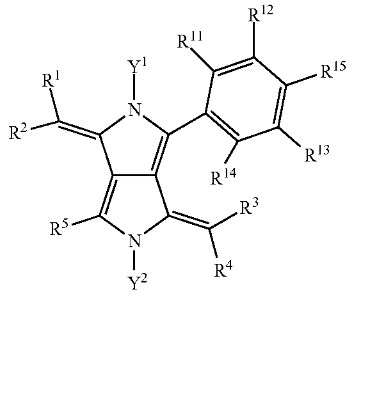

In Formula (1), $R^1$ to $R^4$ each independently represent a substituent, $R^5$ represents an aliphatic hydrocarbon group, $R^{11}$ to $R^{15}$ each independently represent a hydrogen atom or a substituent, and $Y^1$ and $Y^2$ each independently represent a hydrogen atom or a substituent, where at least one of $R^{11}$, $R^{12}$, $R^{13}$, or $R^{14}$ is a substituent or each of $R^{11}$ to $R^{15}$ is a hydrogen atom.

$R^1$ to $R^5$, $R^{11}$ to $R^{15}$, and $Y^1$ and $Y^2$ in Formula (1) have the same meaning as $R^1$ to $R^5$, $R^{11}$ to $R^{15}$, and $Y^1$ and $Y^2$ in Formula (1) represented as the coloring agent represented by Formula (1) (specific coloring agent) described above, respectively.

The compound according to the embodiment of the present invention has a maximal absorption wavelength preferably at a wavelength of 650 nm or more, more preferably in a wavelength range of 650 to 1500 nm, still more preferably in a wavelength range of 660 to 1200 nm, and particularly preferably in a wavelength range of 660 to 1000 nm.

In addition, with regard to the compound according to the embodiment of the present invention, in a wavelength range of 400 nm to 1200 nm, in a case where an absorbance value in a wavelength (λmax) which exhibits the largest absorbance value is set to 1, an average absorbance value in a wavelength range of 420 to 550 nm is preferably less than 0.010 and more preferably less than 0.007.

The compound according to the embodiment of the present invention can be preferably used as an infrared absorber. In addition, the compound according to the embodiment of the present invention can also be used as a dispersion aid. In addition, the compound according to the embodiment of the present invention can also be used as a fluorescent coloring agent.

<Infrared Absorber>

The infrared absorber according to the embodiment of the present invention includes the compound represented by Formula (1). The infrared absorber may include only one kind of the compound represented by Formula (1), or may include two or more kinds thereof. In addition, the infrared absorber according to the embodiment of the present invention may include a decomposition product of the compound represented by Formula (1).

EXAMPLES

Hereinafter, the present invention will be described in detail with reference to Examples. Materials, used amounts, proportions, treatment details, treatment procedures, and the like shown in the following examples can be appropriately changed within a range not departing from the scope of the present invention. In addition, in the structural formulae, Me represents a methyl group, Et represents an ethyl group, iPr represents an isopropyl group, Bu represents a butyl group, Ph represents a phenyl group, and Ac represents an acetyl group.

<Synthesis of Coloring Agent Represented by Formula (1) (Specific Coloring Agent)>
<<Synthesis Example of Coloring Agent PPB-A-43>>
A coloring agent PPB-A-43 was synthesized according to the following scheme.
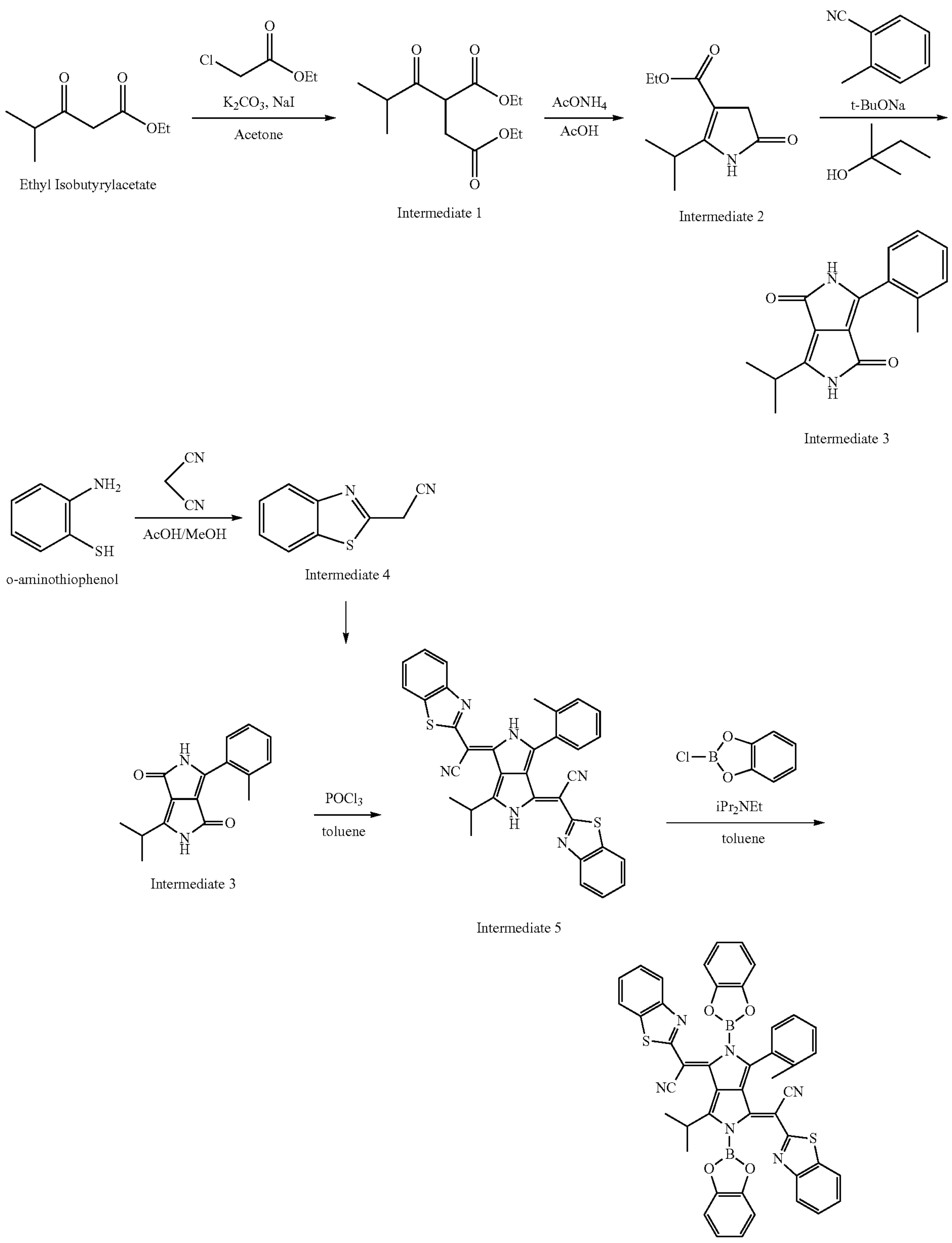
PPB-A-43

(Synthesis of Intermediate 1)

Under a nitrogen atmosphere, 500 g of ethyl isobutyryl acetate, 3000 mL of acetone, 61.17 g of potassium iodide, 458.66 g of potassium carbonate, and 387.33 g of ethyl chloroacetate were charged into a three-neck flask, and the mixture was stirred for 10 hours with heating under reflux. The reaction solution was cooled to 10° C. or lower, filtered, and washed with 1000 mL of acetone, and the filtrate was concentrated with an evaporator to obtain 772.09 g of an intermediate 1.

(Synthesis of Intermediate 2)

Under a nitrogen atmosphere, 772.09 g of the intermediate 1, 1827 g of ammonium acetate, and 1544 mL of acetic acid were charged into a three-neck flask, and the mixture was stirred for 2 hours with heating under reflux. The reaction solution was cooled to 25° C., 6176 mL of distilled water was added thereto, and the reaction solution was stirred at 5° C. or lower under ice cooling for 30 minutes. The reaction solution was filtered and washed with 1081 mL of distilled water. The obtained crystals and 811 mL of hexane were charged into a three-neck flask, stirred in air for 1 hour, filtered, and washed with 540 mL of hexane, and the obtained crystals were blast-dried at 50° C. for 12 hours to obtain 284.2 g of an intermediate 2 (yield: 45.6%).

$^1$H-NMR ($CDCl_3$): δ=1.20 (d, J=7.0 Hz, 6H), 1.29 (t, J=7.1 Hz, 3H), 3.30 (s, 2H), 3.91 (sep, J=7.0 Hz, 1H), 4.19 (q, J=7.1 Hz, 2H), 8.82 (s, 1H)

(Synthesis of Intermediate 3)

Under a nitrogen atmosphere, 165 g of the intermediate 2, 107.12 g of o-tolunitrile, and 759 mL of t-amyl alcohol were charged into a three-neck flask, 241.19 g of sodium t-butoxide was added thereto while washing with 66 mL of t-amyl alcohol, and the reaction solution was stirred at an external temperature of 135° C. for 3.5 hours with heating under reflux. The reaction solution was cooled to 40° C., 1518 mL of methanol, 1518 mL of distilled water, and 150.71 g of acetic acid were sequentially added thereto at 40° C. or lower, and the reaction solution was stirred at 25° C. for 20 minutes. The reaction solution was filtered and washed with 1320 mL of methanol, and the obtained crystals were blast-dried at 50° C. for 12 hours to obtain 66.83 g of an intermediate 3 (yield: 29.8%).

$^1$H-NMR (deuterated dimethyl sulfoxide (DMSO)): б=1.30 (d, J=6.9 Hz, 6H), 2.44 (s, 3H), 2.90 (sep, J=6.9 Hz, 1H), 7.26 to 7.42 (m, 3H), 7.53 (m, 1H), 10.49 (s, 2H)

(Synthesis of Intermediate 4)

Under a nitrogen atmosphere, 237.46 g of malononitrile, 201 mL of acetic acid, and 1977 mL of methanol were charged into a three-neck flask, and 450 g of o-aminothiophenol was added dropwise thereto while washing with 150 mL of methanol at 40° C. or lower. The reaction solution was stirred at 30° C. for 2 hours, stirred at 10° C. or lower for 30 minutes, filtered, and washed with 300 mL of cold methanol, and the obtained crystals were blast-dried at 40° C. for 12 hours to obtain 510.55 g of an intermediate 4 (yield: 81.5%).

$^1$H-NMR ($CDCl_3$): δ=4.24 (s, 2H), 7.44 (m, 1H), 7.53 (m, 1H), 7.89 (m, 1H), 8.04 (m, 1H)

(Synthesis of Intermediate 5)

Under a nitrogen atmosphere, 66.5 g of the intermediate 3, 103.63 g of the intermediate 4, and 1397 mL of toluene were charged into a three-neck flask, and 67 mL of the toluene was distilled off with heating under reflux. The reaction solution was cooled to 95° C., 229.22 g of phosphorus oxychloride was added thereto while maintaining a temperature in a range of 90° C. to 95° C., and the reaction solution was stirred for 2 hours with heating under reflux. The reaction solution was cooled to 20° C., 2993 mL of ethyl acetate and 2993 mL of distilled water were added thereto while maintaining a temperature of 20° C. to 30° C., and a liquid separation operation was performed. The organic layer was dried with magnesium sulfate and filtered, the magnesium sulfate was filtered off, and the filtrate was concentrated with an evaporator. 998 mL of methanol was added to the obtained residue, the mixture was stirred at 25° C. for 30 minutes, the precipitated crystals were filtered off and washed with 333 mL of methanol, and the obtained crystals were blast-dried at 50° C. for 12 hours to obtain 25.13 g of an intermediate 5 (yield: 17.5%).

$^1$H-NMR ($CDCl_3$): δ=1.57 (d, 6H), 2.49 (s, 3H), 4.25 (sep, J=6.8 Hz, 1H), 7.28 to 7.58 (m, 8H), 7.74 (m, 1H), 7.82 to 7.87 (m, 3H), 12.78 (m, 1H), 13.01 (m, 1H)

(Synthesis of Coloring Agent PPB-A-43)

Under a nitrogen atmosphere, 1.0 g of the intermediate 5, 2.12 g of chlorocatecholborane, and 10 mL of toluene were charged into a three-neck flask, and 2.22 g of diisopropylethylamine was added thereto while washing with 1.0 mL of toluene. The reaction solution was stirred at 60° C. for 10 minutes and cooled to 20° C., 20 mL of methanol was added thereto while maintaining a temperature of 10° C. to 20° C., and the mixture was stirred at 20° C. for 10 minutes. The precipitated crystals were filtered off and washed with 10 mL of methanol, and the obtained crude product was dissolved in chloroform and purified by silica gel column chromatography (chloroform) to obtain 0.2 g of a coloring agent PPB-A-43 (yield: 14.2%).

$^1$H-NMR ($CDCl_3$): δ=1.47 (d, J=7.2 Hz, 3H), 1.48 (d, J=7.2 Hz, 3H), 2.31 (s, 3H), 3.05 (m, 1H), 6.32 to 6.36 (m, 2H), 6.55 to 6.58 (m, 2H), 6.84 to 7.08 (m, 8H), 7.17 to 7.35 (m, 6H), 7.69 to 7.74 (m, 2H)

<<Synthesis Example of Coloring Agent PPB-A-19>>

A coloring agent PPB-A-19 was synthesized according to the following scheme.

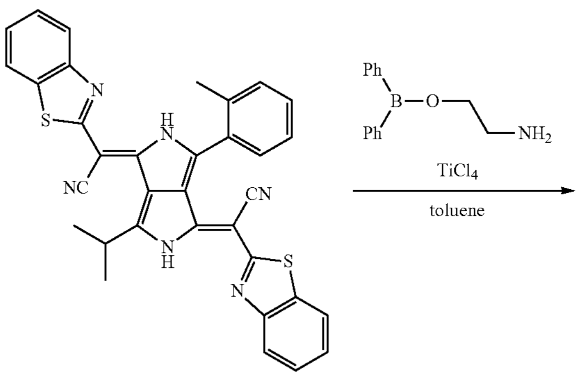

Intermediate 5

-continued

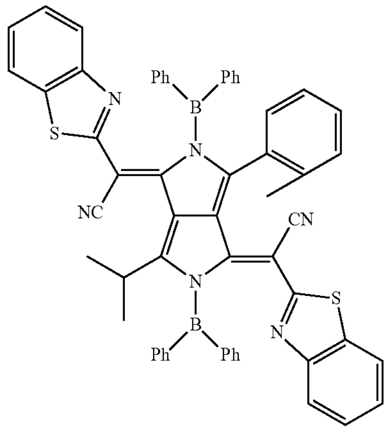

PPB-A-19

Under a nitrogen atmosphere, 25.0 g of the intermediate 5, 77.52 g of 2-aminoethoxydiphenyl borate, and 500 mL of toluene were charged into a three-neck flask, and 97.99 g of titanium tetrachloride was added thereto while washing with 50 mL of toluene and maintaining a temperature in a range of 90° C. to 100° C. The reaction solution was stirred for 2 hours with heating under reflux and cooled to 20° C., and 500 mL of methanol was added thereto while maintaining a temperature of 20° C. to 30° C. The obtained crystals were filtered off and washed with 250 mL of methanol, 500 mL of methanol was added to the obtained crude product, and the mixture was stirred for 30 minutes with heating under reflux. Thereafter, the mixture was cooled to 20° C., filtered, and washed with 250 mL of methanol, and the obtained crystals were blast-dried at 50° C. for 12 hours to obtain 9.56 g of a coloring agent PPB-A-19 (yield: 24.4%).

$^1$H-NMR ($CDCl_3$): δ=0.88 (d, J=7.2 Hz, 3H), 0.95 (d, J=7.2 Hz, 3H), 1.51 (s, 3H), 3.51 (m, 1H), 6.39 (m, 1H), 6.74 (m, 1H), 6.82 (m, 1H), 6.88 to 7.41 (m, 21H), 7.51 to 7.55 (m, 4H), 7.64 to 7.67 (m, 2H), 7.76 to 7.78 (m, 2H)

<<Synthesis Example of Coloring Agent PPB-C-1>>

A coloring agent PPB-C-1 was synthesized according to the following scheme.

-continued

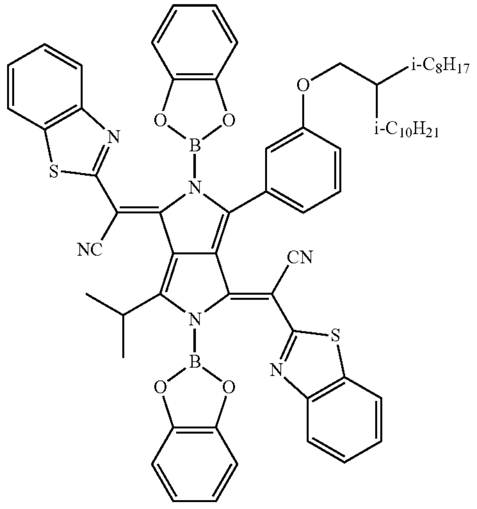

PPB-C-1

An intermediate 6 was synthesized by the same method as that of the intermediate 5. Under a nitrogen atmosphere, 0.4 g of the intermediate 6, 0.86 g of chlorocatecholborane, and 4 mL of toluene were charged into a three-neck flask, and 0.96 g of diisopropylethylamine was added thereto while washing with 0.4 mL of toluene. The reaction solution was stirred at 60° C. for 10 minutes and cooled to 20° C., 12 mL of methanol was added thereto while maintaining a temperature of 10° C. to 20° C., and the mixture was stirred at 20° C. for 10 minutes. The precipitated crystals were filtered off and washed with 7 mL of methanol, and the obtained crude product was dissolved in chloroform and purified by silica gel column chromatography (chloroform) to obtain 0.29 g of a coloring agent PPB-C-1 (yield: 57%).

$^1$H-NMR ($CDCl_3$): δ=0.87 to 1.90 (m, 45H), 3.04 (m, 1H), 3.67 to 3.71 (m, 2H), 6.36 (m, 2H), 6.56 to 6.63 (m, 3H), 6.82 to 7.35 (m, 13H), 7.69 to 7.74 (dd, J=7.6 Hz, 2H)

<<Synthesis Example of Coloring Agent PPB-B-34>>

A coloring agent PPB-B-34 was synthesized according to the following scheme.

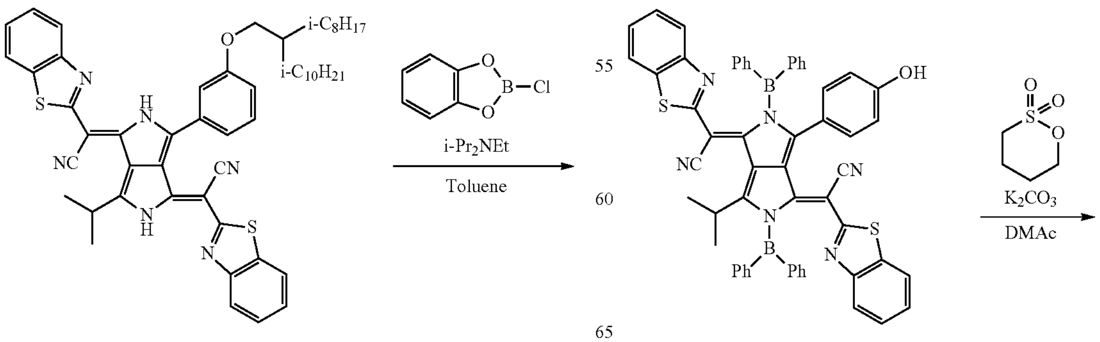

Intermediate 6 Intermediate 7

-continued

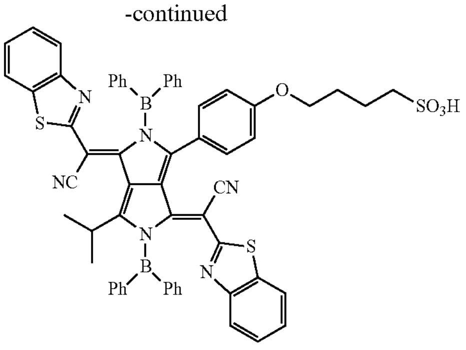

PPB-B-34

An intermediate 7 was synthesized by the same method as that of the intermediate 5. Under a nitrogen atmosphere, 1.00 g of the intermediate 7 and 0.607 g of potassium carbonate were stirred in 12 mL of dimethylacetamide (DMAc) in a three-neck flask, and 1.05 g of butanesultone was added thereto while washing with 1 mL of DMAc. The reaction solution was stirred at 95° C. for 2 hours and cooled to 20° C., 6 mL of ethyl acetate was added thereto while maintaining a temperature of 20° C. to 30° C., and the mixture was stirred at 25° C. for 10 minutes. The precipitated crystals were filtered off and washed with 12 mL of a 1:1 mixed solution of ethyl acetate and DMAc and 6 mL of ethyl acetate in this order, the obtained crude product was added to 20 mL of 4 mol/L hydrochloric acid water and stirred at 25° C. for 40 minutes. The reaction solution was filtered and washed with 10 mL of distilled water, and the obtained crystals were blast-dried at 50° C. for 12 hours to obtain 0.36 g of a coloring agent PPB-B-34 (yield: 31.4%).

$^1$H-NMR (d-DMSO): δ=0.79 (d, J=7.2 Hz, 6H), 1.29 to 1.46 (m, 2H), 1.74 to 1.77 (m, 4H), 2.01 (m, 1H), 3.91 to 3.94 (m, 2H), 6.30 (d, J=8.8 Hz, 1H), 6.42 (d, J=8.8 Hz, 1H), 6.84 (d, J=8.5 Hz, 1H), 7.10 to 7.40 (m, 23H), 7.77 to 7.79 (m, 4H), 7.95 to 7.97 (m, 2H)

<<Synthesis Example of Coloring Agent PPB-B-36>>

A coloring agent PPB-B-36 was synthesized according to the following scheme.

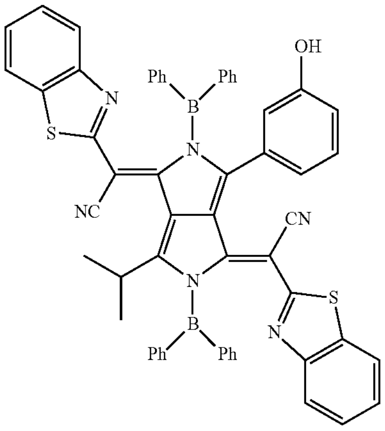

Intermediate 8

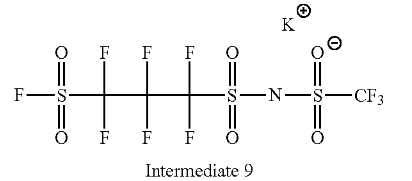

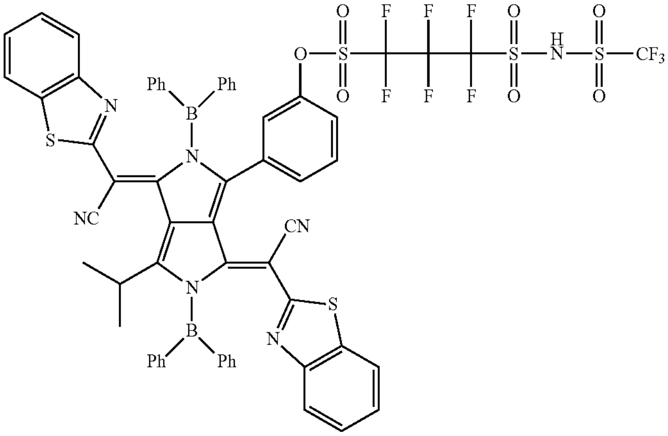

PPB-B-36

An intermediate 8 was synthesized by the same method as that of the intermediate 5. Under a nitrogen atmosphere, 3.50 g of the intermediate 8 and 1.06 g of potassium carbonate were stirred in 105 mL of dimethylacetamide (DMAc) in a three-neck flask, and 7.43 g of an intermediate 9 was added thereto. The reaction solution was stirred at 95° C. for 1 hour and cooled to 20° C., 140 mL of 4 mol/L hydrochloric acid water was added thereto while maintaining a temperature of 20° C. to 30° C., and the mixture was stirred at 25° C. for 10 minutes. The precipitated crystals were filtered off and washed with 140 mL of 4 mol/L hydrochloric acid water, the obtained crude product was added to 140 mL of 4 mol/L hydrochloric acid water and stirred at 25° C. for 30 minutes. The reaction solution was filtered and washed with 140 mL of 4 mol/L hydrochloric acid water. The obtained crude product was added to 70 mL of a mixed solution of hexane/ethyl acetate=1:1, stirred at 25° C. for 10 minutes, and filtered, and the obtained crude product was washed with 70 mL of a mixed solution of hexane/ethyl acetate=1:1. The crystals were blast-dried at 50° C. for 12 hours to obtain 4.34 g of a coloring agent PPB-B-36 (yield: 84.6%).

$^1$H-NMR (d-DMSO): δ=0.78 (d, J=7.2 Hz, 3H), 0.82 (d, J=7.2 Hz, 3H), 3.57 (m, 1H), 6.49 (m, 1H), 6.58 (m, 1H), 6.82 (m, 1H), 7.00 to 7.43 (m, 23H), 7.77 to 7.82 (m, 4H), 7.96 to 8.00 (m, 2H)

$^{19}$F-NMR (d-DMSO): δ=−78.7 (3F), −108.8 (2F), −112.8 (2F), −118.3 (2F)

<<Synthesis Examples of Coloring Agents PPB-A-1 to 18, PPB-A-20 to 42, PPB-A-44 to 81, PPB-C-2 to PPB-C-12, PPB-D-1, PPB-D-2, PPB-E-1, PPB-B-1 to PPB-B-33, PPB-B-35, and PPB-B-37 to PPB-B-65>>

Each coloring agent was synthesized by the same method as that of the coloring agents PPB-A-19, PPB-A-43, PPB-B-34, PPB-B-36, and PPB-C-1.

<Evaluation of Visible Transparency>

Coloring agents listed in the tables below were dissolved in solvents listed in the tables below to prepare a coloring agent solution. Using a spectrophotometer U-4100 (manufactured by Hitachi High-Tech Corporation), an absorbance of the obtained coloring agent solution with respect to light having a wavelength of 400 to 1200 nm was measured. In the wavelength range of 400 nm to 1200 nm, in a case where an absorbance value in a wavelength (λmax) which exhibited the largest absorbance value was measured and a value of the absorbance at λmax was set to 1, an average absorbance value in a wavelength range of 420 to 550 nm was calculated, and visible transparency was evaluated according to the following standard.

A: average absorbance in the range of 420 to 550 nm was less than 0.007.

B: average absorbance in the range of 420 to 550 nm was 0.007 or more and less than 0.010.

C: average absorbance in the range of 420 to 550 nm was 0.010 or more.

TABLE 1

| Coloring agent | | Solvent | λmax [nm] | Average absorbance at wavelength of 420 to 550 nm | Visible transparency |
|---|---|---|---|---|---|
| PPB-A-1 | Pigment | Chloroform | 849 | 0.0047 | A |
| PPB-A-2 | Pigment | Chloroform | 810 | 0.0050 | A |
| PPB-A-3 | Pigment | Chloroform | 721 | 0.0073 | A |
| PPB-A-4 | Pigment | Chloroform | 721 | 0.0051 | A |
| PPB-A-5 | Pigment | Chloroform | 736 | 0.0044 | A |
| PPB-A-6 | Pigment | Chloroform | 719 | 0.0060 | A |

TABLE 1-continued

| Coloring agent | | Solvent | λmax [nm] | Average absorbance at wavelength of 420 to 550 nm | Visible transparency |
|---|---|---|---|---|---|
| PPB-A-7 | Pigment | Chloroform | 870 | 0.0061 | A |
| PPB-A-8 | Pigment | Chloroform | 729 | 0.0068 | A |
| PPB-A-9 | Pigment | Chloroform | 753 | 0.0068 | A |
| PPB-A-10 | Pigment | Chloroform | 744 | 0.0053 | A |
| PPB-A-11 | Pigment | Chloroform | 771 | 0.0080 | B |
| PPB-A-12 | Pigment | Chloroform | 786 | 0.0080 | B |
| PPB-A-13 | Pigment | Chloroform | 726 | 0.0047 | A |
| PPB-A-14 | Pigment | Chloroform | 752 | 0.0084 | B |
| PPB-A-15 | Pigment | Chloroform | 732 | 0.0063 | A |
| PPB-A-16 | Pigment | Chloroform | 736 | 0.0046 | A |
| PPB-A-17 | Pigment | Chloroform | 726 | 0.0047 | A |
| PPB-A-18 | Pigment | Chloroform | 727 | 0.0047 | A |
| PPB-A-19 | Pigment | Chloroform | 766 | 0.0038 | A |
| PPB-A-20 | Pigment | Chloroform | 788 | 0.0038 | A |
| PPB-A-21 | Pigment | Chloroform | 771 | 0.0043 | A |
| PPB-A-22 | Pigment | Chloroform | 774 | 0.0050 | A |
| PPB-A-23 | Pigment | Chloroform | 766 | 0.0038 | A |
| PPB-A-24 | Pigment | Chloroform | 767 | 0.0038 | A |
| PPB-A-25 | Pigment | Chloroform | 792 | 0.0049 | A |
| PPB-A-26 | Pigment | Chloroform | 743 | 0.0053 | A |
| PPB-A-27 | Pigment | Chloroform | 664 | 0.0076 | A |
| PPB-A-28 | Pigment | Chloroform | 664 | 0.0053 | A |
| PPB-A-29 | Pigment | Chloroform | 679 | 0.0046 | A |
| PPB-A-30 | Pigment | Chloroform | 662 | 0.0063 | A |
| PPB-A-31 | Pigment | Chloroform | 813 | 0.0064 | A |
| PPB-A-32 | Pigment | Chloroform | 672 | 0.0072 | A |
| PPB-A-33 | Pigment | Chloroform | 696 | 0.0072 | A |
| PPB-A-34 | Pigment | Chloroform | 687 | 0.0055 | A |
| PPB-A-35 | Pigment | Chloroform | 714 | 0.0084 | B |

TABLE 2

| Coloring agent | | Solvent | λmax [nm] | Average absorbance at wavelength of 420 to 550 nm | Visible transparency |
|---|---|---|---|---|---|
| PPB-A-36 | Pigment | Chloroform | 729 | 0.0084 | B |
| PPB-A-37 | Pigment | Chloroform | 669 | 0.0049 | A |
| PPB-A-38 | Pigment | Chloroform | 695 | 0.0088 | B |
| PPB-A-39 | Pigment | Chloroform | 675 | 0.0067 | A |
| PPB-A-40 | Pigment | Chloroform | 679 | 0.0048 | A |
| PPB-A-41 | Pigment | Chloroform | 669 | 0.0049 | A |
| PPB-A-42 | Pigment | Chloroform | 670 | 0.0049 | A |
| PPB-A-43 | Pigment | Chloroform | 709 | 0.0040 | A |
| PPB-A-44 | Pigment | Chloroform | 731 | 0.0040 | A |
| PPB-A-45 | Pigment | Chloroform | 714 | 0.0046 | A |
| PPB-A-46 | Pigment | Chloroform | 717 | 0.0053 | A |
| PPB-A-47 | Pigment | Chloroform | 709 | 0.0040 | A |
| PPB-A-48 | Pigment | Chloroform | 710 | 0.0040 | A |
| PPB-A-49 | Pigment | Chloroform | 732 | 0.0063 | A |
| PPB-A-50 | Pigment | Chloroform | 732 | 0.0063 | A |
| PPB-A-51 | Pigment | Chloroform | 675 | 0.0067 | A |
| PPB-A-52 | Pigment | Chloroform | 771 | 0.0043 | A |
| PPB-A-53 | Pigment | Chloroform | 766 | 0.0038 | A |
| PPB-A-54 | Pigment | Chloroform | 768 | 0.0048 | A |
| PPB-A-55 | Pigment | Chloroform | 764 | 0.0043 | A |
| PPB-A-56 | Pigment | Chloroform | 768 | 0.0038 | A |
| PPB-A-57 | Pigment | Chloroform | 766 | 0.0038 | A |
| PPB-A-58 | Pigment | Chloroform | 766 | 0.0038 | A |
| PPB-A-59 | Pigment | Chloroform | 766 | 0.0043 | A |
| PPB-A-60 | Pigment | Chloroform | 709 | 0.0040 | A |
| PPB-A-61 | Pigment | Chloroform | 726 | 0.0047 | A |
| PPB-A-62 | Pigment | Chloroform | 714 | 0.0046 | A |
| PPB-A-63 | Pigment | Chloroform | 733 | 0.0055 | A |
| PPB-A-64 | Pigment | Chloroform | 738 | 0.0055 | A |
| PPB-A-65 | Pigment | Chloroform | 766 | 0.0038 | A |
| PPB-A-66 | Pigment | Chloroform | 766 | 0.0038 | A |
| PPB-A-67 | Pigment | Chloroform | 766 | 0.0038 | A |
| PPB-A-68 | Pigment | Chloroform | 737 | 0.0060 | A |

TABLE 2-continued

| Coloring agent | | Solvent | λmax [nm] | Average absorbance at wavelength of 420 to 550 nm | Visible transparency |
|---|---|---|---|---|---|
| PPB-A-69 | Pigment | Chloroform | 778 | 0.0045 | A |
| PPB-A-70 | Pigment | Chloroform | 766 | 0.0038 | A |

TABLE 3

| Coloring agent | | Solvent | λmax [nm] | Average absorbance at wavelength of 420 to 550 nm | Visible transparency |
|---|---|---|---|---|---|
| PPB-A-71 | Pigment | Chloroform | 732 | 0.0063 | A |
| PPB-A-72 | Pigment | Chloroform | 766 | 0.0038 | A |
| PPB-A-73 | Pigment | Chloroform | 771 | 0.0080 | B |
| PPB-A-74 | Pigment | Chloroform | 766 | 0.0038 | A |
| PPB-A-75 | Pigment | Chloroform | 766 | 0.0038 | A |
| PPB-A-76 | Pigment | Chloroform | 766 | 0.0038 | A |
| PPB-A-77 | Pigment | Chloroform | 786 | 0.0080 | B |
| PPB-A-78 | Pigment | Chloroform | 766 | 0.0038 | A |
| PPB-A-79 | Pigment | Chloroform | 766 | 0.0038 | A |
| PPB-A-80 | Pigment | Chloroform | 766 | 0.0038 | A |
| PPB-A-81 | Pigment | Chloroform | 766 | 0.0038 | A |
| PPB-C-1 | Dye | Chloroform | 711 | 0.0059 | A |
| PPB-C-2 | Dye | Chloroform | 768 | 0.0059 | A |
| PPB-C-3 | Dye | Chloroform | 766 | 0.0059 | A |
| PPB-C-4 | Dye | Chloroform | 734 | 0.0079 | A |
| PPB-C-5 | Dye | Chloroform | 759 | 0.0084 | A |
| PPB-C-6 | Dye | Chloroform | 733 | 0.0078 | A |
| PPB-C-7 | Dye | Chloroform | 711 | 0.0059 | A |
| PPB-C-8 | Dye | Chloroform | 711 | 0.0059 | A |
| PPB-C-9 | Dye | Chloroform | 711 | 0.0059 | A |
| PPB-C-10 | Dye | Chloroform | 711 | 0.0059 | A |
| PPB-C-11 | Dye | Chloroform | 766 | 0.0038 | A |
| PPB-C-12 | Dye | Chloroform | 766 | 0.0038 | A |
| PPB-D-1 | Pigment | Chloroform | 752 | 0.0162 | C |
| PPB-D-2 | Pigment | Chloroform | 752 | 0.0123 | C |
| PPB-E-1 | Dye | Chloroform | 752 | 0.0162 | C |

The coloring agents PPB-A-1 to PPB-A-81 and the coloring agents PPB-C-1 to PPB-C-12 were more excellent in visible transparency that the coloring agent PPB-D-1, the coloring agent PPB-D-2, and the coloring agent PPB-E-1. Details of each coloring agent are as follows.

PPB-A-1 to PPB-A-81: compounds having the following structures (coloring agents represented by Formula (1) (specific coloring agents))

PPB-C-1 to PPB-C-12: compounds having the following structures (coloring agents represented by Formula (1) (specific coloring agents))

PPB-D-1, PPB-D-2, PPB-E-1: compounds having the following structures (comparative coloring agents)

PPB-A-1

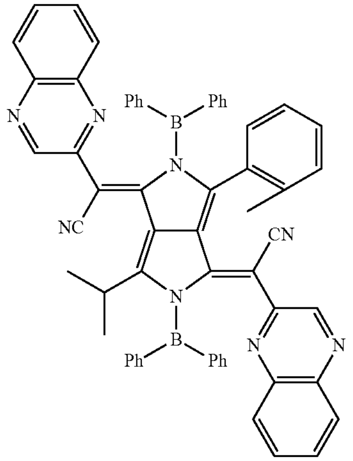

PPB-A-2

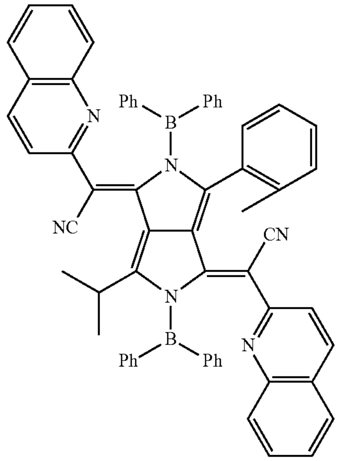

PPB-A-3

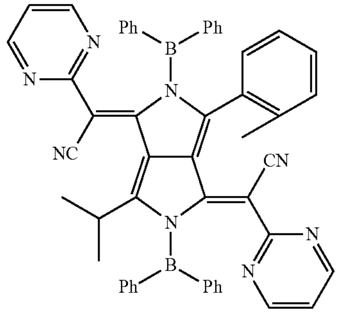

PPB-A-4

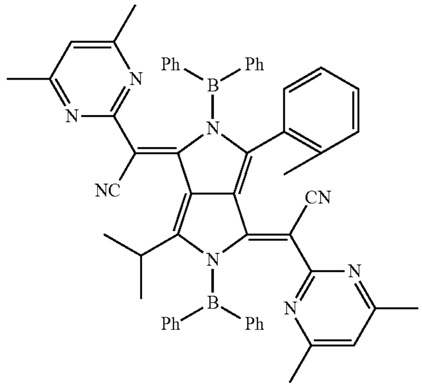

-continued
PPB-A-5
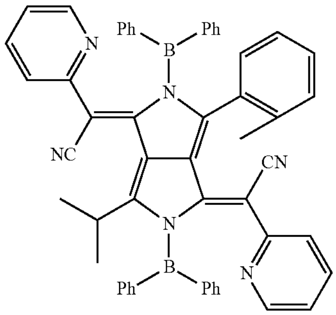
PPB-A-6
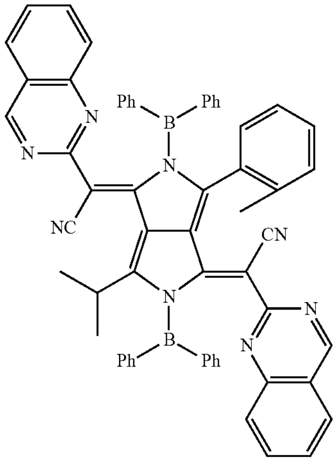
PPB-A-7
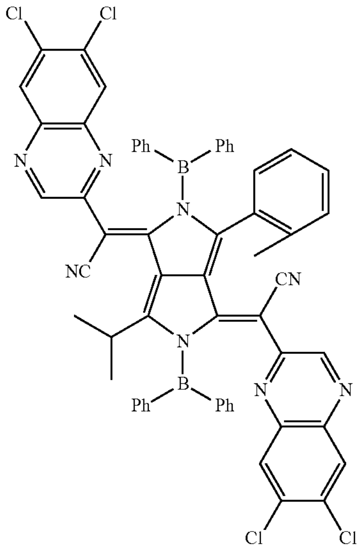
-continued
PPB-A-8
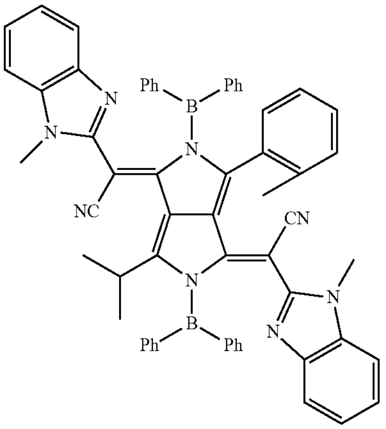
PPB-A-9
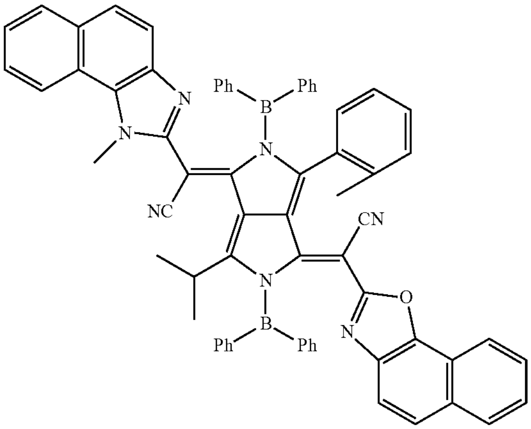
PPB-A-10
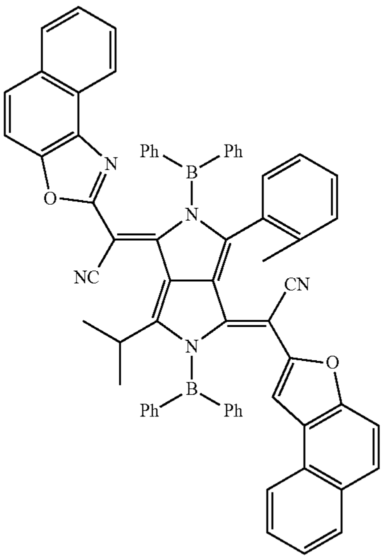

-continued
PPB-A-11
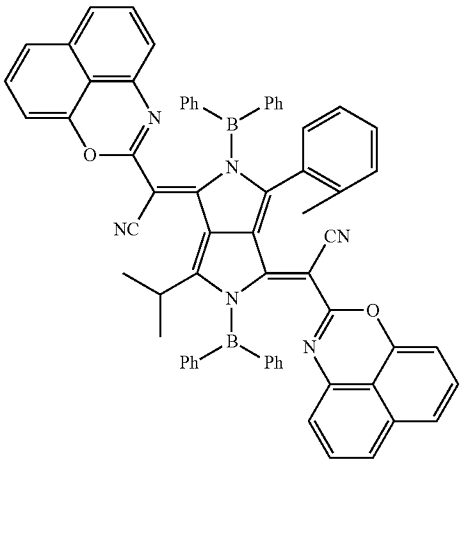
PPB-A-12
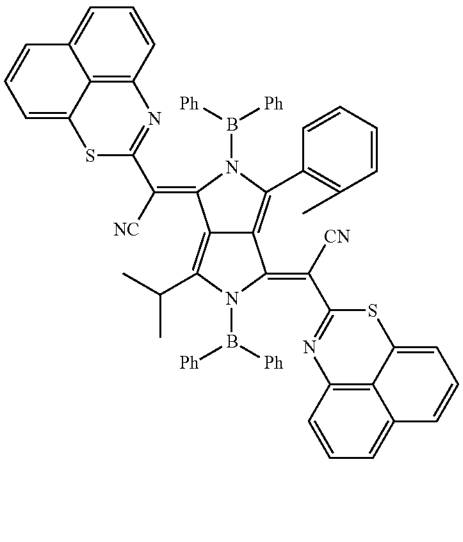
PPB-A-13
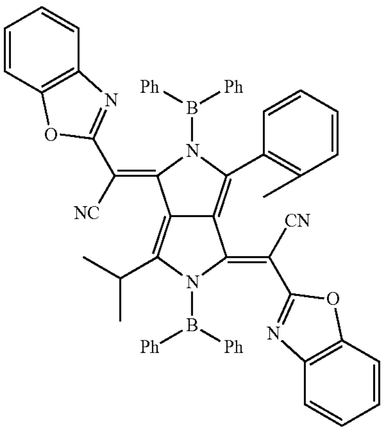
-continued
PPB-A-14
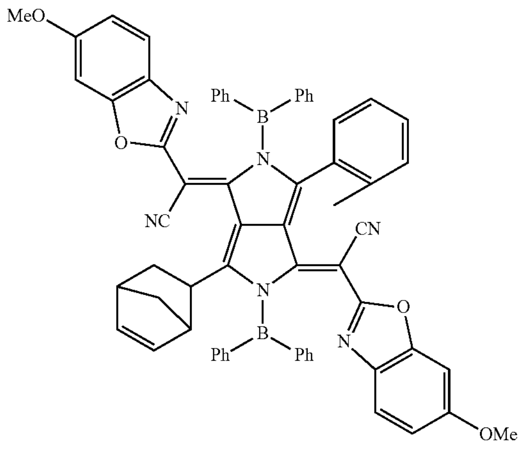
PPB-A-15
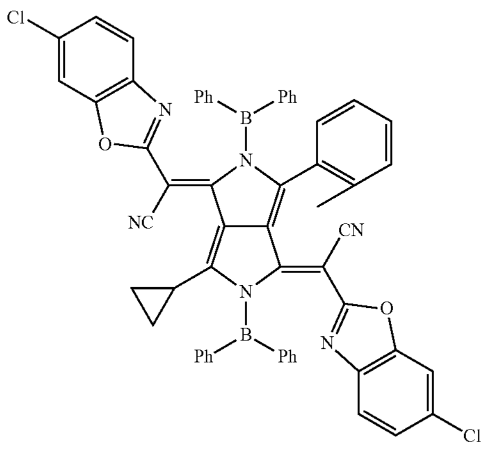
PPB-A-16
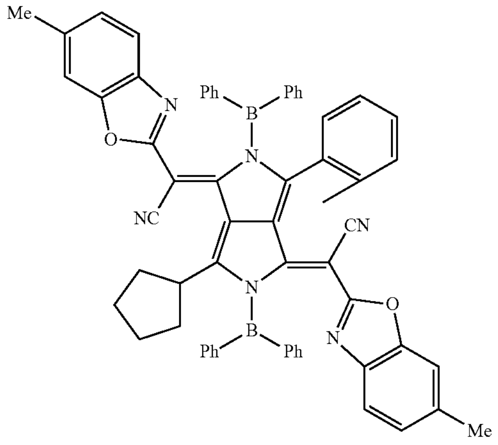

-continued
PPB-A-17
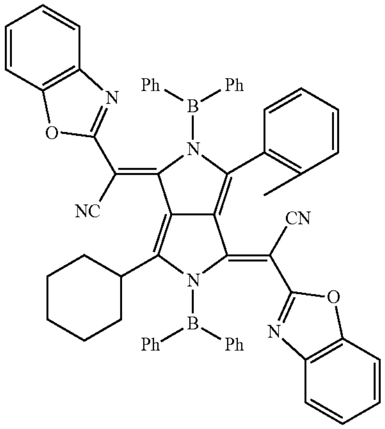
PPB-A-18
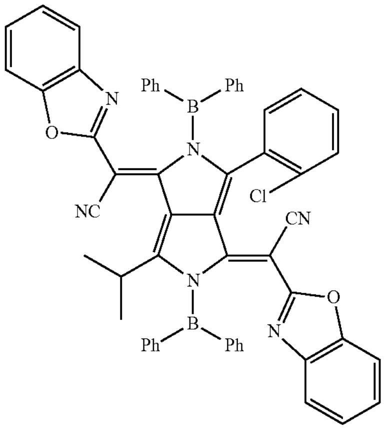
PPB-A-19
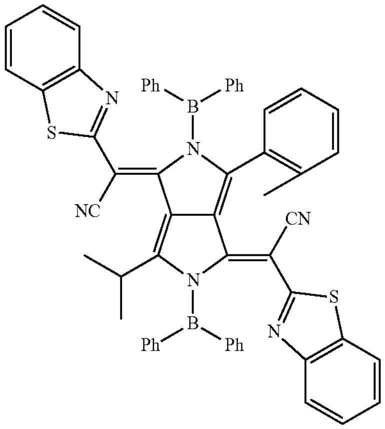
-continued
PPB-A-20
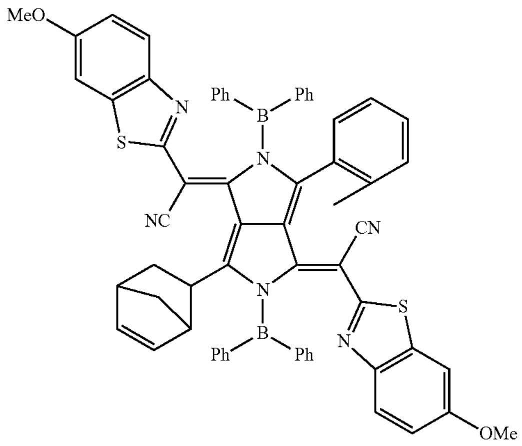
PPB-A-21
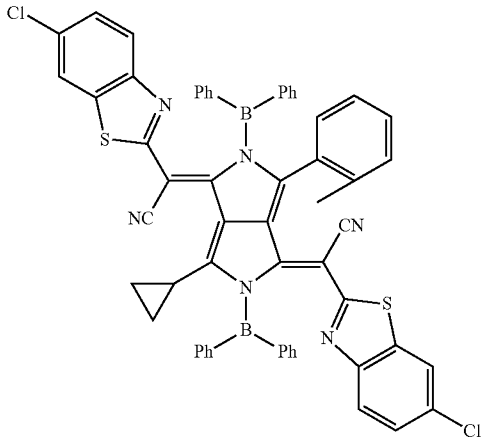
PPB-A-22
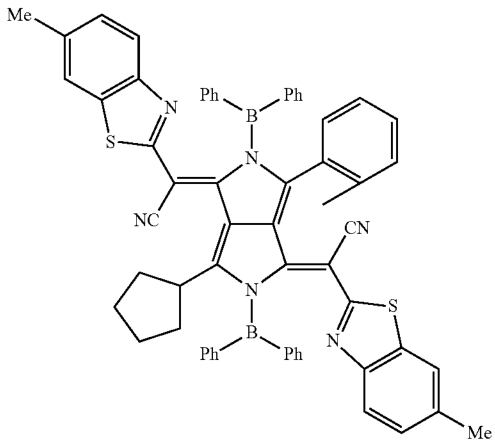

-continued
PPB-A-23
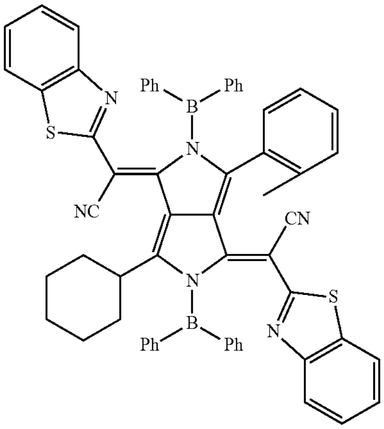
PPB-A-24
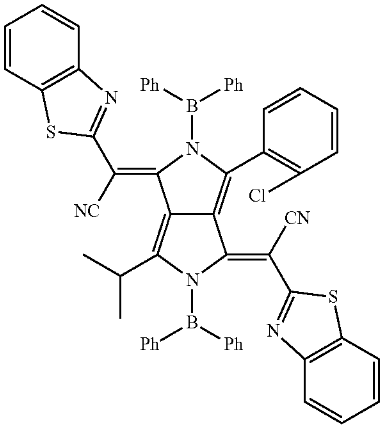
PPB-A-25
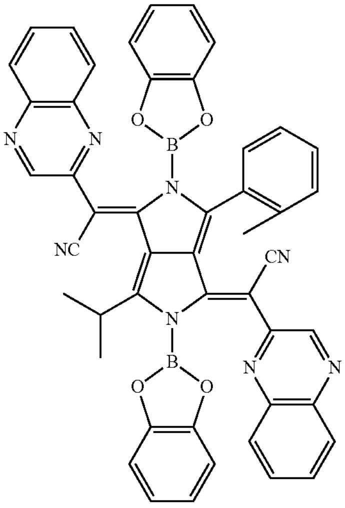
-continued
PPB-A-26
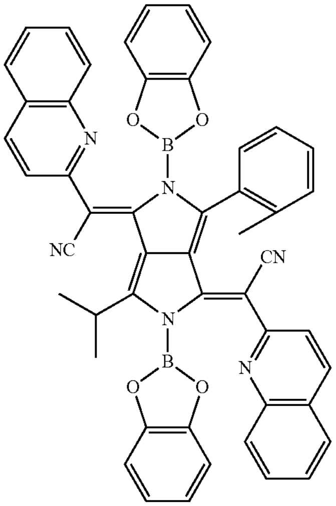
PPB-A-27
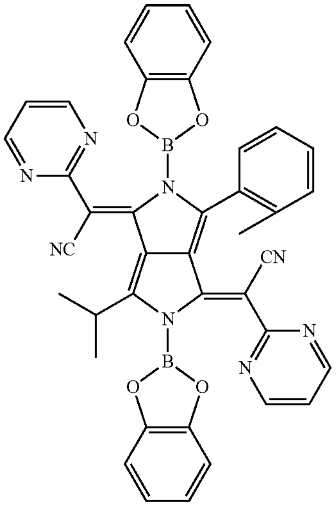
PPB-A-28
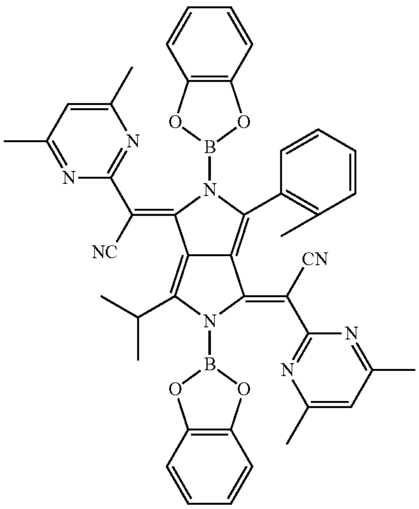

-continued
PPB-A-29
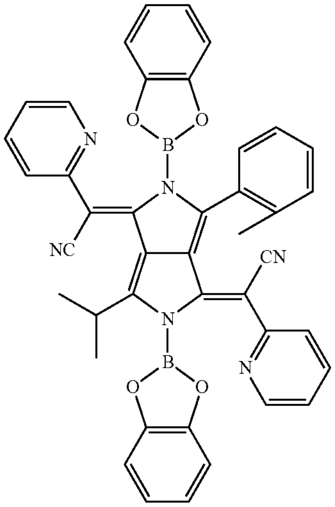
PPB-A-30
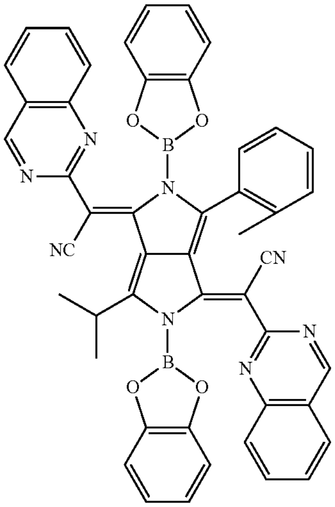
PPB-A-31
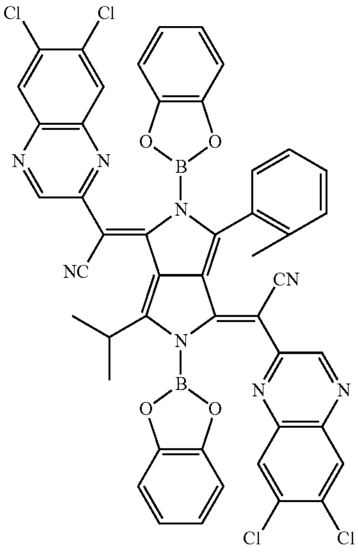
-continued
PPB-A-32
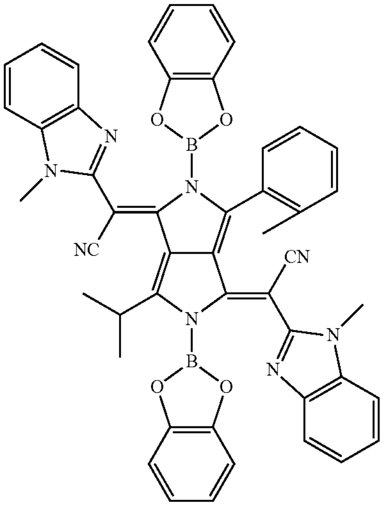
PPB-A-33
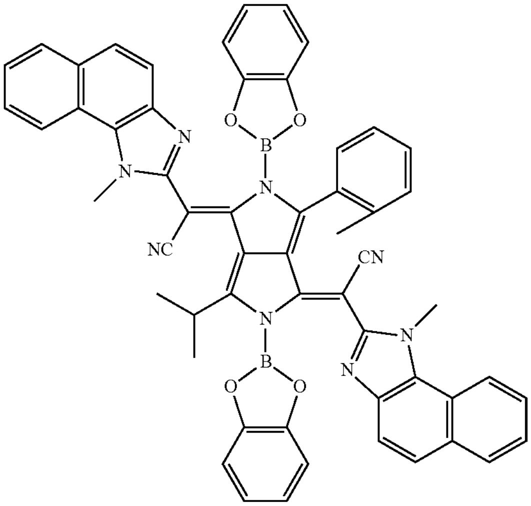
PPB-A-34
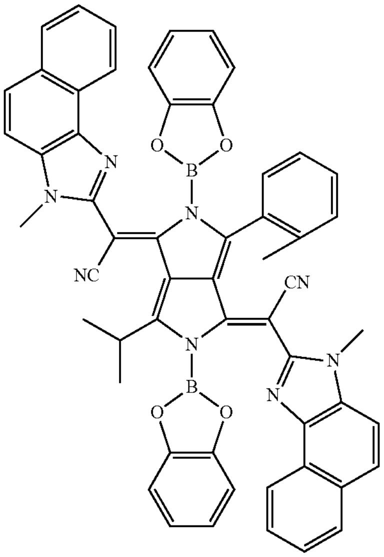

-continued
PPB-A-35
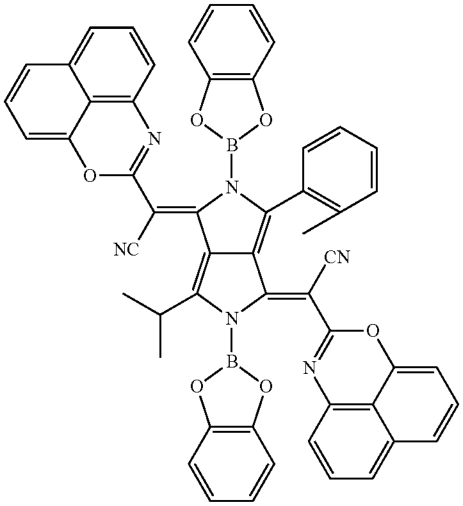
PPB-A-36
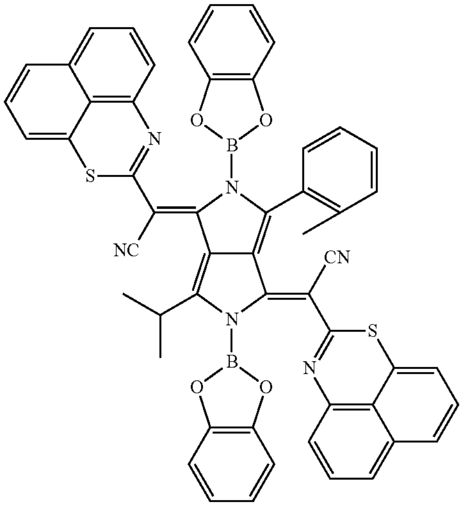
PPB-A-37
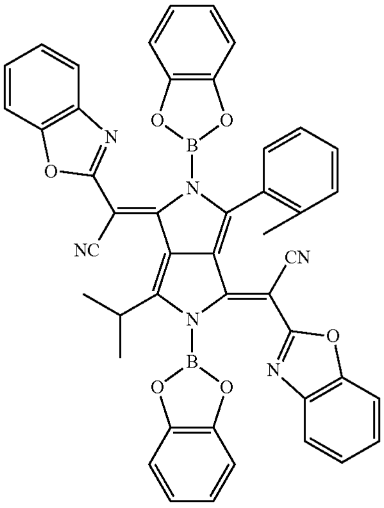
-continued
PPB-A-38
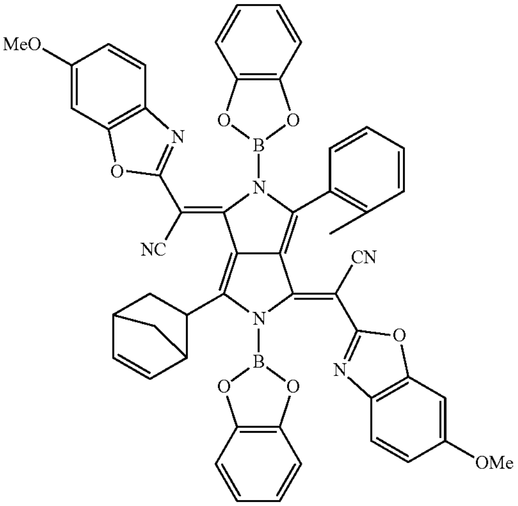
PPB-A-39
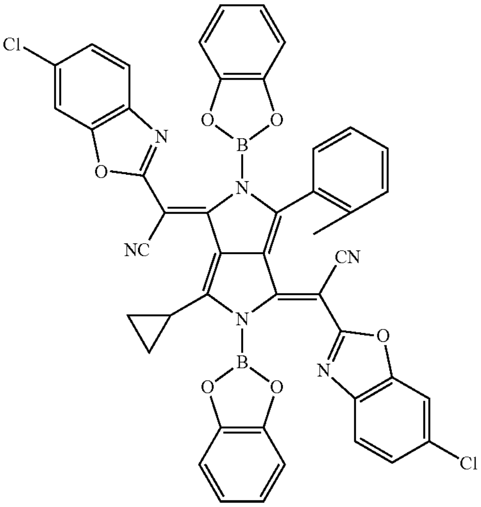
PPB-A-40
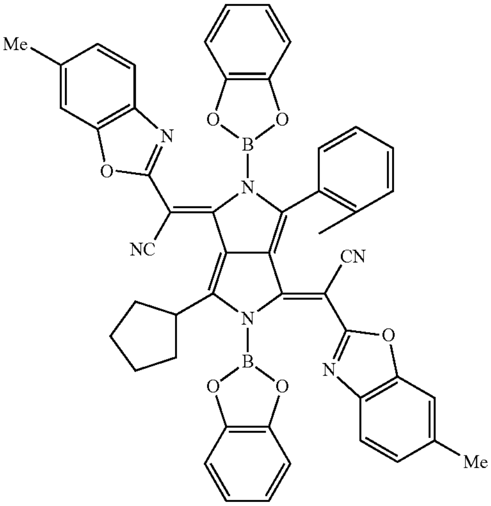

-continued
PPB-A-41
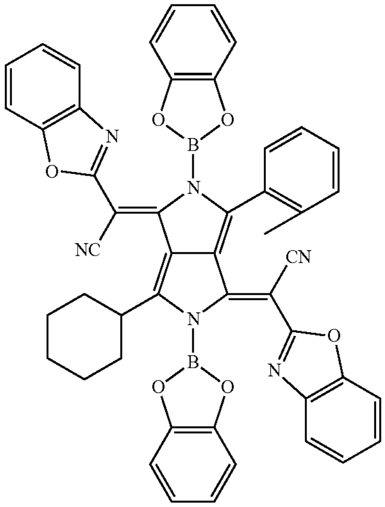
PPB-A-42
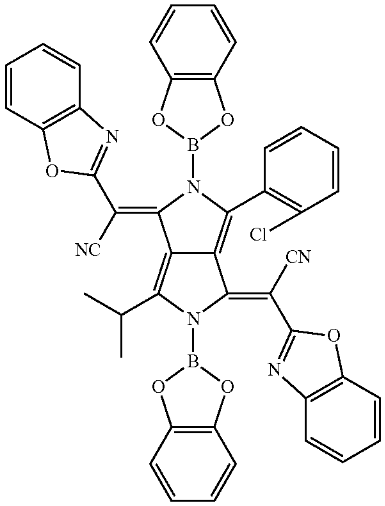
PPB-A-43
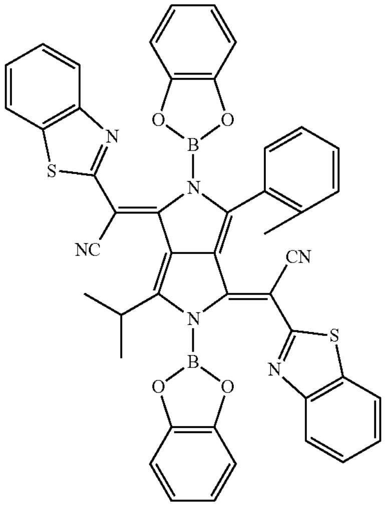
-continued
PPB-A-44
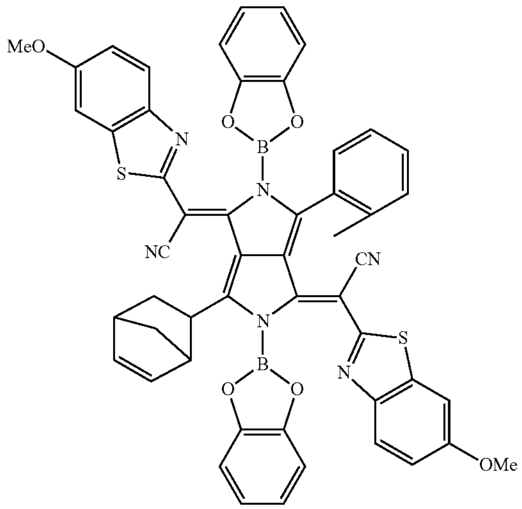
PPB-A-45
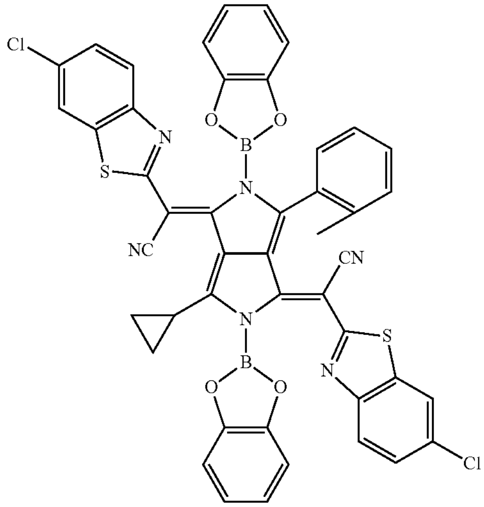
PPB-A-46
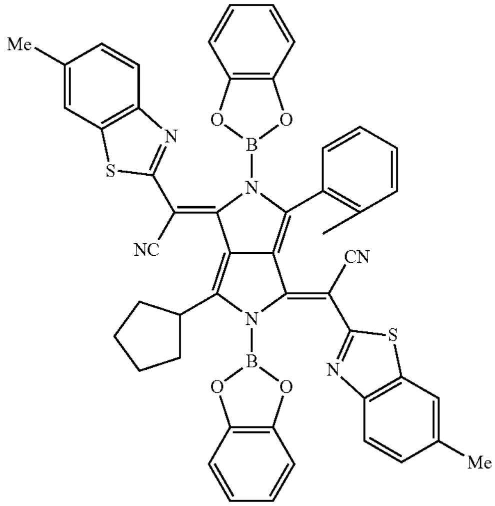

-continued
PPB-A-47
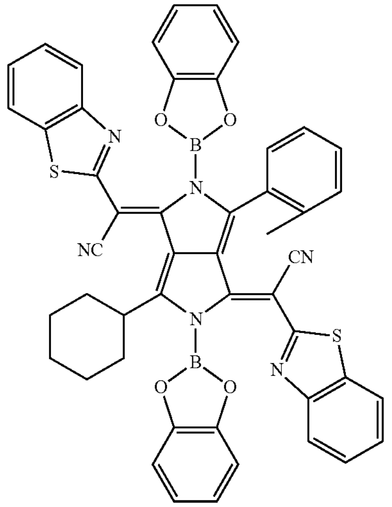
PPB-A-48
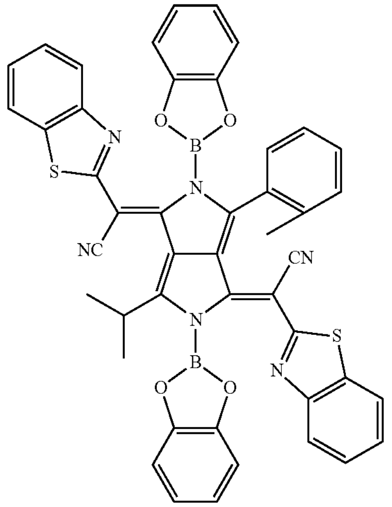
PPB-A-49
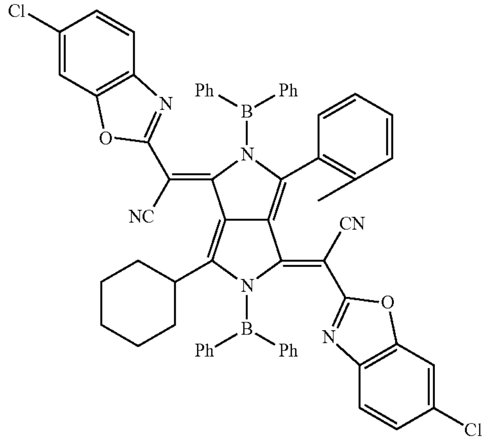
-continued
PPB-A-50
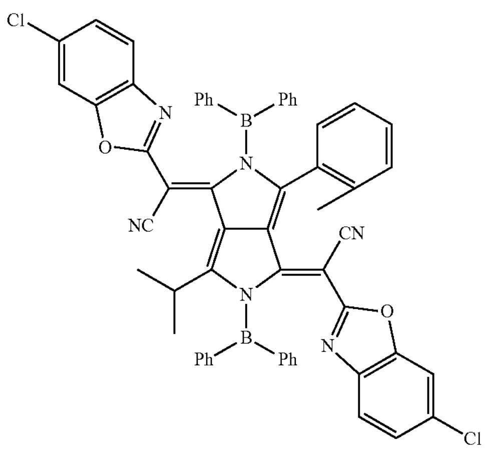
PPB-A-51
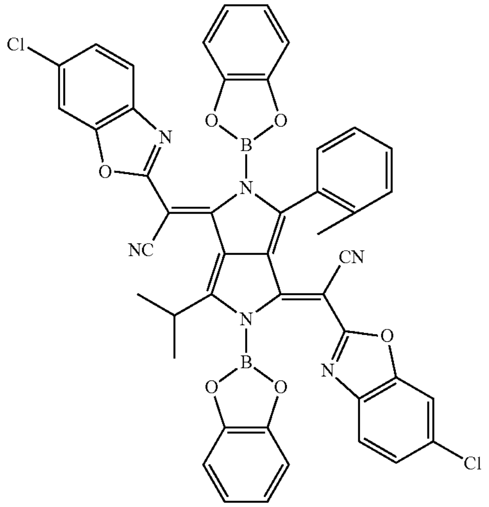
PPB-A-52
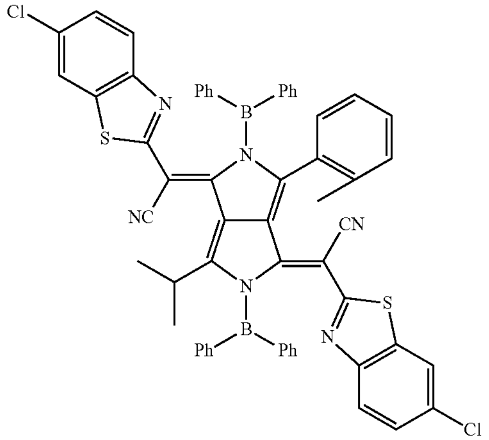

-continued
PPB-A-53
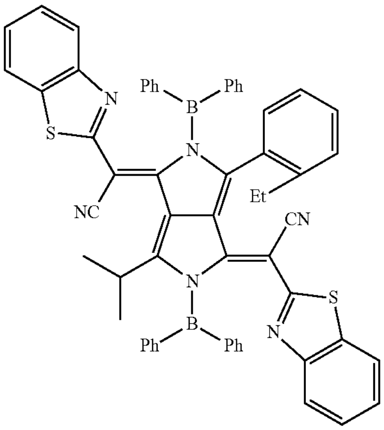
PPB-A-54
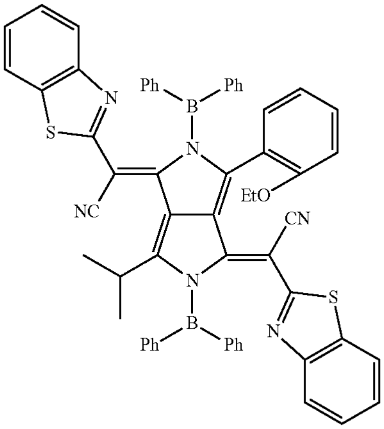
PPB-A-55
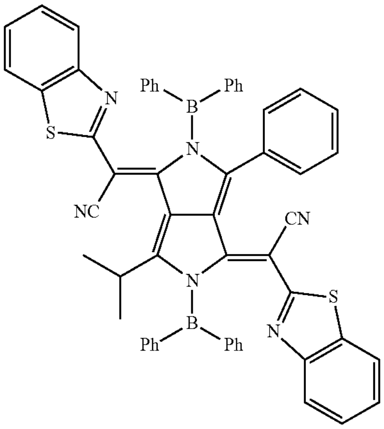
-continued
PPB-A-56
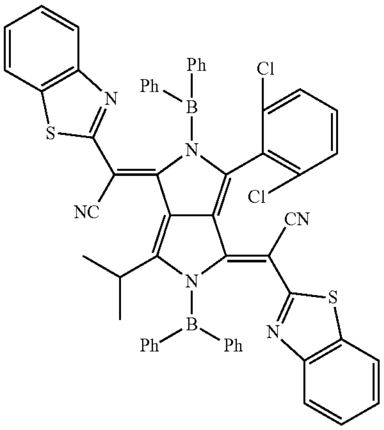
PPB-A-57
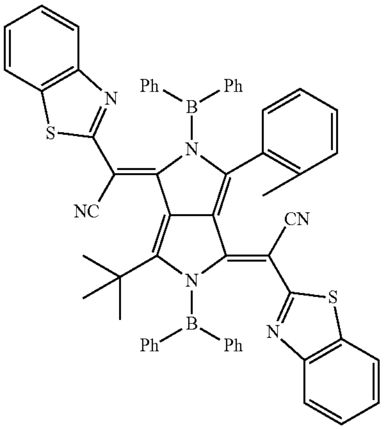
PPB-A-58
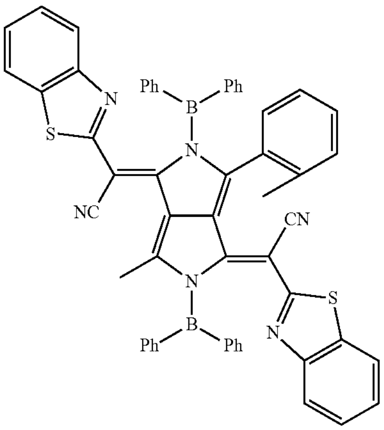

-continued
PPB-A-59
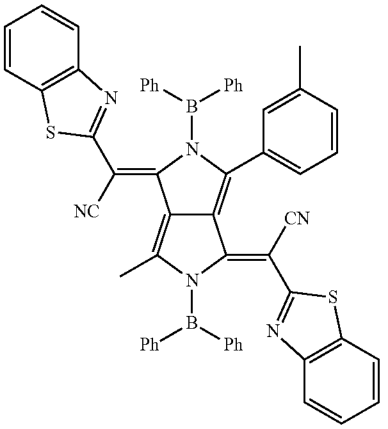
(PPB-A-60)
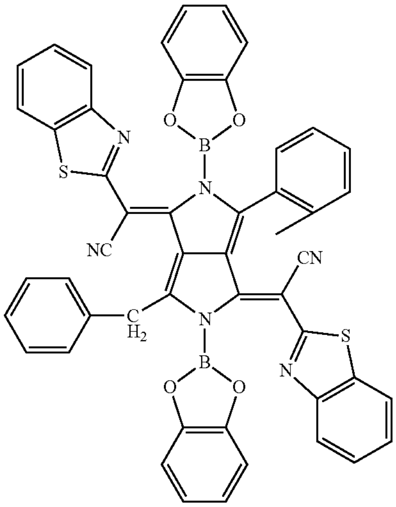
(PPB-A-61)
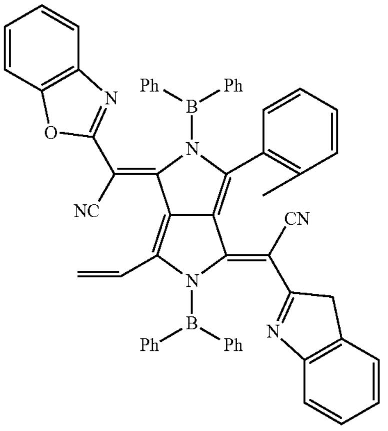
-continued
(PPB-A-62)
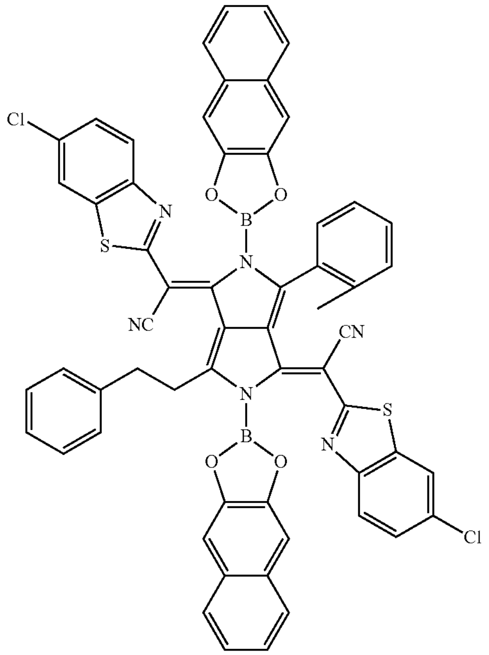
(PPB-A-63)
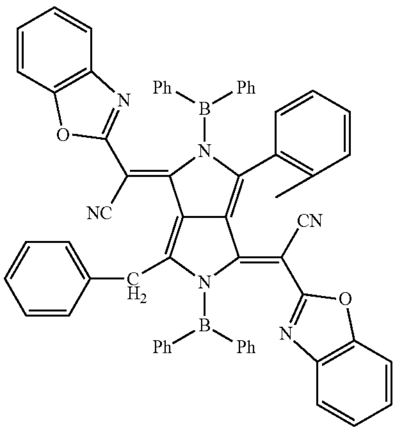
(PPB-A-64)
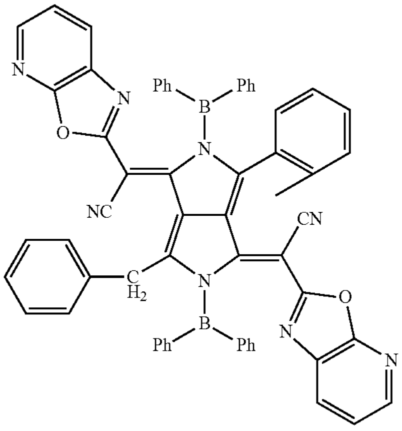

-continued
(PPB-A-65)
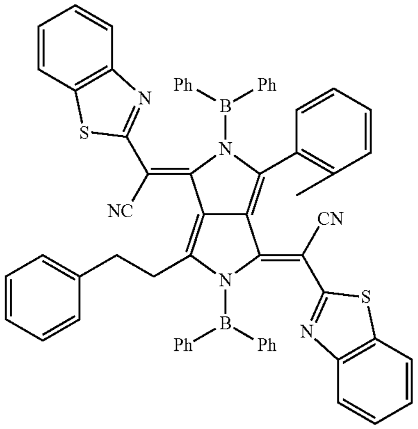
(PPB-A-66)
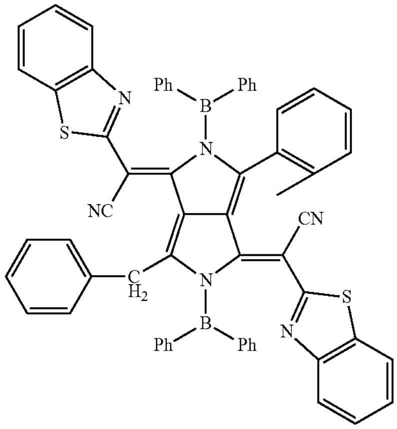
(PPB-A-67)
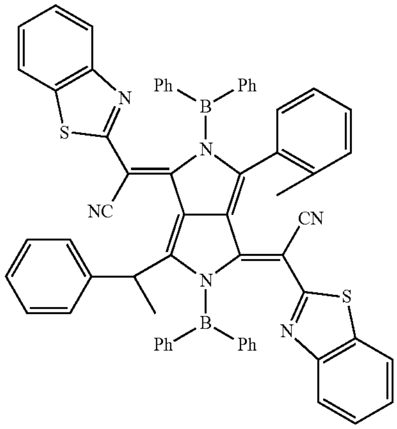
-continued
(PPB-A-68)
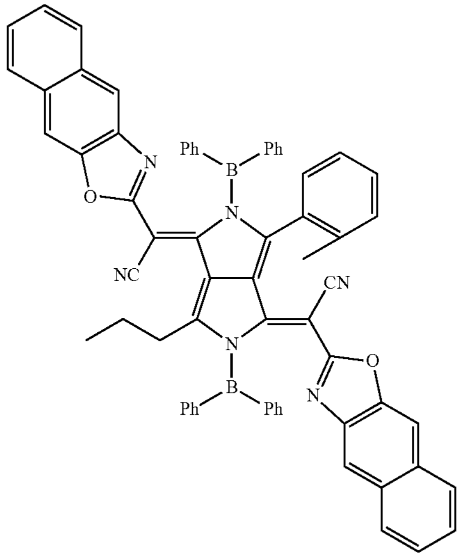
(PPB-A-69)
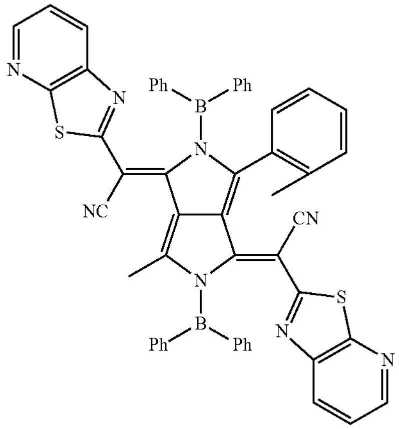
(PPB-A-70)
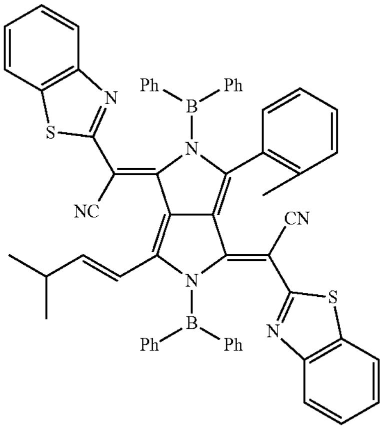

-continued
(PPB-A-71)
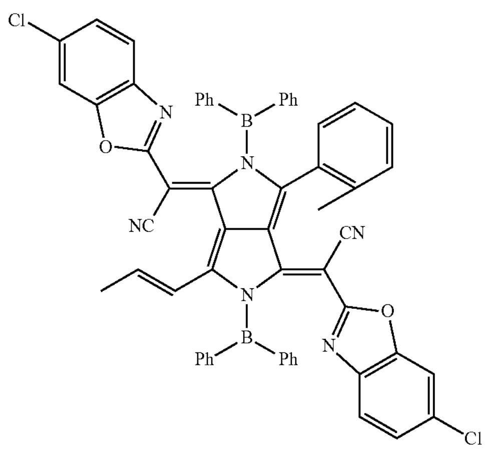
(PPB-A-72)
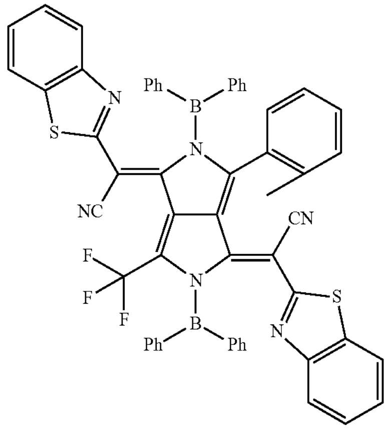
(PPB-A-73)
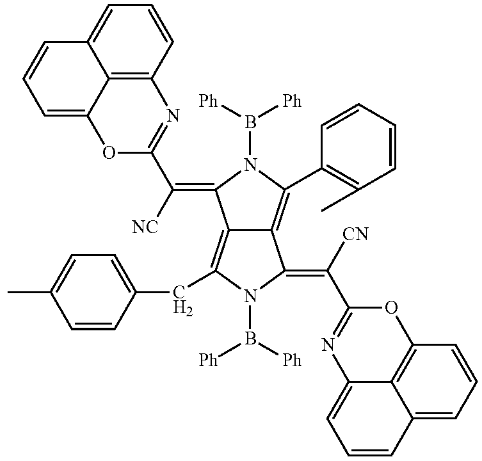
-continued
(PPB-A-74)
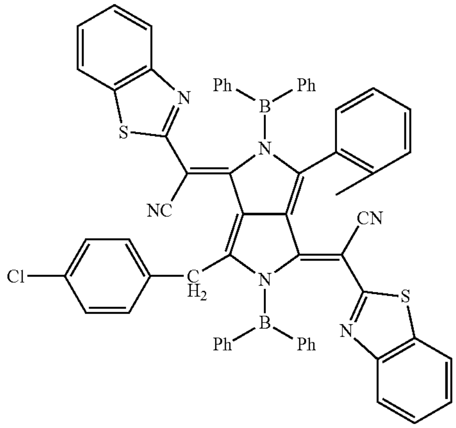
(PPB-A-75)
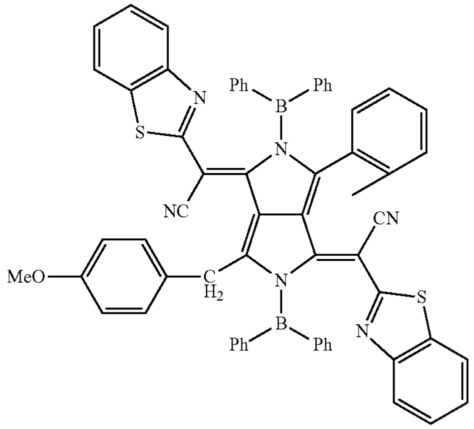
(PPb-A-76)
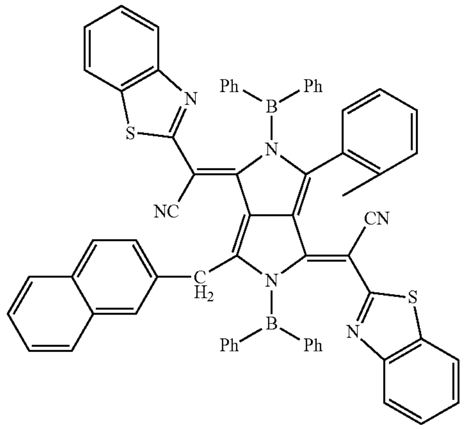

-continued
(PPB-A-77)
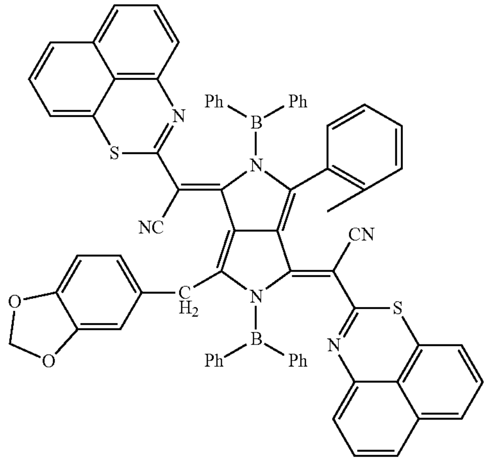
(PPB-A-78)
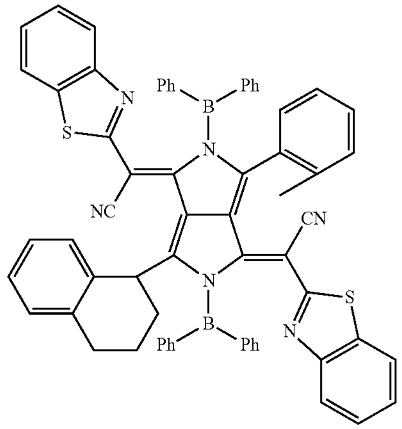
(PPB-A-79)
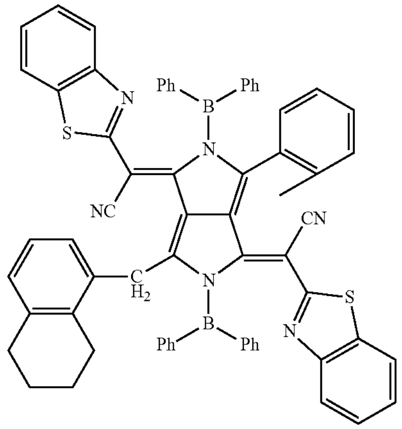
-continued
(PPB-A-80)
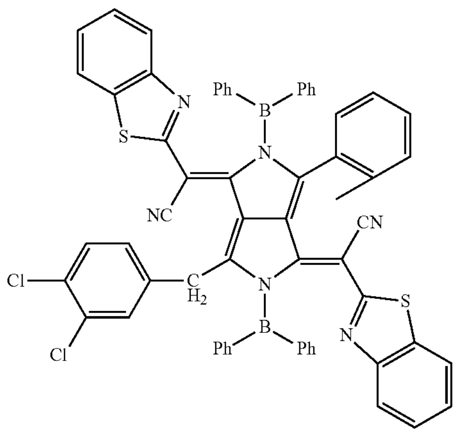
(PPB-A-81)
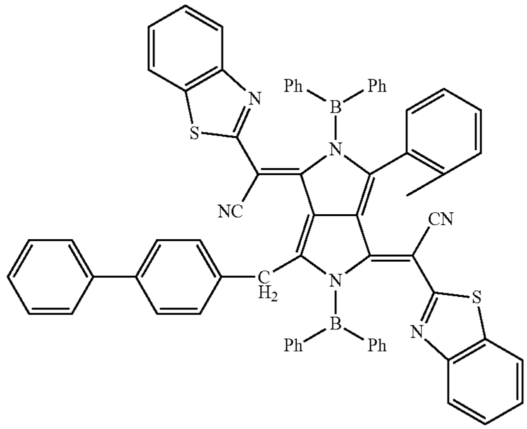
PPB-C-1
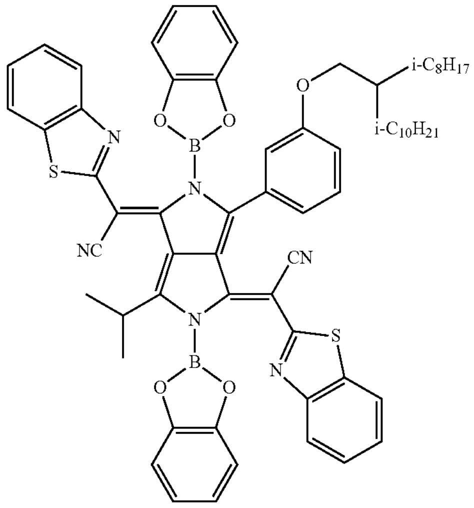

-continued
PPB-C-2
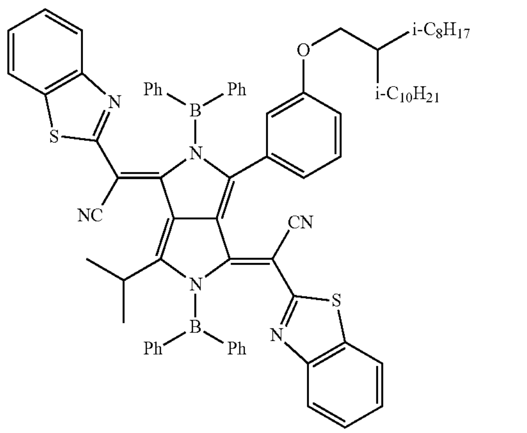
PPB-C-3
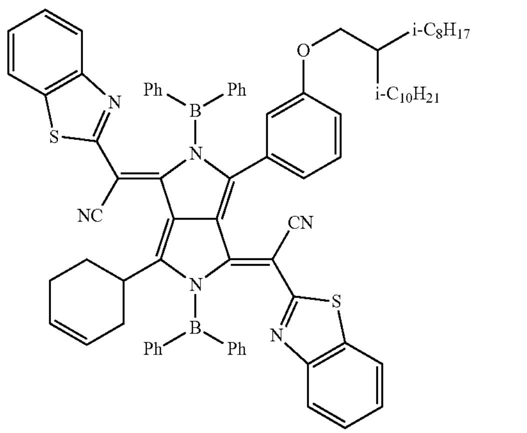
PPB-C-4
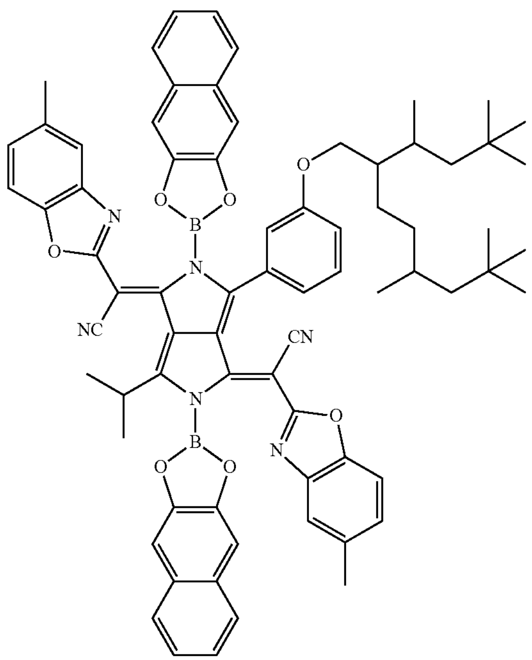
-continued
PPB-C-5
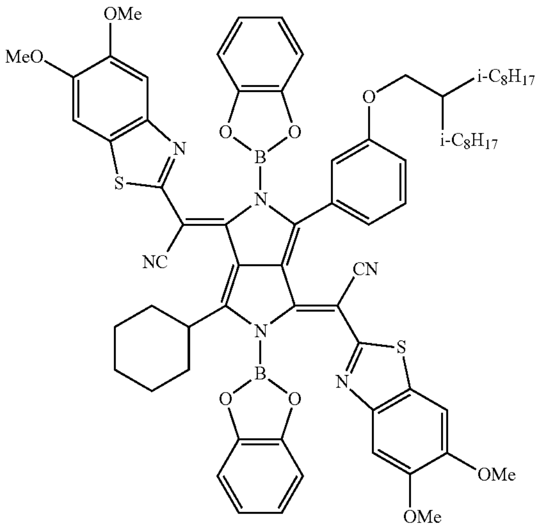
PPB-C-6
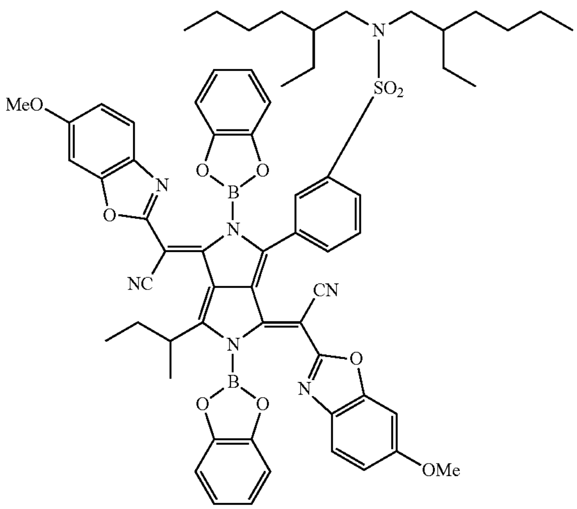
PPB-C-7
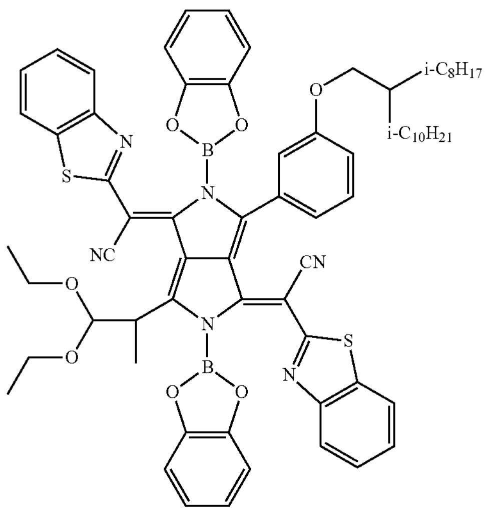

PPB-C-8
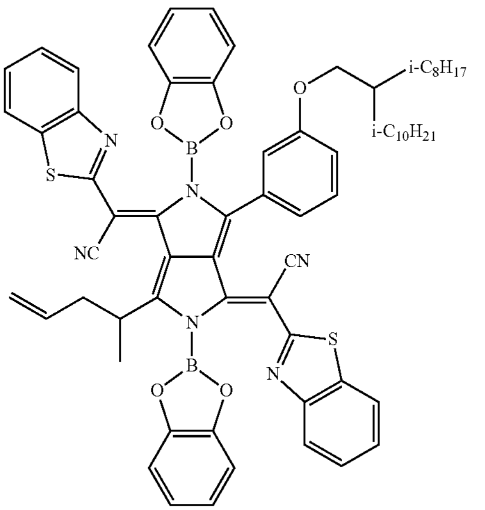
PPB-C-9
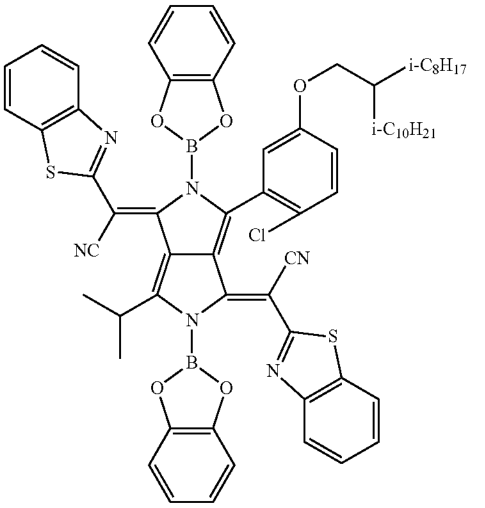
PPB-C-10
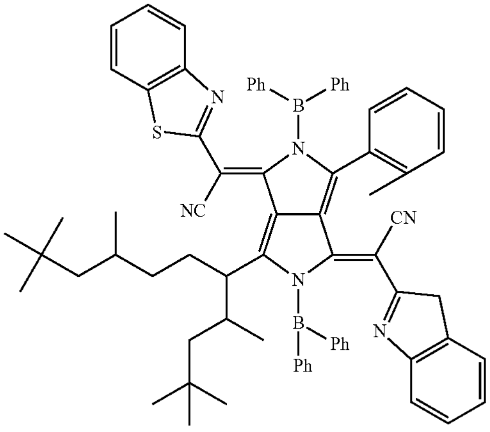
(PPB-C-11)
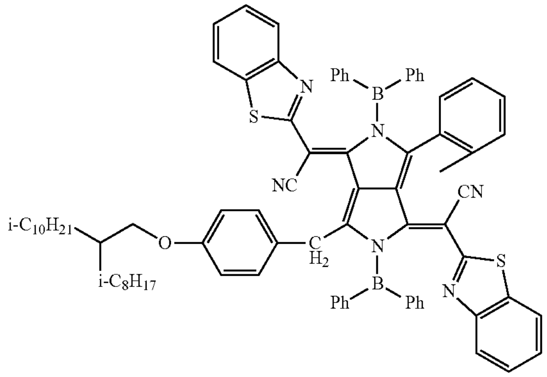
(PPB-C-12)
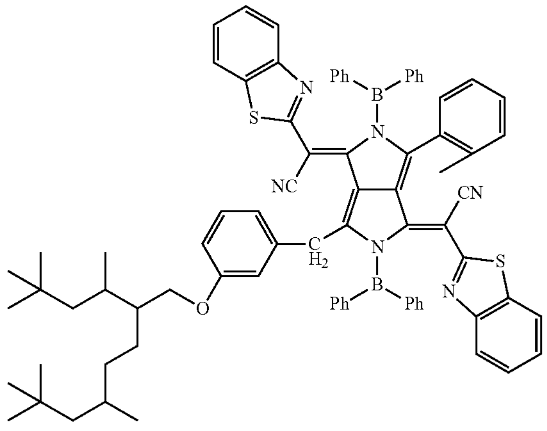
PPB-D-1
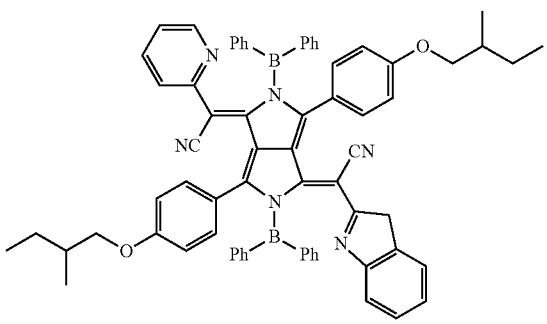
PPB-D-2
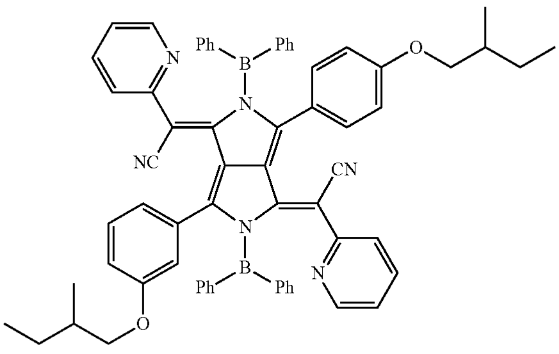

-continued

PPB-E-1

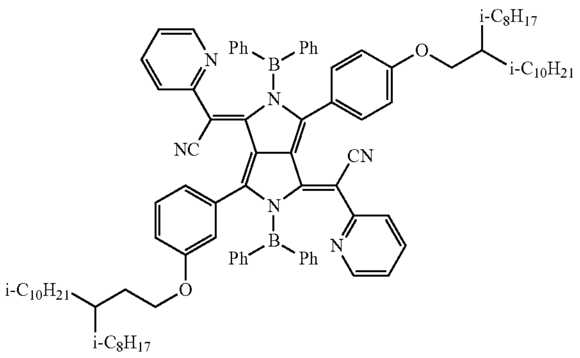

<Preparation of Dispersion Liquid>

1.902 parts by mass of the coloring agent (pigment) shown in the following tables, 0.36 parts by mass of a derivative shown in the following tables, 9 parts by mass of a dispersant shown in the following tables, 18.74 parts by mass of a solvent shown in the following tables, and 40 parts by mass of zirconia beads having a diameter of 0.3 mm were mixed. Thereafter, a dispersion treatment was performed for 5 hours using a paint shaker, and the beads were separated by filtration to produce a dispersion liquid.

TABLE 4

| | Coloring agent | | Derivative | Dispersant | Solvent |
|---|---|---|---|---|---|
| Dispersion liquid 1 | PPB-A-1 | Pigment | PPB-B-1 | D-2 | S-1 |
| Dispersion liquid 2 | PPB-A-2 | Pigment | PPB-B-3 | D-2 | S-1 |
| Dispersion liquid 3 | PPB-A-3 | Pigment | PPB-B-2 | D-1 | S-1 |
| Dispersion liquid 4 | PPB-A-4 | Pigment | PPB-B-2 | D-2 | S-1 |
| Dispersion liquid 5 | PPB-A-5 | Pigment | PPB-B-3 | D-2 | S-1 |
| Dispersion liquid 6 | PPB-A-6 | Pigment | PPB-B-2 | D-2 | S-1/S-2 = 1/1 (mass ratio) |
| Dispersion liquid 7 | PPB-A-7 | Pigment | PPB-B-1 | D-2 | S-1 |
| Dispersion liquid 8 | PPB-A-8 | Pigment | PPB-B-4 | D-2 | S-2 |
| Dispersion liquid 9 | PPB-A-9 | Pigment | PPB-B-6 | D-2 | S-1 |
| Dispersion liquid 10 | PPB-A-10 | Pigment | PPB-B-6 | D-2 | S-1 |
| Dispersion liquid 11 | PPB-A-11 | Pigment | PPB-B-5 | D-2 | S-2 |
| Dispersion liquid 12 | PPB-A-12 | Pigment | PPB-B-5 | D-2 | S-1 |
| Dispersion liquid 13 | PPB-A-13 | Pigment | PPB-B-6 | D-2 | S-1 |
| Dispersion liquid 14 | PPB-A-14 | Pigment | PPB-B-6 | D-2 | S-1 |
| Dispersion liquid 15 | PPB-A-15 | Pigment | PPB-B-6 | D-2 | S-1 |
| Dispersion liquid 16 | PPB-A-16 | Pigment | PPB-B-6 | D-2 | S-1/S-2 = 1/3 (mass ratio) |
| Dispersion liquid 17 | PPB-A-17 | Pigment | PPB-B-6 | D-2 | S-1 |
| Dispersion liquid 18 | PPB-A-18 | Pigment | PPB-B-6 | D-2 | S-1 |
| Dispersion liquid 19 | PPB-A-19 | Pigment | PPB-B-8 | D-2 | S-1 |
| Dispersion liquid 20 | PPB-A-20 | Pigment | PPB-B-7 | D-2 | S-1 |
| Dispersion liquid 21 | PPB-A-21 | Pigment | PPB-B-9 | D-1 | S-1/S-2 = 1/4 (mass ratio) |
| Dispersion liquid 22 | PPB-A-22 | Pigment | PPB-B-10 | D-2 | S-1 |
| Dispersion liquid 23 | PPB-A-23 | Pigment | PPB-B-7 | D-2 | S-1 |
| Dispersion liquid 24 | PPB-A-24 | Pigment | PPB-B-7 | D-2 | S-1 |
| Dispersion liquid 25 | PPB-A-25 | Pigment | PPB-B-11 | D-2 | S-1 |
| Dispersion liquid 26 | PPB-A-26 | Pigment | PPB-B-13 | D-2 | S-1 |
| Dispersion liquid 27 | PPB-A-27 | Pigment | PPB-B-12 | D-1 | S-1 |
| Dispersion liquid 28 | PPB-A-28 | Pigment | PPB-B-12 | D-2 | S-1 |
| Dispersion liquid 29 | PPB-A-29 | Pigment | PPB-B-13 | D-2 | S-1 |
| Dispersion liquid 30 | PPB-A-30 | Pigment | PPB-B-12 | D-2 | S-1 |

TABLE 5

| | Coloring agent | | Derivative | Dispersant | Solvent |
|---|---|---|---|---|---|
| Dispersion liquid 31 | PPB-A-31 | Pigment | PPB-B-11 | D-2 | S-1 |
| Dispersion liquid 32 | PPB-A-32 | Pigment | PPB-B-14 | D-2 | S-1 |
| Dispersion liquid 33 | PPB-A-33 | Pigment | PPB-B-16 | D-2 | S-1 |
| Dispersion liquid 34 | PPB-A-34 | Pigment | PPB-B-16 | D-2 | S-1 |
| Dispersion liquid 35 | PPB-A-35 | Pigment | PPB-B-15 | D-2 | S-1 |
| Dispersion liquid 36 | PPB-A-36 | Pigment | PPB-B-15 | D-2 | S-1 |
| Dispersion liquid 37 | PPB-A-37 | Pigment | PPB-B-16 | D-2 | S-1 |
| Dispersion liquid 38 | PPB-A-38 | Pigment | PPB-B-16 | D-2 | S-1 |
| Dispersion liquid 39 | PPB-A-39 | Pigment | PPB-B-16 | D-2 | S-1 |
| Dispersion liquid 40 | PPB-A-40 | Pigment | PPB-B-16 | D-2 | S-1 |
| Dispersion liquid 41 | PPB-A-41 | Pigment | PPB-B-16 | D-2 | S-1 |
| Dispersion liquid 42 | PPB-A-42 | Pigment | PPB-B-16 | D-2 | S-1 |
| Dispersion liquid 43 | PPB-A-43 | Pigment | PPB-B-18 | D-2 | S-1 |
| Dispersion liquid 44 | PPB-A-44 | Pigment | PPB-B-17 | D-2 | S-1 |
| Dispersion liquid 45 | PPB-A-45 | Pigment | PPB-B-19 | D-1 | S-1 |
| Dispersion liquid 46 | PPB-A-46 | Pigment | PPB-B-20 | D-2 | S-1 |
| Dispersion liquid 47 | PPB-A-47 | Pigment | PPB-B-17 | D-2 | S-1 |
| Dispersion liquid 48 | PPB-A-48 | Pigment | PPB-B-17 | D-2 | S-1 |
| Dispersion liquid 49 | PPB-A-7 | Pigment | PPB-B-21 | D-2 | S-1 |
| Dispersion liquid 50 | PPB-A-19 | Pigment | PPB-B-22 | D-2 | S-1 |
| Dispersion liquid 51 | PPB-A-23 | Pigment | PPB-B-22 | D-2 | S-1 |
| Dispersion liquid 52 | PPB-A-7 | Pigment | PPB-B-23 | D-2 | S-1 |
| Dispersion liquid 53 | PPB-A-7 | Pigment | PPB-B-24 | D-2 | S-1 |
| Dispersion liquid 54 | PPB-A-7 | Pigment | PPB-B-25 | D-1 | S-1 |
| Dispersion liquid 55 | PPB-A-7 | Pigment | PPB-B-26 | D-1 | S-1 |
| Dispersion liquid 56 | PPB-A-7 | Pigment | PPB-B-27 | D-1 | S-1 |
| Dispersion liquid 57 | PPB-A-7 | Pigment | PPB-B-28 | D-1 | S-1 |
| Dispersion liquid 58 | PPB-A-13 | Pigment | PPB-B-29 | D-2 | S-1 |
| Dispersion liquid 59 | PPB-A-13 | Pigment | PPB-B-30 | D-2 | S-1 |
| Dispersion liquid 60 | PPB-A-49 | Pigment | PPB-B-39 | D-2 | S-1 |

TABLE 6

| | Coloring agent | | Derivative | Dispersant | Solvent |
|---|---|---|---|---|---|
| Dispersion liquid 61 | PPB-A-49 | Pigment | PPB-B-40 | D-2 | S-1 |
| Dispersion liquid 62 | PPB-A-50 | Pigment | PPB-B-31 | D-2 | S-1 |
| Dispersion liquid 63 | PPB-A-50 | Pigment | PPB-B-32 | D-2 | S-1 |
| Dispersion liquid 64 | PPB-A-19 | Pigment | PPB-B-33 | D-2 | S-1 |
| Dispersion liquid 65 | PPB-A-23 | Pigment | PPB-B-41 | D-2 | S-1 |
| Dispersion liquid 66 | PPB-A-19 | Pigment | PPB-B-34 | D-2 | S-1 |
| Dispersion liquid 67 | PPB-A-23 | Pigment | PPB-B-42 | D-2 | S-1 |
| Dispersion liquid 68 | PPB-A-19 | Pigment | PPB-B-35 | D-1 | S-1 |
| Dispersion liquid 69 | PPB-A-23 | Pigment | PPB-B-43 | D-1 | S-1 |
| Dispersion liquid 70 | PPB-A-19 | Pigment | PPB-B-36 | D-2 | S-1 |
| Dispersion liquid 71 | PPB-A-23 | Pigment | PPB-B-44 | D-2 | S-1 |
| Dispersion liquid 72 | PPB-A-19 | Pigment | PPB-B-37 | D-2 | S-1 |
| Dispersion liquid 73 | PPB-A-23 | Pigment | PPB-B-45 | D-2 | S-1 |
| Dispersion liquid 74 | PPB-A-19 | Pigment | PPB-B-38 | D-1 | S-1 |
| Dispersion liquid 75 | PPB-A-23 | Pigment | PPB-B-46 | D-1 | S-1 |
| Dispersion liquid 76 | PPB-A-31 | Pigment | PPB-B-47 | D-2 | S-1 |

TABLE 6-continued

| | Coloring agent | | Derivative | Dispersant | Solvent |
|---|---|---|---|---|---|
| Dispersion liquid 77 | PPB-A-43 | Pigment | PPB-B-48 | D-1 | S-1 |
| Dispersion liquid 78 | PPB-A-31 | Pigment | PPB-B-49 | D-2 | S-1 |
| Dispersion liquid 79 | PPB-A-31 | Pigment | PPB-B-50 | D-2 | S-1 |
| Dispersion liquid 80 | PPB-A-31 | Pigment | PPB-B-51 | D-2 | S-1 |
| Dispersion liquid 81 | PPB-A-31 | Pigment | PPB-B-52 | D-2 | S-1 |
| Dispersion liquid 82 | PPB-A-31 | Pigment | PPB-B-53 | D-2 | S-1 |
| Dispersion liquid 83 | PPB-A-31 | Pigment | PPB-B-54 | D-2 | S-1 |
| Dispersion liquid 84 | PPB-A-37 | Pigment | PPB-B-55 | D-1 | S-1 |
| Dispersion liquid 85 | PPB-A-37 | Pigment | PPB-B-56 | D-2 | S-1 |
| Dispersion liquid 86 | PPB-A-51 | Pigment | PPB-B-57 | D-2 | S-1 |
| Dispersion liquid 87 | PPB-A-51 | Pigment | PPB-B-58 | D-2 | S-1 |
| Dispersion liquid 88 | PPB-A-43 | Pigment | PPB-B-59 | D-2 | S-1 |
| Dispersion liquid 89 | PPB-A-43 | Pigment | PPB-B-60 | D-2 | S-1 |
| Dispersion liquid 90 | PPB-A-43 | Pigment | PPB-B-61 | D-1 | S-1 |

TABLE 7

| | Coloring agent | | Derivative | Dispersant | Solvent |
|---|---|---|---|---|---|
| Dispersion liquid 91 | PPB-A-43 | Pigment | PPB-B-62 | D-2 | S-1 |
| Dispersion liquid 92 | PPB-A-43 | Pigment | PPB-B-63 | D-2 | S-1 |
| Dispersion liquid 93 | PPB-A-43 | Pigment | PPB-B-64 | D-1 | S-1 |
| Dispersion liquid 94 | PPB-A-52 | Pigment | PPB-B-65 | D-2 | S-1 |
| Dispersion liquid 95 | PPB-A-53 | Pigment | PPB-B-33 | D-2 | S-1 |
| Dispersion liquid 96 | PPB-A-54 | Pigment | PPB-B-36 | D-2 | S-1 |
| Dispersion liquid 97 | PPB-A-55 | Pigment | PPB-B-36 | D-2 | S-1 |
| Dispersion liquid 98 | PPB-A-56 | Pigment | PPB-B-34 | D-2 | S-1 |
| Dispersion liquid 99 | PPB-A-57 | Pigment | PPB-B-34 | D-2 | S-1 |
| Dispersion liquid 100 | PPB-A-58 | Pigment | PPB-B-35 | D-2 | S-1 |
| Dispersion liquid 101 | PPB-A-59 | Pigment | PPB-B-36 | D-2 | S-1 |
| Dispersion liquid 102 | PPB-A-60 | Pigment | PPB-B-62 | D-2 | S-1 |
| Dispersion liquid 103 | PPB-A-61 | Pigment | PPB-B-73 | D-2 | S-1 |
| Dispersion liquid 104 | PPB-A-62 | Pigment | PPB-B-62 | D-2 | S-1 |
| Dispersion liquid 105 | PPB-A-63 | Pigment | PPB-B-73 | D-2 | S-1 |
| Dispersion liquid 106 | PPB-A-64 | Pigment | PPB-B-73 | D-2 | S-1 |
| Dispersion liquid 107 | PPB-A-65 | Pigment | PPB-B-66 | D-2 | S-1 |
| Dispersion liquid 108 | PPB-A-66 | Pigment | PPB-B-67 | D-1 | S-1 |
| Dispersion liquid 109 | PPB-A-67 | Pigment | PPB-B-68 | D-2 | S-2 |
| Dispersion liquid 110 | PPB-A-68 | Pigment | PPB-B-30 | D-2 | S-1/S-2 = 1/3 (mass ratio) |
| Dispersion liquid 111 | PPB-A-69 | Pigment | PPB-B-36 | D-2 | S-1 |
| Dispersion liquid 112 | PPB-A-70 | Pigment | PPB-B-36 | D-2 | S-2 |
| Dispersion liquid 113 | PPB-A-71 | Pigment | PPB-B-73 | D-2 | S-1 |
| Dispersion liquid 114 | PPB-A-72 | Pigment | PPB-B-69 | D-2 | S-1/S-2 = 3/1 (mass ratio) |
| Dispersion liquid 115 | PPB-A-73 | Pigment | PPB-B-7 | D-2 | S-1 |
| Dispersion liquid 116 | PPB-A-74 | Pigment | PPB-B-70 | D-1 | S-1 |
| Dispersion liquid 117 | PPB-A-75 | Pigment | PPB-B-71 | D-2 | S-1 |
| Dispersion liquid 118 | PPB-A-76 | Pigment | PPB-B-72 | D-2 | S-1 |
| Dispersion liquid 119 | PPB-A-77 | Pigment | PPB-B-5 | D-2 | S-1 |
| Dispersion liquid 120 | PPB-A-78 | Pigment | PPB-B-66 | D-2 | S-1/S-2 = 2/1 (mass ratio) |
| Dispersion liquid 121 | PPB-A-79 | Pigment | PPB-B-67 | D-1 | S-1 |
| Dispersion liquid 122 | PPB-A-80 | Pigment | PPB-B-69 | D-2 | S-1 |
| Dispersion liquid 123 | PPB-A-81 | Pigment | PPB-B-70 | D-1 | S-1 |
| Comparative dispersion liquid 1 | PPB-D-1 | Pigment | PPB-B-3 | D-2 | S-1 |
| Comparative dispersion liquid 2 | PPB-D-2 | Pigment | PPB-B-3 | D-2 | S-1 |

(Coloring Agent)

PPB-A-1 to PPB-A-81: compounds having the above-described structures (coloring agents represented by Formula (1) (specific coloring agents))

PPB-D-1, PPB-D-2: compounds having the above-described structures (comparative coloring agents)

(Derivative)

PPB-B-1 to PPB-B-74: compounds having the following structures (among these, PPB-B-24, PPB-B-26, PPB-B-28, PPB-B-30, PPB-B-32, PPB-B-36, PPB-B-37, PPB-B-38, PPB-B-40, PPB-B-44, PPB-B-45, PPB-B-46, PPB-B-50, PPB-B-52, PPB-B-54, PPB-B-56, PPB-B-58, PPB-B-62, PPB-B-63, PPB-B-64, PPB-B-65, PPB-B-66, PPB-B-67, PPB-B-68, PPB-B-69, PPB-B-70, PPB-B-71, PPB-B-72, PPB-B-73, and PPB-B-74 were the coloring agents represented by Formula (1) (specific coloring agents))

PPB-B-1

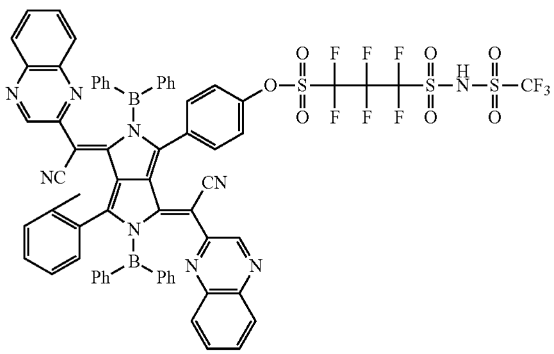

PPB-B-2

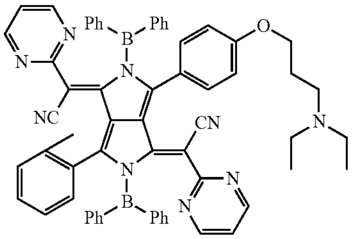

PPB-B-3

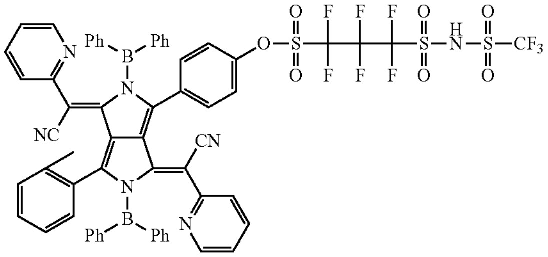

PPB-B-4

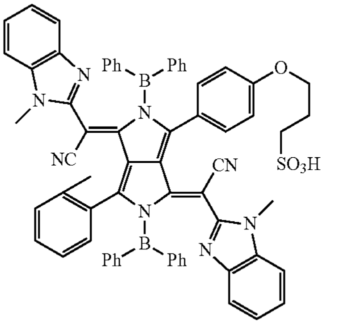

PPB-B-5

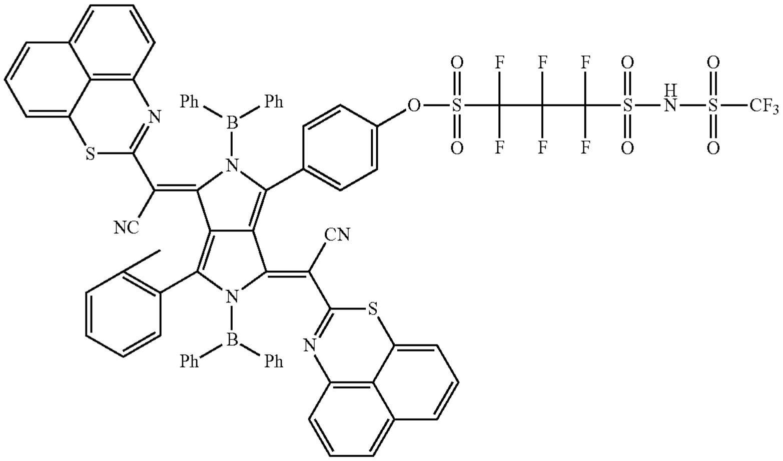

-continued
PPB-B-6
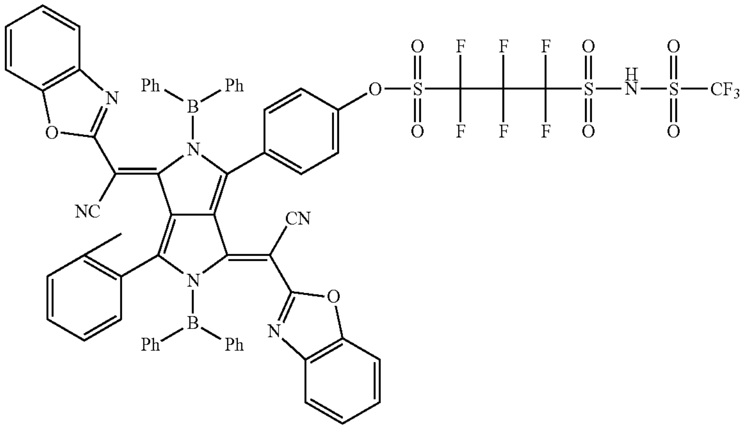
PPB-B-7
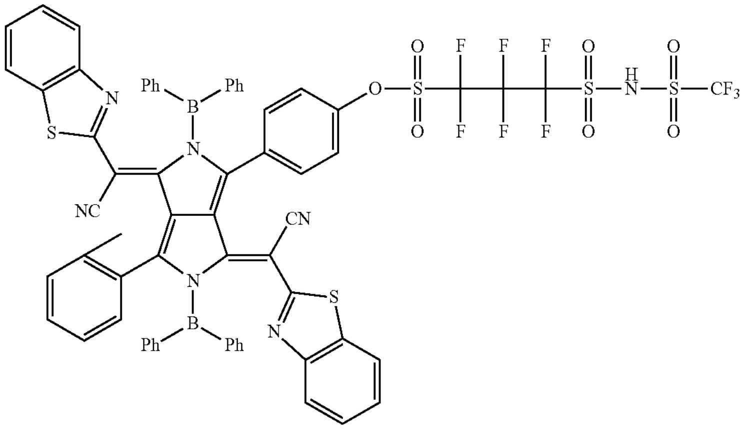
PPB-B-8
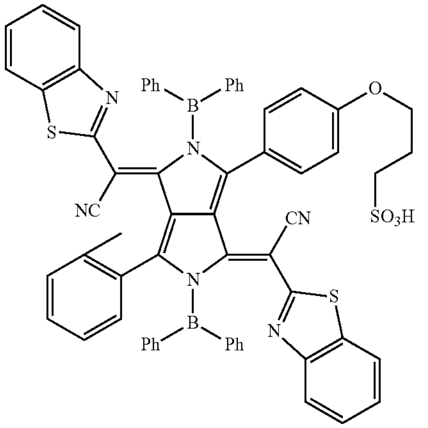
PPB-B-9
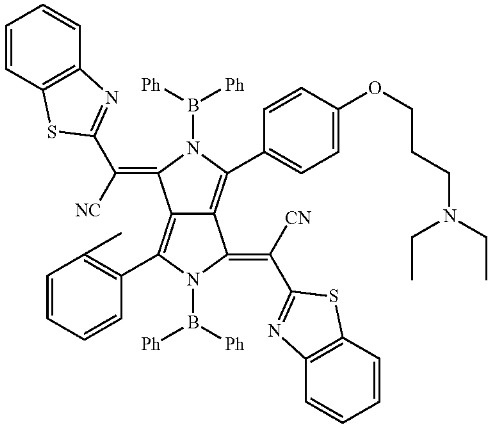

-continued
PPB-B-10
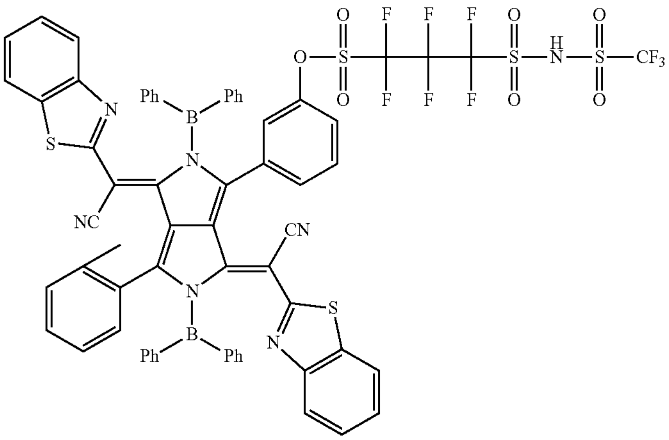
PPB-B-11
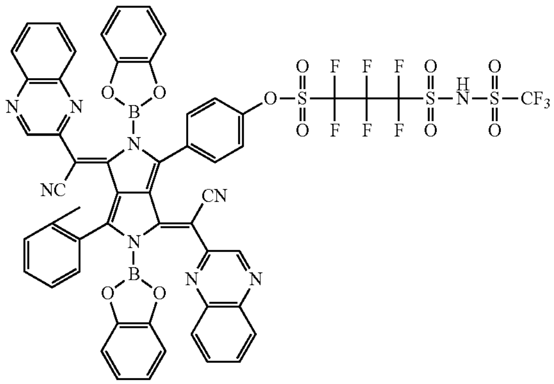
PPB-B-12
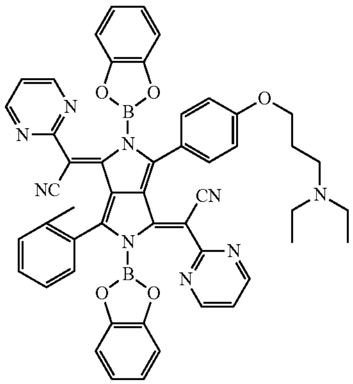
PPB-B-13
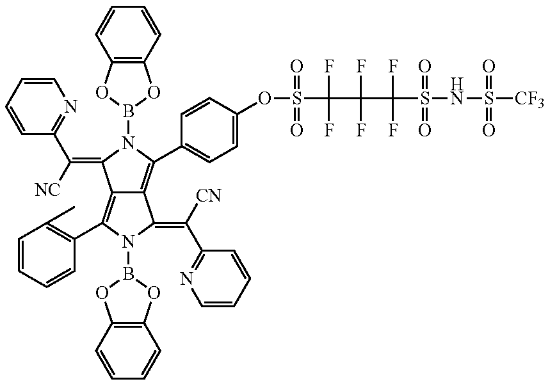
PPB-B-14
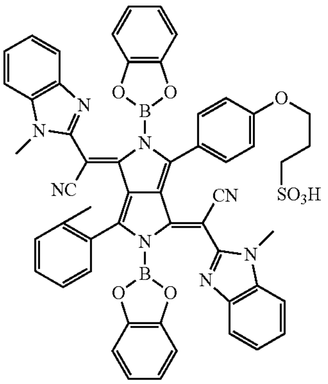

-continued
PPB-B-15
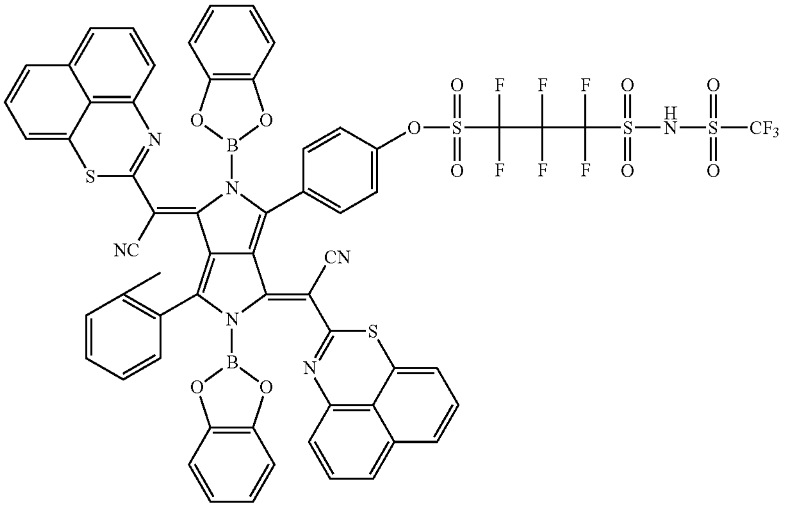
PPB-B-16
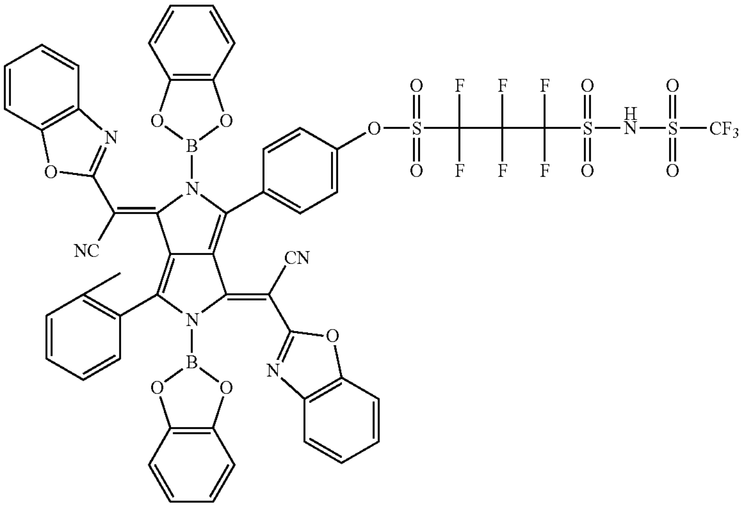
PPB-B-17
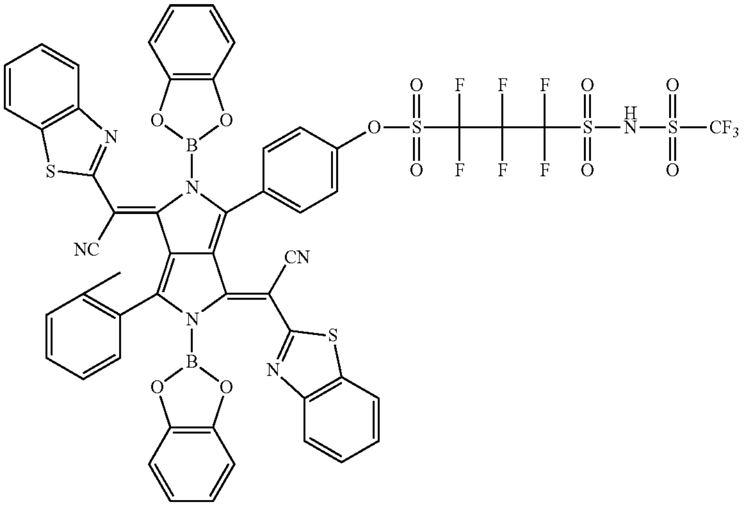

-continued
PPB-B-18
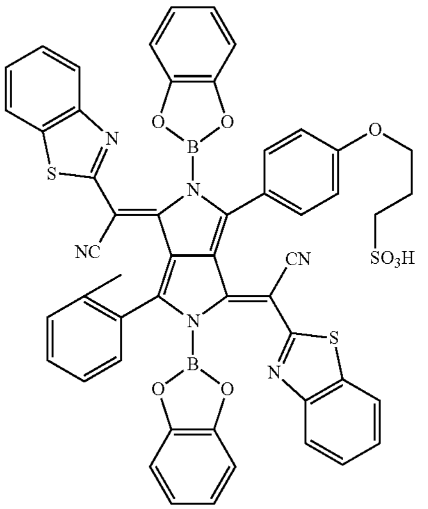
PPB-B-19
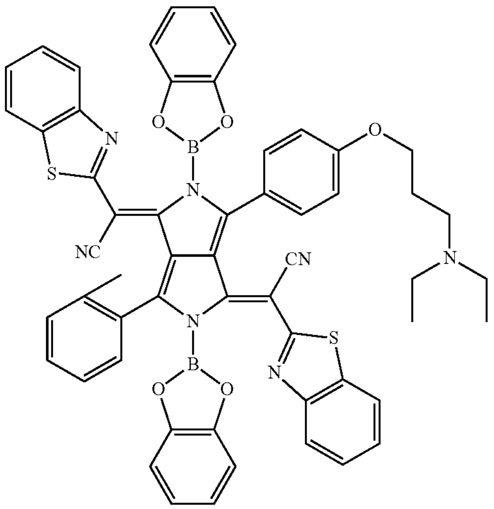
PPB-B-20
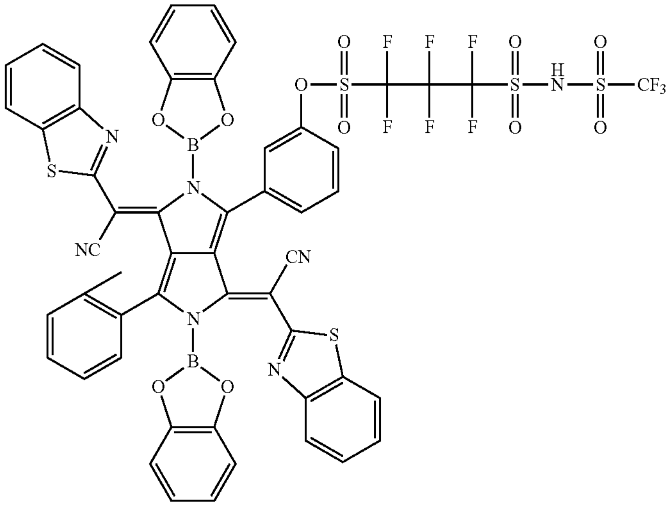
PPB-B-21
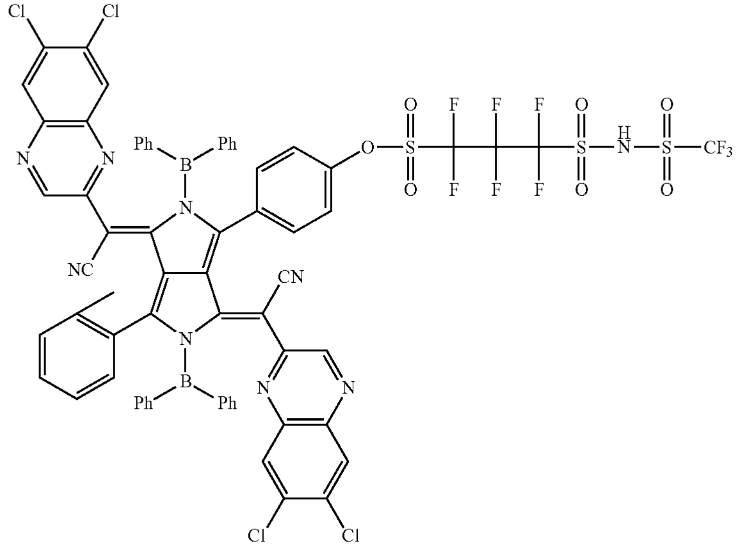

-continued
PPB-B-22
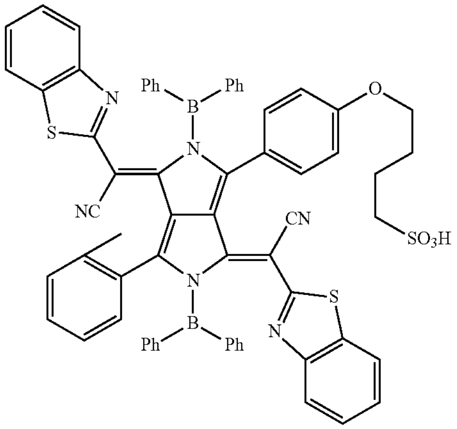
PPB-B-23
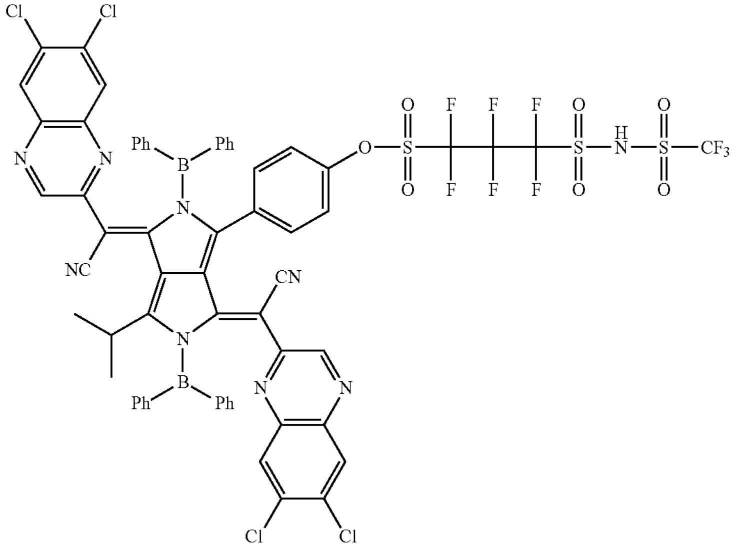
PPB-B-24
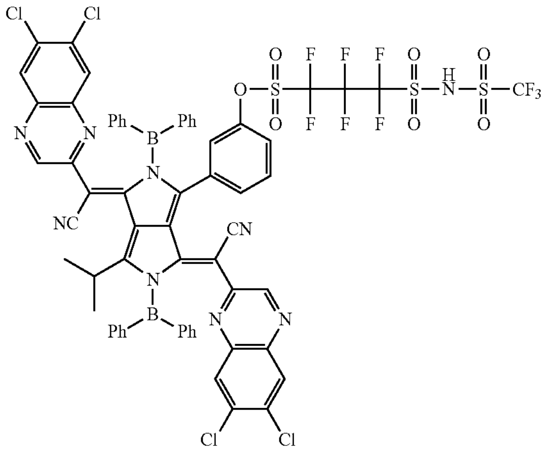
PPB-B-25
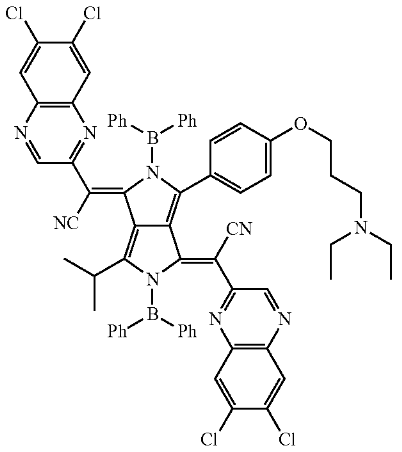

-continued
PPB-B-26
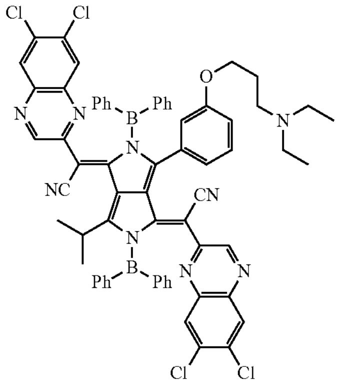
PPB-B-27
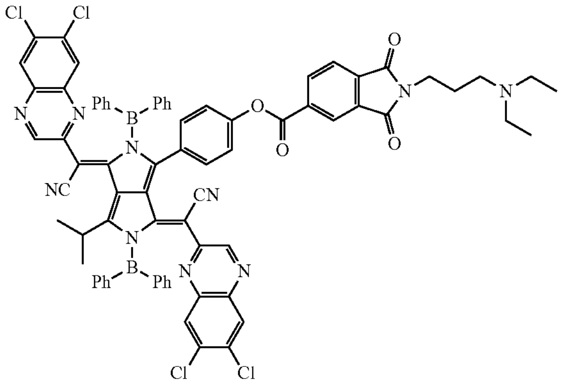
PPB-B-28
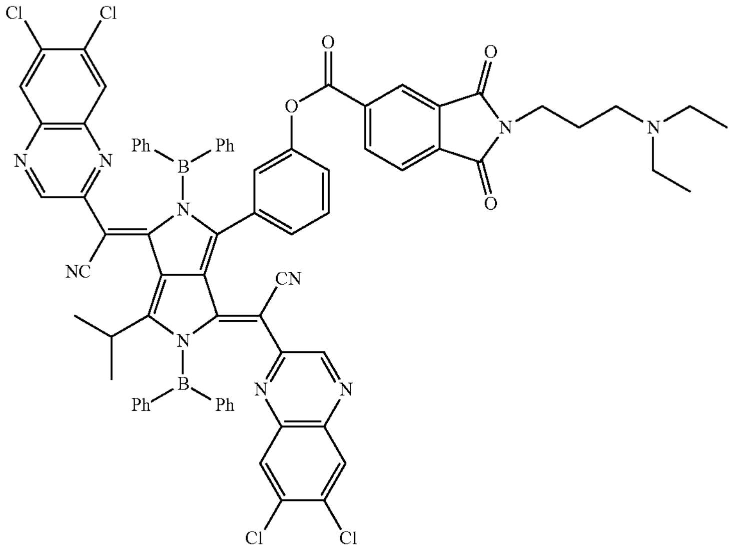
PPB-B-29
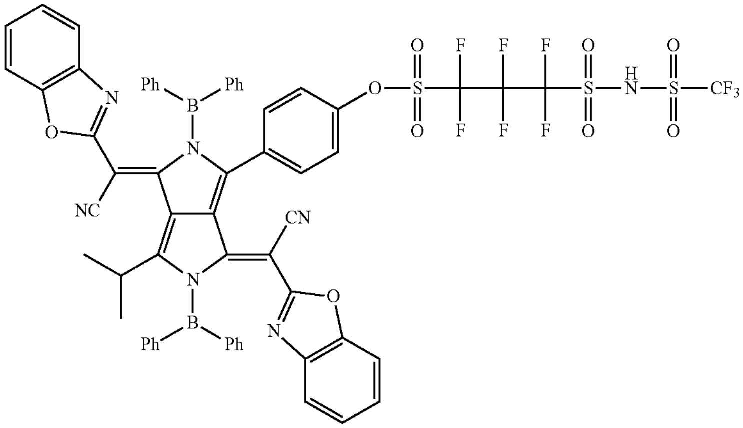

-continued
PPB-B-30
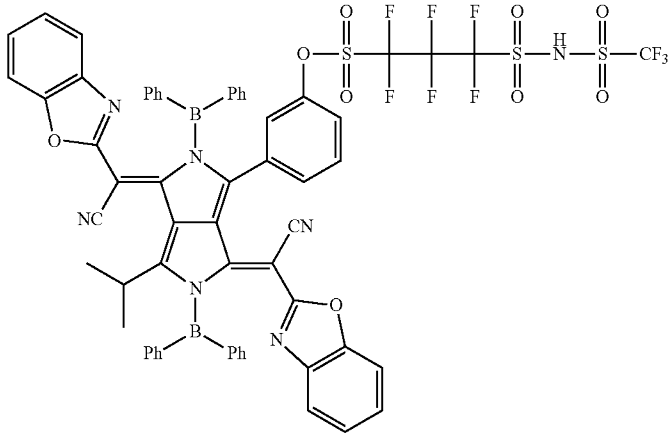
PPB-B-31
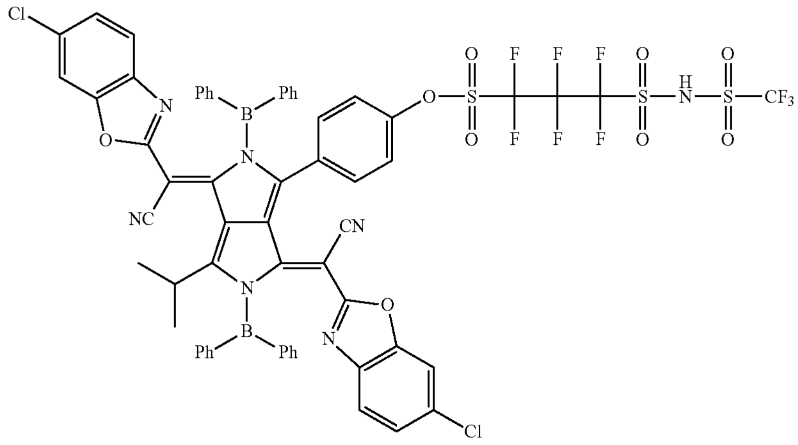
PPB-B-32
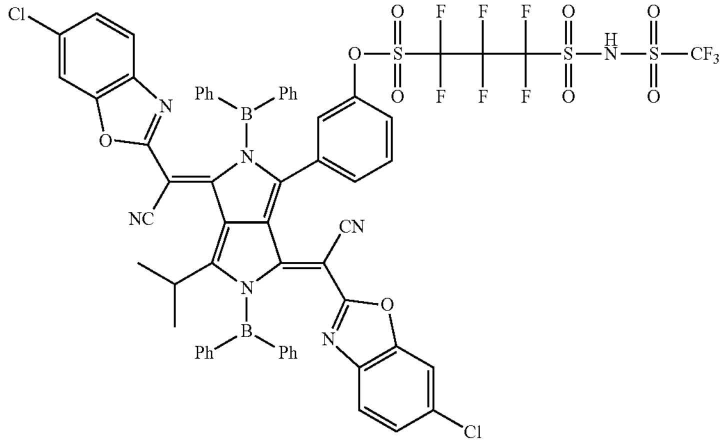

-continued
PPB-B-33
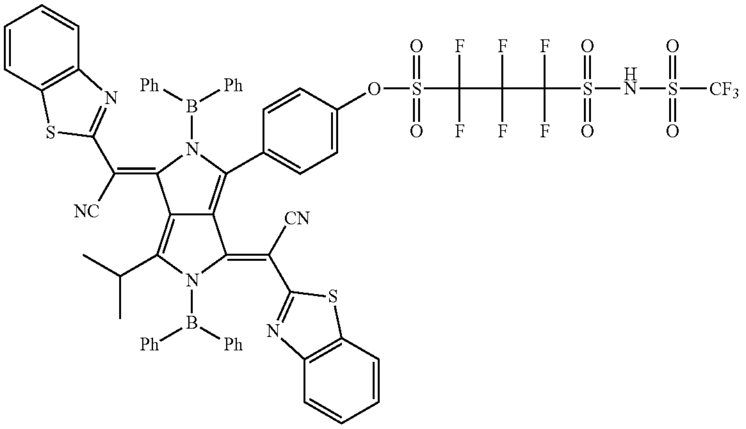
PPB-B-34
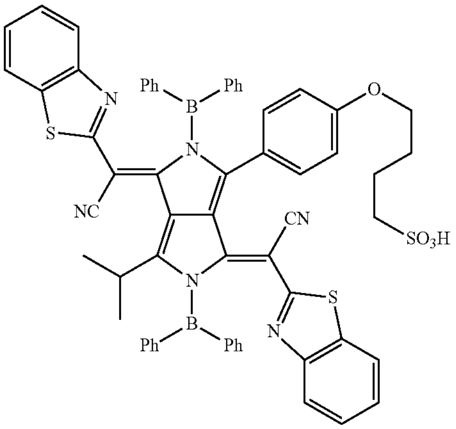
PPB-B-35
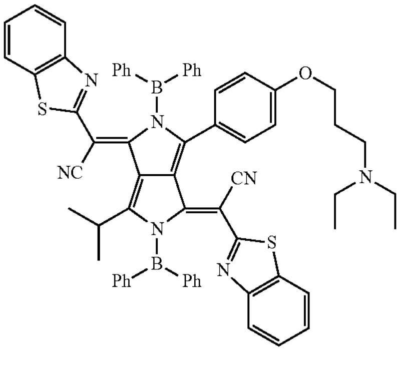
PPB-B-36
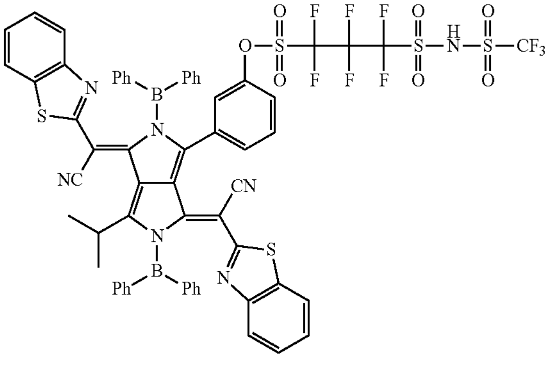

-continued
PPB-B-37
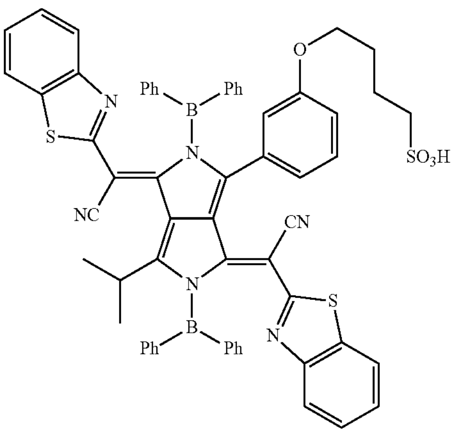
PPB-B-38
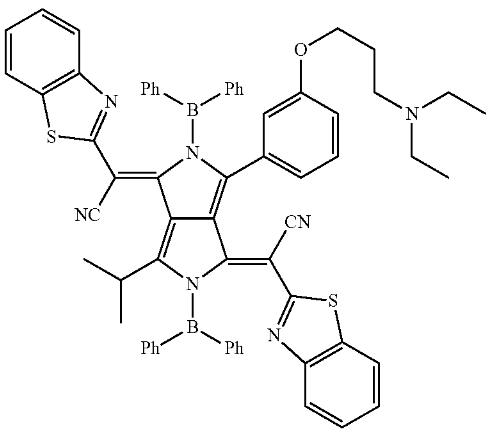
PPB-B-39
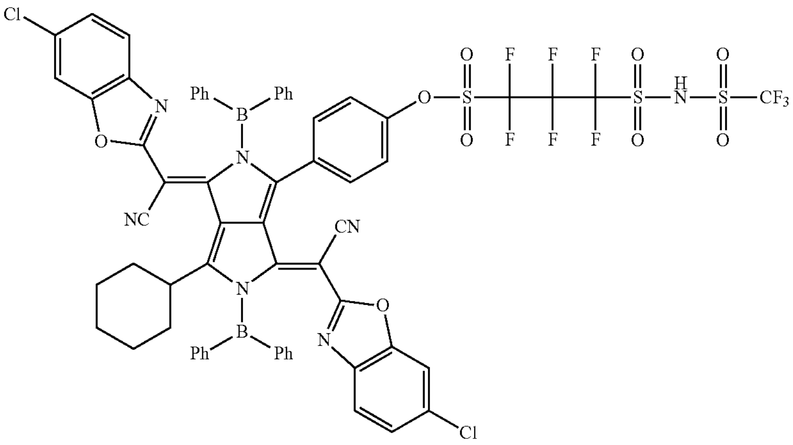
PPB-B-40
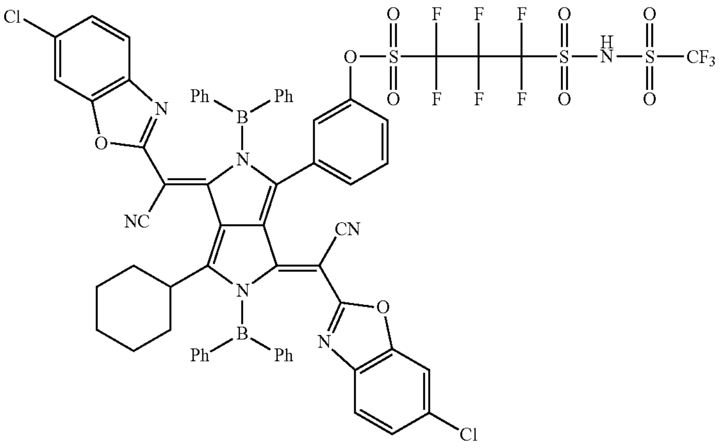

-continued
PPB-B-41
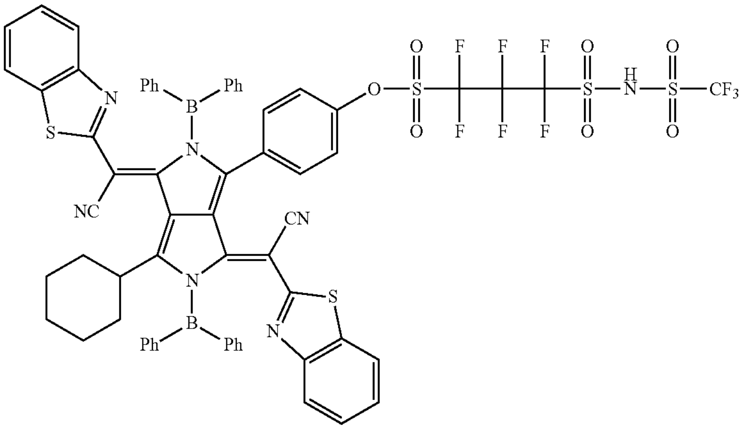
PPB-B-42
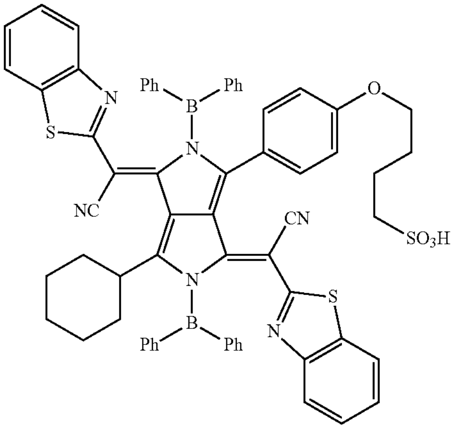
PPB-B-43
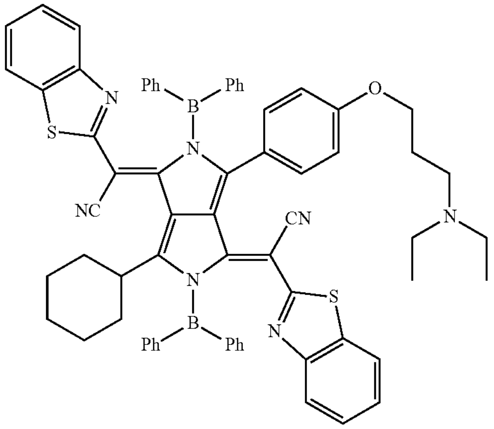
PPB-B-44
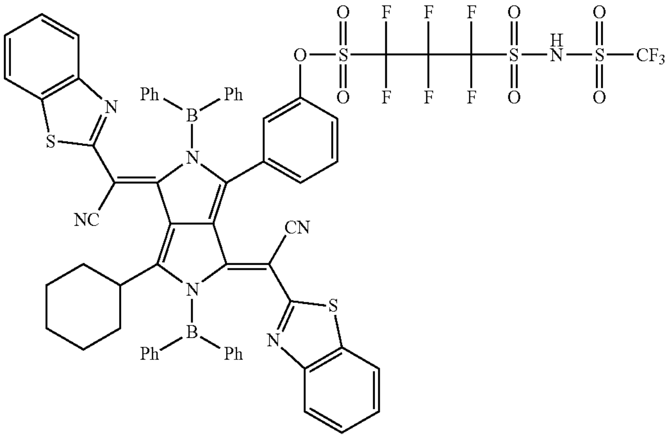

-continued
PPB-B-45
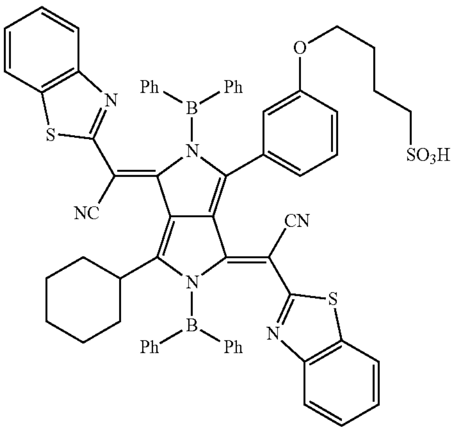
PPB-B-46
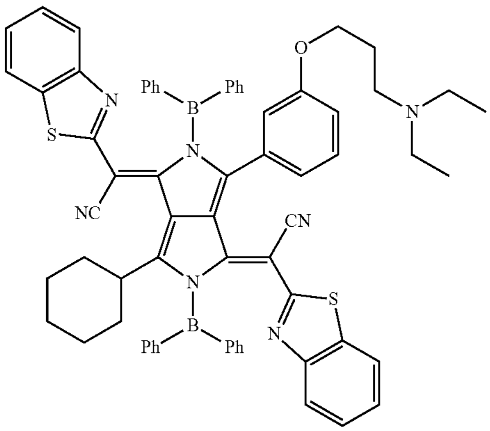
PPB-B-47
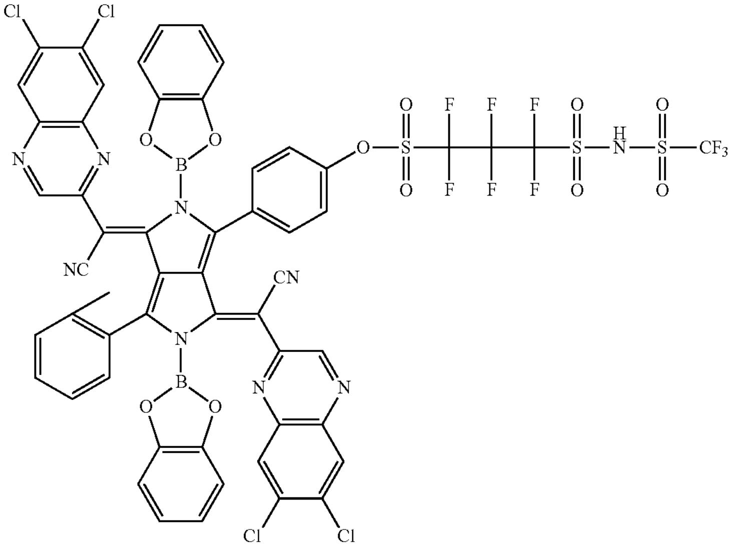
PPB-B-48
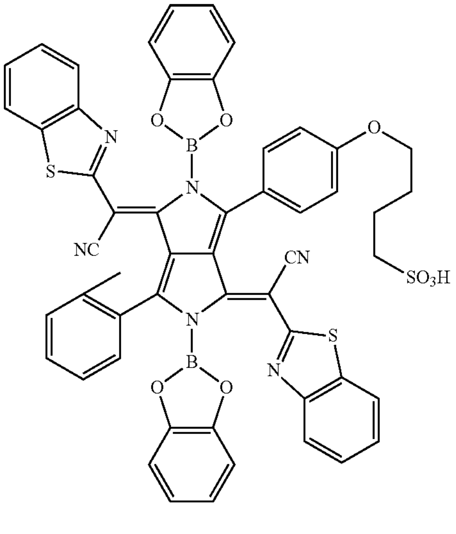

-continued
PPB-B-49
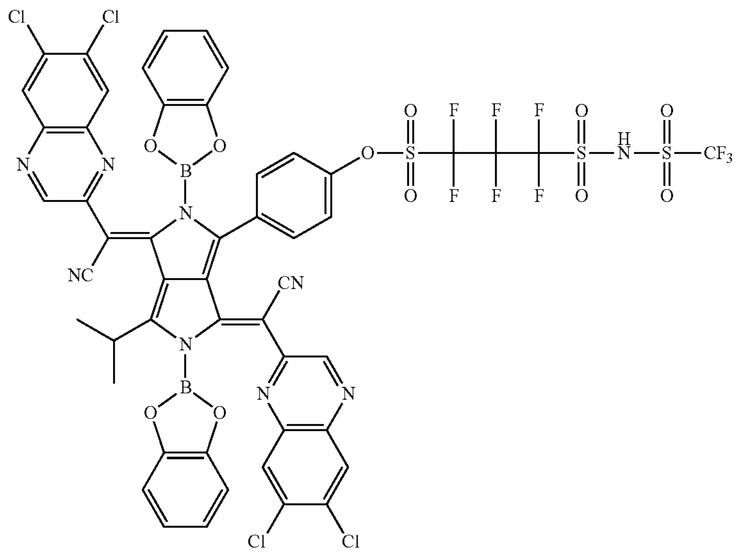
PPB-B-50
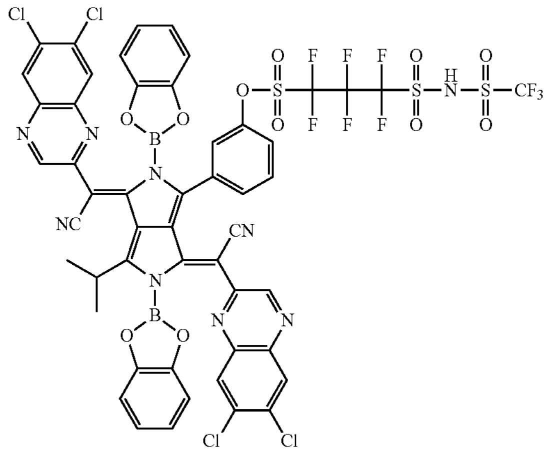
PPB-B-51
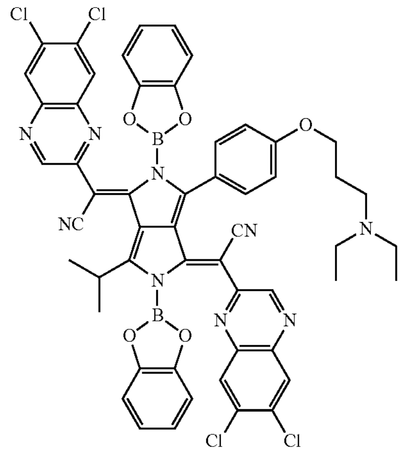
PPB-B-52
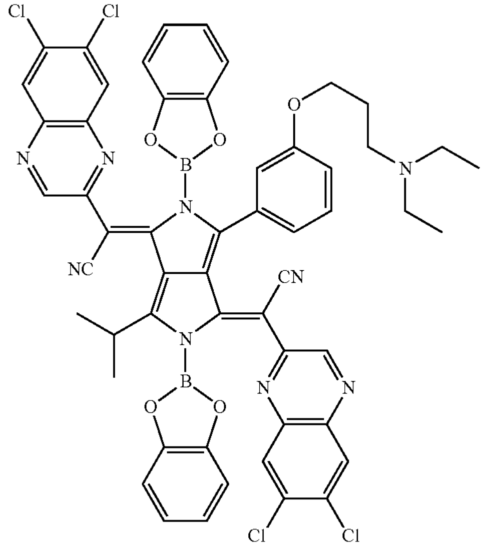

-continued
PPB-B-53
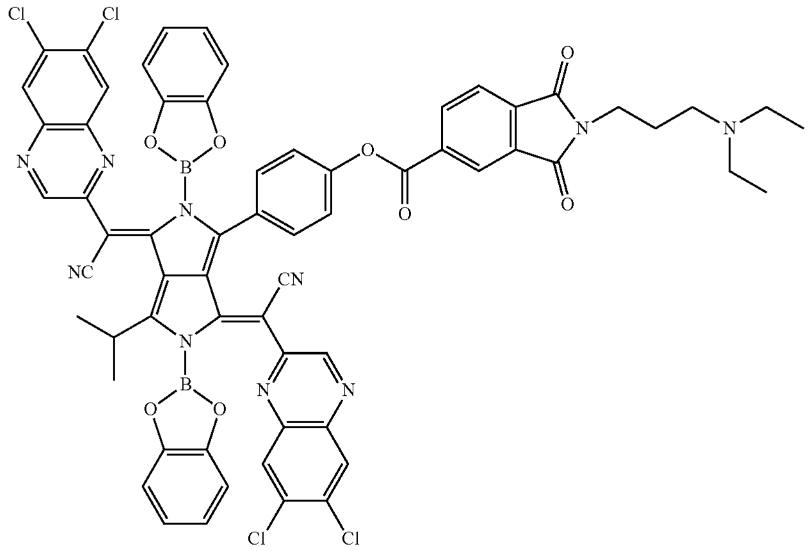
PPB-B-54
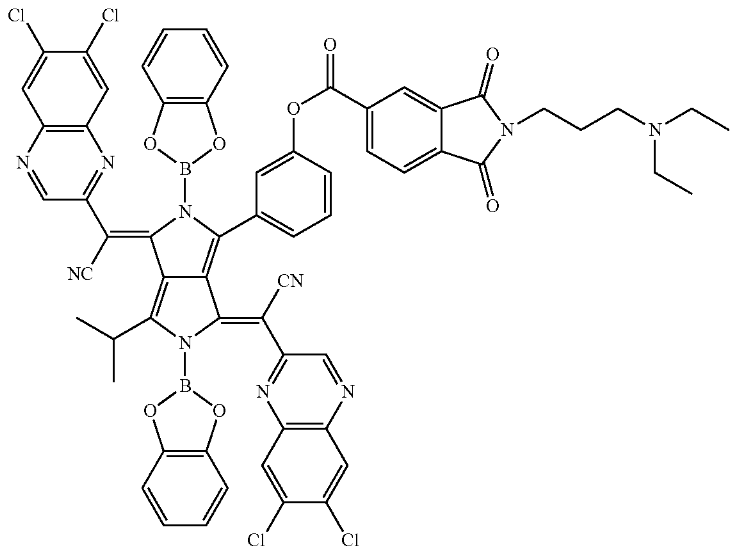
PPB-B-55
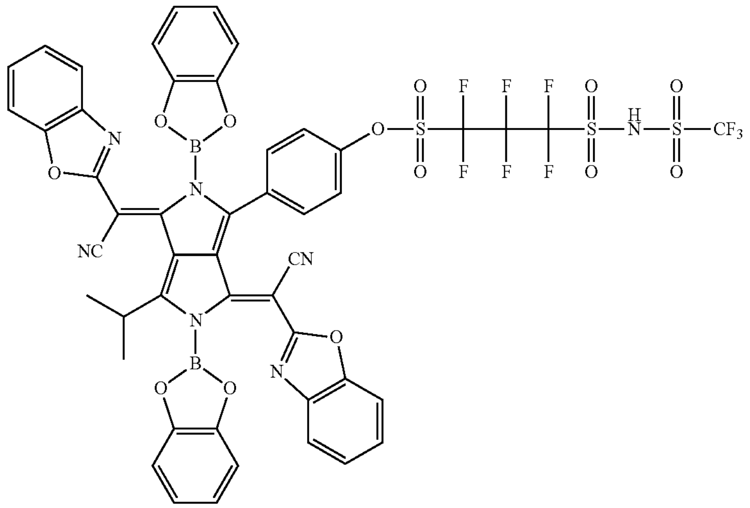

-continued
PPB-B-56
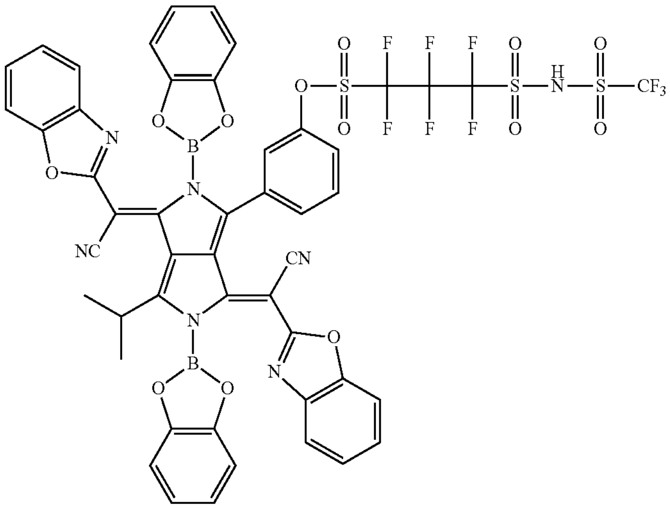
PPB-B-57
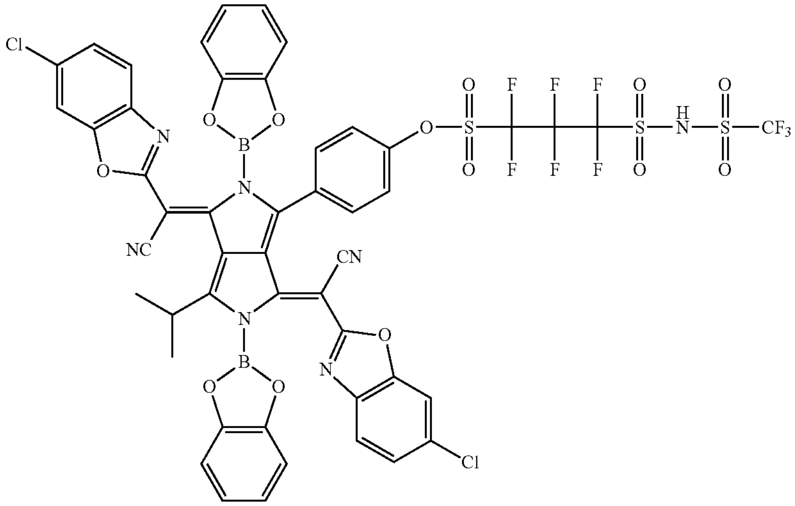
PPB-B-58
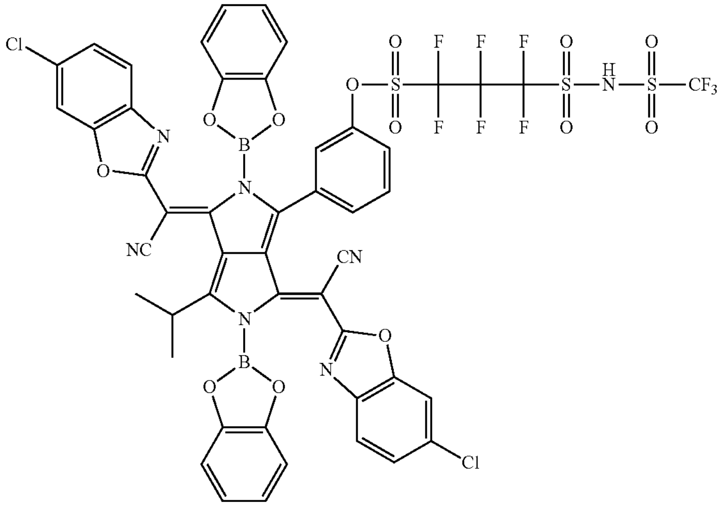

-continued
PPB-B-59
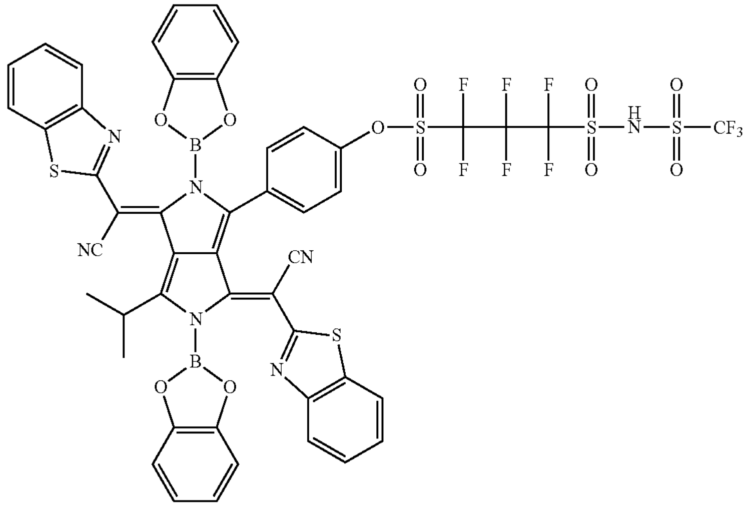
PPB-B-60
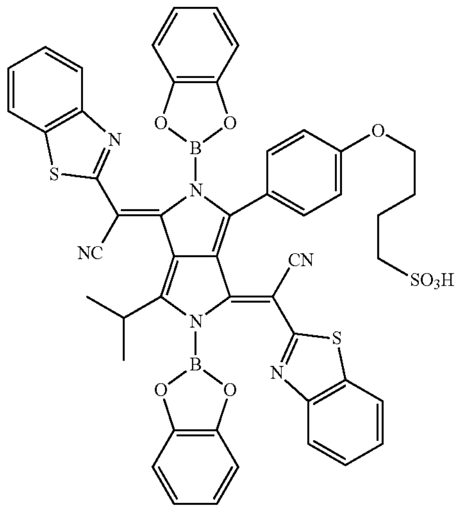
PPB-B-61
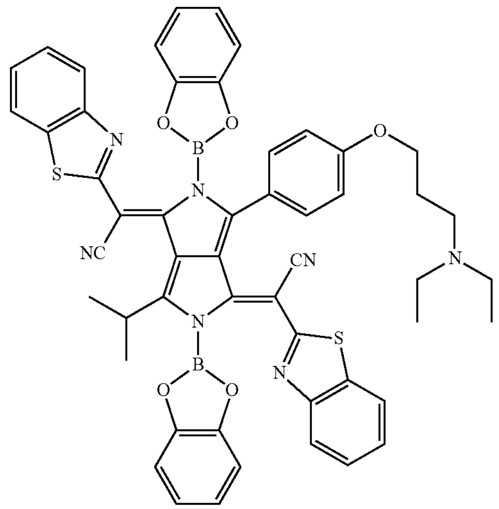
PPB-B-62
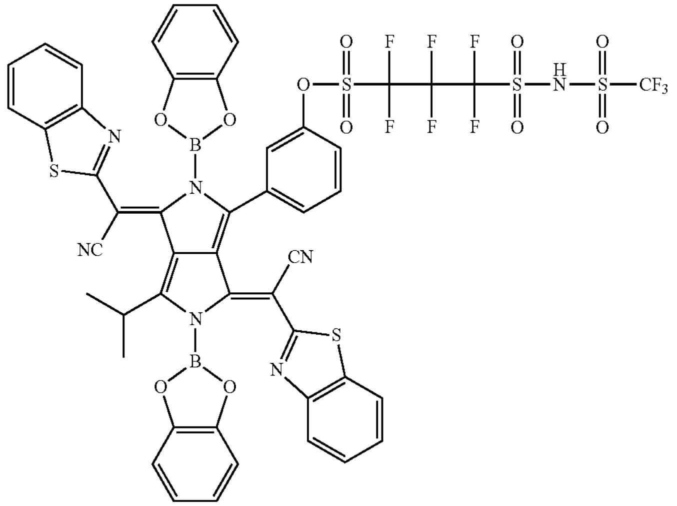

-continued
PPB-B-63
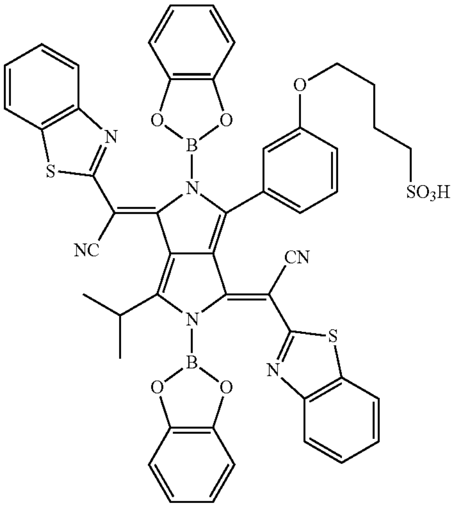
PPB-B-64
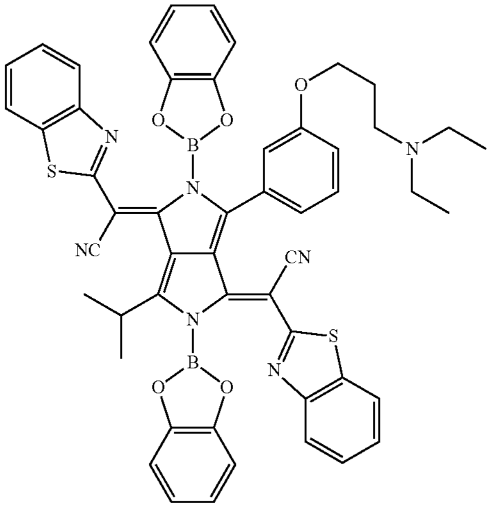
PPB-B-65
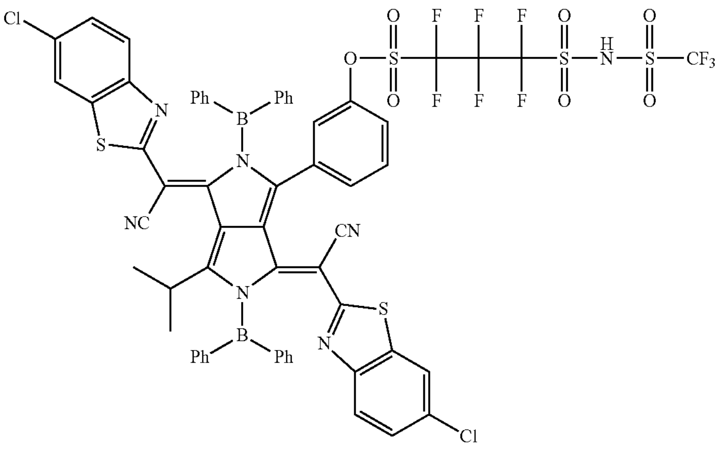
(PPB-B-66)
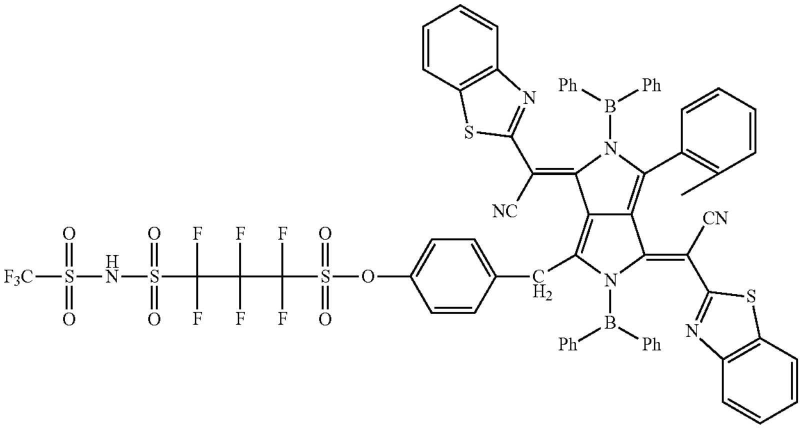

-continued
(PPB-B-67)
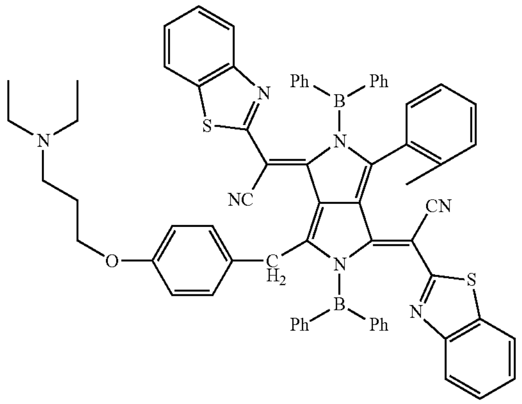
(PPB-B-68)
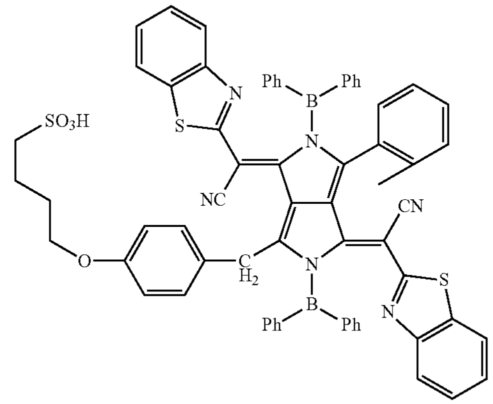
(PPB-B-69)
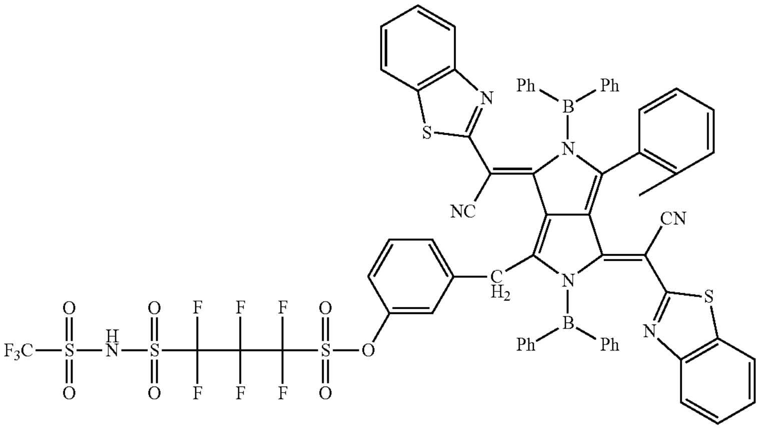
(PPB-B-70)
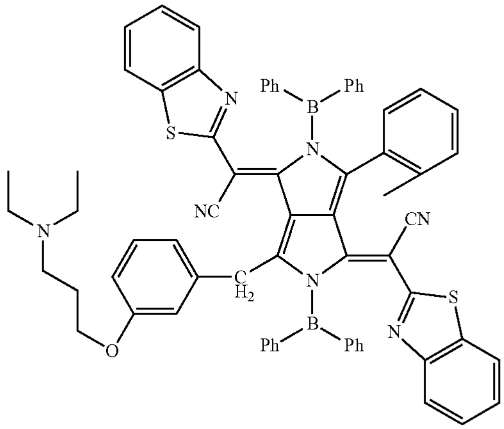
(PPB-B-71)
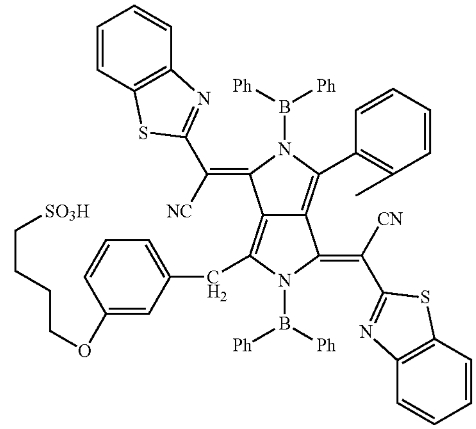

-continued (PPB-B-72)

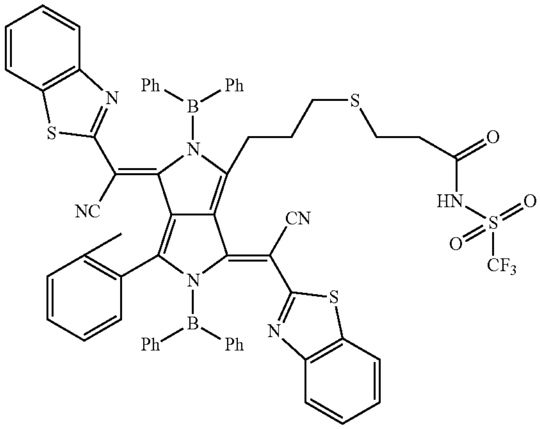

(PPB-B-73)

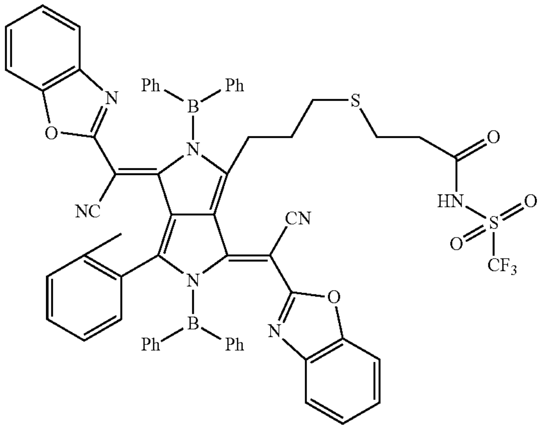

(PPB-B-724

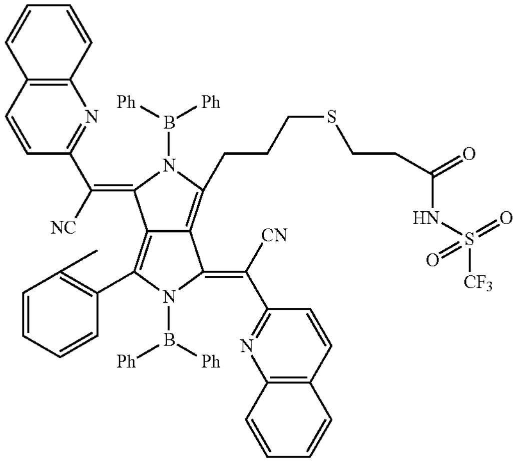

(Dispersant)

D-1: solution of a resin having the following structure (the numerical value described together with the main chain indicates a molar ratio, and the numerical value described together with the side chain indicates the number of repeating units; weight-average molecular weight=38900, acid value: 99.1 mgKOH/g), in which a concentration of solid contents was adjusted to 20% by mass with a mixed solution of propylene glycol monomethyl ether acetate:propylene glycol monomethyl ether=9:1 (mass ratio)

D-2: solution of a resin having the following structure (the numerical value described together with the main chain indicates a molar ratio, and the numerical value described together with the side chain indicates the number of repeating units; weight-average molecular weight=21000, acid value: 36.0 mgKOH/g, amine value: 47.0 mgKOH/g), in which a concentration of solid contents was adjusted to 20% by mass with a mixed solution of propylene glycol monomethyl ether acetate:propylene glycol monomethyl ether=9:1 (mass ratio)

(D-1)

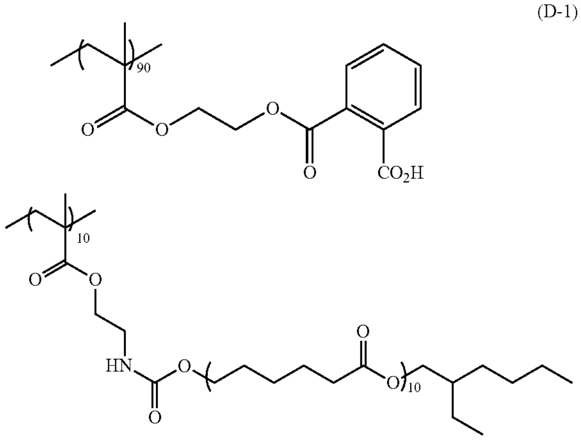

(D-2)

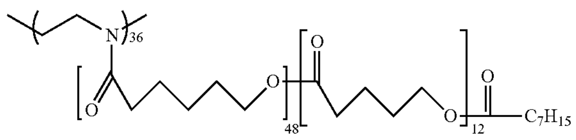

-continued

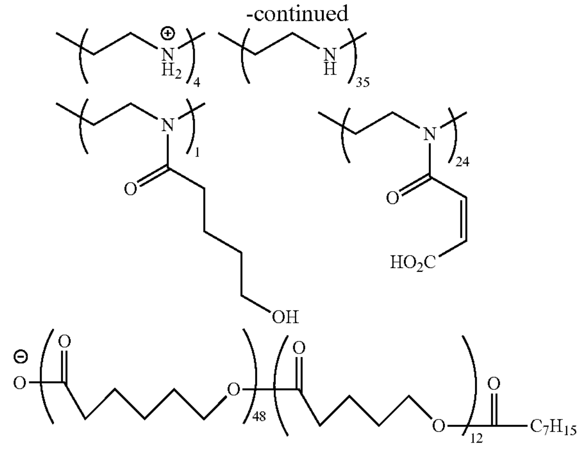

(Solvent)

S-1: propylene glycol monomethyl ether acetate

S-2: propylene glycol monomethyl ether

<Preparation of Coloring Agent Solution>

8.02 parts by mass of a coloring agent (dye) shown in the following table and 91.98 parts by mass of a solvent shown in the following table were mixed to produce a coloring agent solution.

TABLE 8

| | Coloring agent | | Solvent |
|---|---|---|---|
| Coloring agent solution 1 | PPB-C-1 | Dye | S-3 |
| Coloring agent solution 2 | PPB-C-2 | Dye | S-3 |
| Coloring agent solution 3 | PPB-C-3 | Dye | S-3 |
| Coloring agent solution 4 | PPB-C-4 | Dye | S-4 |
| Coloring agent solution 5 | PPB-C-5 | Dye | S-3 |
| Coloring agent solution 6 | PPB-C-6 | Dye | S-3 |
| Coloring agent solution 7 | PPB-C-7 | Dye | S-4 |
| Coloring agent solution 8 | PPB-C-8 | Dye | S-3 |
| Coloring agent solution 9 | PPB-C-9 | Dye | S-3 |
| Coloring agent solution 10 | PPB-C-10 | Dye | S-3 |
| Coloring agent solution 11 | PPB-C-11 | Dye | S-3 |
| Coloring agent solution 12 | PPB-C-12 | Dye | S-3 |
| Coloring agent solution 13 | PPB-C-1 | Dye | S-4 |
| Coloring agent solution 14 | PPB-C-5 | Dye | S-5 |
| Coloring agent solution 15 | PPB-C-8 | Dye | S-5 |
| Coloring agent solution 16 | PPB-C-11 | Dye | S-4 |
| Comparative coloring agent solution 1 | PPB-E-1 | Dye | S-3 |

(Coloring Agent)

PPB-C-1 to PPB-C-12: compounds having the above-described structures (coloring agents represented by Formula (1) (specific coloring agents))

PPB-E-1: compound having the above-described structure (comparative coloring agent)

(Solvent)

S-3: cyclopentanone

S-4: cyclohexanone

S-5: anisole

<Production of Composition>

Each material was mixed at a proportion of Formulations 1 to 6 shown below, and the obtained mixture was filtered through a nylon filter (manufactured by Pall Corporation) having a pore size of 0.45 μm to produce each composition.

<Formulation 1>

| | | |
|---|---|---|
| Dispersion liquid described in table | 15.873 | parts by mass |
| Resin described in table | 2.943 | parts by mass |
| Polymerizable compound described in table | 0.45 | parts by mass |
| Photopolymerization initiator described in table | 0.45 | parts by mass |
| Polymerization Inhibitor (p-methoxyphenol) | 0.001 | parts by mass |
| Surfactant described in table | 0.0075 | parts by mass |
| Solvent described in table: | 10.276 | parts by mass |

<Formulation 2>

| | | |
|---|---|---|
| Dispersion liquid described in table | 15.873 | parts by mass |
| Resin described in table | 2.943 | parts by mass |
| Epoxy compound described in table | 0.9 | parts by mass |
| Curing agent described in table (in a case of being described in the table) | 0.045 | parts by mass |
| Polymerization Inhibitor (p-methoxyphenol) | 0.001 | parts by mass |
| Surfactant described in table | 0.0075 | parts by mass |
| Solvent described in table | 10.276 | parts by mass |

<Formulation 3>

| | | |
|---|---|---|
| Coloring agent solution described in table | 14.921 | parts by mass |
| Resin described in table | 3.895 | parts by mass |
| Polymerizable compound described in table | 0.45 | parts by mass |
| Photopolymerization initiator described in table | 0.45 | parts by mass |
| Polymerization Inhibitor (p-methoxyphenol) | 0.001 | parts by mass |
| Surfactant described in table | 0.00075 | parts by mass |
| Solvent described in table | 10.276 | parts by mass |

<Formulation 4>

| | | |
|---|---|---|
| Coloring agent solution described in table | 14.921 | parts by mass |
| Resin described in table | 3.895 | parts by mass |
| Epoxy compound described in table | 0.9 | parts by mass |
| Curing agent described in table (in a case of being described in the table) | 0.045 | parts by mass |
| Polymerization Inhibitor (p-methoxyphenol) | 0.001 | parts by mass |
| Surfactant described in table | 0.0075 | parts by mass |
| Solvent described in table | 10.276 | parts by mass |

<Formulation 5>

Dispersion liquid described in table 8.333 parts by mass

45% propylene glycol monomethyl ether acetate solution of resin having following structure (weight-average molecular weight: 24600; the numerical value described together with the main chain indicates a mass ratio of a repeating unit)

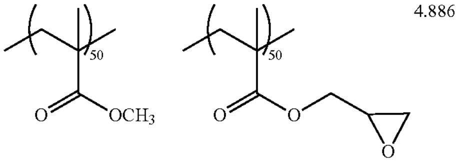

4.886 parts by mass

-continued

| | |
|---|---|
| Ultraviolet absorber described in table | 2.7 parts by mass |
| Polymerization Inhibitor (p-methoxyphenol) | 0.001 parts by mass |
| Surfactant described in table | 0.011 parts by mass |
| Solvent described in table | 6.305 parts by mass |

<Formulation 6>

Coloring agent solution described in table 7.833 parts by mass

45% propylene glycol monomethyl ether acetate solution of resin having following structure (weight-average mole cular weight: 24600; the numerical value described together with the main chain indicates a mas s ratio of a repeating unit)

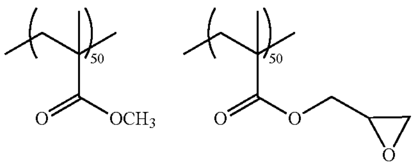

5.386 parts by mass

| | |
|---|---|
| Ultraviolet absorber described in table | 2.7 parts by mass |
| Polymerization Inhibitor (p-methoxyphenol) | 0.001 parts by mass |
| Surfactant described in table | 0.011 parts by mass |
| Solvent described in table | 6.030 parts by mass |

TABLE 9

| | Formulation | Dispersion liquid or coloring agent solution | Resin | Photopolymerization initiator | Polymerizable compound | Surfactant | Solvent |
|---|---|---|---|---|---|---|---|
| Example 1 | Formulation 1 | Dispersion liquid 1 | E-3 | C-1 | M-1 | H-1 | S-1 |
| Example 2 | Formulation 1 | Dispersion liquid 2 | E-1 | C-1 | M-1 | H-1 | S-1 |
| Example 3 | Formulation 1 | Dispersion liquid 3 | E-1/E-2 = 2/1 (mass ratio) | C-1 | M-1 | H-1 | S-1 |
| Example 4 | Formulation 1 | Dispersion liquid 4 | E-1/E-2 = 1/1 (mass ratio) | C-2 | M-2 | H-1 | S-1 |
| Example 5 | Formulation 1 | Dispersion liquid 5 | E-1 | C-1 | M-1 | H-1 | S-1 |
| Example 6 | Formulation 1 | Dispersion liquid 6 | E-1 | C-2 | M-1 | H-2 | S-1/S-2 = 1/1 (mass ratio) |
| Example 7 | Formulation 1 | Dispersion liquid 7 | E-3 | C-1 | M-3 | H-1 | S-1 |
| Example 8 | Formulation 1 | Dispersion liquid 8 | E-1 | C-1 | M-1 | H-1 | S-2 |
| Example 9 | Formulation 1 | Dispersion liquid 9 | E-1/E-3 = 1/2 (mass ratio) | C-1 | M-2 | H-1 | S-1 |
| Example 10 | Formulation 1 | Dispersion liquid 10 | E-3 | C-1 | M-1 | H-1 | S-1 |
| Example 11 | Formulation 1 | Dispersion liquid 11 | E-2/E-3 = 1/3 (mass ratio) | C-1 | M-1 | H-1 | S-2 |
| Example 12 | Formulation 1 | Dispersion liquid 12 | E-1 | C-1 | M-3 | H-1 | S-1 |
| Example 13 | Formulation 1 | Dispersion liquid 13 | E-3 | C-1 | M-1 | H-3 | S-1 |
| Example 14 | Formulation 1 | Dispersion liquid 14 | E-1 | C-2 | M-1 | H-2 | S-1 |
| Example 15 | Formulation 1 | Dispersion liquid 15 | E-3 | C-1 | M-3 | H-1 | S-1 |
| Example 16 | Formulation 1 | Dispersion liquid 16 | E-1/E-2 = 1/2 (mass ratio) | C-2 | M-1 | H-1 | S-1/S-2 = 1/3 (mass ratio) |
| Example 17 | Formulation 1 | Dispersion liquid 17 | E-3 | C-1 | M-1 | H-3 | S-1 |
| Example 18 | Formulation 1 | Dispersion liquid 18 | E-1 | C-3 | M-2 | H-3 | S-1 |
| Example 19 | Formulation 1 | Dispersion liquid 19 | E-3 | C-1 | M-1 | H-3 | S-1 |
| Example 20 | Formulation 1 | Dispersion liquid 20 | E-1/E-2 = 2/1 (mass ratio) | C-1 | M-1 | H-1 | S-1 |
| Example 21 | Formulation 1 | Dispersion liquid 21 | E-1 | C-2 | M-1 | H-1 | S-1/S-2 = 1/4 (mass ratio) |
| Example 22 | Formulation 1 | Dispersion liquid 22 | E-1 | C-1 | M-1 | H-1/H-2 = 1/1 (mass ratio) | S-1 |
| Example 23 | Formulation 1 | Dispersion liquid 23 | E-3 | C-1 | M-1 | H-3 | S-1 |
| Example 24 | Formulation 1 | Dispersion liquid 24 | E-1 | C-1 | M-1 | H-1 | S-1 |
| Example 25 | Formulation 1 | Dispersion liquid 25 | E-1 | C-1 | M-1 | H-1 | S-1 |
| Example 26 | Formulation 1 | Dispersion liquid 26 | E-1 | C-1 | M-2/M-3 = 1/1 (mass ratio) | H-1 | S-1 |
| Example 27 | Formulation 1 | Dispersion liquid 27 | E-2/E-3 = 2/1 (mass ratio) | C-2 | M-1 | H-1 | S-1 |

TABLE 9-continued

| | Formulation | Dispersion liquid or coloring agent solution | Resin | Photopolymerization initiator | Polymerizable compound | Surfactant | Solvent |
|---|---|---|---|---|---|---|---|
| Example 28 | Formulation 1 | Dispersion liquid 28 | E-1 | C-1 | M-3 | H-1 | S-1 |
| Example 29 | Formulation 1 | Dispersion liquid 29 | E-1 | C-1 | M-1 | H-1 | S-1 |
| Example 30 | Formulation 1 | Dispersion liquid 30 | E-1 | C-2 | M-3 | H-1 | S-1 |
| Example 31 | Formulation 1 | Dispersion liquid 31 | E-1 | C-2 | M-2 | H-1 | S-1 |
| Example 32 | Formulation 1 | Dispersion liquid 32 | E-1 | C-3 | M-1 | H-1 | S-1 |
| Example 33 | Formulation 1 | Dispersion liquid 33 | E-1 | C-1 | M-1 | H-3 | S-1 |
| Example 34 | Formulation 1 | Dispersion liquid 34 | E-1 | C-1 | M-1 | H-1 | S-1 |
| Example 35 | Formulation 1 | Dispersion liquid 35 | E-1 | C-1 | M-1 | H-1 | S-1 |

TABLE 10

| | Formulation | Dispersion liquid or coloring agent solution | Resin | Photopolymerization initiator | Polymerizable compound | Surfactant | Solvent |
|---|---|---|---|---|---|---|---|
| Example 36 | Formulation 1 | Dispersion liquid 36 | E-1 | C-1 | M-1/M-2 = 1/1 (mass ratio) | H-1 | S-1 |
| Example 37 | Formulation 1 | Dispersion liquid 37 | E-1 | C-3 | M-1 | H-1 | S-1 |
| Example 38 | Formulation 1 | Dispersion liquid 38 | E-1 | C-1 | M-2 | H-2 | S-1 |
| Example 39 | Formulation 1 | Dispersion liquid 39 | E-1 | C-1 | M-1 | H-1 | S-1 |
| Example 40 | Formulation 1 | Dispersion liquid 40 | E-1 | C-1 | M-3 | H-1 | S-1 |
| Example 41 | Formulation 1 | Dispersion liquid 41 | E-1 | C-2/C-3 = 1/1 (mass ratio) | M-1 | H-1 | S-1 |
| Example 42 | Formulation 1 | Dispersion liquid 42 | E-1 | C-1 | M-1 | H-2 | S-1 |
| Example 43 | Formulation 1 | Dispersion liquid 43 | E-1 | C-1 | M-2 | H-1 | S-1 |
| Example 44 | Formulation 1 | Dispersion liquid 44 | E-1 | C-1 | M-1 | H-1 | S-1 |
| Example 45 | Formulation 1 | Dispersion liquid 45 | E-1 | C-1 | M-3 | H-1 | S-1 |
| Example 46 | Formulation 1 | Dispersion liquid 46 | E-1 | C-3 | M-1 | H-1 | S-1 |
| Example 47 | Formulation 1 | Dispersion liquid 47 | E-1 | C-1 | M-1/M-3 = 1/1 (mass ratio) | H-1 | S-1 |
| Example 48 | Formulation 1 | Dispersion liquid 48 | E-1 | C-1 | M-1 | H-1/H-3 = 1/1 (mass ratio) | S-1 |
| Example 49 | Formulation 3 | Coloring agent solution 1 | E-1 | C-1 | M-1 | H-1 | S-3 |
| Example 50 | Formulation 3 | Coloring agent solution 2 | E-1 | C-1 | M-1 | H-1 | S-3 |
| Example 51 | Formulation 3 | Coloring agent solution 3 | E-1 | C-1/C-2 = 1/1 (mass ratio) | M-2 | H-1 | S-3 |
| Example 52 | Formulation 3 | Coloring agent solution 4 | E-1 | C-1 | M-1 | H-1 | S-4 |
| Example 53 | Formulation 3 | Coloring agent solution 5 | E-1 | C-1 | M-1 | H-3 | S-3 |
| Example 54 | Formulation 3 | Coloring agent solution 6 | E-1 | C-1 | M-3 | H-1 | S-3 |
| Example 55 | Formulation 3 | Coloring agent solution 7 | E-1 | C-1/C-3 = 1/1 (mass ratio) | M-1 | H-1 | S-4 |
| Example 56 | Formulation 3 | Coloring agent solution 8 | E-1 | C-1 | M-1 | H-1 | S-3 |
| Example 57 | Formulation 3 | Coloring agent solution 9 | E-1 | C-1 | M-2 | H-2/H-3 = 1/1 (mass ratio) | S-3 |
| Example 58 | Formulation 1 | Dispersion liquid 49 | E-3 | C-1 | M-1 | H-3 | S-1 |
| Example 59 | Formulation 1 | Dispersion liquid 50 | E-3 | C-1 | M-1 | H-3 | S-1 |
| Example 60 | Formulation 1 | Dispersion liquid 51 | E-3 | C-1 | M-1 | H-3 | S-1 |
| Example 61 | Formulation 1 | Dispersion liquid 52 | E-3 | C-1 | M-1 | H-3 | S-1 |
| Example 62 | Formulation 1 | Dispersion liquid 53 | E-1 | C-2 | M-1/M-2 = 3/1 (mass ratio) | H-1 | S-1 |
| Example 63 | Formulation 1 | Dispersion liquid 54 | E-3 | C-1 | M-1 | H-3 | S-1 |
| Example 64 | Formulation 1 | Dispersion liquid 55 | E-2/E-3 = 1/3 (mass ratio) | C-2 | M-2 | H-1 | S-1 |
| Example 65 | Formulation 1 | Dispersion liquid 56 | E-3 | C-1 | M-1 | H-3 | S-1 |
| Example 66 | Formulation 1 | Dispersion liquid 57 | E-1 | C-1/C-2 = 2/1 (mass ratio) | M-2 | H-1/H-2 = 3/1 (mass ratio) | S-1 |
| Example 67 | Formulation 1 | Dispersion liquid 58 | E-3 | C-1 | M-1 | H-3 | S-1 |
| Example 68 | Formulation 1 | Dispersion liquid 59 | E-3 | C-1 | M-1 | H-3 | S-1 |
| Example 69 | Formulation 1 | Dispersion liquid 60 | E-3 | C-1 | M-1 | H-3 | S-1 |
| Example 70 | Formulation 1 | Dispersion liquid 61 | E-3 | C-1 | M-1 | H-3 | S-1 |
| Example 71 | Formulation 1 | Dispersion liquid 62 | E-3 | C-1 | M-1 | H-3 | S-1 |
| Example 72 | Formulation 1 | Dispersion liquid 63 | E-3 | C-1 | M-1 | H-3 | S-1 |
| Example 73 | Formulation 1 | Dispersion liquid 64 | E-3 | C-1 | M-1 | H-3 | S-1 |
| Example 74 | Formulation 1 | Dispersion liquid 65 | E-3 | C-1 | M-1 | H-3 | S-1 |
| Example 75 | Formulation 1 | Dispersion liquid 66 | E-3 | C-1 | M-1 | H-3 | S-1 |

TABLE 11

| | Formulation | Dispersion liquid or coloring agent solution | Resin | Photopolymerization initiator | Polymerizable compound | Surfactant | Solvent |
|---|---|---|---|---|---|---|---|
| Example 76 | Formulation 1 | Dispersion liquid 67 | E-3 | C-1 | M-1 | H-3 | S-1 |
| Example 77 | Formulation 1 | Dispersion liquid 68 | E-3 | C-1 | M-1 | H-3 | S-1 |
| Example 78 | Formulation 1 | Dispersion liquid 69 | E-3 | C-1 | M-1 | H-3 | S-1 |
| Example 79 | Formulation 1 | Dispersion liquid 70 | E-3 | C-1 | M-1 | H-3 | S-1 |
| Example 80 | Formulation 1 | Dispersion liquid 71 | E-3 | C-1 | M-1 | H-3 | S-1 |
| Example 81 | Formulation 1 | Dispersion liquid 72 | E-3 | C-1 | M-1 | H-3 | S-1 |
| Example 82 | Formulation 1 | Dispersion liquid 73 | E-3 | C-1 | M-1 | H-3 | S-1 |
| Example 83 | Formulation 1 | Dispersion liquid 74 | E-3 | C-1 | M-1 | H-3 | S-1 |
| Example 84 | Formulation 1 | Dispersion liquid 75 | E-3 | C-1 | M-1 | H-3 | S-1 |
| Example 85 | Formulation 1 | Dispersion liquid 76 | E-2/E-3 = 1/4 (mass ratio) | C-2 | M-2 | H-2/H-3 = 1/3 (mass ratio) | S-1 |
| Example 86 | Formulation 1 | Dispersion liquid 77 | E-3 | C-1 | M-1 | H-3 | S-1 |
| Example 87 | Formulation 1 | Dispersion liquid 78 | E-1 | C-2 | M-2/M-3 = 1/2 (mass ratio) | H-1 | S-1 |
| Example 88 | Formulation 1 | Dispersion liquid 79 | E-1 | C-2 | M-2 | H-1 | S-1 |
| Example 89 | Formulation 1 | Dispersion liquid 80 | E-1 | C-1/C-3 = 3/1 (mass ratio) | M-2 | H-1 | S-1 |
| Example 90 | Formulation 1 | Dispersion liquid 81 | E-1 | C-2 | M-2 | H-1/H-3 = 1/2 (mass ratio) | S-1 |
| Example 91 | Formulation 1 | Dispersion liquid 82 | E-1/E-3 = 1/2 (mass ratio) | C-2 | M-2 | H-1 | S-1 |
| Example 92 | Formulation 1 | Dispersion liquid 83 | E-1 | C-2 | M-1/M-3 = 2/1 (mass ratio) | H-1 | S-1 |
| Example 93 | Formulation 1 | Dispersion liquid 84 | E-3 | C-1 | M-1 | H-3 | S-1 |
| Example 94 | Formulation 1 | Dispersion liquid 85 | E-3 | C-1 | M-1 | H-3 | S-1 |
| Example 95 | Formulation 1 | Dispersion liquid 86 | E-3 | C-1 | M-1 | H-3 | S-1 |
| Example 96 | Formulation 1 | Dispersion liquid 87 | E-3 | C-1 | M-1 | H-3 | S-1 |
| Example 97 | Formulation 1 | Dispersion liquid 88 | E-3 | C-1 | M-1 | H-3 | S-1 |
| Example 98 | Formulation 1 | Dispersion liquid 89 | E-3 | C-1 | M-1 | H-3 | S-1 |
| Example 99 | Formulation 1 | Dispersion liquid 90 | E-3 | C-1 | M-1 | H-3 | S-1 |
| Example 100 | Formulation 1 | Dispersion liquid 91 | E-3 | C-1 | M-1 | H-3 | S-1 |
| Example 101 | Formulation 1 | Dispersion liquid 92 | E-3 | C-1 | M-1 | H-3 | S-1 |
| Example 102 | Formulation 1 | Dispersion liquid 93 | E-3 | C-1 | M-1 | H-3 | S-1 |
| Example 103 | Formulation 1 | Dispersion liquid 94 | E-1 | C-1 | M-1 | H-3 | S-1 |
| Example 104 | Formulation 1 | Dispersion liquid 95 | E-1 | C-1 | M-1 | H-3 | S-1 |
| Example 105 | Formulation 1 | Dispersion liquid 96 | E-1 | C-2 | M-2 | H-3 | S-1 |
| Example 106 | Formulation 1 | Dispersion liquid 97 | E-3 | C-1 | M-1 | H-1 | S-1 |
| Example 107 | Formulation 1 | Dispersion liquid 98 | E-1 | C-1 | M-2 | H-3 | S-1 |
| Example 108 | Formulation 1 | Dispersion liquid 99 | E-1 | C-1 | M-1 | H-1 | S-1 |
| Example 109 | Formulation 1 | Dispersion liquid 100 | E-1 | C-2 | M-2 | H-3 | S-1 |
| Example 110 | Formulation 1 | Dispersion liquid 101 | E-3 | C-1 | M-1 | H-1 | S-1 |
| Example 111 | Formulation 3 | Coloring agent solution 10 | E-1 | C-2 | M-1 | H-3 | S-3 |
| Example 112 | Formulation 1 | Dispersion liquid 102 | E-3 | C-1 | M-2 | H-1 | S-1 |
| Example 113 | Formulation 1 | Dispersion liquid 103 | E-1 | C-1 | M-1 | H-1 | S-1 |

TABLE 11-continued

| | Formulation | Dispersion liquid or coloring agent solution | Resin | Photopolymerization initiator | Polymerizable compound | Surfactant | Solvent |
|---|---|---|---|---|---|---|---|
| Example 114 | Formulation 1 | Dispersion liquid 104 | E-1 | C-2 | M-2/M-3 = 1/3 (mass ratio) | H-1 | S-1 |
| Example 115 | Formulation 1 | Dispersion liquid 105 | E-1 | C-1 | M-1 | H-2 | S-1 |

TABLE 12

| | Formulation | Dispersion liquid or coloring agent solution | Resin | Photopolymerization initiator | Polymerizable compound | Surfactant | Solvent |
|---|---|---|---|---|---|---|---|
| Example 116 | Formulation 1 | Dispersion liquid 106 | E-1 | C-1 | M-1 | H-1 | S-1 |
| Example 117 | Formulation 1 | Dispersion liquid 107 | E-3 | C-1 | M-1 | H-2 | S-1 |
| Example 118 | Formulation 1 | Dispersion liquid 108 | E-1/E-2 = 2/1 (mass ratio) | C-2 | M-3 | H-1 | S-1 |
| Example 119 | Formulation 1 | Dispersion liquid 109 | E-1 | C-1 | M-1 | H-1 | S-2 |
| Example 120 | Formulation 1 | Dispersion liquid 110 | E-1/E-3 = 1/2 (mass ratio) | C-3 | M-1 | H-1 | S-1/S-2 = 1/3 (mass ratio) |
| Example 121 | Formulation 1 | Dispersion liquid 111 | E-3 | C-1 | M-1 | H-3 | S-1 |
| Example 122 | Formulation 1 | Dispersion liquid 112 | E-1 | C-1 | M-3 | H-1 | S-2 |
| Example 123 | Formulation 1 | Dispersion liquid 113 | E-1 | C-3 | M-1 | H-1 | S-1 |
| Example 124 | Formulation 1 | Dispersion liquid 114 | E-2/E-3 = 1/3 (mass ratio) | C-1 | M-1 | H-1 | S-1/S-2 = 3/1 (mass ratio) |
| Example 125 | Formulation 1 | Dispersion liquid 115 | E-1 | C-2 | M-1 | H-1 | S-1 |
| Example 126 | Formulation 1 | Dispersion liquid 116 | E-3 | C-1 | M-1/M-3 = 2/1 (mass ratio) | H-3 | S-1 |
| Example 127 | Formulation 1 | Dispersion liquid 117 | E-1 | C-2 | M-3 | H-1 | S-1 |
| Example 128 | Formulation 1 | Dispersion liquid 118 | E-1 | C-1 | M-1 | H-1 | S-1 |
| Example 129 | Formulation 1 | Dispersion liquid 119 | E-1/E-2 = 1/2 (mass ratio) | C-3 | M-1 | H-1 | S-1 |
| Example 130 | Formulation 1 | Dispersion liquid 120 | E-1 | C-1 | M-1 | H-1 | S-1/S-2 = 2/1 (mass ratio) |
| Example 131 | Formulation 1 | Dispersion liquid 121 | E-1/E-2 = 2/1 (mass ratio) | C-1 | M-1/M-2 = 1/1 (mass ratio) | H-1/ H-2 = 1/1 (mass ratio) | S-1 |
| Example 132 | Formulation 1 | Dispersion liquid 122 | E-3 | C-1/C-2 = 1/1 (mass ratio) | M-2 | H-3 | S-1 |
| Example 133 | Formulation 1 | Dispersion liquid 123 | E-1/E-2 = 1/1 (mass ratio) | C-1 | M-1 | H-1 | S-1 |
| Example 134 | Formulation 3 | Coloring agent solution 11 | E-1 | C-1 | M-2 | H-1 | S-3 |
| Example 135 | Formulation 3 | Coloring agent solution 12 | E-1 | C-1 | M-1 | H-1 | S-3 |
| Example 136 | Formulation 3 | Coloring agent solution 13 | E-3 | C-1 | M-1 | H-3 | S-4 |
| Example 137 | Formulation 3 | Coloring agent solution 14 | E-1 | C-3 | M-3 | H-1 | S-4 |
| Example 138 | Formulation 3 | Coloring agent solution 15 | E-3 | C-1 | M-2 | H-1 | S-4 |
| Example 139 | Formulation 3 | Coloring agent solution 16 | E-1 | C-1 | M-1 | H-1 | S-4 |
| Comparative Example 1 | Formulation 1 | Comparative dispersion liquid 1 | E-1 | C-1 | M-1 | H-1 | S-1 |
| Comparative Example 2 | Formulation 1 | Comparative dispersion liquid 2 | E-1 | C-1 | M-1 | H-1 | S-1 |
| Comparative Example 3 | Formulation 3 | Comparative coloring agent solution 1 | E-1 | C-1 | M-1 | H-1 | S-3 |

TABLE 13

| | Formulation | Dispersion liquid or coloring agent solution | Resin | Epoxy compound | Curing agent | Surfactant | Solvent |
|---|---|---|---|---|---|---|---|
| Example 401 | Formulation 2 | Dispersion liquid 1 | E-3 | F-1 | — | H-1 | S-1 |
| Example 402 | Formulation 2 | Dispersion liquid 2 | E-1 | F-1 | — | H-2 | S-1 |

TABLE 13-continued

| | Formulation | Dispersion liquid or coloring agent solution | Resin | Epoxy compound | Curing agent | Surfactant | Solvent |
|---|---|---|---|---|---|---|---|
| Example 403 | Formulation 2 | Dispersion liquid 3 | E-1/E-2 = 2/1 (mass ratio) | F-1 | — | H-1 | S-1 |
| Example 404 | Formulation 2 | Dispersion liquid 4 | E-1/E-2 = 1/1 (mass ratio) | F-1 | — | H-1 | S-1 |
| Example 405 | Formulation 2 | Dispersion liquid 5 | E-1 | F-1 | — | H-1 | S-1 |
| Example 406 | Formulation 2 | Dispersion liquid 6 | E-1 | F-2 | — | H-1 | S-1/S-2 = 1/1 (mass ratio) |
| Example 407 | Formulation 2 | Dispersion liquid 7 | E-3 | F-1 | — | H-1 | S-1 |
| Example 408 | Formulation 2 | Dispersion liquid 8 | E-1/E-3 = 1/2 (mass ratio) | F-1 | — | H-3 | S-2 |
| Example 409 | Formulation 2 | Dispersion liquid 9 | E-1 | F-1 | — | H-1 | S-1 |
| Example 410 | Formulation 2 | Dispersion liquid 10 | E-3 | F-1 | — | H-1 | S-1 |
| Example 411 | Formulation 2 | Dispersion liquid 11 | E-2/E-3 = 1/3 (mass ratio) | F-2 | — | H-1 | S-2 |
| Example 412 | Formulation 2 | Dispersion liquid 12 | E-1 | F-1 | — | H-1 | S-1 |
| Example 413 | Formulation 2 | Dispersion liquid 13 | E-3 | F-2 | — | H-3 | S-1 |
| Example 414 | Formulation 2 | Dispersion liquid 14 | E-1 | F-1 | — | H-2 | S-1 |
| Example 415 | Formulation 2 | Dispersion liquid 15 | E-3 | F-1 | G-3 | H-1 | S-1 |
| Example 416 | Formulation 2 | Dispersion liquid 16 | E-1/E-2 = 1/2 (mass ratio) | F-1 | — | H-1 | S-1/S-2 = 1/3 (mass ratio) |
| Example 417 | Formulation 2 | Dispersion liquid 17 | E-3 | F-2 | — | H-3 | S-1 |
| Example 418 | Formulation 2 | Dispersion liquid 18 | E-1 | F-1 | — | H-1 | S-1 |
| Example 419 | Formulation 2 | Dispersion liquid 19 | E-3 | F-2 | — | H-3 | S-1 |
| Example 420 | Formulation 2 | Dispersion liquid 20 | E-2 | F-1 | — | H-1 | S-1 |
| Example 421 | Formulation 2 | Dispersion liquid 21 | E-1 | F-1 | — | H-1 | S-1/S-2 = 1/4 (mass ratio) |
| Example 422 | Formulation 2 | Dispersion liquid 22 | E-1 | F-1 | — | H-1/H-2 = 1/1 (mass ratio) | S-1 |
| Example 423 | Formulation 2 | Dispersion liquid 23 | E-3 | F-2 | — | H-3 | S-1 |
| Example 424 | Formulation 2 | Dispersion liquid 24 | E-1 | F-2 | — | H-1 | S-1 |
| Example 425 | Formulation 2 | Dispersion liquid 25 | E-1 | F-1 | G-1 | H-1 | S-1 |
| Example 426 | Formulation 2 | Dispersion liquid 26 | E-1 | F-4 | — | H-1 | S-1 |
| Example 427 | Formulation 2 | Dispersion liquid 27 | E-2/E-3 = 2/1 (mass ratio) | F-1 | — | H-1 | S-1 |
| Example 428 | Formulation 2 | Dispersion liquid 28 | E-1 | F-1 | — | H-1 | S-1 |
| Example 429 | Formulation 2 | Dispersion liquid 29 | E-1 | F-1 | — | H-1 | S-1 |
| Example 430 | Formulation 2 | Dispersion liquid 30 | E-2 | F-1 | — | H-2 | S-1 |
| Example 431 | Formulation 2 | Dispersion liquid 31 | E-1 | F-1 | — | H-1 | S-1 |
| Example 432 | Formulation 2 | Dispersion liquid 32 | E-1 | F-1 | G-2 | H-1 | S-1 |
| Example 433 | Formulation 2 | Dispersion liquid 33 | E-1 | F-1 | — | H-3 | S-1 |
| Example 434 | Formulation 2 | Dispersion liquid 34 | E-1 | F-1 | — | H-1 | S-1 |
| Example 435 | Formulation 2 | Dispersion liquid 35 | E-1 | F-4 | — | H-1 | S-1 |
| Example 436 | Formulation 2 | Dispersion liquid 36 | E-1 | F-1 | — | H-3 | S-1 |
| Example 437 | Formulation 2 | Dispersion liquid 37 | E-1 | F-3 | — | H-1 | S-1 |
| Example 438 | Formulation 2 | Dispersion liquid 38 | E-1 | F-1 | — | H-1 | S-1 |
| Example 439 | Formulation 2 | Dispersion liquid 39 | E-1 | F-1 | — | H-1 | S-1 |
| Example 440 | Formulation 2 | Dispersion liquid 40 | E-2 | F-1 | — | H-1 | S-1 |

TABLE 14

| | Formulation | Dispersion liquid or coloring agent solution | Resin | Epoxy compound | Curing agent | Surfactant | Solvent |
|---|---|---|---|---|---|---|---|
| Example 441 | Formulation 2 | Dispersion liquid 41 | E-1 | F-3 | — | H-1 | S-1 |
| Example 442 | Formulation 2 | Dispersion liquid 42 | E-1 | F-1 | — | H-3 | S-1 |
| Example 443 | Formulation 2 | Dispersion liquid 43 | E-1 | F-1 | G4 | H-1 | S-1 |
| Example 444 | Formulation 2 | Dispersion liquid 44 | E-1 | F-1 | — | H-1 | S-1 |
| Example 445 | Formulation 2 | Dispersion liquid 45 | E-2 | F-1 | — | H-3 | S-1 |
| Example 446 | Formulation 2 | Dispersion liquid 46 | E-1 | F-1 | — | H-1 | S-1 |
| Example 447 | Formulation 2 | Dispersion liquid 47 | E-1 | F-1 | — | H-1 | S-1 |
| Example 448 | Formulation 2 | Dispersion liquid 48 | E-1 | F-3 | — | H-1/H-3 = 1/1 (mass ratio) | S-1 |
| Example 449 | Formulation 4 | Coloring agent solution 1 | E-1 | F-1 | — | H-1 | S-3 |
| Example 450 | Formulation 4 | Coloring agent solution 2 | E-1 | F-1 | — | H-3 | S-3 |
| Example 451 | Formulation 4 | Coloring agent solution 3 | E-1 | F-1 | — | H-1 | S-3 |
| Example 452 | Formulation 4 | Coloring agent solution 4 | E-1 | F-1 | — | H-3 | S-4 |
| Example 453 | Formulation 4 | Coloring agent solution 5 | E-1 | F-4 | — | H-1 | S-3 |
| Example 454 | Formulation 4 | Coloring agent solution 6 | E-1 | F-1 | — | H-3 | S-3 |
| Example 455 | Formulation 4 | Coloring agent solution 7 | E-1 | F-1 | — | H-3 | S-4 |
| Example 456 | Formulation 4 | Coloring agent solution 8 | E-1 | F-3 | — | H-1 | S-3 |
| Example 457 | Formulation 4 | Coloring agent solution 9 | E-1 | F-1 | — | H-2/H-3 = 1/1 (mass ratio) | S-3 |
| Example 458 | Formulation 2 | Dispersion liquid 49 | E-3 | F-2 | — | H-3 | S-1 |
| Example 459 | Formulation 2 | Dispersion liquid 50 | E-3 | F-2 | — | H-3 | S-1 |
| Example 460 | Formulation 2 | Dispersion liquid 51 | E-3 | F-2 | — | H-3 | S-1 |
| Example 461 | Formulation 2 | Dispersion liquid 52 | E-3 | F-2 | — | H-3 | S-1 |
| Example 462 | Formulation 2 | Dispersion liquid 53 | E-1 | F-3 | — | H-1 | S-1 |
| Example 463 | Formulation 2 | Dispersion liquid 54 | E-3 | F-2 | — | H-3 | S-1 |
| Example 464 | Formulation 2 | Dispersion liquid 55 | E-1 | F-1 | — | H-1/H-2 = 2/1 (mass ratio) | S-1 |
| Example 465 | Formulation 2 | Dispersion liquid 56 | E-3 | F-2 | — | H-3 | S-1 |
| Example 466 | Formulation 2 | Dispersion liquid 57 | E-2/E-3 = 1/3 (mass ratio) | F-1 | — | H-1 | S-1 |
| Example 467 | Formulation 2 | Dispersion liquid 58 | E-3 | F-2 | — | H-3 | S-1 |
| Example 468 | Formulation 2 | Dispersion liquid 59 | E-3 | F-2 | — | H-3 | S-1 |
| Example 469 | Formulation 2 | Dispersion liquid 60 | E-3 | F-2 | — | H-3 | S-1 |
| Example 470 | Formulation 2 | Dispersion liquid 61 | E-3 | F-2 | — | H-3 | S-1 |
| Example 471 | Formulation 2 | Dispersion liquid 62 | E-3 | F-2 | — | H-3 | S-1 |
| Example 472 | Formulation 2 | Dispersion liquid 63 | E-3 | F-2 | — | H-3 | S-1 |
| Example 473 | Formulation 2 | Dispersion liquid 64 | E-3 | F-2 | — | H-3 | S-1 |
| Example 474 | Formulation 2 | Dispersion liquid 65 | E-3 | F-2 | — | H-3 | S-1 |
| Example 475 | Formulation 2 | Dispersion liquid 66 | E-3 | F-2 | — | H-3 | S-1 |
| Example 476 | Formulation 2 | Dispersion liquid 67 | E-3 | F-2 | — | H-3 | S-1 |
| Example 477 | Formulation 2 | Dispersion liquid 68 | E-3 | F-2 | — | H-3 | S-1 |
| Example 478 | Formulation 2 | Dispersion liquid 69 | E-3 | F-2 | — | H-3 | S-1 |
| Example 479 | Formulation 2 | Dispersion liquid 70 | E-3 | F-2 | — | H-3 | S-1 |
| Example 480 | Formulation 2 | Dispersion liquid 71 | E-3 | F-2 | — | H-3 | S-1 |

TABLE 15

| | Formulation | Dispersion liquid or coloring agent solution | Resin | Epoxy compound | Curing agent | Surfactant | Solvent |
|---|---|---|---|---|---|---|---|
| Example 481 | Formulation 2 | Dispersion liquid 72 | E-3 | F-2 | — | H-3 | S-1 |
| Example 482 | Formulation 2 | Dispersion liquid 73 | E-3 | F-2 | — | H-3 | S-1 |
| Example 483 | Formulation 2 | Dispersion liquid 74 | E-3 | F-2 | — | H-3 | S-1 |
| Example 484 | Formulation 2 | Dispersion liquid 75 | E-3 | F-2 | — | H-3 | S-1 |
| Example 485 | Formulation 2 | Dispersion liquid 76 | E-1 | F-4 | — | H-1 | S-1 |
| Example 486 | Formulation 2 | Dispersion liquid 77 | E-3 | F-2 | — | H-3 | S-1 |
| Example 487 | Formulation 2 | Dispersion liquid 78 | E-1 | F-1 | — | H-1 | S-1 |
| Example 488 | Formulation 2 | Dispersion liquid 79 | E-2/E-3 = 1/4 (mass ratio) | F-1 | — | H-1 | S-1 |
| Example 489 | Formulation 2 | Dispersion liquid 80 | E-1 | F-4 | — | H-2/H-3 = 1/1 (mass ratio) | S-1 |
| Example 490 | Formulation 2 | Dispersion liquid 81 | E-1 | F-3 | — | H-1 | S-1 |
| Example 491 | Formulation 2 | Dispersion liquid 82 | E-1 | F-1 | — | H-1/H-3 = 1/4 (mass ratio) | S-1 |
| Example 492 | Formulation 2 | Dispersion liquid 83 | E-1/E-3 = 1/2 (mass ratio) | F-1 | — | H-1 | S-1 |

TABLE 15-continued

| | Formulation | Dispersion liquid or coloring agent solution | Resin | Epoxy compound | Curing agent | Surfactant | Solvent |
|---|---|---|---|---|---|---|---|
| Example 493 | Formulation 2 | Dispersion liquid 84 | E-3 | F-2 | — | H-3 | S-1 |
| Example 494 | Formulation 2 | Dispersion liquid 85 | E-3 | F-2 | — | H-3 | S-1 |
| Example 495 | Formulation 2 | Dispersion liquid 86 | E-3 | F-2 | — | H-3 | S-1 |
| Example 496 | Formulation 2 | Dispersion liquid 87 | E-3 | F-2 | — | H-3 | S-1 |
| Example 497 | Formulation 2 | Dispersion liquid 88 | E-3 | F-2 | — | H-3 | S-1 |
| Example 498 | Formulation 2 | Dispersion liquid 89 | E-3 | F-2 | — | H-3 | S-1 |
| Example 499 | Formulation 2 | Dispersion liquid 90 | E-3 | F-2 | — | H-3 | S-1 |
| Example 500 | Formulation 2 | Dispersion liquid 91 | E-3 | F-2 | — | H-3 | S-1 |
| Example 501 | Formulation 2 | Dispersion liquid 92 | E-3 | F-2 | — | H-3 | S-1 |
| Example 502 | Formulation 2 | Dispersion liquid 93 | E-3 | F-2 | — | H-3 | S-1 |
| Example 503 | Formulation 2 | Dispersion liquid 94 | E-3 | F-2 | — | H-3 | S-1 |
| Example 504 | Formulation 2 | Dispersion liquid 95 | E-3 | F-1 | — | H-1 | S-1 |
| Example 505 | Formulation 2 | Dispersion liquid 96 | E-2 | F-2 | — | H-3 | S-1 |
| Example 506 | Formulation 2 | Dispersion liquid 97 | E-1 | F-4 | — | H-1 | S-1 |
| Example 507 | Formulation 2 | Dispersion liquid 98 | E-2 | F-2 | — | H-3 | S-1 |
| Example 508 | Formulation 2 | Dispersion liquid 99 | E-3 | F-2 | — | H-1 | S-1 |
| Example 509 | Formulation 2 | Dispersion liquid 100 | E-1 | F-3 | — | H-3 | S-1 |
| Example 510 | Formulation 2 | Dispersion liquid 101 | E-3 | F-1 | — | H-3 | S-1 |
| Example 511 | Formulation 4 | Coloring agent solution 10 | E-3 | F-2 | — | H-3 | S-3 |
| Example 512 | Formulation 2 | Dispersion liquid 102 | E-3 | F-1 | — | H-1 | S-1 |
| Example 513 | Formulation 2 | Dispersion liquid 103 | E-1 | F-1 | — | H-1 | S-1 |
| Example 514 | Formulation 2 | Dispersion liquid 104 | E-1 | F-2 | — | H-1 | S-1 |
| Example 515 | Formulation 2 | Dispersion liquid 105 | E-1 | F-4 | — | H-2 | S-1 |
| Example 516 | Formulation 2 | Dispersion liquid 106 | E-1 | F-1 | — | H-1 | S-1 |
| Example 517 | Formulation 2 | Dispersion liquid 107 | E-3 | F-1 | G-4 | H-2 | S-1 |
| Example 518 | Formulation 2 | Dispersion liquid 108 | E-1/E-2 = 2/1 (mass ratio) | F-1 | — | H-1 | S-1 |
| Example 519 | Formulation 2 | Dispersion liquid 109 | E-1 | F-2 | — | H-1 | S-2 |
| Example 520 | Formulation 2 | Dispersion liquid 110 | E-1/E-3 = 1/2 (mass ratio) | F-1 | — | H-1 | S-1/S-2 = 1/3 (mass ratio) |

TABLE 16

| | Formulation | Dispersion liquid or coloring agent solution | Resin | Epoxy compound | Curing agent | Surfactant | Solvent |
|---|---|---|---|---|---|---|---|
| Example 521 | Formulation 2 | Dispersion liquid 111 | E-3 | F-1 | — | H-3 | S-1 |
| Example 522 | Formulation 2 | Dispersion liquid 112 | E-1 | F-3 | — | H-1 | S-2 |
| Example 523 | Formulation 2 | Dispersion liquid 113 | E-1 | F-1 | G-3 | H-1 | S-1 |
| Example 524 | Formulation 2 | Dispersion liquid 114 | E-2/E-3 = 1/3 (mass ratio) | F-2 | — | H-1 | S-1/S-2 = 3/1 (mass ratio) |
| Example 525 | Formulation 2 | Dispersion liquid 115 | E-1 | F-1 | — | H-1 | S-1 |
| Example 526 | Formulation 2 | Dispersion liquid 116 | E-3 | F-2 | — | H-3 | S-1 |
| Example 527 | Formulation 2 | Dispersion liquid 117 | E-1 | F-1 | — | H-1 | S-1 |
| Example 528 | Formulation 2 | Dispersion liquid 118 | E-1 | F-1 | G-2 | H-1 | S-1 |
| Example 529 | Formulation 2 | Dispersion liquid 119 | E-1/E-2 = 1/2 (mass ratio) | F-2 | — | H-1 | S-1 |

TABLE 16-continued

| | Formulation | Dispersion liquid or coloring agent solution | Resin | Epoxy compound | Curing agent | Surfactant | Solvent |
|---|---|---|---|---|---|---|---|
| Example 530 | Formulation 2 | Dispersion liquid 120 | E-1 | F-3 | — | H-1 | S-1/S-2 = 2/1 (mass ratio) |
| Example 531 | Formulation 2 | Dispersion liquid 121 | E-1/E-2 = 2/1 (mass ratio) | F-1 | — | H-1/H-2 = 1/1 (mass ratio) | S-1 |
| Example 532 | Formulation 2 | Dispersion liquid 122 | E-3 | F-1 | — | H-3 | S-1 |
| Example 533 | Formulation 2 | Dispersion liquid 123 | E-1/E-2 = 1/1 (mass ratio) | F-1 | — | H-1 | S-1 |
| Example 534 | Formulation 4 | Coloring agent solution 11 | E-1 | F-1 | G-1 | H-1 | S-3 |
| Example 535 | Formulation 4 | Coloring agent solution 12 | E-1 | F-1 | — | H-1 | S-3 |
| Example 536 | Formulation 4 | Coloring agent solution 13 | E-3 | F-2 | — | H-3 | S-4 |
| Example 537 | Formulation 4 | Coloring agent solution 14 | E-1 | F-4 | — | H-1 | S-4 |
| Example 538 | Formulation 4 | Coloring agent solution 15 | E-3 | F-1 | — | H-1 | S-4 |
| Example 539 | Formulation 4 | Coloring agent solution 16 | E-1 | F-1 | — | H-1 | S-4 |
| Comparative Example 201 | Formulation 2 | Comparative dispersion liquid 1 | E-2 | F-1 | — | H-1 | S-1 |
| Comparative Example 202 | Formulation 2 | Comparative dispersion liquid 2 | E-3 | F-1 | — | H-1 | S-1 |
| Comparative Example 203 | Formulation 4 | Comparative coloring agent solution 1 | E-4 | F-1 | — | H-1 | S-3 |

TABLE 17

| | Formulation | Dispersion liquid or coloring agent solution | Ultraviolet absorber | Surfactant | Solvent |
|---|---|---|---|---|---|
| Example 701 | Formulation 5 | Dispersion liquid 1 | U-1 | H-1 | S-1 |
| Example 702 | Formulation 5 | Dispersion liquid 2 | U-1 | H-2 | S-1 |
| Example 703 | Formulation 5 | Dispersion liquid 3 | U-2 | H-1 | S-1 |
| Example 704 | Formulation 5 | Dispersion liquid 4 | U-1 | H-1 | S-1 |
| Example 705 | Formulation 5 | Dispersion liquid 5 | U-1/U-2 = 1/1 (mass ratio) | H-1 | S-1 |
| Example 706 | Formulation 5 | Dispersion liquid 6 | U-1 | H-1 | S-1/S-2 = 1/1 (mass ratio) |
| Example 707 | Formulation 5 | Dispersion liquid 7 | U-1 | H-1 | S-1 |
| Example 708 | Formulation 5 | Dispersion liquid 8 | U-1 | H-3 | S-2 |
| Example 709 | Formulation 5 | Dispersion liquid 9 | U-2 | H-1 | S-1 |
| Example 710 | Formulation 5 | Dispersion liquid 10 | U-1 | H-1 | S-1 |
| Example 711 | Formulation 5 | Dispersion liquid 11 | U-3 | H-1 | S-2 |
| Example 712 | Formulation 5 | Dispersion liquid 12 | U-1 | H-1 | S-1 |
| Example 713 | Formulation 5 | Dispersion liquid 13 | U-1 | H-3 | S-1 |
| Example 714 | Formulation 5 | Dispersion liquid 14 | U-1 | H-2 | S-1 |
| Example 715 | Formulation 5 | Dispersion liquid 15 | U-1/U-2 = 3/1 (mass ratio) | H-1 | S-1 |
| Example 716 | Formulation 5 | Dispersion liquid 16 | U-1 | H-1 | S-1/S-2 = 1/3 (mass ratio) |
| Example 717 | Formulation 5 | Dispersion liquid 17 | U-1 | H-3 | S-1 |
| Example 718 | Formulation 5 | Dispersion liquid 18 | U-3 | H-1 | S-1 |
| Example 719 | Formulation 5 | Dispersion liquid 19 | U-1 | H-3 | S-1 |
| Example 720 | Formulation 5 | Dispersion liquid 20 | U-1 | H-1 | S-1 |
| Example 721 | Formulation 5 | Dispersion liquid 21 | U-1 | H-1 | S-1/S-2 = 1/4 (mass ratio) |
| Example 722 | Formulation 5 | Dispersion liquid 22 | U-1 | H-1/H-2 = 1/1 (mass ratio) | S-1 |
| Example 723 | Formulation 5 | Dispersion liquid 23 | U-1 | H-3 | S-1 |
| Example 724 | Formulation 5 | Dispersion liquid 24 | U-1 | H-1 | S-1 |
| Example 725 | Formulation 5 | Dispersion liquid 25 | U-1 | H-1 | S-1 |
| Example 726 | Formulation 5 | Dispersion liquid 26 | U-1 | H-1 | S-1 |
| Example 727 | Formulation 5 | Dispersion liquid 27 | U-1/U-3 = 2/1 (mass ratio) | H-1 | S-1 |
| Example 728 | Formulation 5 | Dispersion liquid 28 | U-1 | H-1 | S-1 |
| Example 729 | Formulation 5 | Dispersion liquid 29 | U-1 | H-1 | S-1 |
| Example 730 | Formulation 5 | Dispersion liquid 30 | U-3 | H-2 | S-1 |
| Example 731 | Formulation 5 | Dispersion liquid 31 | U-3 | H-1 | S-1 |
| Example 732 | Formulation 5 | Dispersion liquid 32 | U-1 | H-1 | S-1 |
| Example 733 | Formulation 5 | Dispersion liquid 33 | U-1 | H-3 | S-1 |
| Example 734 | Formulation 5 | Dispersion liquid 34 | U-1 | H-1 | S-1 |
| Example 735 | Formulation 5 | Dispersion liquid 35 | U-2 | H-1 | S-1 |

TABLE 18

| | Formulation | Dispersion liquid or coloring agent solution | Ultraviolet absorber | Surfactant | Solvent |
|---|---|---|---|---|---|
| Example 736 | Formulation 5 | Dispersion liquid 36 | U-1 | H-3 | S-1 |
| Example 737 | Formulation 5 | Dispersion liquid 37 | U-1 | H-1 | S-1 |
| Example 738 | Formulation 5 | Dispersion liquid 38 | U-2 | H-1 | S-1 |
| Example 739 | Formulation 5 | Dispersion liquid 39 | U-1 | H-1 | S-1 |
| Example 740 | Formulation 5 | Dispersion liquid 40 | U-3 | H-1 | S-1 |
| Example 741 | Formulation 5 | Dispersion liquid 41 | U-1 | H-1 | S-1 |
| Example 742 | Formulation 5 | Dispersion liquid 42 | U-1 | H-3 | S-1 |
| Example 743 | Formulation 5 | Dispersion liquid 43 | U-3 | H-1 | S-1 |
| Example 744 | Formulation 5 | Dispersion liquid 44 | U-2 | H-1 | S-1 |
| Example 745 | Formulation 5 | Dispersion liquid 45 | U-1 | H-3 | S-1 |
| Example 746 | Formulation 5 | Dispersion liquid 46 | U-2 | H-1 | S-1 |
| Example 747 | Formulation 5 | Dispersion liquid 47 | U-1 | H-1 | S-1 |
| Example 748 | Formulation 5 | Dispersion liquid 48 | U-2 | H-1/H-3 = 1/1 (mass ratio) | S-1 |
| Example 749 | Formulation 6 | Coloring agent solution 1 | U-2/U-3 = 1/1 (mass ratio) | H-1 | S-3 |
| Example 750 | Formulation 6 | Coloring agent solution 2 | U-3 | H-3 | S-3 |
| Example 751 | Formulation 6 | Coloring agent solution 3 | U-2 | H-1 | S-3 |
| Example 752 | Formulation 6 | Coloring agent solution 4 | U-1 | H-3 | S-4 |
| Example 753 | Formulation 6 | Coloring agent solution 5 | U-1 | H-1 | S-3 |
| Example 754 | Formulation 6 | Coloring agent solution 6 | U-2 | H-3 | S-3 |
| Example 755 | Formulation 6 | Coloring agent solution 7 | U-1 | H-3 | S-4 |
| Example 756 | Formulation 6 | Coloring agent solution 8 | U-1 | H-1 | S-3 |
| Example 757 | Formulation 6 | Coloring agent solution 9 | U-1 | H-2/H-3 = 1/1 (mass ratio) | S-3 |
| Example 758 | Formulation 5 | Dispersion liquid 49 | U-1 | H-3 | S-1 |
| Example 759 | Formulation 5 | Dispersion liquid 50 | U-1 | H-3 | S-1 |
| Example 760 | Formulation 5 | Dispersion liquid 51 | U-1 | H-3 | S-1 |
| Example 761 | Formulation 5 | Dispersion liquid 52 | U-1 | H-3 | S-1 |
| Example 762 | Formulation 5 | Dispersion liquid 53 | U-3 | H-1 | S-1 |
| Example 763 | Formulation 5 | Dispersion liquid 54 | U-1 | H-3 | S-1 |
| Example 764 | Formulation 5 | Dispersion liquid 55 | U-2 | H-1/H-2 = 2/1 (mass ratio) | S-1 |
| Example 765 | Formulation 5 | Dispersion liquid 56 | U-1 | H-3 | S-1 |
| Example 766 | Formulation 5 | Dispersion liquid 57 | U-1 | H-1 | S-1 |
| Example 767 | Formulation 5 | Dispersion liquid 58 | U-1 | H-3 | S-1 |
| Example 768 | Formulation 5 | Dispersion liquid 59 | U-1 | H-3 | S-1 |
| Example 769 | Formulation 5 | Dispersion liquid 60 | U-1 | H-3 | S-1 |
| Example 770 | Formulation 5 | Dispersion liquid 61 | U-1 | H-3 | S-1 |

TABLE 19

| | Formulation | Dispersion liquid or coloring agent solution | Ultraviolet absorber | Surfactant | Solvent |
|---|---|---|---|---|---|
| Example 771 | Formulation 5 | Dispersion liquid 62 | U-1 | H-3 | S-1 |
| Example 772 | Formulation 5 | Dispersion liquid 63 | U-1 | H-3 | S-1 |
| Example 773 | Formulation 5 | Dispersion liquid 64 | U-1 | H-3 | S-1 |
| Example 774 | Formulation 5 | Dispersion liquid 65 | U-1 | H-3 | S-1 |
| Example 775 | Formulation 5 | Dispersion liquid 66 | U-1 | H-3 | S-1 |
| Example 776 | Formulation 5 | Dispersion liquid 67 | U-1 | H-3 | S-1 |
| Example 777 | Formulation 5 | Dispersion liquid 68 | U-1 | H-3 | S-1 |
| Example 778 | Formulation 5 | Dispersion liquid 69 | U-1 | H-3 | S-1 |
| Example 779 | Formulation 5 | Dispersion liquid 70 | U-1 | H-3 | S-1 |
| Example 780 | Formulation 5 | Dispersion liquid 71 | U-1 | H-3 | S-1 |
| Example 781 | Formulation 5 | Dispersion liquid 72 | U-1 | H-3 | S-1 |
| Example 782 | Formulation 5 | Dispersion liquid 73 | U-1 | H-3 | S-1 |
| Example 783 | Formulation 5 | Dispersion liquid 74 | U-1 | H-3 | S-1 |
| Example 784 | Formulation 5 | Dispersion liquid 75 | U-1 | H-3 | S-1 |
| Example 785 | Formulation 5 | Dispersion liquid 76 | U-3 | H-1 | S-1 |
| Example 786 | Formulation 5 | Dispersion liquid 77 | U-1 | H-3 | S-1 |
| Example 787 | Formulation 5 | Dispersion liquid 78 | U-1 | H-1 | S-1 |
| Example 788 | Formulation 5 | Dispersion liquid 79 | U-1 | H-1 | S-1 |
| Example 789 | Formulation 5 | Dispersion liquid 80 | U-2 | H-2/H-3 = 1/1 (mass ratio) | S-1 |
| Example 790 | Formulation 5 | Dispersion liquid 81 | U-2 | H-1 | S-1 |
| Example 791 | Formulation 5 | Dispersion liquid 82 | U-1 | H-1/H-3 = 1/4 (mass ratio) | S-1 |
| Example 792 | Formulation 5 | Dispersion liquid 83 | U-3 | H-1 | S-1 |
| Example 793 | Formulation 5 | Dispersion liquid 84 | U-1 | H-3 | S-1 |
| Example 794 | Formulation 5 | Dispersion liquid 85 | U-1 | H-3 | S-1 |
| Example 795 | Formulation 5 | Dispersion liquid 86 | U-1 | H-3 | S-1 |
| Example 796 | Formulation 5 | Dispersion liquid 87 | U-1 | H-3 | S-1 |
| Example 797 | Formulation 5 | Dispersion liquid 88 | U-1 | H-3 | S-1 |

TABLE 19-continued

| | Formulation | Dispersion liquid or coloring agent solution | Ultraviolet absorber | Surfactant | Solvent |
|---|---|---|---|---|---|
| Example 798 | Formulation 5 | Dispersion liquid 89 | U-1 | H-3 | S-1 |
| Example 799 | Formulation 5 | Dispersion liquid 90 | U-1 | H-3 | S-1 |
| Example 800 | Formulation 5 | Dispersion liquid 91 | U-1 | H-3 | S-1 |
| Example 801 | Formulation 5 | Dispersion liquid 92 | U-1 | H-3 | S-1 |
| Example 802 | Formulation 5 | Dispersion liquid 93 | U-1 | H-3 | S-1 |
| Example 803 | Formulation 5 | Dispersion liquid 94 | U-1 | H-3 | S-1 |
| Example 804 | Formulation 5 | Dispersion liquid 95 | U-1 | H-3 | S-1 |
| Example 805 | Formulation 5 | Dispersion liquid 96 | U-3 | H-1 | S-1 |
| Example 806 | Formulation 5 | Dispersion liquid 97 | U-2 | H-3 | S-1 |
| Example 807 | Formulation 5 | Dispersion liquid 98 | U-1 | H-1 | S-1 |
| Example 808 | Formulation 5 | Dispersion liquid 99 | U-2 | H-3 | S-1 |
| Example 809 | Formulation 5 | Dispersion liquid 100 | U-3 | H-3 | S-1 |
| Example 810 | Formulation 5 | Dispersion liquid 101 | U-1 | H-1 | S-1 |
| Example 811 | Formulation 6 | Coloring agent solution 10 | U-1 | H-3 | S-3 |

TABLE 20

| | Formulation | Dispersion liquid or coloring agent solution | Ultraviolet absorber | Surfactant | Solvent |
|---|---|---|---|---|---|
| Example 812 | Formulation 5 | Dispersion liquid 102 | U-1 | H-1 | S-1 |
| Example 813 | Formulation 5 | Dispersion liquid 103 | U-1 | H-1 | S-1 |
| Example 814 | Formulation 5 | Dispersion liquid 104 | U-2 | H-1 | S-1 |
| Example 815 | Formulation 5 | Dispersion liquid 105 | U-1 | H-2 | S-1 |
| Example 816 | Formulation 5 | Dispersion liquid 106 | U-1 | H-1 | S-1 |
| Example 817 | Formulation 5 | Dispersion liquid 107 | U-1 | H-2 | S-1 |
| Example 818 | Formulation 5 | Dispersion liquid 108 | U-1/U-2 = 1/1 (mass ratio) | H-1 | S-1 |
| Example 819 | Formulation 5 | Dispersion liquid 109 | U-1 | H-1 | S-2 |
| Example 820 | Formulation 5 | Dispersion liquid 110 | U-1 | H-1 | S-1/S-2 = 1/3 (mass ratio) |
| Example 821 | Formulation 5 | Dispersion liquid 111 | U-3 | H-3 | S-1 |
| Example 822 | Formulation 5 | Dispersion liquid 112 | U-3 | H-1 | S-2 |
| Example 823 | Formulation 5 | Dispersion liquid 113 | U-1 | H-1 | S-1 |
| Example 824 | Formulation 5 | Dispersion liquid 114 | U-1/U-2 = 3/1 (mass ratio) | H-1 | S-1/S-2 = 3/1 (mass ratio) |
| Example 825 | Formulation 5 | Dispersion liquid 115 | U-1 | H-1 | S-1 |
| Example 826 | Formulation 5 | Dispersion liquid 116 | U-1 | H-3 | S-1 |
| Example 827 | Formulation 5 | Dispersion liquid 117 | U-2 | H-1 | S-1 |
| Example 828 | Formulation 5 | Dispersion liquid 118 | U-1 | H-1 | S-1 |
| Example 829 | Formulation 5 | Dispersion liquid 119 | U-1 | H-1 | S-1 |
| Example 830 | Formulation 5 | Dispersion liquid 120 | U-1 | H-1 | S-1/S-2 = 2/1 (mass ratio) |
| Example 831 | Formulation 5 | Dispersion liquid 121 | U-1 | H-1/H-2 = 1/1 (mass ratio) | S-1 |
| Example 832 | Formulation 5 | Dispersion liquid 122 | U-1 | H-3 | S-1 |
| Example 833 | Formulation 5 | Dispersion liquid 123 | U-1/U-3 = 2/1 (mass ratio) | H-1 | S-1 |
| Example 834 | Formulation 6 | Coloring agent solution 11 | U-3 | H-1 | S-3 |
| Example 835 | Formulation 6 | Coloring agent solution 12 | U-1 | H-1 | S-3 |
| Example 836 | Formulation 6 | Coloring agent solution 13 | U-3 | H-3 | S-4 |
| Example 837 | Formulation 6 | Coloring agent solution 14 | U-1 | H-1 | S-4 |
| Example 838 | Formulation 6 | Coloring agent solution 15 | U-2 | H-1 | S-4 |
| Example 839 | Formulation 6 | Coloring agent solution 16 | U-1 | H-1 | S-4 |

Among the materials listed in the above tables, details of the materials other than the dispersion liquid and the coloring agent solution are as follows.

(Resin)

E-1: copolymer resin of benzyl methacrylate, methacrylic acid, and 2-hydroxyethyl methacrylate (weight-average molecular weight: 14000, acid value: 77 mgKOH/g, alkali-soluble resin)

E-2: ARTON F4520 (manufactured by JSR Corporation, cyclic polyolefin resin)

E-3: resin having the following structure (weight-average molecular weight: 40000, acid value: 100 mgKOH/g; the numerical value described together with the main chain indicates a mass ratio of a repeating unit; alkali-soluble resin)

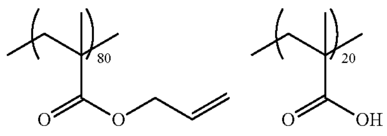

(Polymerizable Compound)

M-1: ARONIX M-305 (manufactured by TOAGOSEI CO., LTD.; mixture of pentaerythritol triacrylate and pentaerythritol tetraacrylate; content of the pentaerythritol triacrylate is 55% by mass to 63% by mass)

M-2: KAYARAD RP-1040 (manufactured by Nippon Kayaku Co., Ltd., ethylene oxide-modified pentaerythritol tetraacrylate)

M-3: ARONIX M-510 (manufactured by TOAGOSEI CO., LTD., polybasic acid-modified acrylic oligomer)

(Photopolymerization INITIATOR)

C-1: Irgacure OXE01 (manufactured by BASF SE, oxime ester-based initiator)

C-2: Irgacure OXE02 (manufactured by BASF SE, oxime ester-based initiator)

C-3: Omnirad 907 (manufactured by IGM Resins B.V, α-aminoalkylphenone-based initiator)

(Epoxy Compound)

F-1: glycidyl methacrylate-skeleton random polymer (manufactured by NOF Corporation, MARPROOF G-0150M, weight-average molecular weight: 10000)

F-2: EPICLON N-695 (manufactured by DIC Corporation, cresol novolac-type epoxy resin)

F-3: JER 1031S (manufactured by Mitsubishi Chemical Corporation, polyfunctional epoxy resin)

F-4: EHPE 3150 (manufactured by DAICEL-ALLNEX LTD., 1,2-epoxy-4-(2-oxiranyl)cyclohexane adduct of 2,2'-bis(hydroxymethyl)-1-butanol)

(Curing Agent)

G-1: trimellitic acid

G-2: pyromellitic acid anhydride

G-3: N,N-dimethyl-4-aminopyridine

G-4: pentaerythritol tetrakis(3-mercaptopropionate)

(Surfactant)

H-1: MEGAFACE RS-72-K (manufactured by DIC Corporation, fluorine-based surfactant)

H-2: compound having the following structure (weight-average molecular weight: 14000; a numerical value "%" representing the proportion of a repeating unit is mol %)

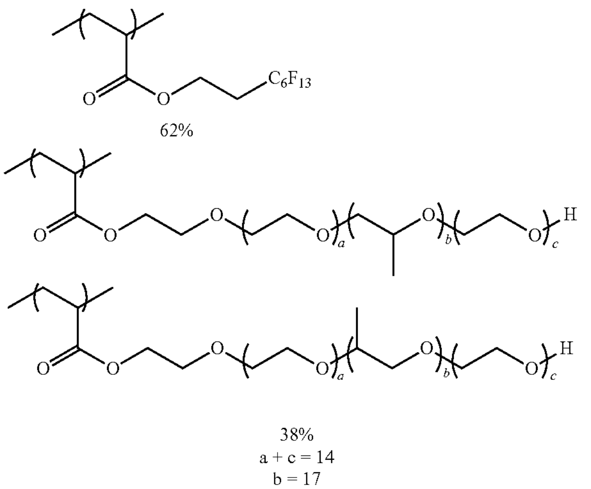

H-3: KF-6001 (manufactured by Shin-Etsu Chemical Co., Ltd., both-terminal carbinol-modified polydimethylsiloxane; hydroxyl value: 62 mgKOH/g)

(Ultraviolet Absorber)

U-1: Uvinul 3050 (manufactured by BASF SE, compound having the following structure)

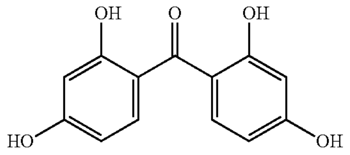 [SMILES: O=C(c1ccc(O)cc1O)c1ccc(O)cc1O]

U-2: Tinuvin 477 (manufactured by BASF SE, hydroxyphenyltriazine-based ultraviolet absorber)

U-3: Tinuvin 326 (manufactured by BASF SE, compound having the following structure)

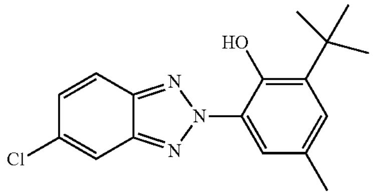 [SMILES: Cc1cc(-n2nc3ccc(Cl)cc3n2)c(O)c(C(C)(C)C)c1]

(Solvent)

S-1: propylene glycol monomethyl ether acetate

S-2: propylene glycol monomethyl ether

S-3: cyclopentanone

S-4: cyclohexanone

<Evaluation of Temporal Stability of Composition>

Immediately after the production, the composition was sealed in a light-shielded container, and after 3 days at 45° C., the liquid (inside the solution of the composition) was visually checked for foreign matter precipitation, and evaluated according to the following standard.

A: precipitation of foreign matter was not observed.

B: slight precipitation of foreign matter was observed, but there was no problem in practical use.

C: precipitation of foreign matter was observed, and there was a problem in practical use.

D: foreign matter was violently precipitated.

Production of Film

(Production Example 1) Method for Producing Film Using Compositions of Examples 1 to 139 and Comparative Examples 1 to 3

Each composition was applied onto a glass substrate by a spin coating method, and then heated at 100° C. for 2 minutes using a hot plate to obtain a composition layer. Using an i-ray stepper, the obtained composition layer was exposed to an exposure amount of 500 mJ/cm$^2$. Next, the composition layer after exposure was cured by heating the composition layer at 220° C. for 5 minutes using a hot plate to obtain a film having a thickness of 1.5 μm.

(Production Example 2) Method for Producing Film Using Compositions of Examples 401 to 539 and Comparative Examples 201 to 203

Each composition prepared above was applied onto a glass substrate by a spin coating method. Thereafter, the composition was heated (pre-baked) using a hot plate at 100° C. for 10 minutes, and then cured by heating at 200° C. for 8 minutes to form a film having a thickness of 1.5 μm.

(Production Example 3) Method for Producing Film Using Compositions of Examples 701 to 839

Each composition prepared above was applied onto a glass substrate by a spin coating method. Thereafter, the composition was heated (pre-baked) using a hot plate at 100° C. for 10 minutes, and then cured by heating at 200° C. for 8 minutes to form a film having a thickness of 8.0 μm.

<Evaluation of Defects>

The obtained film was observed for precipitation of foreign matter on a surface of the film with a bright visual field of 200 times using an optical microscope, and defects were evaluated according to the following standard.

A: precipitation of foreign matter was not observed.

B: slight precipitation of foreign matter was observed, but there was no problem in practical use.

C: precipitation of foreign matter was observed, and there was a problem in practical use.

D: foreign matter was violently precipitated.

TABLE 21

| | Defects | Temporal stability |
|---|---|---|
| Example 1 | A | A |
| Example 2 | B | B |
| Example 3 | B | A |
| Example 4 | B | B |
| Example 5 | B | A |
| Example 6 | A | B |
| Example 7 | A | B |
| Example 8 | A | A |
| Example 9 | A | A |
| Example 10 | A | A |
| Example 11 | A | B |
| Example 12 | A | A |
| Example 13 | A | A |
| Example 14 | A | A |
| Example 15 | A | A |
| Example 16 | A | A |
| Example 17 | A | A |
| Example 18 | A | A |
| Example 19 | A | A |
| Example 20 | A | A |
| Example 21 | A | A |
| Example 22 | A | A |
| Example 23 | A | A |
| Example 24 | A | A |
| Example 25 | A | A |
| Example 26 | B | B |
| Example 27 | B | A |
| Example 28 | B | B |
| Example 29 | B | A |
| Example 30 | A | B |
| Example 31 | A | B |
| Example 32 | A | A |
| Example 33 | A | A |
| Example 34 | A | A |
| Example 35 | A | B |
| Example 36 | A | A |
| Example 37 | A | A |
| Example 38 | A | A |
| Example 39 | A | A |
| Example 40 | A | A |
| Example 41 | A | A |
| Example 42 | A | A |
| Example 43 | A | A |
| Example 44 | A | A |
| Example 45 | A | A |
| Example 46 | A | A |
| Example 47 | A | A |
| Example 48 | A | A |
| Example 49 | A | A |
| Example 50 | A | A |
| Example 51 | A | A |
| Example 52 | A | A |
| Example 53 | A | A |
| Example 54 | A | A |
| Example 55 | A | A |
| Example 56 | A | A |
| Example 57 | A | A |
| Example 58 | A | A |
| Example 59 | A | A |
| Example 60 | A | A |
| Example 61 | A | A |
| Example 62 | A | A |
| Example 63 | A | A |
| Example 64 | A | A |
| Example 65 | A | A |
| Example 66 | A | A |
| Example 67 | A | A |
| Example 68 | A | A |
| Example 69 | A | A |
| Example 70 | A | A |
| Example 71 | A | A |
| Example 72 | A | A |
| Example 73 | A | A |
| Example 74 | A | A |
| Example 75 | A | A |
| Example 76 | A | A |
| Example 77 | A | A |
| Example 78 | A | A |
| Example 79 | A | A |
| Example 80 | A | A |

TABLE 22

| | Defects | Temporal stability |
|---|---|---|
| Example 81 | A | A |
| Example 82 | A | A |
| Example 83 | A | A |
| Example 84 | A | A |
| Example 85 | A | A |
| Example 86 | A | A |
| Example 87 | A | A |
| Example 88 | A | A |
| Example 89 | A | A |
| Example 90 | A | A |
| Example 91 | A | A |
| Example 92 | A | A |
| Example 93 | A | A |
| Example 94 | A | A |
| Example 95 | A | A |
| Example 96 | A | A |
| Example 97 | B | A |
| Example 98 | A | A |
| Example 99 | A | A |
| Example 100 | A | A |
| Example 101 | B | A |
| Example 102 | A | A |
| Example 103 | A | A |
| Example 104 | A | A |
| Example 105 | A | A |
| Example 106 | A | A |
| Example 107 | A | A |
| Example 108 | A | A |
| Example 109 | A | A |
| Example 110 | A | A |
| Example 111 | A | A |
| Example 112 | A | A |
| Example 113 | A | A |
| Example 114 | A | A |
| Example 115 | A | A |
| Example 116 | A | A |
| Example 117 | A | A |
| Example 118 | A | A |
| Example 119 | A | A |

TABLE 22-continued

| | Defects | Temporal stability |
|---|---|---|
| Example 120 | A | A |
| Example 121 | A | A |
| Example 122 | A | A |
| Example 123 | A | A |
| Example 124 | A | A |
| Example 125 | A | B |
| Example 126 | A | A |
| Example 127 | A | A |
| Example 128 | A | A |
| Example 129 | A | A |
| Example 130 | A | A |
| Example 131 | A | A |
| Example 132 | A | A |
| Example 133 | A | A |
| Example 134 | A | A |
| Example 135 | A | A |
| Example 136 | A | A |
| Example 137 | A | A |
| Example 138 | A | A |
| Example 139 | A | A |
| Comparative Example 1 | D | D |
| Comparative Example 2 | D | D |
| Comparative Example 3 | C | C |

TABLE 23

| | Defects | Temporal stability |
|---|---|---|
| Example 401 | A | A |
| Example 402 | B | B |
| Example 403 | B | A |
| Example 404 | B | B |
| Example 405 | B | A |
| Example 406 | A | B |
| Example 407 | A | B |
| Example 408 | A | A |
| Example 409 | A | A |
| Example 410 | A | A |
| Example 411 | A | B |
| Example 412 | A | A |
| Example 413 | A | A |
| Example 414 | A | A |
| Example 415 | A | A |
| Example 416 | A | A |
| Example 417 | A | A |
| Example 418 | A | A |
| Example 419 | A | A |
| Example 420 | A | A |
| Example 421 | A | A |
| Example 422 | A | A |
| Example 423 | A | A |
| Example 424 | A | A |
| Example 425 | A | A |
| Example 426 | B | B |
| Example 427 | B | A |
| Example 428 | B | B |
| Example 429 | B | A |
| Example 430 | A | B |
| Example 431 | A | B |
| Example 432 | A | A |
| Example 433 | A | A |
| Example 434 | A | A |
| Example 435 | A | B |
| Example 436 | A | A |
| Example 437 | A | A |
| Example 438 | A | A |
| Example 439 | A | A |
| Example 440 | A | A |
| Example 441 | A | A |
| Example 442 | A | A |
| Example 443 | A | A |
| Example 444 | A | A |

TABLE 23-continued

| | Defects | Temporal stability |
|---|---|---|
| Example 445 | A | A |
| Example 446 | A | A |
| Example 447 | A | A |
| Example 448 | A | A |
| Example 449 | A | A |
| Example 450 | A | A |
| Example 451 | A | A |
| Example 452 | A | A |
| Example 453 | A | A |
| Example 454 | A | A |
| Example 455 | A | A |
| Example 456 | A | A |
| Example 457 | A | A |
| Example 458 | A | A |
| Example 459 | A | A |
| Example 460 | A | A |
| Example 461 | A | A |
| Example 462 | A | A |
| Example 463 | A | A |
| Example 464 | A | A |
| Example 465 | A | A |
| Example 466 | A | A |
| Example 467 | A | A |
| Example 468 | A | A |
| Example 469 | A | A |
| Example 470 | A | A |
| Example 471 | A | A |
| Example 472 | A | A |
| Example 473 | A | A |
| Example 474 | A | A |
| Example 475 | A | A |
| Example 476 | A | A |
| Example 477 | A | A |
| Example 478 | A | A |
| Example 479 | A | A |
| Example 480 | A | A |

TABLE 24

| | Defects | Temporal stability |
|---|---|---|
| Example 481 | A | A |
| Example 482 | A | A |
| Example 483 | A | A |
| Example 484 | A | A |
| Example 485 | A | A |
| Example 486 | A | A |
| Example 487 | A | A |
| Example 488 | A | A |
| Example 489 | A | A |
| Example 490 | A | A |
| Example 491 | A | A |
| Example 492 | A | A |
| Example 493 | A | A |
| Example 494 | A | A |
| Example 495 | A | A |
| Example 496 | A | A |
| Example 497 | B | A |
| Example 498 | A | A |
| Example 499 | A | A |
| Example 500 | A | A |
| Example 501 | B | A |
| Example 502 | A | A |
| Example 503 | A | A |
| Example 504 | A | A |
| Example 505 | A | A |
| Example 506 | A | A |
| Example 507 | A | A |
| Example 508 | A | A |
| Example 509 | A | A |
| Example 510 | A | A |
| Example 511 | A | A |
| Example 512 | A | A |
| Example 513 | A | A |
| Example 514 | A | A |

TABLE 24-continued

| | Defects | Temporal stability |
|---|---|---|
| Example 515 | A | A |
| Example 516 | A | A |
| Example 517 | A | A |
| Example 518 | A | A |
| Example 519 | A | A |
| Example 520 | A | A |
| Example 521 | A | A |
| Example 522 | A | A |
| Example 523 | A | A |
| Example 524 | A | A |
| Example 525 | A | B |
| Example 526 | A | A |
| Example 527 | A | A |
| Example 528 | A | A |
| Example 529 | A | A |
| Example 530 | A | A |
| Example 531 | A | A |
| Example 532 | A | A |
| Example 533 | A | A |
| Example 534 | A | A |
| Example 535 | A | A |
| Example 536 | A | A |
| Example 537 | A | A |
| Example 538 | A | A |
| Example 539 | A | A |
| Comparative Example 201 | D | D |
| Comparative Example 202 | D | D |
| Comparative Example 203 | C | C |

TABLE 25

| | Defects | Temporal stability |
|---|---|---|
| Example 701 | A | A |
| Example 702 | B | B |
| Example 703 | B | A |
| Example 704 | B | B |
| Example 705 | B | A |
| Example 706 | A | B |
| Example 707 | A | B |
| Example 708 | A | A |
| Example 709 | A | A |
| Example 710 | A | A |
| Example 711 | A | B |
| Example 712 | A | A |
| Example 713 | A | A |
| Example 714 | A | A |
| Example 715 | A | A |
| Example 716 | A | A |
| Example 717 | A | A |
| Example 718 | A | A |
| Example 719 | A | A |
| Example 720 | A | A |
| Example 721 | A | A |
| Example 722 | A | A |
| Example 723 | A | A |
| Example 724 | A | A |
| Example 725 | A | A |
| Example 726 | B | B |
| Example 727 | B | A |
| Example 728 | B | B |
| Example 729 | B | A |
| Example 730 | A | B |
| Example 731 | A | B |
| Example 732 | A | A |
| Example 733 | A | A |
| Example 734 | A | A |
| Example 735 | A | B |
| Example 736 | A | A |
| Example 737 | A | A |
| Example 738 | A | A |
| Example 739 | A | A |

TABLE 25-continued

| | Defects | Temporal stability |
|---|---|---|
| Example 740 | A | A |
| Example 741 | A | A |
| Example 742 | A | A |
| Example 743 | A | A |
| Example 744 | A | A |
| Example 745 | A | A |
| Example 746 | A | A |
| Example 747 | A | A |
| Example 748 | A | A |
| Example 749 | A | A |
| Example 750 | A | A |
| Example 751 | A | A |
| Example 752 | A | A |
| Example 753 | A | A |
| Example 754 | A | A |
| Example 755 | A | A |
| Example 756 | A | A |
| Example 757 | A | A |
| Example 758 | A | A |
| Example 759 | A | A |
| Example 760 | A | A |
| Example 761 | A | A |
| Example 762 | A | A |
| Example 763 | A | A |
| Example 764 | A | A |
| Example 765 | A | A |
| Example 766 | A | A |
| Example 767 | A | A |
| Example 768 | A | A |
| Example 769 | A | A |
| Example 770 | A | A |
| Example 771 | A | A |
| Example 772 | A | A |
| Example 773 | A | A |
| Example 774 | A | A |
| Example 775 | A | A |
| Example 776 | A | A |
| Example 777 | A | A |
| Example 778 | A | A |
| Example 779 | A | A |
| Example 780 | A | A |

TABLE 26

| | Defects | Temporal stability |
|---|---|---|
| Example 781 | A | A |
| Example 782 | A | A |
| Example 783 | A | A |
| Example 784 | A | A |
| Example 785 | A | A |
| Example 786 | A | A |
| Example 787 | A | A |
| Example 788 | A | A |
| Example 789 | A | A |
| Example 790 | A | A |
| Example 791 | A | A |
| Example 792 | A | A |
| Example 793 | A | A |
| Example 794 | A | A |
| Example 795 | A | A |
| Example 796 | A | A |
| Example 797 | B | A |
| Example 798 | A | A |
| Example 799 | A | A |
| Example 800 | A | A |
| Example 801 | B | A |
| Example 802 | A | A |
| Example 803 | A | A |
| Example 804 | A | A |
| Example 805 | A | A |
| Example 806 | A | A |
| Example 807 | A | A |
| Example 808 | A | A |
| Example 809 | A | A |

TABLE 26-continued

| | Defects | Temporal stability |
|---|---|---|
| Example 810 | A | A |
| Example 811 | A | A |
| Example 812 | A | A |
| Example 813 | A | A |
| Example 814 | A | A |
| Example 815 | A | A |
| Example 816 | A | A |
| Example 817 | A | A |
| Example 818 | A | A |
| Example 819 | A | A |
| Example 820 | A | A |
| Example 821 | A | A |
| Example 822 | A | A |
| Example 823 | A | A |
| Example 824 | A | A |
| Example 825 | A | B |
| Example 826 | A | A |
| Example 827 | A | A |
| Example 828 | A | A |
| Example 829 | A | A |
| Example 830 | A | A |
| Example 831 | A | A |
| Example 832 | A | A |
| Example 833 | A | A |
| Example 834 | A | A |
| Example 835 | A | A |
| Example 836 | A | A |
| Example 837 | A | A |
| Example 838 | A | A |
| Example 839 | A | A |

As shown in the above tables, the compositions of Examples had good temporal stability, and the films obtained by using the compositions of Examples had few defects. In addition, the films obtained by using the compositions of Examples were excellent in visible transparency as compared with the films obtained by using the compositions of Comparative Examples.

In addition, all of the films obtained by using the compositions of Examples 701 to 839 had a transmittance of 5% at a wavelength of 390 nm, and were excellent in ultraviolet shielding properties.

Among PPB-B-1 to PPB-B-74 used as the derivatives in Examples, with regard to a compound having a group represented by Formula (A-1) below, a compound having a structure in which the group represented by Formula (A-1) was replaced with a group represented by Formula (B-1) below or a mixture of the two compounds could provide the same effects as those of each of Examples. In addition, among PPB-B-1 to PPB-B-74 used as the derivatives in Examples, with regard to a compound having a group represented by Formula (A-2) below, a compound having a structure in which the group represented by Formula (A-2) was replaced with a group represented by Formula (B-2) below or a mixture of the two compounds could provide the same effects as those of each of Examples.

(A-1)

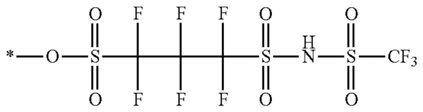

-continued (A-2)

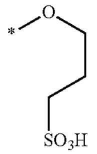

(B-1)

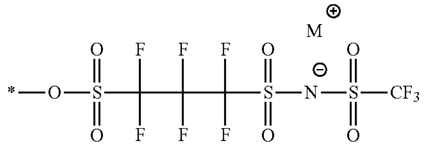

(B-2)

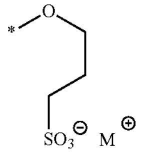

In the above formulae, M represents Li, Na, K, Rb, Cs, or a structure represented by Formula (C) or Formula (D).

(C)

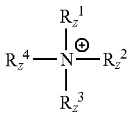

(D)

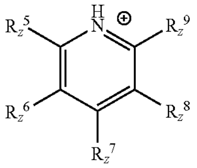

In Formula (C), $R_z^1$ to $R_z^4$ each independently represent a hydrogen atom, a branched or linear alkyl group which may have a substituent, or an aryl group which may have a substituent. However, $R_z^1$ to $R_z^4$ may be linked to each other to form a ring.

In Formula (D), $R_z^5$ to $R_z^9$ each independently represent a substituent, and $R_z^5$ and $R_z^6$, $R_z^6$ and $R_z^7$, $R_z^7$ and $R_z^8$, or $R_z^8$ and $R_z^9$ may be independently linked to each other to form a ring.

Examples 1001 to 1139

Each material was mixed at a proportion of a formulation shown below, and the obtained mixture was filtered through a nylon filter (manufactured by Pall Corporation) having a pore size of 0.45 μm to produce a composition IR1.

| | |
|---|---|
| Infrared absorber (FDR-003, manufactured by YAMADA CHEMICAL CO., LTD.) | 0.045 parts by mass |
| Resin P1 (45% propylene glycol monomethyl ether acetate solution of resin having following structure (weight-average molecular weight: 24600; the numerical value described together with the main chain indicates a mass ratio of a repeating unit)) | |
| 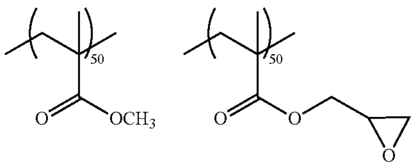 | 6.9 parts by mass |
| Ultraviolet absorber (Uvinul 3050, manufactured by BASF SE) | 1.35 parts by mass |
| Polymerization Inhibitor (p-methoxyphenol) | 0.001 parts by mass |
| Propylene glycol monomethyl ether acetate | 6.705 parts by mass |

The composition IR1 prepared above was applied onto a glass substrate by a spin coating method so that a film thickness after post-baking was 7.0 μm. Thereafter, the composition was heated (pre-baked) using a hot plate at 100° C. for 10 minutes, and then cured by heating at 200° C. for 8 minutes to form a film having a thickness of 7.0 μm. Each of the compositions of Examples 401 to 539 as a composition for a second layer was applied onto the obtained film of the glass substrate by a spin coating method so that a film thickness after post-baking was 1.0 μm. Thereafter, the composition was heated (pre-baked) using a hot plate at 100° C. for 10 minutes, and then cured by heating at 200° C. for 8 minutes to form a film having a thickness of 1.0 μm, thereby obtaining laminated films (total film thickness: 8.0 μm) of Examples 1001 to 1139.

In a case where the laminated films of Examples 1001 to 1139 were observed for precipitation of foreign matter with a bright visual field of 200 times using an optical microscope, no precipitation of foreign matter was observed in all cases. In addition, all of the laminated films of Examples 1001 to 1139 had a transmittance of less than 5% at a wavelength of 390 nm, and were excellent in shielding ultraviolet rays.

Examples 1201 to 1323

Compositions of Examples 1201 to 1323 were prepared in the same manner as in Examples 1 to 48, Examples 58 to 110, and Examples 112 to 133, except that in the formulation 1 of Examples 1 to 48, Examples 58 to 110, and Examples 112 to 133, 0.120 parts by mass of FDR-003 (manufactured by YAMADA CHEMICAL CO., LTD.) and 0.359 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 1201 to 1323 were the same as those of Examples 1 to 48, Examples 58 to 110, and Examples 112 to 133.

Examples 1401 to 1523

Compositions of Examples 1401 to 1523 were prepared in the same manner as in Examples 1 to 48, Examples 58 to 110, and Examples 112 to 133, except that in the formulation 1 of Examples 1 to 48, Examples 58 to 110, and Examples 112 to 133, 0.287 parts by mass of FDR-003 (manufactured by YAMADA CHEMICAL CO., LTD.) and 0.191 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 1401 to 1523 were the same as those of Examples 1 to 48, Examples 58 to 110, and Examples 112 to 133.

Examples 1601 to 1723

Compositions of Examples 1601 to 1723 were prepared in the same manner as in Examples 1 to 48, Examples 58 to 110, and Examples 112 to 133, except that in the formulation 1 of Examples 1 to 48, Examples 58 to 110, and Examples 112 to 133, 0.209 parts by mass of a phthalocyanine compound (Pc-5) (compound having the following structure) and 0.269 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 1601 to 1723 were the same as those of Examples 1 to 48, Examples 58 to 110, and Examples 112 to 133.

Pc-5

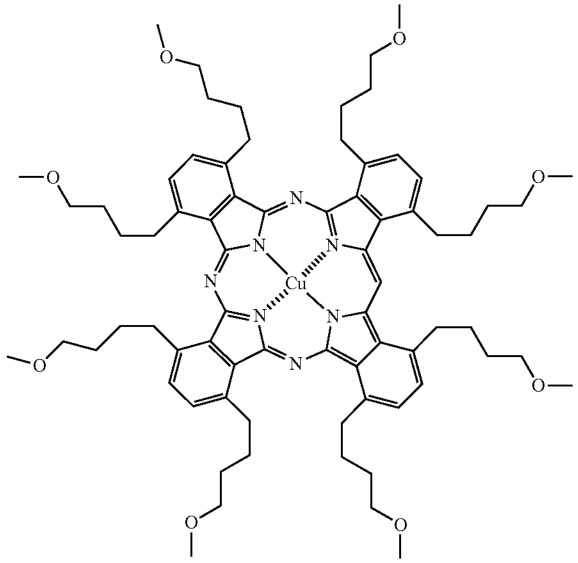

Examples 1801 to 1923

Compositions of Examples 1801 to 1923 were prepared in the same manner as in Examples 1 to 48, Examples 58 to 110, and Examples 112 to 133, except that in the formulation 1 of Examples 1 to 48, Examples 58 to 110, and Examples 112 to 133, 0.389 parts by mass of the phthalocyanine compound (Pc-5) and 0.090 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 1801 to 1923 were the same as those of Examples 1 to 48, Examples 58 to 110, and Examples 112 to 133.

Examples 2001 to 2123

Compositions of Examples 2001 to 2123 were prepared in the same manner as in Examples 1 to 48, Examples 58 to 110, and Examples 112 to 133, except that in the formulation 1 of Examples 1 to 48, Examples 58 to 110, and Examples 112 to 133, 0.209 parts by mass of the phthalocyanine compound (Pc-5) and 0.389 parts by mass of a phthalocyanine compound (Pc-2) (compound having the following structure) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 2001 to 2123 were the same as those of Examples 1 to 48, Examples 58 to 110, and Examples 112 to 133.

Pc-2

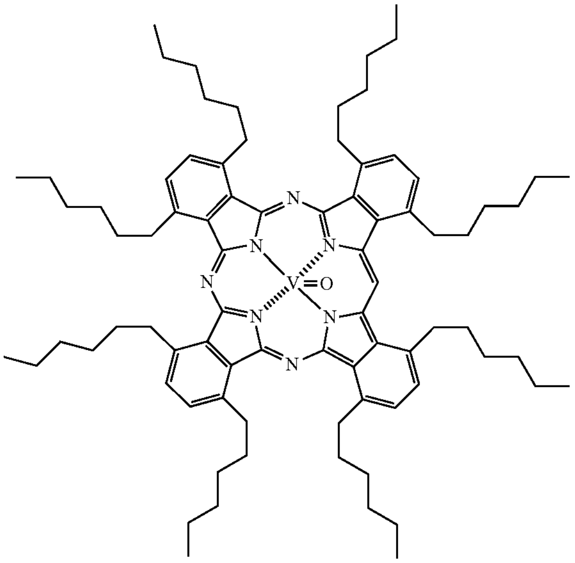

Examples 2201 to 2323

Compositions of Examples 2201 to 2323 were prepared in the same manner as in Examples 1 to 48, Examples 58 to 110, and Examples 112 to 133, except that in the formulation 1 of Examples 1 to 48, Examples 58 to 110, and Examples 112 to 133, 0.419 parts by mass of the phthalocyanine compound (Pc-5) and 0.120 parts by mass of the phthalocyanine compound (Pc-2) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 2201 to 2323 were the same as those of Examples 1 to 48, Examples 58 to 110, and Examples 112 to 133.

Examples 2401 to 2523

Compositions of Examples 2401 to 2523 were prepared in the same manner as in Examples 1 to 48, Examples 58 to 110, and Examples 112 to 133, except that in the formulation 1 of Examples 1 to 48, Examples 58 to 110, and Examples 112 to 133, 0.180 parts by mass of FDR-003 (manufactured by YAMADA CHEMICAL CO., LTD.) and 0.419 parts by mass of the phthalocyanine compound (Pc-2) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 2401 to 2523 were the same as those of Examples 1 to 48, Examples 58 to 110, and Examples 112 to 133.

Examples 2601 to 2723

Compositions of Examples 2601 to 2723 were prepared in the same manner as in Examples 1 to 48, Examples 58 to 110, and Examples 112 to 133, except that in the formulation 1 of Examples 1 to 48, Examples 58 to 110, and Examples 112 to 133, 0.389 parts by mass of FDR-003 (manufactured by YAMADA CHEMICAL CO., LTD.) and 0.209 parts by mass of the phthalocyanine compound (Pc-2) were added as infrared absorbers. Temporal stability of the obtained composition was evaluated by the same method as described above. In addition, a film was produced in the same manner as in Production Example 1, except that the film thickness was 1.0 μm, and defects were evaluated. Evaluation results of the defects and the temporal stability of Examples 2601 to 2723 were the same as those of Examples 1 to 48, Examples 58 to 110, and Examples 112 to 133.

Examples 2801 to 2923

Compositions of Examples 2801 to 2923 were prepared in the same manner as in Examples 401 to 448, Examples 458 to 510, and Examples 512 to 533, except that in the formulation 2 of Examples 401 to 448, Examples 458 to 510, and Examples 512 to 533, 0.120 parts by mass of FDR-003 (manufactured by YAMADA CHEMICAL CO., LTD.) and 0.359 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 2801 to 2923 were the same as those of Examples 401 to 448, Examples 458 to 510, and Examples 512 to 533.

Examples 3001 to 3123

Compositions of Examples 3001 to 3123 were prepared in the same manner as in Examples 401 to 448, Examples 458 to 510, and Examples 512 to 533, except that in the formulation 2 of Examples 401 to 448, Examples 458 to 510, and Examples 512 to 533, 0.287 parts by mass of FDR-003 (manufactured by YAMADA CHEMICAL CO., LTD.) and 0.191 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 3001 to 3123 were the same as those of Examples 401 to 448, Examples 458 to 510, and Examples 512 to 533.

Examples 3201 to 3323

Compositions of Examples 3201 to 3323 were prepared in the same manner as in Examples 401 to 448, Examples 458 to 510, and Examples 512 to 533, except that in the formulation 2 of Examples 401 to 448, Examples 458 to 510, and Examples 512 to 533, 0.209 parts by mass of the phthalocyanine compound (Pc-5) and 0.269 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 3201 to 3323 were the same as those of Examples 401 to 448, Examples 458 to 510, and Examples 512 to 533.

Examples 3401 to 3523

Compositions of Examples 3401 to 3523 were prepared in the same manner as in Examples 401 to 448, Examples 458 to 510, and Examples 512 to 533, except that in the formulation 2 of Examples 401 to 448, Examples 458 to 510, and Examples 512 to 533, 0.389 parts by mass of the phthalocyanine compound (Pc-5) and 0.090 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 3401 to 3523 were the same as those of Examples 401 to 448, Examples 458 to 510, and Examples 512 to 533.

Examples 3601 to 3723

Compositions of Examples 3601 to 3723 were prepared in the same manner as in Examples 401 to 448, Examples 458 to 510, and Examples 512 to 533, except that in the formulation 2 of Examples 401 to 448, Examples 458 to 510, and Examples 512 to 533, 0.209 parts by mass of the phthalocyanine compound (Pc-5) and 0.389 parts by mass of the phthalocyanine compound (Pc-2) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 3601 to 3723 were the same as those of Examples 401 to 448, Examples 458 to 510, and Examples 512 to 533.

Examples 3801 to 3923

Compositions of Examples 3801 to 3923 were prepared in the same manner as in Examples 401 to 448, Examples 458 to 510, and Examples 512 to 533, except that in the formulation 2 of Examples 401 to 448, Examples 458 to 510, and Examples 512 to 533, 0.419 parts by mass of the phthalocyanine compound (Pc-5) and 0.120 parts by mass of the phthalocyanine compound (Pc-2) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 3801 to 3923 were the same as those of Examples 401 to 448, Examples 458 to 510, and Examples 512 to 533.

Examples 4001 to 4123

Compositions of Examples 4001 to 4123 were prepared in the same manner as in Examples 401 to 448, Examples 458 to 510, and Examples 512 to 533, except that in the formulation 2 of Examples 401 to 448, Examples 458 to 510, and Examples 512 to 533, 0.180 parts by mass of FDR-003 (manufactured by YAMADA CHEMICAL CO., LTD.) and 0.419 parts by mass of the phthalocyanine compound (Pc-2) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 4001 to 4123 were the same as those of Examples 401 to 448, Examples 458 to 510, and Examples 512 to 533.

Examples 4201 to 4323

Compositions of Examples 4201 to 4323 were prepared in the same manner as in Examples 401 to 448, Examples 458 to 510, and Examples 512 to 533, except that in the formulation 2 of Examples 401 to 448, Examples 458 to 510, and Examples 512 to 533, 0.389 parts by mass of FDR-003 (manufactured by YAMADA CHEMICAL CO., LTD.) and 0.209 parts by mass of the phthalocyanine compound (Pc-2) were added as infrared absorbers. Temporal stability of the obtained composition was evaluated by the same method as described above. In addition, a film was produced in the same manner as in Production Example 2, except that the film thickness was 1.0 μm, and defects were evaluated. Evaluation results of the defects and the temporal stability of Examples 4201 to 4323 were the same as those of Examples 401 to 448, Examples 458 to 510, and Examples 512 to 533.

Examples 4401 to 4523

Compositions of Examples 4401 to 4523 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.057 parts by mass of FDR-003 (manufactured by YAMADA CHEMICAL CO., LTD.) and 0.182 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 4401 to 4523 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 4601 to 4723

Compositions of Examples 4601 to 4723 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.151 parts by mass of FDR-003 (manufactured by YAMADA CHEMICAL CO., LTD.) and 0.101 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 4601 to 4723 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 4801 to 4923

Compositions of Examples 4801 to 4923 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.110 parts by mass of the phthalocyanine compound (Pc-5) and 0.141 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 4801 to 4923 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 5001 to 5123

Compositions of Examples 5001 to 5123 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.204 parts by mass of the phthalocyanine compound (Pc-5) and 0.047 parts by mass of FDR-004 (manufactured by YAMADA CHEMICAL CO., LTD.) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 5001 to 5123 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 5201 to 5323

Compositions of Examples 5201 to 5323 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.110 parts by mass of the phthalocyanine compound (Pc-5) and 0.204 parts by mass of the phthalocyanine compound (Pc-2) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 5201 to 5323 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 5401 to 5523

Compositions of Examples 5401 to 5523 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.220 parts by mass of the phthalocyanine compound (Pc-5) and 0.063 parts by mass of the phthalocyanine compound (Pc-2) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 5401 to 5523 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 5601 to 5723

Compositions of Examples 5601 to 5723 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.094 parts by mass of FDR-003 (manufactured by YAMADA CHEMICAL CO., LTD.) and 0.220 parts by mass of the phthalocyanine compound (Pc-2) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 5601 to 5723 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 5801 to 5923

Compositions of Examples 5801 to 5923 were prepared in the same manner as in Examples 701 to 748, Examples 758 to 810, and Examples 812 to 833, except that in the formulation 5 of Examples 701 to 748, Examples 758 to 810, and Examples 812 to 833, the ultraviolet absorber was used in an amount of 3.927 parts by mass, and 0.204 parts by mass of FDR-003 (manufactured by YAMADA CHEMICAL CO., LTD.) and 0.110 parts by mass of the phthalocyanine compound (Pc-2) were added as infrared absorbers. Temporal stability of the obtained composition was evaluated by the same method as described above. In addition, a film was produced in the same manner as in Production Example 3, except that the film thickness was 5.0 μm, and defects were evaluated. Evaluation results of the defects and the temporal stability of Examples 5801 to 5923 were the same as those of Examples 701 to 748, Examples 758 to 810, and Examples 812 to 833. In addition, the obtained films had a transmittance of 5% or less at a wavelength of 390 nm, and were excellent in ultraviolet light shielding properties.

Examples 6001 to 6139

Each material was mixed at a proportion of a formulation shown below, and the obtained mixture was filtered through a nylon filter (manufactured by Pall Corporation) having a pore size of 0.45 μm to produce a composition IR2.

| | |
|---|---|
| Infrared absorber (FDR-003, manufactured by YAMADA CHEMICAL CO., LTD.) | 0.0152 parts by mass |
| Infrared absorber (FDR-004, manufactured by YAMADA CHEMICAL CO., LTD.) | 0.0490 parts by mass |
| Resin P1 described above | 6.9 parts by mass |
| Ultraviolet absorber (Uvinul 3050, manufactured by BASF SE) | 1.057 parts by mass |
| Polymerization Inhibitor (p-methoxyphenol) | 0.001 parts by mass |
| Propylene glycol monomethyl ether acetate | 6.705 parts by mass |

The composition IR2 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 6001 to 6139. In a case where the laminated films of Examples 6001 to 6139 were observed for precipitation of foreign matter with a bright visual field of 200 times using an optical microscope, no precipitation of foreign matter was observed in all cases. In addition, all of the laminated films of Examples 6001 to 6139 had a transmittance of less than 5% at a wavelength of 390 nm, and were excellent in shielding ultraviolet rays.

Examples 6201 to 6339

Each material was mixed at a proportion of a formulation shown below, and the obtained mixture was filtered through a nylon filter (manufactured by Pall Corporation) having a pore size of 0.45 μm to produce a composition IR3.

| | |
|---|---|
| Infrared absorber (FDR-003, manufactured by YAMADA CHEMICAL CO., LTD.) | 0.0406 parts by mass |
| Infrared absorber (FDR-004, manufactured by YAMADA CHEMICAL CO., LTD.) | 0.0271 parts by mass |
| Resin P1 described above | 6.9 parts by mass |
| Ultraviolet absorber (Uvinul 3050, manufactured by BASF SE) | 1.058 parts by mass |
| Polymerization Inhibitor (p-methoxyphenol) | 0.001 parts by mass |
| Propylene glycol monomethyl ether acetate | 6.705 parts by mass |

The composition IR3 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 6201 to 6339. In a case where the laminated films of Examples 6201 to 6339 were observed for precipitation of foreign matter with a bright visual field of 200 times using an optical microscope, no precipitation of foreign matter was observed in all cases. In addition, all of the laminated films of Examples 6201 to 6339 had a transmittance of less than 5% at a wavelength of 390 nm, and were excellent in shielding ultraviolet rays.

Examples 6401 to 6539

Each material was mixed at a proportion of a formulation shown below, and the obtained mixture was filtered through a nylon filter (manufactured by Pall Corporation) having a pore size of 0.45 μm to produce a composition IR4.

| | |
|---|---|
| Infrared absorber (phthalocyanine compound (Pc-5) described above) | 0.0296 parts by mass |
| Infrared absorber (FDR-004, manufactured by YAMADA CHEMICAL CO., LTD.) | 0.0381 parts by mass |
| Resin P1 described above | 6.9 parts by mass |
| Ultraviolet absorber (Uvinul 3050, manufactured by BASF SE) | 1.058 parts by mass |
| Polymerization Inhibitor (p-methoxyphenol) | 0.001 parts by mass |
| Propylene glycol monomethyl ether acetate | 6.705 parts by mass |

The composition IR4 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 6401 to 6539. In a case where the laminated films of Examples 6401 to 6539 were observed for precipitation of foreign matter with a bright visual field of 200 times using an optical microscope, no precipitation of foreign matter was observed in all cases. In addition, all of the laminated films of Examples 6401 to 6539 had a transmittance of less than 5% at a wavelength of 390 nm, and were excellent in shielding ultraviolet rays.

Examples 6601 to 6739

Each material was mixed at a proportion of a formulation shown below, and the obtained mixture was filtered through a nylon filter (manufactured by Pall Corporation) having a pore size of 0.45 μm to produce a composition IR5.

| | |
|---|---|
| Infrared absorber (phthalocyanine compound (Pc-5) described above) | 0.0550 parts by mass |
| Infrared absorber (FDR-004, manufactured by YAMADA CHEMICAL CO., LTD.) | 0.0127 parts by mass |
| Resin P1 described above | 6.9 parts by mass |
| Ultraviolet absorber (Uvinul 3050, manufactured by BASF SE) | 1.058 parts by mass |
| Polymerization Inhibitor (p-methoxyphenol) | 0.001 parts by mass |
| Propylene glycol monomethyl ether acetate | 6.705 parts by mass |

The composition IR5 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 am. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 6601 to 6739. In a case where the laminated films of Examples 6601 to 6739 were observed for precipitation of foreign matter with a bright visual field of 200 times using an optical microscope, no precipitation of foreign matter was observed in all cases. In addition, all of the laminated films of Examples 6601 to 6739 had a transmittance of less than 5% at a wavelength of 390 nm, and were excellent in shielding ultraviolet rays.

Examples 6801 to 6939

Each material was mixed at a proportion of a formulation shown below, and the obtained mixture was filtered through a nylon filter (manufactured by Pall Corporation) having a pore size of 0.45 μm to produce a composition IR6.

| | |
|---|---|
| Infrared absorber (phthalocyanine compound (Pc-5) described above) | 0.0298 parts by mass |
| Infrared absorber (phthalocyanine compound (Pc-2) described above) | 0.0553 parts by mass |
| Resin P1 described above | 6.9 parts by mass |
| Ultraviolet absorber (Uvinul 3050, manufactured by BASF SE) | 1.064 parts by mass |
| Polymerization Inhibitor (p-methoxyphenol) | 0.001 parts by mass |
| Propylene glycol monomethyl ether acetate | 6.705 parts by mass |

The composition IR6 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 6801 to 6939. In a case where the laminated films of Examples 6801 to 6939 were observed for precipitation of foreign matter with a bright visual field of 200 times using an optical microscope, no precipitation of foreign matter was observed in all cases. In addition, all of the laminated films of Examples 6801 to 6939 had a transmittance of less than 5% at a wavelength of 390 nm, and were excellent in shielding ultraviolet rays.

Examples 7001 to 7139

Each material was mixed at a proportion of a formulation shown below, and the obtained mixture was filtered through a nylon filter (manufactured by Pall Corporation) having a pore size of 0.45 μm to produce a composition IR7.

| | |
|---|---|
| Infrared absorber (phthalocyanine compound (Pc-5) described above) | 0.0594 parts by mass |
| Infrared absorber (phthalocyanine compound (Pc-2) described above) | 0.0170 parts by mass |
| Resin P1 described above | 6.9 parts by mass |
| Ultraviolet absorber (Uvinul 3050, manufactured by BASF SE) | 1.061 parts by mass |
| Polymerization Inhibitor (p-methoxyphenol) | 0.001 parts by mass |
| Propylene glycol monomethyl ether acetate | 6.705 parts by mass |

The composition IR7 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 7001 to 7139. In a case where the laminated films of Examples 7001 to 7139 were observed for precipitation of foreign matter with a bright visual field of 200 times using an optical microscope, no precipitation of foreign matter was observed in all cases. In addition, all of the laminated films of Examples 7001 to 7139 had a transmittance of less than 5% at a wavelength of 390 nm, and were excellent in shielding ultraviolet rays.

Examples 7201 to 7339

Each material was mixed at a proportion of a formulation shown below, and the obtained mixture was filtered through a nylon filter (manufactured by Pall Corporation) having a pore size of 0.45 μm to produce a composition IR8.

| | |
|---|---|
| Infrared absorber (FDR-003, manufactured by YAMADA CHEMICAL CO., LTD.) | 0.0255 parts by mass |
| Infrared absorber (phthalocyanine compound (Pc-2) described above) | 0.0596 parts by mass |
| Resin P1 described above | 6.9 parts by mass |
| Ultraviolet absorber (Uvinul 3050, manufactured by BASF SE) | 1.064 parts by mass |
| Polymerization Inhibitor (p-methoxyphenol) | 0.001 parts by mass |
| Propylene glycol monomethyl ether acetate | 6.705 parts by mass |

The composition IR8 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 7201 to 7339. In a case where the laminated films of Examples 7201 to 7339 were observed for precipitation of foreign matter with a bright visual field of 200 times using an optical microscope, no precipitation of foreign matter was observed in all cases. In addition, all of the laminated films of Examples 7201 to 7339 had a transmittance of less than 5% at a wavelength of 390 nm, and were excellent in shielding ultraviolet rays.

Examples 7401 to 7539

Each material was mixed at a proportion of a formulation shown below, and the obtained mixture was filtered through a nylon filter (manufactured by Pall Corporation) having a pore size of 0.45 μm to produce a composition IR9.

| | |
|---|---|
| Infrared absorber (FDR-003, manufactured by YAMADA CHEMICAL CO., LTD.) | 0.0553 parts by mass |
| Infrared absorber (phthalocyanine compound (Pc-2) described above) | 0.0298 parts by mass |
| Resin P1 described above | 6.9 parts by mass |
| Ultraviolet absorber (Uvinul 3050, manufactured by BASF SE) | 1.064 parts by mass |
| Polymerization Inhibitor (p-methoxyphenol) | 0.001 parts by mass |
| Propylene glycol monomethyl ether acetate | 6.705 parts by mass |

The composition IR9 prepared above was applied onto a glass substrate by a spin coating method so that a film thickness after post-baking was 5.0 μm. Thereafter, the composition was heated (pre-baked) using a hot plate at 100° C. for 10 minutes, and then cured by heating at 200° C. for 8 minutes to form a film having a thickness of 5.0 μm. Each of the compositions of Examples 401 to 539 as a composition for a second layer was applied onto the obtained film of the glass substrate by a spin coating method so that a film thickness after post-baking was 0.9 μm. Thereafter, the composition was heated (pre-baked) using a hot plate at 100° C. for 10 minutes, and then cured by heating at 200° C. for 8 minutes to form a film having a thickness of 0.9 μm, thereby obtaining laminated films (total film thickness: 5.9 μm) of Examples 7401 to 7539. In a case where the laminated films of Examples 7401 to 7539 were observed for precipitation of foreign matter with a bright visual field of 200 times using an optical microscope, no precipitation of foreign matter was observed in all cases. In addition, all of the laminated films of Examples 7401 to 7539 had a transmittance of less than 5% at a wavelength of 390 nm, and were excellent in shielding ultraviolet rays.

In each of Examples, in a case where the dispersant (D-2) was replaced with DISPERBYK-140 (manufactured by BYK Chemie Japan), DISPERBYK-167 (manufactured by BYK Chemie Japan), DISPERBYK-2026 (manufactured by BYK Chemie Japan), or a dispersant (D-3) shown below, the same effects were obtained.

Dispersant (D-3): solution of a resin having the following structure (the numerical value described together with the main chain indicates a molar ratio, and the numerical value described together with the side chain indicates the number of repeating units; weight-average molecular weight=11500, acid value: 105 mgKOH/g, amine value: 105 mgKOH/g), in which a concentration of solid contents was adjusted to 30% by mass with a mixed solution of propylene glycol monomethyl ether acetate:propylene glycol monomethyl ether=1:3 (mass ratio)

(D-3)

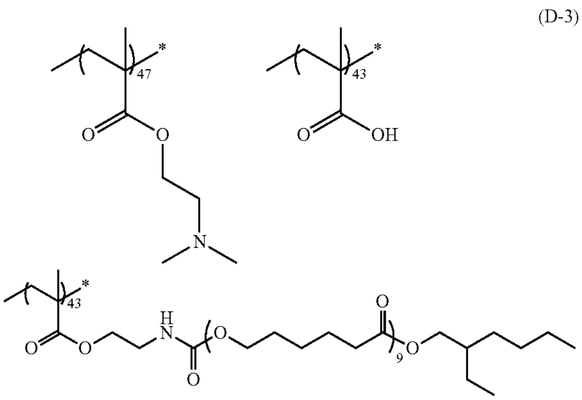

In each of Examples, in a case where the phthalocyanine compound (Pc-2) used as the infrared absorber was replaced with a phthalocyanine compound (Pc-4), a phthalocyanine compound (Pc-6), a phthalocyanine compound (Pc-8), or a phthalocyanine compound (Pc-10), the same effects were obtained.

Pc-4

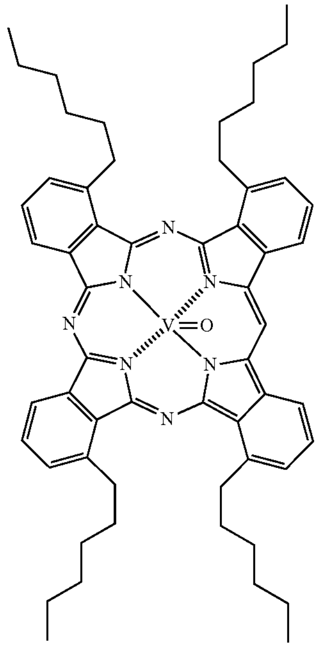

Pc-6

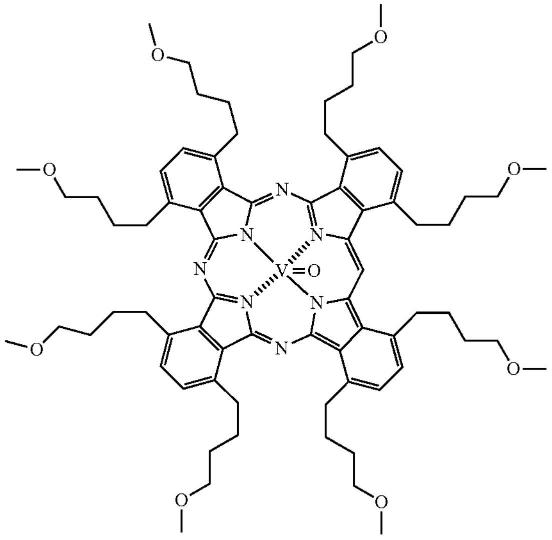

-continued
Pc-8
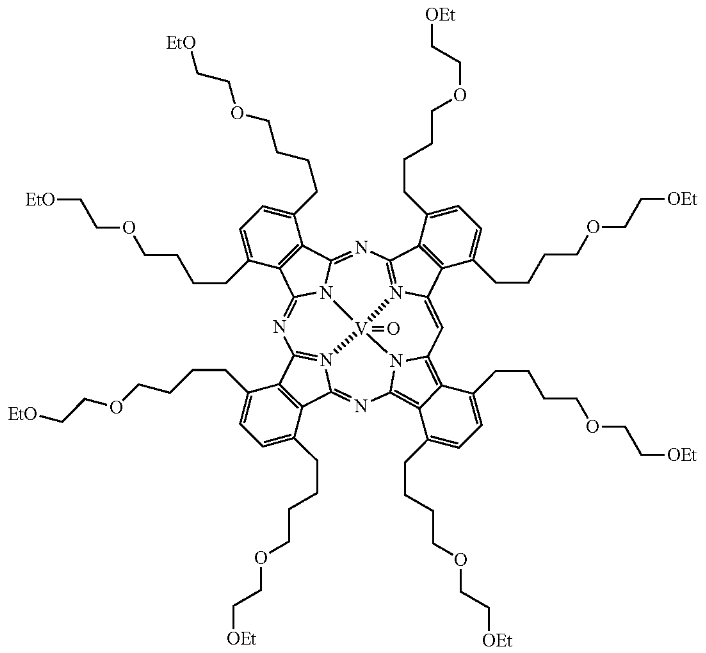
Pc-10
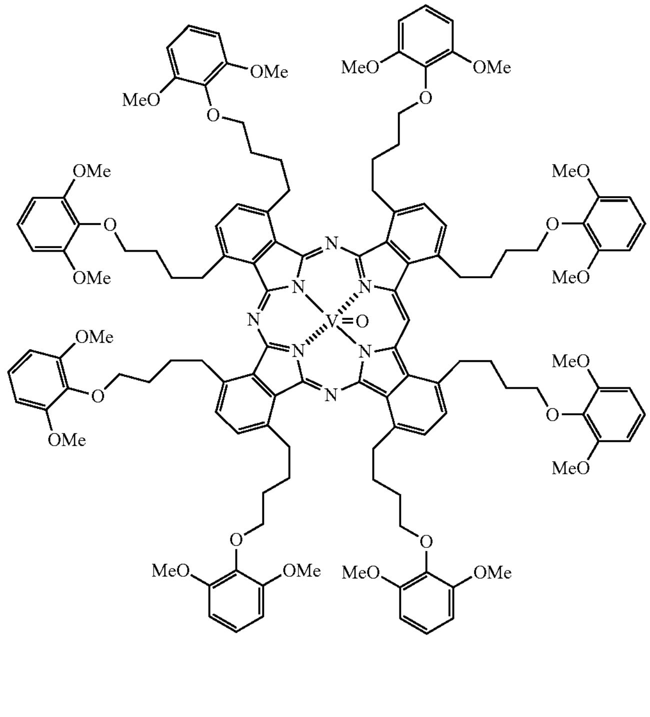

In each of Examples, in a case where the phthalocyanine compound (Pc-5) used as the infrared absorber was replaced with a phthalocyanine compound (Pc-1), a phthalocyanine compound (Pc-3), a phthalocyanine compound (Pc-7), or a phthalocyanine compound (Pc-9), the same effects were obtained.
Pc-1
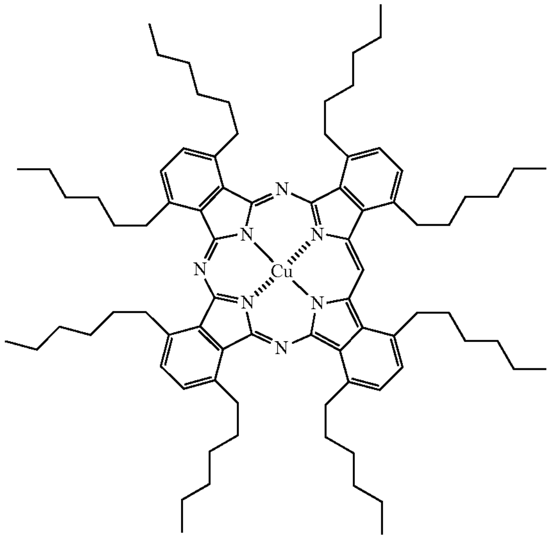
Pc-3
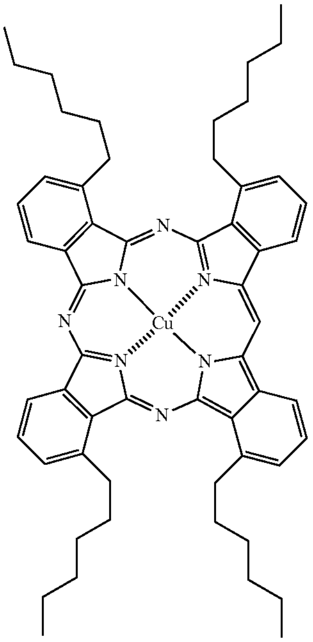
Pc-7
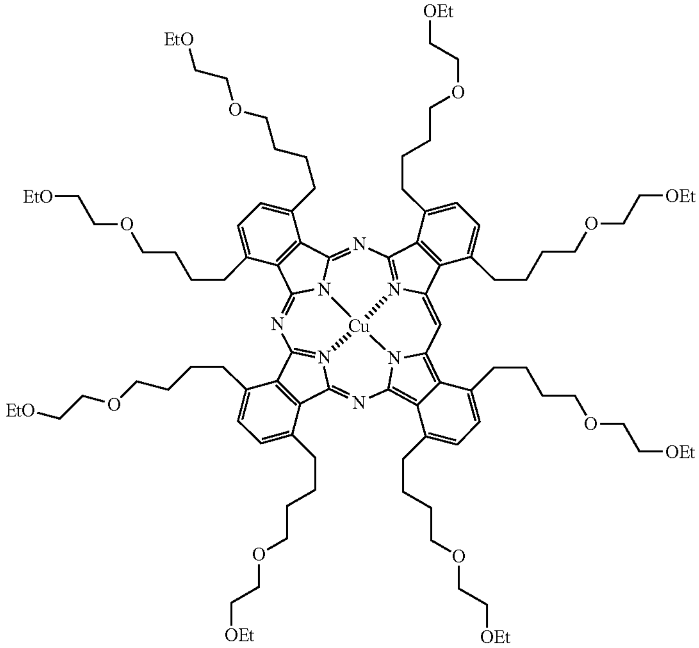

-continued

Pc-9

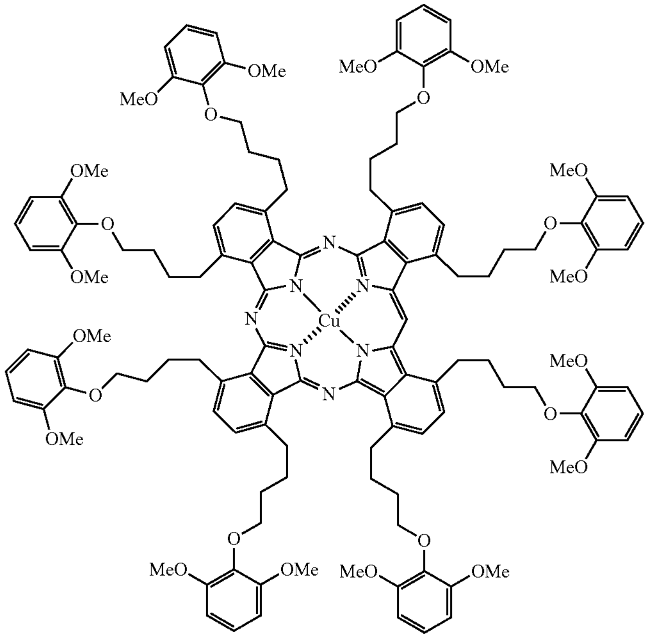

By using the film or the laminated film of Examples, an optical filter, a solid-state imaging element, an image display device, an infrared sensor, and a camera module having excellent performance can be obtained.

EXPLANATION OF REFERENCES

110: solid-state imaging element
111: infrared cut filter
112: color filter
114: infrared transmitting filter
115: microlens
116: planarizing laver

What is claimed is:

1. A composition comprising:

a coloring agent represented by Formula (1); and a curable compound, (1)

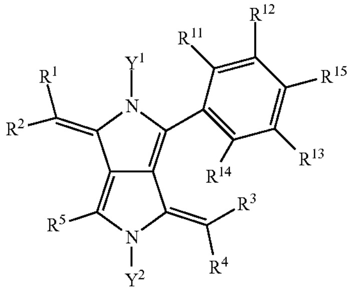

in Formula (1), $R^1$ to $R^4$ each independently represent a substituent, $R^5$ represents an alkyl group, $R^{11}$ to $R^{15}$ each independently represent a hydrogen atom or a substituent, and $Y^1$ and $Y^2$ each independently represent a hydrogen atom or a substituent, where at least one of $R^{11}$ or $R^{14}$ is a substituent, and wherein at least one of $R^{11}$ to $R^{15}$ is a group represented by Formula (R-100):

$$*\text{-}L^{R1}\text{-}(X^{R1})_n \quad \text{(R-100)}$$

wherein, in Formula (R-100), $L^{R1}$ represents an aliphatic hydrocarbon group, an aromatic hydrocarbon group, a heterocyclic group, —O—, —S—, —$NR^{L1}$—, —CO—, —COO—, —OCO—, —$SO_2$—, or an (n+1)-valent linking group consisting of a combination of these groups; $R^{L1}$ represents a hydrogen atom, an alkyl group, or an aryl group; $X^{R1}$ represents an acid group or a basic group; n represents an integer of 1 or more; and, in a case where n is 1, $L^{R1}$ may be a single bond.

2. The composition according to claim 1, wherein one of $R^1$ and $R^2$ in Formula (1) is a cyano group and the other is an aryl group or a heteroaryl group, and one of $R^3$ and $R^4$ in Formula (1) is a cyano group and the other is an aryl group or a heteroaryl group.

3. The composition according to claim 1, wherein $Y^1$ and $Y^2$ in Formula (1) each independently represent —B(boron)$R^{Y1}R^{Y2}$, where $R^{Y1}$ and $R^{Y2}$ each independently represent a hydrogen atom, a halogen atom, an alkyl group, an alkenyl group, an aryl group, a heteroaryl group, an alkoxy group, an aryloxy group, or a heteroaryloxy group, and $R^{Y1}$ and $R^{Y2}$ may be bonded to each other to form a ring.

4. The composition according to claim 1, wherein the coloring agent represented by Formula (1) has a maximal absorption wavelength at a wavelength of 650 nm or more.

5. The composition according to claim 1, further comprising:

a compound represented by Formula (Pc), (Pc)

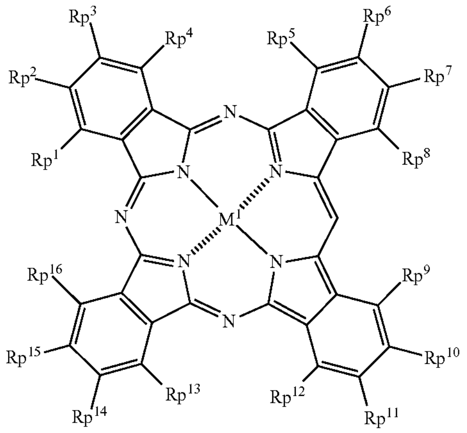

in Formula (Pc), $Rp^1$ to $Rp^{16}$ each independently represent a hydrogen atom or a substituent, at least one of $Rp^1$ or $Rp^4$ represents an alkyl group, at least one of $Rp^5$ or $Rp^8$ represents an alkyl group, at least one of $Rp^9$ or $Rp^{12}$ represents an alkyl group, at least one of $Rp^{13}$ or $Rp^{16}$ represents an alkyl group, and $M^1$ represents two hydrogen atoms, a divalent metal atom, or a divalent substituted metal atom including a trivalent or tetravalent metal atom.

6. A film formed of the composition according to claim 1.

7. An optical filter comprising:

the film according to claim 6.

8. A solid-state imaging element comprising:

the film according to claim 6.

9. An image display device comprising:

the film according to claim 6.

10. An infrared sensor comprising:

the film according to claim 6.

11. A camera module comprising:

the film according to claim 6.

12. A compound represented by Formula (1), (1)

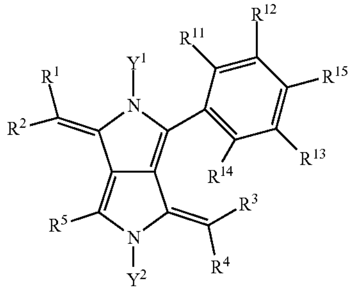

in Formula (1), $R^1$ to $R^4$ each independently represent a substituent, $R^5$ represents an alkyl group, $R^{11}$ to $R^{15}$ each independently represent a hydrogen atom or a substituent, and $Y^1$ and $Y^2$ each independently represent a hydrogen atom or a substituent, where at least one of $R^{11}$ or $R^{14}$ is a substituent, and wherein at least one of $R^{11}$ to $R^{15}$ is a group represented by Formula (R-100);

$$*\text{-}L^{R1}\text{-}(X^{R1})_n \quad \text{(R-100)}$$

wherein, in Formula (R-100), $L^{R1}$ represents an aliphatic hydrocarbon group, an aromatic hydrocarbon group, a heterocyclic group, —O—, —S—, —$NR^{L1}$—, —CO—, —COO—, —OCO—, —$SO_2$—, or an (n+1)-valent linking group consisting of a combination of these groups; $R^{L1}$ represents a hydrogen atom, an alkyl group, or an aryl group; $X^{R1}$ represents an acid group or a basic group; n represents an integer of 1 or more; and, in a case where n is 1, $L^{R1}$ may be a single bond.

13. An infrared absorber comprising:

the compound according to claim 12.

* * * * *